United States Patent
Duluk, Jr. et al.

(10) Patent No.: US 6,597,363 B1
(45) Date of Patent: Jul. 22, 2003

(54) GRAPHICS PROCESSOR WITH DEFERRED SHADING

(75) Inventors: Jerome F. Duluk, Jr., Palo Alto, CA (US); Richard E. Hessel, Pleasanton, CA (US); Vaughn T. Arnold, Scotts Valley, CA (US); Jack Benkual, Cupertino, CA (US); Joseph P. Bratt, San Jose, CA (US); George Cuan, Sunnyvale, CA (US); Stephen L. Dodgen, Boulder Creek, CA (US); Emerson S. Fang, Fremont, CA (US); Zhaoyu Gong, Cupertino, CA (US); Thomas Y. Ho, Fremont, CA (US); Hengwei Hsu, Fremont, CA (US); Sidong Li, San Jose, CA (US); Sam Ng, Fremont, CA (US); Matthew N. Papakipos, Menlo Park, CA (US); Jason R. Redgrave, Mountain View, CA (US); Sushma S. Trivedi, Sunnyvale, CA (US); Nathan D. Tuck, San Diego, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/378,637

(22) Filed: Aug. 20, 1999

(Under 37 CFR 1.47)

Related U.S. Application Data

(63) Continuation of application No. 09/213,990, filed on Dec. 17, 1998.
(60) Provisional application No. 60/097,336, filed on Aug. 20, 1998.

(51) Int. Cl.$^7$ ................................................. G06T 1/20
(52) U.S. Cl. ........................ 345/506; 345/545; 345/563; 345/653; 345/654
(58) Field of Search ................................. 345/506, 419, 345/420, 421, 422, 545, 563, 427, 582, 653, 654, 664, 665, 622, 623

(56) References Cited

U.S. PATENT DOCUMENTS

| | | | |
|---|---|---|---|
| 4,484,346 A | 11/1984 | Sternberg et al. | |
| 4,783,829 A | 11/1988 | Miyakawa et al. | |
| 4,945,500 A | 7/1990 | Deering | 364/522 |
| 4,970,636 A | 11/1990 | Snodgrass et al. | 364/518 |

(List continued on next page.)

OTHER PUBLICATIONS

Angel (interactive computer graphics: a top–down approach with OpenG1: ISBN: 0–201–85571–2—sections 6.8 & 7.7.2).

(List continued on next page.)

*Primary Examiner*—Matthew C. Bella
*Assistant Examiner*—Mackly Monestime
(74) *Attorney, Agent, or Firm*—Dorsey & Whitney LLP; R. Michael Ananian

(57) ABSTRACT

Graphics processors and methods are described that encompass numerous substructures including specialized subsystems, subprocessors, devices, architectures, and corresponding procedures. Embodiments of the invention may include one or more of deferred shading, a bled frame buffer, and multiple-stage hidden surface removal processing, as well as other structures and/or procedures. Embodiments of the present invention are designed to provide high-performance 3D graphics with Phong shading, subpixel anti-aliasing, and texture- and bump-mappings.

29 Claims, 49 Drawing Sheets

U.S. PATENT DOCUMENTS

| | | | |
|---|---|---|---|
| 5,083,287 A | | 1/1992 | Obata et al. ................. 395/126 |
| 5,123,085 A | | 6/1992 | Wells et al. |
| 5,402,532 A | | 3/1995 | Epstein et al. .............. 395/122 |
| 5,448,690 A | | 9/1995 | Shiraishi et al. |
| 5,455,900 A | | 10/1995 | Shiraishi et al. |
| 5,481,669 A | | 1/1996 | Poulton et al. |
| 5,546,194 A | * | 8/1996 | Ross ......................... 358/445 |
| 5,574,836 A | | 11/1996 | Broemmelsiek |
| 5,579,455 A | | 11/1996 | Greene et al. |
| 5,596,686 A | | 1/1997 | Dulukm, Jr. |
| 5,664,071 A | | 9/1997 | Nagashima |
| 5,684,939 A | | 11/1997 | Foran et al. ................ 395/131 |
| 5,699,497 A | | 12/1997 | Erdahl et al. |
| 5,710,876 A | | 1/1998 | Peercy et al. ............... 395/126 |
| 5,751,291 A | * | 5/1998 | Olsen et al. ................ 345/422 |
| 5,767,589 A | | 6/1998 | Lake et al. |
| 5,767,859 A | | 6/1998 | Rossin et al. |
| 5,798,770 A | * | 8/1998 | Baldwin .................... 345/506 |
| 5,828,378 A | | 10/1998 | Shiraishi ..................... 345/422 |
| 5,841,447 A | | 11/1998 | Drews |
| 5,850,225 A | | 12/1998 | Cosman |
| 5,854,631 A | | 12/1998 | Akeley et al. .............. 345/419 |
| 5,860,158 A | | 1/1999 | Pai et al. |
| 5,864,342 A | | 1/1999 | Kajiya et al. ............... 345/418 |
| RE36,145 E | | 3/1999 | DeAguiar et al. .......... 345/511 |
| 5,880,736 A | | 3/1999 | Peercy et al. ............... 345/426 |
| 5,889,997 A | | 3/1999 | Strunk |
| 5,920,326 A | | 7/1999 | Rentschler et al. |
| 5,936,629 A | | 8/1999 | Brown et al. |
| 5,949,424 A | | 9/1999 | Cabral et al. ............... 345/426 |
| 5,949,428 A | | 9/1999 | Toelle et al. |
| 5,977,977 A | | 11/1999 | Kajiya et al. ............... 345/418 |
| 5,990,904 A | | 11/1999 | Griffin |
| 6,002,410 A | | 12/1999 | Battle |
| 6,002,412 A | | 12/1999 | Schinnerer |
| 6,046,746 A | * | 4/2000 | Deering ...................... 345/422 |
| 6,118,452 A | * | 9/2000 | Gannett ...................... 345/418 |
| 6,128,000 A | | 10/2000 | Jouppi et al. |
| 6,167,143 A | * | 12/2000 | Badique ..................... 382/107 |
| 6,167,486 A | | 12/2000 | Lee et al. |
| 6,204,859 B1 | | 3/2001 | Jouppi et al. |
| 6,229,553 B1 | | 5/2001 | Duluk, Jr. et al. |
| 6,243,488 B1 | * | 6/2001 | Penna ........................ 382/154 |
| 6,246,415 B1 | | 6/2001 | Grossman et al. |
| 6,259,452 B1 | | 7/2001 | Coorg et al. |
| 6,259,460 B1 | | 7/2001 | Gossett et al. |
| 6,275,235 B1 | * | 8/2001 | Morgan, III ................ 345/430 |

OTHER PUBLICATIONS

Schilling et al., "Texram: a smart memory for texturing," IEEE computer graphics and applications, 5/96, 32–41.

Watt, "3D Computer Graphics" (2nd ed.), Chapter 4, Reflection and Illumination Models, p. 89–126.

Foley et al., Computer Graphics—Principles and Practice (2nd ed. 1996), Chapter 16, Illumination and Shading, pp. 721–814.

Lathrop, "The Way Computer Graphics Works" (1997) Chapter 7, Rendering (Converting A Scene to Pixels), pp. 93–150.

Peercy et al., "Efficient Bump Mapping Hardware" (Computer Graphics Proceedings, Annual Conference Series, 1997) pp. 303–306.

Peercy et al. "Efficient bump mapping hardware" (Computer Graphics Proceedings, Annual Conference Series, 1997 pp. 303–306).

Lathrop "Rendering (converting a scene to pixels)", (The Way Computer Graphics Works, Wiley Computer Publishing, 1997, John Wiley & Sons, Inc., Chapter 7, pp. 93–150).

Foley et al. "Illumination and shading" (Computer Graphics Principles and Practice (2nd edition in C, Addison–Wesley Publishing Co. 1996, Chapter 16, pp. 721–814).

Watt "Reflection and illumination models" (3D Computer Graphics, 2nd edition, Addison–Wesley, 1993, pp. 89–126).

* cited by examiner

GRAY
FRAGMENTS

WHITE
FRAGMENT

BLACK
BACKGROUND

FILLED
PIXELS

THE FOLLOWING PACKETS WILL BE SENT TO MEX IN TIME ORDER:

| VERTEX | PACKET | REUSE | TYPE | FRONTFACE |
|---|---|---|---|---|
| | CULLMODE1 | | | |
| | MATFRONT1 | | | |
| | MATBACK1 | | | |
| | PIXMODE1 | | | |
| | VTXMODE | | | |
| V0 | COLOR | M | N | 1 |
| V0 | SORT | M | N | 1 |
| V1 | COLOR | M | N | 1 |
| V1 | SORT | M | N | 1 |
| V2 | COLOR | M | T | 1 |
| | VTXMODE | | | |
| V2 | SORT | M | T | 1 |
| V3 | COLOR | M | T | 1 |
| V1 | SORT | M | N | 1 |
| Va | SORT | M | N | 1 |
| Vb | SORT | O | T | 1 |
| V2 | SORT | O | T | 1 |
| V4 | COLOR | M | T | 1 |
| V2 | SORT | M | N | 1 |
| Vb | SORT | M | N | 1 |
| Vc | SORT | O | T | 1 |
| | CULLMODE2 | | | |
| | MATFRONT2 | | | |
| | TEXAFRONT2 | | | |
| | LIGHT1 | | | |
| V5 | COLOR | O | N | 0 |
| V5 | SORT | O | N | 0 |
| V6 | COLOR | O | N | 0 |
| V6 | SORT | O | N | 0 |
| V7 | COLOR | O | T | 0 |
| V7 | SORT | O | T | 0 |
| V8 | COLOR | M | T | 0 |
| V8 | SORT | M | T | 0 |

M: KEEP MIDDLE
O: KEEP OLDEST

N: NOT COMPLETE
P: POINT  L: LINE
T: TRIANGLE

FIG. 24

| STATE PARAMETER SET | DESCRIPTION | APPROXIMATE SIZE (IN 144 BIT WORDS) |
|---|---|---|
| TEXTUREAFRONT | IF THE FRONT (OR BACK) FACING PRIMITIVES ARE NOT CULLED OUT, SOFTWARE MAY CHOOSE TO ATTACH DIFFERENT TEXTURE AND MATERIAL PARAMETER TO THE FRONT AND BACK FACING PRIMITIVES. TEXTUREAFRONT PARTITION OF THE STATE VECTOR CONTAINS THE TEXA STATE APPLICABLE IF THE CURRENT PRIMITIVE IS FRONT FACING. | 2 |
| TEXTUREBFRONT | TEXTUREBFRONT PARTITION OF THE STATE VECTOR CONTAINS THE TEXB STATE APPLICABLE IF THE CURRENT PRIMITIVE IS FRONT FACING. | 6 |
| TEXTUREABACK | TEXTUREABACK PARTITION OF THE STATE VECTOR CONTAINS THE TEXA STATE APPLICABLE IF THE CURRENT PRIMITIVE IS BACK FACING. | 2 |
| TEXTUREBBACK | TEXTUREBBACK PARTITION OF THE STATE VECTOR CONTAINS THE TEXB STATE APPLICABLE IF THE CURRENT PRIMITIVE IS BACK FACING. | 6 |
| MATERIALFRONT | MATERIALFRONT PARTITION OF THE STATE VECTOR CONTAINS THE MATERIAL STATE APPLICABLE IF THE CURRENT PRIMITIVE IS FRONT FACING. | 10 |
| MATERIALBACK | MATERIALBACK PARTITION OF THE STATE VECTOR CONTAINS THE MATERIAL STATE APPLICABLE IF THE CURRENT PRIMITIVE IS BACK FACING. | 10 |
| LIGHT | CONTAINS THE CURRENT LIGHT STATE. | 18 |
| PIXELMODES | CONTAINS THE CURRENT PIXEL MODES. | 2 |
| STIPPLE | CONTAINS CURRENT STIPPLE PATTERN | 8 |
| CULLMODES | CONTAINS CURRENT CULL MODES | 0.33 |

FIG. 25

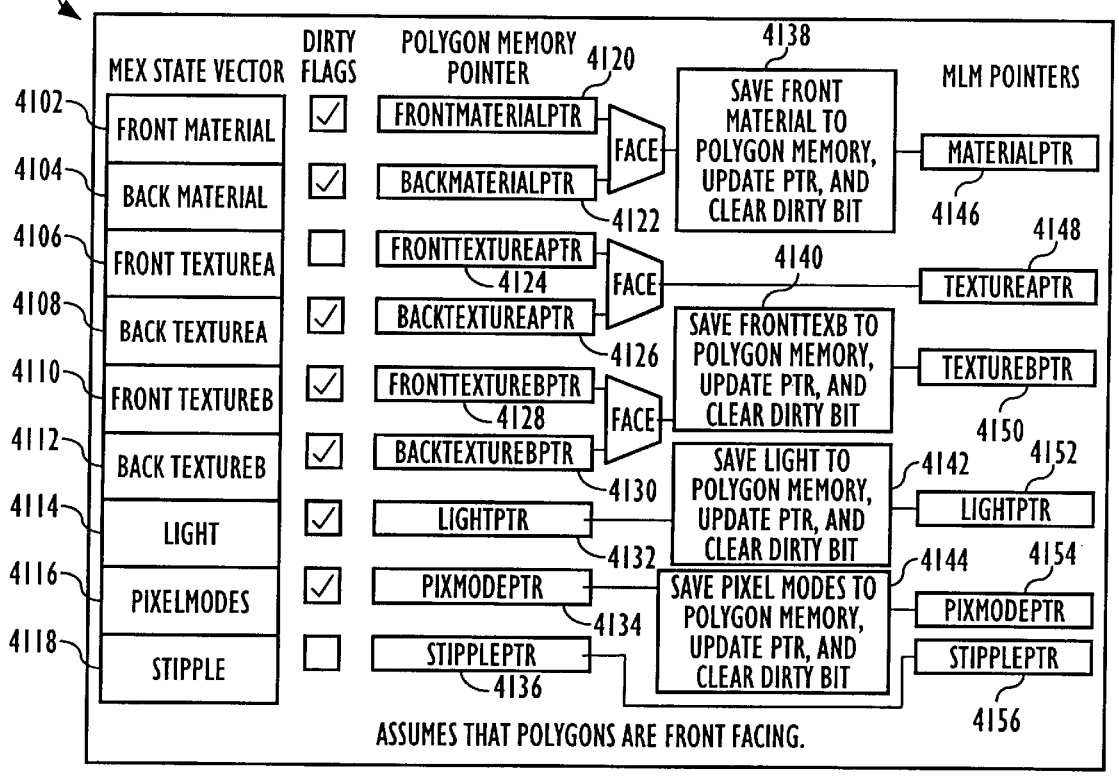

Memory layout (left side, top to bottom with pointers):

- st0 → ta0 | tb0 | m1 | L0 | p1 | s0
- VERTEX V0
- VERTEX V1
- cv2 → VERTEX V2
- cv3 → VERTEX V3
- cv4 → VERTEX V4
- st1 → ta0 | tb0 | mb | L1 | p1 | s0
- VERTEX V5
- VERTEX V6
- cv7 → VERTEX V7
- cv8 → VERTEX V8
- VERTICES ↓

MODES ↑
- L1 → LIGHT1
- mb → MatBack1
- p1 → PixMode1
- m1 → MatFront1
- L0 → LIGHT0
- MaterialBack0
- MaterialFront0
- TextureBBack0
- TextureABack0
- tb0 → TextureBFront0
- ta0 → TextureAFront0
- s0 → STIPPLE0

THE FOLLOWING PACKETS WILL BE SENT TO MEX IN TIME ORDER:

| VERTEX | PACKET | REUSE | TYPE | FRONT | COLOR OFFSET |
|---|---|---|---|---|---|
|  | CullMode1 |  |  |  |  |
|  | MatFront1 |  |  |  |  |
|  | MatBack1 |  |  |  |  |
|  | PixMode1 |  |  |  |  |
| V0 | COLOR | M | N | 1 |  |
| V0 | SORT | M | N | 1 | cv2 |
| V1 | COLOR | M | N | 1 |  |
| V1 | SORT | M | N | 1 | cv2 |
| V2 | COLOR | M | T | 1 |  |
| V2 | SORT | M | T | 1 | cv2 |
| V3 | COLOR | M | T | 1 |  |
| V1 | SORT | M | N | 1 | cv3 |
| Va | SORT | M | N | 1 | cv3 |
| Vb | SORT | O | T | 1 | cv3 |
| V2 | SORT | O | T | 1 | cv3 |
| V4 | COLOR | M | T | 1 |  |
| V2 | SORT | M | N | 1 | cv4 |
| Vb | SORT | M | N | 1 | cv4 |
| Vc | SORT | O | T | 1 | cv4 |
| V4 | SORT | O | T | 1 | cv4 |
|  | CullMode2 |  |  |  |  |
|  | MatFront2 |  |  |  |  |
|  | TexAFront2 |  |  |  |  |
|  | Light1 |  |  |  |  |
| V5 | COLOR | O | N | 0 |  |
| V5 | SORT | O | N | 0 | cv7 |
| V6 | COLOR | O | N | 0 |  |
| V6 | SORT | O | N | 0 | cv7 |
| V7 | COLOR | O | T | 0 |  |
| V7 | SORT | O | T | 0 | cv7 |
| V8 | COLOR | O | T | 0 |  |
| V8 | SORT | O | T | 0 | cv8 |

FIG. 28

| DATA ITEM | BITS / ITEM | ITEMS / PACKET | BITS / PACKET | BYTES / PACKET | NOTES |
|---|---|---|---|---|---|
| COLOR ADDRESS | 23 | 1 | 23 | 2.875 | POINTS TO DUALOCT ADDRESS OF CURRENT VERTEX |
| COLOR OFFSET | 8 | 1 | 8 | 1 | NUMBER OF VERTICES SEPARATING THE CURRENT VERTEX AND THE LAST MLM POINTER |
| COLOR TYPE (FORMAT) | 4 | 1 | 4 | 0.5 | SEE COLOR TYPE TABLE |
|  |  |  | 35 | 4.375 |  |

| BIT VALUE | MEANING | BIT VALUE | MEANING |
|---|---|---|---|
| 00xx | 2 DUAL OCTS | xx00 | TRIANGLE STRIP |
| 01xx | 4 DUAL OCTS | xx01 | TRIANGLE FAN |
| 10xx | 6 DUAL OCTS | xx10 | LINE |
| 11xx | 9 DUAL OCTS | xx11 | POINT |

FIG. 29

| DATA ITEM | BITS / ITEM | ITEMS / PACKET | BITS / PACKET | BYTES / PACKET |
|---|---|---|---|---|
| MATERIAL POINTER | 23 | 1 | 23 | 2.875 |
| MODE POINTER | 23 | 1 | 23 | 2.875 |
| LIGHT POINTER | 23 | 1 | 23 | 2.875 |
| textureA POINTER | 23 | 1 | 23 | 2.875 |
| textureB POINTER | 23 | 1 | 23 | 2.875 |
| STIPPLE POINTER | 23 | 1 | 23 | 2.875 |
|  |  |  | 138 | 17.25 |

FIG. 30

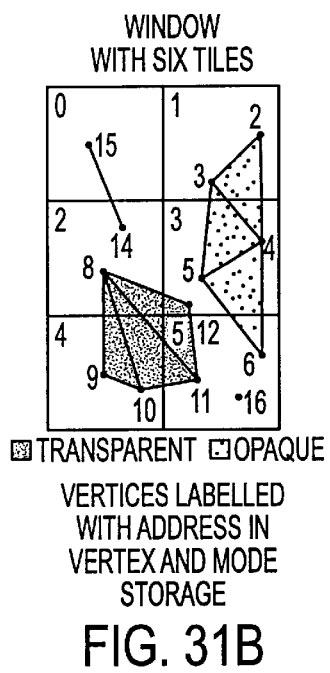
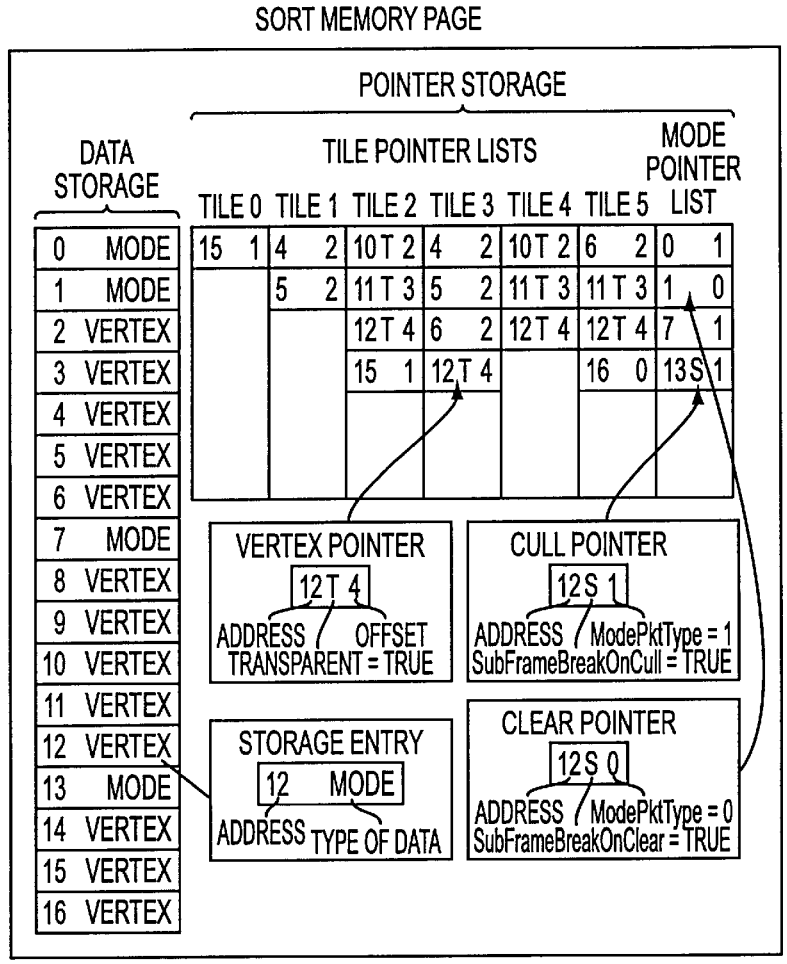
FIG. 31B
FIG. 31A

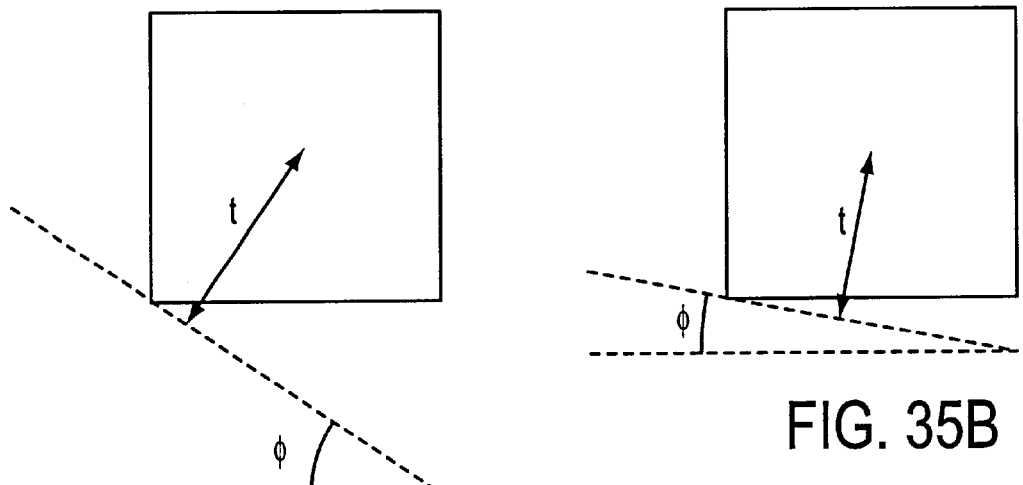
FIG. 35A
FIG. 35B
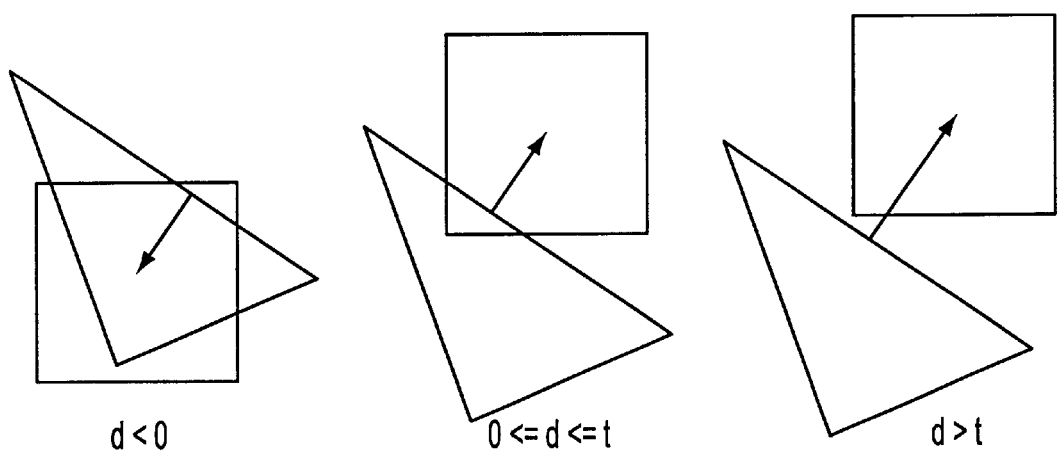
FIG. 36A
FIG. 36B
FIG. 36C

ALIASED TRIANGLE    ANTI-ALIASED TRIANGLE

X-MAJOR LINE
ALIASED LINE

Y-MAJOR LINE
ALIASED LINE

ANTI-ALIASED
LINE

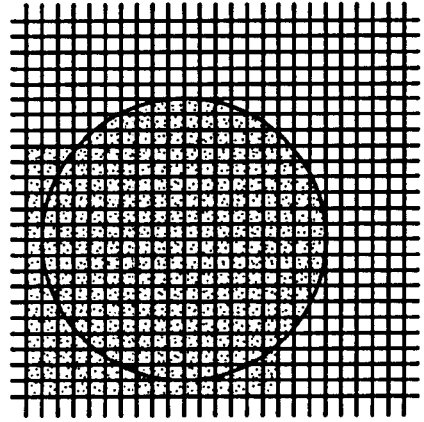
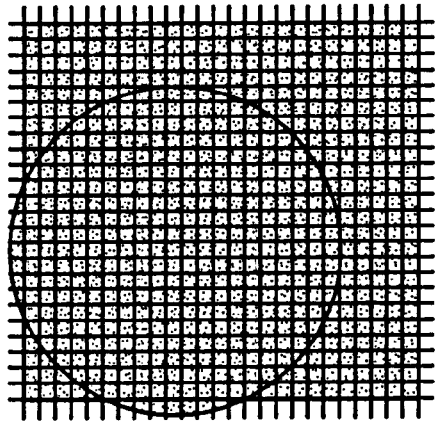
(x, y) = (1.4, 1.4), w = 2.4     (x, y) = (1.2, 1.2), w = 2.6
FIG. 41A     FIG. 41B
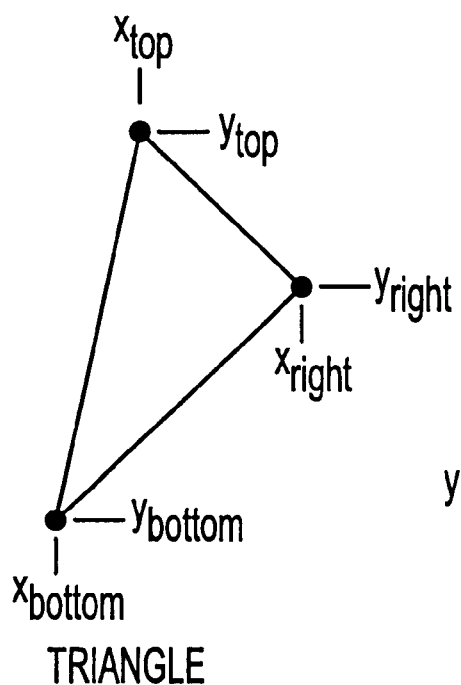
TRIANGLE
FIG. 42A
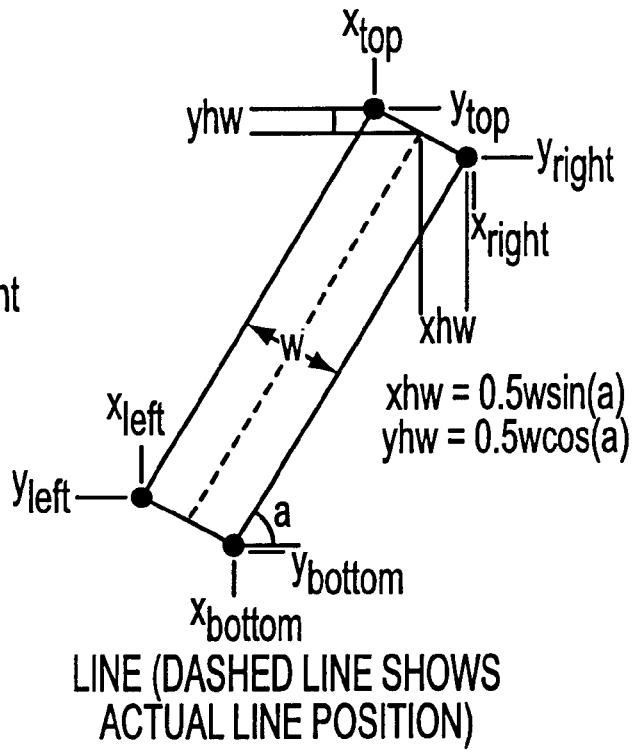
$xhw = 0.5w\sin(a)$
$yhw = 0.5w\cos(a)$
LINE (DASHED LINE SHOWS ACTUAL LINE POSITION)
FIG. 42B

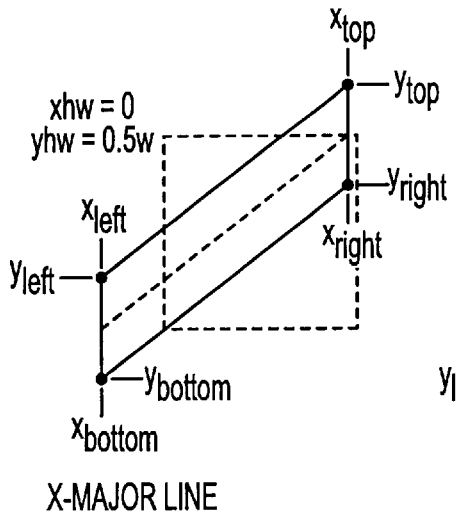
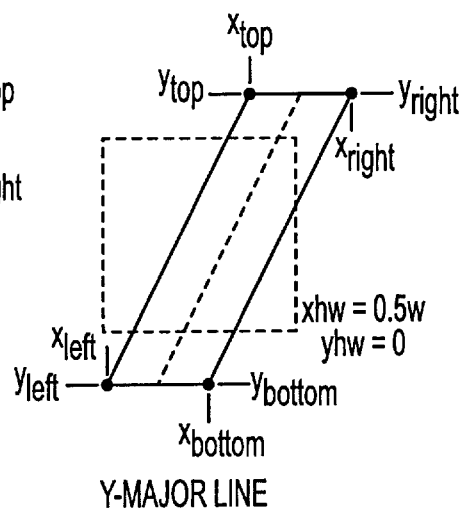
FIG. 43A  FIG. 43B
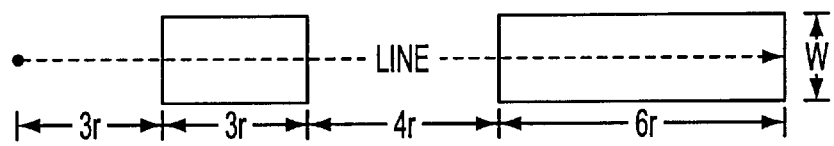
FIG. 44
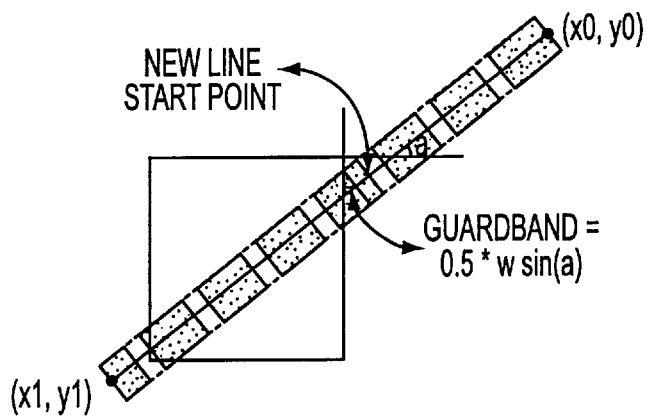
FIG. 45

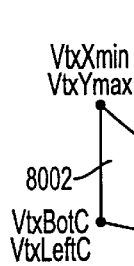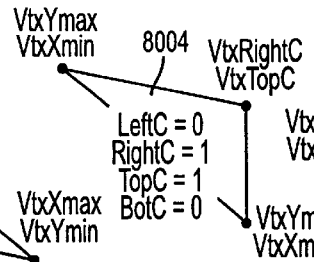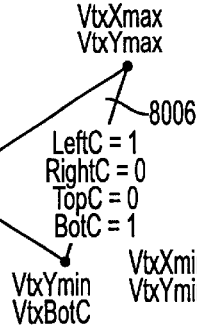
FIG. 47A  FIG. 47B  FIG. 47C  FIG. 47D
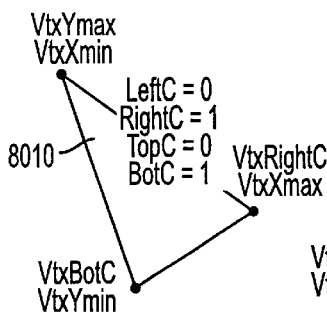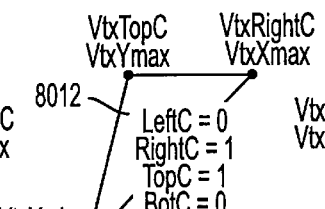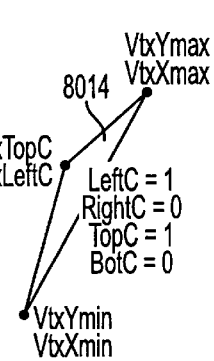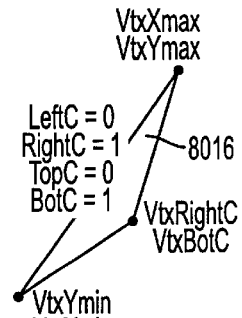
FIG. 47E  FIG. 47F  FIG. 47G  FIG. 47H
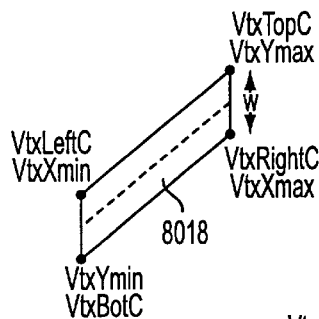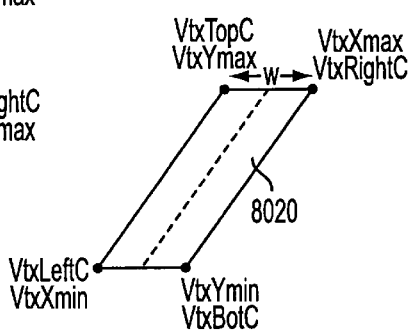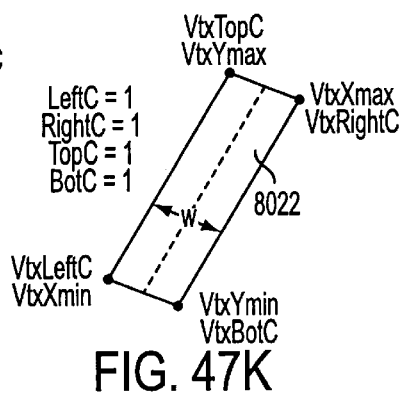
FIG. 47I  FIG. 47J  FIG. 47K

| CACHE | BLOCK | # ENTRIES | DATA CACHELINE SIZE IN (DUALOCTS) |
|---|---|---|---|
| COLORVERTEX | MIJ | .32 | 2 - 9 |
| MLM_PTR | MIJ | 32 | 1 |
| COLORDATA | FRG | 64 - 256 | 6 - 27 |
| TEXTUREA | TEX | 32 | 2 |
| TEXTUREB | TEX | 8 | 6 |
| MATERIAL | PHG | 32 | 10 |
| LIGHT | PHG | 8 | 18 |
| PIXELMODE | PIX | 16 | 2 |
| STIPPLE | PIX | 4 | 8 |

FIG. 55 pMASK 1000
sMASK 1000, 0000, 0000, 0000
COVERAGE 1/4, 0, 0, 0 pMASK 0100
sMASK 0000, 1110, 0000, 0000
COVERAGE 0, 3/4, 0, 0 pMASK 1000
sMASK 0010, 0000, 0000, 0000
COVERAGE 1/4, 0, 0, 0 pMASK 1111
sMASK 1111, 0001, 1100, 1100
COVERAGE 1, 1/4, 1/2, 1/2

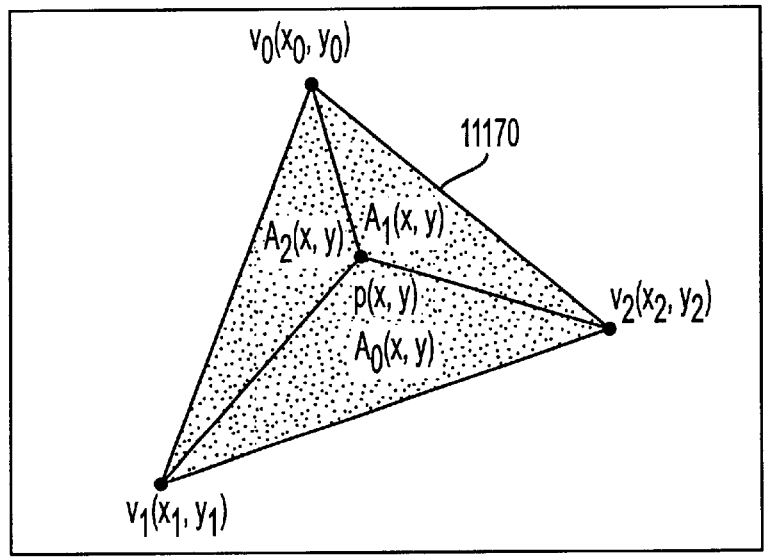
FIG. 59
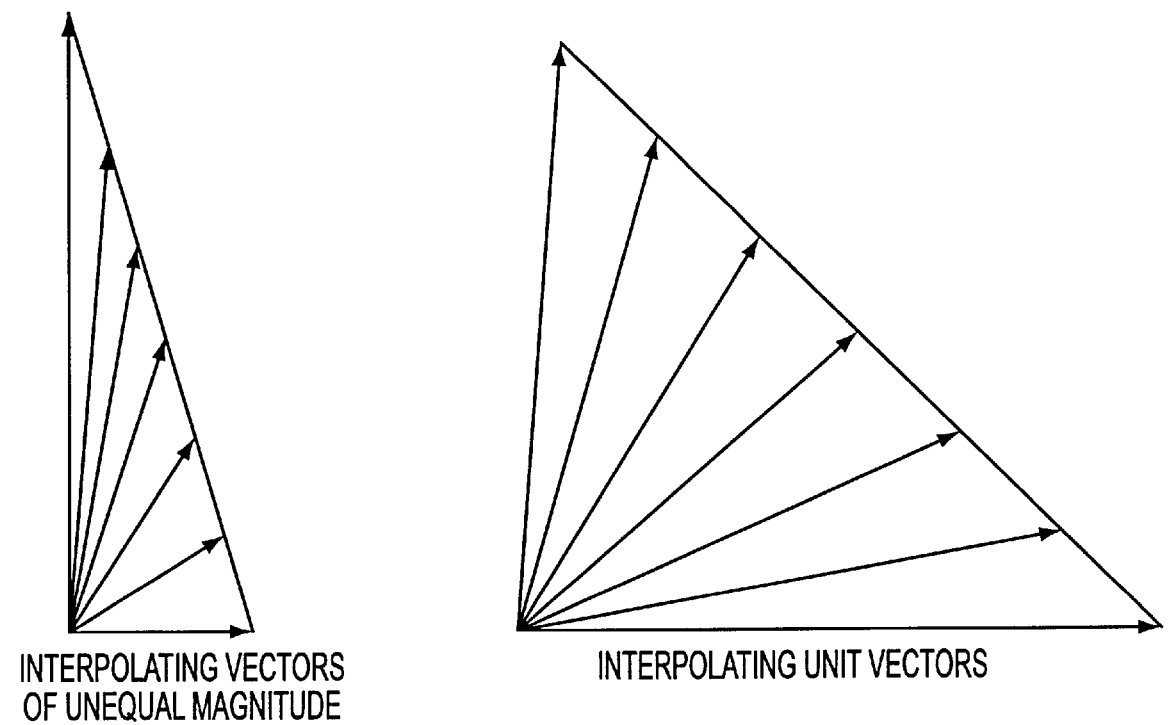
INTERPOLATING VECTORS
OF UNEQUAL MAGNITUDE
INTERPOLATING UNIT VECTORS
FIG. 60A
FIG. 60B

GRAPHICS PROCESSOR WITH DEFERRED SHADING

This application claims the benefit under 35 USC § 119(e) of U.S. Provisional Application Ser. No. 60/097,336 filed Aug. 20, 1998, and under 35 USC § 120 con. of U.S. patent application Ser. No. 09/213,990 filed Dec. 17, 1998.

FIELD OF THE INVENTION

This invention relates to computing systems generally, to three-dimensional computer graphics, more particularly, and more most particularly to structure and method for a three-dimensional graphics processor implementing differed shading and other enhanced features.

BACKGROUND OF THE INVENTION

Three-dimensional Computer Graphics

Computer graphics is the art and science of generating pictures with a computer. Generation of pictures, or images, is commonly called rendering. Generally, in three-dimensional (3D) computer graphics, geometry that represents surfaces (or volumes) of objects in a scene is translated into pixels stored in a frame buffer, and then displayed on a display device. Real-time display devices, such as CRTs used as computer monitors, refresh the display by continuously displaying the image over and over. This refresh usually occurs row-by-row, where each row is called a raster line or scan line. In this document, raster lines are numbered from bottom to top, but are displayed in order from top to bottom.

In a 3D animation, a sequence of images is displayed, giving the illusion of motion in three-dimensional space. Interactive 3D computer graphics allows a user to change his viewpoint or change the geometry in real-time, thereby requiring the rendering system to create new images on-the-fly in real-time.

In 3D computer graphics, each renderable object generally has its own local object coordinate system, and therefore needs to be translated (or transformed) from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. Screen coordinates are points in three-dimensional space, and can be in either screen-precision (i.e., pixels) or object-precision (high precision numbers, usually floating-point), as described later. These translation steps can be compressed into one or two steps by precomputing appropriate translation matrices before any translation occurs. Once the geometry is in screen coordinates, it is broken into a set of pixel color values (that is "rasterized") that are stored into the frame buffer. Many techniques are used for generating pixel color values, including Gouraud shading, Phong shading, and texture mapping.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference).

FIG. 1 shows a three-dimensional object, a tetrahedron, with its own coordinate axes $(x_{obj}, y_{obj}, z_{obj})$. The three-dimensional object is translated, scaled, and placed in the viewing point's coordinate system based on $(x_{eye}, y_{eye}, z_{eye})$. The object is projected onto the viewing plane, thereby correcting for perspective. At this point, the object appears to have become two-dimensional; however, the object's z-coordinates are preserved so they can be used later by hidden surface removal techniques. The object is finally translated to screen coordinates, based on $(x_{screen}, y_{screen}, z_{screen})$, where $Z_{screen}$ is going perpendicularly into the page. Points on the object now have their x and y coordinates described by pixel location (and fractions thereof) within the display screen and their z coordinates in a scaled version of distance from the viewing point.

Because many different portions of geometry can affect the same pixel, the geometry representing the surfaces closest to the scene viewing point must be determined. Thus, for each pixel, the visible surfaces within the volume subtended by the pixel's area determine the pixel color value, while hidden surfaces are prevented from affecting the pixel. Non-opaque surfaces closer to the viewing point than the closest opaque surface (or surfaces, if an edge of geometry crosses the pixel area) affect the pixel color value, while all other non-opaque surfaces are discarded. In this document, the term "occluded" is used to describe geometry which is hidden by other non-opaque geometry.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company, Reading, Mass., 1990, reprinted with corrections 1991, ISBN0-201-12110-7 (hereinafter referred to as the Foley Reference). In the Foley Reference, on page 650, the terms "image-precision" and "object-precision" are defined: "Image-precision algorithms are typically performed at the resolution of the display device, and determine the visibility at each pixel. Object-precision algorithms are performed at the precision with which each object is defined, and determine the visibility of each object."

As a rendering process proceeds, most prior art renderers must compute the color value of a given screen pixel multiple times because multiple surfaces intersect the volume subtended by the pixel. The average number of times a pixel needs to be rendered, for a particular scene, is called the depth complexity of the scene. Simple scenes have a depth complexity near unity, while complex scenes can have a depth complexity of ten or twenty. As scene models become more and more complicated, renderers will be required to process scenes of ever increasing depth complexity. Thus, for most renders, the depth complexity of a scene is a measure of the wasted processing. For example, for a scene with a depth complexity of ten, 90% of the computation is wasted on hidden pixels. This wasted computation is typical of hardware renderers that use the simple Z-buffer technique (discussed later herein), generally chosen because it is easily built in hardware. Methods more complicated than the Z Buffer technique have heretofore generally been too complex to build in a cost-effective manner. An important feature of the method and apparatus invention presented here is the avoidance of this wasted computation by eliminating hidden portions of geometry before they are rasterized, while still being simple enough to build in cost-effective hardware.

When a point on a surface (frequently a polygon vertex) is translated to screen coordinates, the point has three coordinates: 1) the x-coordinate in pixel units (generally including a fraction); 2) the y-coordinate in pixel units (generally including a fraction); and 3) the z-coordinate of the point in either eye coordinates, distance from the virtual screen, or some other coordinate system which preserves the relative distance of surfaces from the viewing point. In this document, positive z-coordinate values are used for the "look direction" from the viewing point, and smaller values indicate a position closer to the viewing point.

When a surface is approximated by a set of planar polygons, the vertices of each polygon are translated to screen coordinates. For points in or on the polygon (other than the vertices), the screen coordinates are interpolated from the coordinates of vertices, typically by the processes of edge walking and span interpolation. Thus, a z-coordinate value is generally included in each pixel value (along with the color value) as geometry is rendered.

Generic 3D Graphics Pipeline

Many hardware renderers have been developed, and an example is incorporated herein by reference: "Leo: A System for Cost Effective 3D Shaded Graphics", by Deering and Nelson, pages 101 to 108 of SIGGRAPH93 Proceedings, Aug. 1–6 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Deering Reference). The Deering Reference includes a diagram of a generic 3D graphics pipeline (i.e., a renderer, or a rendering system) that it describes as "truly generic, as at the top level nearly every commercial 3D graphics accelerator fits this abstraction", and this pipeline diagram is reproduced here as FIG. 2. Such pipeline diagrams convey the process of rendering, but do not describe any particular hardware. This document presents a new graphics pipeline that shares some of the steps of the generic 3D graphics pipeline. Each of the steps in the generic 3D graphics pipeline will be briefly explained here, and are also shown in the method flow diagram of FIG. 3. Processing of polygons is assumed throughout this document, but other methods for describing 3D geometry could be substituted. For simplicity of explanation, triangles are used as the type of polygon in the described methods.

As seen in FIG. 2, the first step within the floating-point intensive functions of the generic 3D graphics pipeline after the data input (Step 212) is the transformation step (Step 214), which was described above. The transformation step is also shown in FIG. 3 as the first step in the outer loop of the method flow diagram, and also includes "get next polygon". The second step, the clip test, checks the polygon to see if it is at least partially contained in the view volume (sometimes shaped as a frustum) (Step 216). If the polygon is not in the view volume, it is discarded; otherwise processing continues. The third step is face determination, where polygons facing away from the viewing point are discarded (Step 218). Generally, face determination is applied only to objects that are closed volumes. The fourth step, lighting computation, generally includes the set up for Gouraud shading and/or texture mapping with multiple light sources of various types, but could also be set up for Phong shading or one of many other choices (Step 222). The fifth step, clipping, deletes any portion of the polygon that is outside of the view volume because that portion would not project within the rectangular area of the viewing plane (Step 224). Generally, polygon clipping is done by splitting the polygon into two smaller polygons that both project within the area of the viewing plane. Polygon clipping is computationally expensive. The sixth step, perspective divide, does perspective correction for the projection of objects onto the viewing plane (Step 226). At this point, the points representing vertices of polygons are converted to pixel space coordinates by step seven, the screen space conversion step (Step 228). The eighth step (Step 230), set up for incremental render, computes the various begin, end, and increment values needed for edge walking and span interpolation (e.g.: x, y, and z-coordinates; RGB color; texture map space u and v-coordinates; and the like).

Within the drawing intensive functions, edge walking (Step 232) incrementally generates horizontal spans for each raster line of the display device by incrementing values from the previously generated span (in the same polygon), thereby "walking" vertically along opposite edges of the polygon. Similarly, span interpolation (Step 234) "walks" horizontally along a span to generate pixel values, including a z-coordinate value indicating the pixel's distance from the viewing point. Finally, the z-buffered blending also referred to as Testing and Blending (Step 236) generates a final pixel color value. The pixel values also include color values, which can be generated by simple Gouraud shading (i.e., interpolation of vertex color values) or by more computationally expensive techniques such as texture mapping (possibly using multiple texture maps blended together), Phong shading (i.e., per-fragment lighting), and/or bump mapping (perturbing the interpolated surface normal). After drawing intensive functions are completed, a double-buffered MUX output look-up table operation is performed (Step 238). In this figure the blocks with rounded corners typically represent functions or process operations, while sharp cornered rectangles typically represent stored data or memory.

By comparing the generated z-coordinate value to the corresponding value stored in the Z Buffer, the z-buffered blend either keeps the new pixel values (if it is closer to the viewing point than previously stored value for that pixel location) by writing it into the frame buffer, or discards the new pixel values (if it is farther). At this step, antialiasing methods can blend the new pixel color with the old pixel color. The z-buffered blend generally includes most of the per-fragment operations, described below.

The generic 3D graphics pipeline includes a double buffered frame buffer, so a double buffered MUX is also included. An output lookup table is included for translating color map values. Finally, digital to analog conversion makes an analog signal for input to the display device.

A major drawback to the generic 3D graphics pipeline is its drawing intensive functions are not deterministic at the pixel level given a fixed number of polygons. That is, given a fixed number of polygons, more pixel-level computation is required as the average polygon size increases. However, the floating-point intensive functions are proportional to the number of polygons, and independent of the average polygon size. Therefore, it is difficult to balance the amount of computational power between the floating-point intensive functions and the drawing intensive functions because this balance depends on the average polygon size.

Prior art Z Buffers are based on conventional Random Access Memory (RAM or DRAM), Video RAM (VRAM), or special purpose DRAMs. One example of a special purpose DRAM is presented in "FBRAM: A new Form of Memory Optimized for 3D Graphics", by Deering, Schlapp, and Lavelle, pages 167 to 174 of SIGGRAPH94 Proceedings, Jul. 24–29, 1994, Computer Graphics Proceedings, Annual Conference Series, published by ACM SIGGRAPH, New York, 1994, Softcover ISBN 0201607956.

Pipeline State

OpenGL is a software interface to graphics hardware which consists of several hundred functions and procedures that allow a programmer to specify objects and operations to produce graphical images. The objects and operations include appropriate characteristics to produce color images of three-dimensional objects. Most of OpenGL (Version 1.2) assumes or requires a that the graphics hardware include a frame buffer even though the object may be a point, line, polygon, or bitmap, and the operation may be an operation on that object. The general features of OpenGL Oust one example of a graphical interface) are described in the reference "The OpenGL® Graphics System: A Specification (Version 1.2) edited by Mark Segal and Kurt Akeley, Version 1.2, March 1998; and hereby incorporated by reference. Although reference is made to OpenGL, the invention is not limited to structures, procedures, or methods which are compatible or consistent with OpenGL, or with any other standard or non-standard graphical interface. Desirably, the inventive structure and method may be implemented in a manner that is consistent with the OpenGL, or other standard graphical interface, so that a data set prepared for one of the standard interfaces may be processed by the inventive structure and method without modification. However, the inventive structure and method provides some features not provided by OpenGL, and even when such generic input/output is provided, the implementation is provided in a different manner.

The phrase "pipeline state" does not have a single definition in the prior-art. The OpenGL specification, for example, sets forth the type and amount of the graphics rendering machine or pipeline state in terms of items of state and the number of bits and bytes required to store that state information. In the OpenGL definition, pipeline state tends to include object vertex pertinent information including for example, the vertices themselves the vertex normals, and color as well as "non-vertex" information.

When information is sent into a graphics renderer, at least some object geometry information is provided to describe the scene. Typically, the object or objects are specified in terms of vertex information, where an object is modeled, defined, or otherwise specified by points, lines, or polygons (object primitives) made up of one or more vertices. In simple terms, a vertex is a location in space and may be specified for example by a three-space (x,y,z) coordinate relative to some reference origin. Associated with each vertex is other information, such as a surface normal, color, texture, transparency, and the like information pertaining to the characteristics of the vertex. This information is essentially "per-vertex" information. Unfortunately, forcing a one-to-one relationship between incoming information and vertices as a requirement for per-vertex information is unnecessarily restrictive. For example, a color value may be specified in the data stream for a particular vertex and then not respecified in the data stream until the color changes for a subsequent vertex. The color value may still be characterized as per-vertex data even though a color value is not explicitly included in the incoming data stream for each vertex.

Texture mapping presents an interesting example of information or data which could be considered as either per-vertex information or pipeline state information. For each object, one or more texture maps may be specified, each texture map being identified in some manner, such as with a texture coordinate or coordinates. One may consider the texture map to which one is pointing with the texture coordinate as part of the pipeline state while others might argue that it is per-vertex information.

Other information, not related on a one-to-one basis to the geometry object primitives, used by the renderer such as lighting location and intensity, material settings, reflective properties, and other overall rules on which the renderer is operating may more accurately be referred to as pipeline state. One may consider that everything that does not or may not change on a per-vertex basis is pipeline state, but for the reasons described, this is not an entirely unambiguous definition. For example, one may define a particular depth test (See later description) to be applied to certain objects to be rendered, for example the depth test may require that the z-value be strictly "greater-than" for some objects and "greater-than-or-equal-to" for other objects. These particular depth tests which change from time to time, may be considered to be pipeline state at that time.

Parameters considered to be renderer (pipeline) state in OpenGL are identified in Section 6.2 of the afore referenced OpenGL Specification (Version 1.2, at pages 193–217).

Essentially then, there are two types of data or information used by the renderer: (1) primitive data which may be thought of as per-vertex data, and (ii) pipeline state data (or simply pipeline state) which is everything else. This distinction should be thought of as a guideline rather than as a specific rule, as there are ways of implementing a graphics renderer treating certain information items as either pipeline state or non-pipeline state.

Per-Fragment Operations

In the generic 3D graphics pipeline, the "z-buffered blend" step actually incorporates many smaller "per-fragment" operational steps.

Application Program Interfaces (APIs), such as OpenGL (Open Graphics Library) and D3D, define a set of per-fragment operations (See Chapter 4 of Version 1.2 OpenGL Specification). We briefly review some exemplary OpenGL per-fragment operations so that any generic similarities and differences between the inventive structure and method and conventional structures and procedures can be more readily appreciated.

Under OpenGL, a frame buffer stores a set of pixels as a two-dimensional array. Each picture-element or pixel stored in the frame buffer is simply a set of some number of bits. The number of bits per pixel may vary depending on the particular GL implementation or context.

Corresponding bits from each pixel in the framebuffer are grouped together into a bitplane; each bitplane containing a single bit from each pixel. The bitplanes are grouped into several logical buffers referred to as the color, depth, stencil, and accumulation buffers. The color buffer in turn includes what is referred to under OpenGI as the front left buffer, the front right buffer, the back left buffer, the back right buffer, and some additional auxiliary buffers. The values stored in the front buffers are the values typically displayed on a display monitor while the contents of the back buffers and auxiliary buffers are invisible and not displayed. Stereoscopic contexts display both the front left and the front right buffers, while monoscopic contexts display only the front left buffer. In general, the color buffers must have the same number of bitplanes, but particular implementations of context may not provide right buffers, back buffers, or auxiliary buffers at all, and an implementation or context may additionally provide or not provide stencil, depth, or accumulation buffers.

Under OpenGL, the color buffers consist of either unsigned integer color indices or R, G, B, and, optionally, a number "A" of unsigned integer values; and the number of bitplanes in each of the color buffers, the depth buffer (if provided), the stencil buffer (if provided), and the accumulation buffer (if provided), is fixed and window dependent. If an accumulation buffer is provided, it should have at least as many bit planes per R, G, and B color component as do the color buffers.

A fragment produced by rasterization with window coordinates of $(x_w, y_w)$ modifies the pixel in the framebuffer at that location based on a number of tests, parameters, and conditions. Noteworthy among the several tests that are typically performed sequentially beginning with a fragment and its associated data and finishing with the final output stream to the frame buffer are in the order performed (and with some variation among APIs): 1) pixel ownership test; 2) scissor test; 3) alpha test; 4) Color Test; 5) stencil test; 6) depth test; 7) blending; 8) dithering; and 9) logicop. Note that the OpenGL does not provide for an explicit "color test" between the alpha test and stencil test. Per-Fragment operations under OpenGL are applied after all the color computations. Each of these tests or operations is briefly described below.

Ownership Test

Under OpenGL, the pixel ownership test determines if the pixel at location $(x_2, y_w)$ in the framebuffer is currently owned by the GL context. If it is not, the window system decides the fate of the incoming fragment. Possible results are that the fragment is discarded or that some subset of the subsequent per-fragment operations are applied to the fragment. This pixel ownership test allows the window system to properly control the GL's behavior.

Assume that in a computer having a display screen, one or several processes are running and that each process has a window on the display screen. For each process, the associated window defines the pixels the process wants to write or render to. When there are two or more windows, the window associated with one process may be in front of the window associated with another process, behind that window, or both windows may be entirely visible. Since there is only a single frame buffer for the entire display screen or desktop, the pixel ownership test involves determining which process and associated window owns each of the pixels. If a particular process does not "own" a pixel, it fails the pixel ownership test relative to the frame buffer and that pixel is thrown away. Note that under the typical paradigm, the pixel ownership test is run by each process, and that for a give pixel location in the frame buffer, that pixel may pass the pixel ownership test for one of the processes, and fail the pixel ownership test for the other process. Furthermore, in general, a particular pixel can pass the ownership test for only one process because only one process can own a particular frame buffer pixel at the same time.

In some rendering schemes the pixel ownership test may not be particularly relevant. For example, if the scene is being rendered to an off-screen buffer, and subsequently Block Transferred or "blitted" to the desktop, pixel ownership is not really even relevant. Each process automatically or necessarily passes the pixel ownership test (if it is executed) because each process effectively owns its own off-screen buffer and nothing is in front of that buffer.

If for a particular process, the pixel is not owned by that process, then there is no need to write a pixel value to that location, and all subsequent processing for that pixel may be ignored. In a typical workstation, all the data associated with a particular pixel on the screen is read during rasterization. All information for any polygon that feeds that pixel is read, including information as to the identity of the process that owns that frame buffer pixel, as well as the z-buffer, the color value, the old color value, the alpha value, stencil bits, and so forth. If a process owns the pixel, then the other downstream process are executed (for example, scissor test, alpha test, and the like) On the other hand, if the process does not own the pixel and fails the ownership test for that pixel, the process need not consider that pixel further and that pixel is skipped for subsequent tests.

Scissor Test

Under OpenGL, the scissor test determines if $(x_w, y_w)$ lies within a scissor rectangle defined by four coordinate values corresponding to a left bottom (left, bottom) coordinate, a width of the rectangle, and a height of the rectangle. The values are set with the procedure "void Scissor( int left, int bottom, sizei width, sizei height)" under OpenGL. If left $\leq x_w <$ left+width and bottom $\leq y_w <$ bottom+height, then the scissor test passes; otherwise the scissor test fails and the particular fragment being tested is discarded. Various initial states are provided and error conditions monitored and reported.

In simple terms, a rectangle defines a window which may be an on-screen or off-screen window. The window is defined by an x-left, x-right, y-top, and y-bottom coordinate (even though it may be expressed in terms of a point and height and width dimensions from that point). This scissor window is useful in that only pixels from a polygon fragment that fall in that screen aligned scissor window will change. In the event that a polygon straddles the scissor window, only those pixels that are inside the scissor window may change.

When a polygon in an OpenGL machine comes down the pipeline, the pipeline calculates everything it needs to in order to determine the z-value and color of that pixel. Once z-value and color are determined, that information is used to determine what information should be placed in the frame buffer (thereby determining what is displayed on the display screen).

Just as with the pixel ownership test, the scissor test provides means for discarding pixels and/or fragments before they actually get to the frame buffer to cause the output to change.

Alpha test

Color is defined by four values, red (R), green (G), blue (B), and alpha (A). The RGB values define the contribution from each of the primary colors, and alpha is related to the transparency. Typically, color is a 32-bit value, 8-bits for each component, though such representation is not limited to 32-bits. Alpha test compares the alpha value of a given pixel to an alpha reference value. The type of comparison may also be specified, so that for example the comparison may be a greater-than operation, a less-than operation, and so forth. If the comparison is a greater-than operation, then the pixel's alpha value has to be greater than the reference to pass the alpha test. So if the pixel's alpha value is 0.9, the reference alpha is 0.8, and the comparison is greater-than, then that pixel passes the alpha test. Any pixel not passing the alpha test is thrown away or discarded. The OpenGL Specification describes the manner in which alpha test is implemented in OpenGL, and we do not describe it further here.

Alpha test is a per-fragment operation and happens after all of the fragment coloring calculations and lighting and shading operations are completed. Each of these per-fragment operations may be though of as part of the conventional z-buffer blending operations.

Color Test

Color test is similar to the alpha test described hereinbefore, except that rather than performing the magnitude or logical comparisons between the pixel alpha (A) value and a reference value, the color test performs a magnitude or logical comparison between one or a combination of the R, G, or B color components and reference value(s). The comparison test may be for example, greater-than, less-than, equal-to, greater-than-or-equal-to, "greater-than-$c_1$ and less-than $c_2$" where $c_1$ and $c_2$ are sore predetermined reference values, and so forth. One might for example, specify a reference minimum R value, and a reference maximum R value, such that the color test would be passed only if the pixel R value is between that minimum and maximum. Color test might, for example, be useful to provide blue-screen functionality. The comparison test may also be performed on a single color component or on a combination of color components. Furthermore, although for the alpha test one typically has one value for each component, for the color test there are effectively two values per component, a maximum value and a minimum value.

Stencil Test

Under OpenGL, stencil test conditionally discards a fragment based on the outcome of a comparison between a value stored in a stencil buffer at location $(x_w, y_w)$ and a reference value. Several stencil comparison functions are permitted such that the stencil test passes never, always, if the reference value is less than, less than or equal to, equal to, greater than or equal to, greater than, or not equal to the masked stored value in the stencil buffer. The Under OpenGL, if the stencil test fails, the incoming fragment is discarded. The reference value and the comparison value can have multiple bits, typically 8 bits so that 256 different values may be represented. When an object is rendered into the frame buffer, a tag having the stencil bits is also written into the frame buffer. These stencil bits are part of the pipeline state. The type of stencil test to perform can be specified at the time the geometry is rendered.

The stencil bits are used to implement various filtering, masking or stenciling operations. For example, if a particular fragment ends up affecting a particular pixel in the frame buffer, then the stencil bits can be written to the frame buffer along with the pixel information.

Depth Buffer Test

Under OpenGL, the depth buffer test discards the incoming fragment if a depth comparison fails. The comparison is enabled or disabled with the generic Enable and Disable commands using the OpenGL symbolic constant DEPTH_TEST. When depth test is disabled, the depth comparison and subsequent possible updates to the depth buffer value are bypassed and a fragment is passed to the next operation. The stencil bits are also involved and are modified even if the test is bypassed. The stencil value is modified if the depth buffer test passed. If depth test is enabled, the depth comparison takes place and the depth buffer and stencil value may subsequently be modified. The manner in which the depth test is implemented in OpenGL is described in greater detail in the OpenGL specification at page 145.

Depth comparisons are implemented in which possible outcomes are as follows: the depth buffer test passes never, always, if the incoming fragment's Z, value is less than, less than or equal to, equal to, greater than, greater than or equal to, or not equal to the depth value stored at the location given by the incoming fragment's $(x_w, y_w)$ coordinates. If the depth buffer test fails, the incoming fragment is discarded. The stencil value at the fragment's $(x_w, y_w)$ coordinate is updated according to the function currently in effect for depth buffer test failure. Otherwise, the fragment continues to the next operation and the value of the depth buffer at the fragment's $(x_w, y_w)$ location is set to the fragment's z, value. In this case the stencil value is updated according to the function currently in effect for depth buffer test success. The necessary OpenGL state is an eight-valued integer and a single bit indicating whether depth buffering is enabled or disabled.

Blending

Under OpenGL, blending combines the incoming fragment's R, G, B, and A values with the R, G, B, and A values stored in the framebuffer at the incoming fragment's $(X_w, Y_w)$ location.

This blending is typically dependent on the incoming fragment's alpha value (A) and that of the corresponding frame buffer stored pixel. In the following discussion, Cs refers to the source color for an incoming fragment, Cd refers to the destination color at the corresponding framebuffer location, and Cc refers to a constant color in-the GL state. Individual RGBA components of these colors are denoted by subscripts of s, d, and c respectively.

Blending is basically an operation that takes color in the frame buffer and the color in the fragment, and blends them together. The manner in which blending is achieved, that is the particular blending function, may be selected from various alternatives for both the source and destination.

Blending is described in the OpenGL specification at page 146–149 and is hereby incorporated by reference. Various blend equations are available under OpenGL. For example, an additive type blend is available wherein a blend result (C) is obtained by adding the product of a source color (Cs) by a source weighting factor quadruplet (S) to the product of a destination color (Cd) and a destination weighting factor (D) quadruplet, that is $C=C_sS+C_dD$. Alternatively, the blend equation may be a subtraction ($C=C_sS-C_dD$), a reverse subtraction ($C=C_dD-C_sS$), a minimum function ($C=\min(C_s, C_d)$), a maximum function ($C=\max(C_s, C_d)$). Under OpenGL, the blending equation is evaluated separately for each color component and its corresponding weighting coefficient. Each of the four R, G, B, A components has its own weighting factor.

The blending test (or blending equation) is part of pipeline state and can potentially change for every polygon, but more typically would chang only for the object made up or several polygons.

In generally, blending is only performed once other tests such as the pixel ownership test and stencil test have been passed so that it is clear that the pixel or fragment under consideration would or could have an effect in the output.

Dithering

Under OpenGL, dithering selects between two color values or indices. In RGBA mode, consider the value of any of the color components as a fixed-point value with m bits to the left of the binary point, where m is the number of bits allocated to that component in the framebuffer; call each such value c. For each c, dithering selects a value c1 such that cl∈ {max{0,[c]-1, [c]}. This selection may depend on the $x_w$ and $y_w$ coordinates of the pixel. In color index mode, the same rule applies with c being a single color index. The value of c must not be larger than the maximum value representable in the framebuffer for either the component or the index.

Although many dithering algorithms are possible, a dithered value produced by any algorithm must generally depend only the incoming value and the fragment's x and y window coordinates. When dithering is disabled, each color component is truncated to a fixed-point value with as many bits as there are in the corresponding framebuffer component, and the color index is rounded to the nearest integer representable in the color index portion of the framebuffer.

The OpenGL Specification of dithering is described more fully in the OpenGL specification, particularly at pages 149–150, which are incorporated by reference.

Logicop

Under OpenGL, there is a final logical operation applied between the incoming fragment's color or index values and the color or index values stored in the frame buffer at the corresponding location. The result of the logical operation replaces the values in the framebuffer at the fragment's (x, y) coordinates. Various logical operations may be implemented between source (s) and destination (d), including for example: clear, set, and, noop, xor, or, nor, nand, invert, copy, inverted and, equivalence, reverse or, reverse and, inverted copy, and inverted or. The logicop arguments and corresponding operations, as well as additional details of the OpenGL logicop implementation, are set forth in the OpenGL specification at pates 150–151. Logical operations are performed independently for each color index buffer that is selected for writing, or for each red, green, blue, and alpha value of each color buffer that is selected for writing. The required state is an integer indicating the logical operation, and two bits indicating whether the logical operation is enabled or disabled.

Antialiasing

In this document, pixels are referred to as the smallest individually controllable element of the display device. But, because images are quantized into discrete pixels, spatial aliasing occurs. A typical aliasing artifact is a "staircase" effect caused when a straight line or edge cuts diagonally across rows of pixels.

Some rendering systems reduce aliasing effects by dividing pixels into subpixels, where each sub-pixel can be colored independently. When the image is to be displayed, the colors for all sub-pixels within each pixel are blended together to form an average color for the pixel. A renderer that uses up to 16 sub-pixels per pixel is described in "RealityEngine Graphics", by Akeley, pages 109 to 116 of SIGGRAPH93 Proceedings, Aug. 1–6, 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Akeley Reference).

Another prior art antialiasing method is the A-Buffer used to perform blending (this technique is also included in the Akeley Reference), and is described in "The A-buffer, an Antialiased Hidden Surface Method" by L. Carpenter, SIGGRAPH 1984 Conference Proceedings, pp.103–108 (hereinafter referred to as the Carpenter Reference). The A-buffer is an antialiasing technique that reduces aliasing by keeping track of the percent coverage of a pixel by a rendered polygon. The main drawback to this technique is the need to sort polygons front-to-back (or back-to-front) at each pixel in order to get acceptable antialiased polygons.

Content Addressable Memories

Most Content Addressable Memories (CAM) perform a bit-for-bit equality test between an input vector and each of the data words stored in the CAM. This type of CAM frequently provides masking of bit positions in order to eliminate the corresponding bit in all words from affecting the equality test. It is inefficient to perform magnitude comparisons in a equality-testing CAM because a large number of clock cycles is required to do the task. CAMs are presently used in translation look-aside buffers within a virtual memory systems in some computers. CAMs are also used to match addresses in high speed computer networks.

Magnitude Comparison CAM (MCCAM) is defined here as any CAM where the stored data are treated as numbers, and arithmetic magnitude comparisons (i.e. less-than, greater-than, less-than-or-equal-to, and the like) are performed on the data in parallel. This is in contrast to ordinary CAM which treats stored data strictly as bit vectors, not as numbers. An MCCAM patent, included herein by reference, is U.S. Pat. No. 4,996,666, by Jerome F. Duluk Jr., entitled "Content-Addressable Memory System Capable of Fully Parallel Magnitude Comparisons", granted Feb. 26, 1991 (hereinafter referred to as the Duluk Patent). Structures within the Duluk Patent specifically referenced shall include the prefix "Duluk Patent" (for example, 'Duluk Patent MCCAM Bit Circuit").

The basic internal structure of an MCCAM is a set of memory bits organized into words, where each word can perform one or more arithmetic magnitude comparisons between the stored data and input data. In general, for an MCCAM, when a vector of numbers is applied in parallel to an array of words, all arithmetic comparisons in all words occur in parallel. Such a parallel search comparison operation is called a "query" of the stored data.

The invention described here augments the capability of the MCCAM by adding various features, including the ability to output all the query result bits every clock cycle and to logically "or" together these output query result bits to form additional outputs.

SUMMARY OF THE INVENTION
Overview of Aspects of the Invention - Top Level Summary Computer graphics is the art and science of generating pictures or images with a computer. This picture generation is commonly referred to as rendering. The appearance of motion, for example in a 3-Dimensional animation is achieved by displaying a sequence of images. Interactive 3-Dimensional (3D) computer graphics allows a user to change his or her viewpoint or to change the geometry in real-time, thereby requiring the rendering system to create new images on-the-fly in real-time. Therefore, real-time performance in color, with high quality imagery is becoming increasingly important.

The invention is directed to a new graphics processor and method and encompasses numerous substructures including specialized subsystems, subprocessors, devices, architectures, and corresponding procedures. Embodiments of the invention may include one or more of deferred shading, a tiled frame buffer, and multiple-stage hidden surface removal processing, as well as other structures and/or procedures. In this document, this graphics processor is hereinafter referred to as the DSGP (for Deferred Shading Graphics Processor), or the DSGP pipeline, but is sometimes referred to as the pipeline.

This present invention includes numerous embodiments of the DSGP pipeline. Embodiments of the present invention are designed to provide high-performance 3D graphics with Phong shading, subpixel anti-aliasing, and texture- and bump-mapping in hardware. The DSGP pipeline provides these sophisticated features without sacrificing performance.

The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL and Direct3D APIs. The OpenGL specification, entitled "The OpenGL Graphics System: A Specification (Version 1.2)" by Mark Segal and Kurt Akeley, edited by Jon Leech, is included incorporated by reference.

Several exemplary embodiments or versions of a Deferred Shading Graphics Pipeline are now described.

Versions of the Deferred Shading Graphics Pipeline

Several versions or embodiments of the Deferred Shading Graphics Pipeline are described here, and embodiments having various combinations of features may be implemented. Furthermore, features of the invention may be implemented independently of other features. Most of the important features described above can be applied to all versions of the DSGP pipeline.

Tiles, Stamps, Samples, and Fragments

Each frame (also called a scene or user frame) of 3D graphics primitives is rendered into a 3D window on the display screen. A window consists of a rectangular grid of pixels, and the window is divided into tiles (hereinafter tiles are assumed to be 16×16 pixels, but could be any size). If tiles are not used, then the window is considered to be one tile. Each tile is further divided into stamps (hereinafter stamps are assumed to be 2×2 pixels, thereby resulting in 64 stamps per tile, but stamps could be any size within a tile). Each pixel includes one or more of samples, where each sample has its own color values and z-value (hereinafter, pixels are assumed to include four samples, but any number could be used). A fragment is the collection of samples covered by a primitive within a particular pixel. The term "fragment" is also used to describe the collection of visible samples within a particular primitive and a particular pixel.

Deferred Shading

In ordinary Z-buffer rendering, the renderer calculates the color value (RGB or RGBA) and z value for each pixel of each primitive, then compares the z value of the new pixel with the current z value in the Z-buffer. If the z value comparison indicates the new pixel is "in front of" the existing pixel in the frame buffer, the new pixel overwrites the old one; otherwise, the new pixel is thrown away.

Z-buffer rendering works well and requires no elaborate hardware. However, it typically results in a great deal of wasted processing effort if the scene contains many hidden surfaces. In complex scenes, the renderer may calculate color values for ten or twenty times as many pixels as are visible in the final picture. This means the computational cost of any per-pixel operation—such as Phong shading or texture-mapping—is multiplied by ten or twenty. The number of surfaces per pixel, averaged over an entire frame, is called the depth complexity of the frame. In conventional z-buffered renderers, the depth complexity is a measure of the renderer's inefficiency when rendering a particular frame.

In a pipeline that performs deferred shading, hidden surface removal (HSR) is completed before any pixel coloring is done. The objective of a deferred shading pipeline is to generate pixel colors for only those primitives that appear in the final image (i.e., exact HSR). Deferred shading generally requires the primitives to be accumulated before HSR can begin. For a frame with only opaque primitives, the HSR process determines the single visible primitive at each sample within all the pixels. Once the visible primitive is determined for a sample, then the primitive's color at that sample location is determined. Additional efficiency can be achieved by determining a single per-pixel color for all the samples within the same pixel, rather than computing per-sample colors.

For a frame with at least some alpha blending (as defined in the afore referenced OpenGL specification) of primitives (generally due to transparency), there are some samples that are colored by two or more primitives. This means the HSR process must determine a set of visible primitives per sample.

In some APIs, such as OpenGL, the HSR process can be complicated by other operations (that is by operation other than depth test) that can discard primitives. These other operations include: pixel ownership test, scissor test, alpha test, color test, and stencil test (as described elsewhere in this specification). Some of these operations discard a primitive based on its color (such as alpha test), which is not determined in a deferred shading pipeline until after the HSR process (this is because alpha values are often generated by the texturing process, included in pixel fragment coloring). For example, a primitive that would normally obscure a more distant primitive (generally at a greater z-value) can be discarded by alpha test, thereby causing it to not obscure the more distant primitive. A HSR process that does not take alpha test into account could mistakenly discard the more distant primitive. Hence, there may be an inconsistency between deferred shading and alpha test (similarly, with color test and stencil test); that is, pixel coloring is postponed until after hidden surface removal, but hidden surface removal can depend on pixel colors. Simple solutions to this problem include: 1) eliminating non-depth-dependent tests from the API, such as alpha test, color test, and stencil test, but this potential solution might prevent existing programs from executing properly on the deferred shading pipeline; and 2) having the HSR process do some color generation, only when, needed, but this potential solution would complicate the data flow considerably. Therefore, neither of these choices is attractive. A third alternative, called conservative hidden surface removal (CHSR), is one of the important innovations provided by the inventive structure and method. CHSR is described in great detail in subsequent sections of the specification.

Another complication in many APIs is their ability to change the depth test. The standard way of thinking about 3D rendering assumes visible objects are closer than obscured objects (i.e., at lesser z-values), and this is accomplished by selecting a "less-than" depth test (i.e., an object is visible if its z-value is "less-than" other geometry). However, most APIs support other depth tests such as: greater-than, less-than, greater-than-or-equal-to, equal, less-than-or-equal-to, less-than, not-equal, and the like algebraic, magnitude, and logical relationships. This essentially "changes the rules" for what is visible. This complication is compounded by an API allowing the application program to change the depth test within a frame. Different geometry may be subject to drastically different rules for visibility. Hence, the time order of primitives with different rendering rules must be taken into account. For example, in the embodiment illustrated in FIG. 4, three primitives are shown with their respective depth test (only the z dimension is shown in the figure, so this may be considered the case for one sample). If they are rendered in the order A, B, then C, primitive B will be the final visible surface. However, if the primitives are rendered in the order C, B, then A, primitive A will be the final visible surface. This illustrates how a deferred shading pipeline must preserve the time ordering of primitives, and correct pipeline state (for example, the depth test) must be associated with each primitive.

Deferred Shading Graphics Pipeline, First Embodiment (Version 1)

A conventional 3D graphics pipeline is illustrated in FIG. 2. We now describe a first embodiment of the inventive 3D Deferred Shading Graphics Pipeline Version 1 (hereinafter "DSGPv1"), relative to FIG. 4. It will be observed that the inventive pipeline (FIG. 4) has been obtained from the generic conventional pipeline (FIG. 2) by replacing the drawing intensive functions 231 with: (1) a scene memory 250 for storing the pipeline state and primitive data describing each primitive, called scene memory in the figure; (2) an exact hidden surface removal process 251; (3) a fragment coloring process 252; and (4) a blending process 253.

The scene memory 250 stores the primitive data for a frame, along with their attributes, and also stores the various settings of pipeline state throughout the frame. Primitive data includes vertex coordinates, texture coordinates, vertex colors, vertex normals, and the like In DSGPv1, primitive data also includes the data generated by the setup for incremental render, which includes spatial, color, and edge derivatives.

When all the primitives in a frame have been processed by the floating-point intensive functions 213 and stored into the scene memory 250, then the HSR process commences. The scene memory 250 can be double buffered, thereby allowing the HSR process to perform computations on one frame while the floating-point intensive functions perform computations on the next frame. The scene memory can also be triple buffered. The scene memory could also be a scratchpad for the HSR process, storing intermediate results for the HSR process, allowing the HSR process to start before all primitive have been stored into the scene memory.

In the scene memory, every primitive is associated with the pipeline state information that was valid when the primitive was input to the pipeline. The simplest way to associate the pipeline state with each primitive is to include the entire pipeline state within each primitive. However, this would introduce a very large amount of redundant information because much of the pipeline state does not change between most primitives (especially when the primitives are in the same object). The preferred way to store information in the scene memory is to keep separate lists: one list for pipeline state settings and one list for primitives. Furthermore, the pipeline state information can be split into a multiplicity of sub-lists, and additions to each sub-list occurs only when part of the sub-list changes. The preferred way to store primitives is done by storing a series of vertices, along with the connectivity information to re-create the primitives. This preferred way of storing primitives eliminates redundant vertices that would otherwise occur in polygon meshes and line strips.

The HSR process described relative to DSGPv1 is required to be an exact hidden surface removal (EHSR) because it is the only place in the DSGPv1 where hidden surface removal is done. The exact hidden surface removal (EHSR) process 251 determines precisely which primitives affect the final color of the pixels in the frame buffer. This process accounts for changes in the pipeline state, which introduces various complexities into the process. Most of these complications stem from the per-fragment operations (ownership test, scissor test, alpha test, and the like), as described above. These complications are solved by the innovative conservative hidden surface removal (CHSR) process, described later, so that exact hidden surface removal is not required.

The fragment coloring process generates colors for each sample or group of samples within a pixel. This can include: Gouraud shading, texture mapping, Phong shading, and various other techniques for generating pixel colors. This process is different from edged walk 232 and span interpolation 234 because this process must be able to efficiently generate colors for subsections of primitives. That is, a primitive may be partially visible, and therefore, colors need to be generated for only some of its pixels, and edge walk and span interpolation assume the entire primitive must be colored. Furthermore, the HSR process may generate a multiplicity of visible subsections of a primitive, and these may be interspersed in time amongst visible subsections of other primitives. Hence, the fragment coloring process 252 should be capable of generating color values at random locations within a primitive without needing to do incremental computations along primitive edges or along the x-axis or y-axis.

The blending process 253 of the inventive embodiment combines the fragment colors together to generate a single color per pixel. In contrast to the conventional z-buffered blend process 236, this blending process 253 does not include z-buffer operations because the exact hidden surface removal process 251 as already determined which primitives are visible at each sample. The blending process 253 may keep separate color values for each sample, or sample colors may be blended together to make a single color for the entire pixel. If separate color values are kept per sample and are stored separately into the Frame buffer 240, then final pixel colors are generated from sample colors during the scan out process as data is sent to the digital to analog converter 242.

Deferred Shading Graphics Pipeline, Second Embodiment (Version 2)

As described above for DSGPv1, the scene memory 250 stores: (1) primitive data; and (2) pipeline state. In a second embodiment of the Deferred Shading Graphics Pipeline 260 (Version 2) (DSGPv2),illustrated in FIG. 5, this scene memory 250 is split into two parts: a spatial memory 261 part and polygon memory 262 part. The split of the data is not simply into primitive data and pipeline state data.

In DSGPv2, the part of the pipeline state data needed for HSR is stored into spatial memory 261, while the rest is stored into polygon memory 262. Examples of pipeline state needed for HSR include (as defined, for example, in the OpenGL Specification) are DepthFunc, DepthMask, StencilEnable, etc. Examples of pipeline state not needed for HSR include: BlendEquation, BlendFunc, stipple pattern, etc. While the choice or identification of a particular blending function (for example, choosing $R=R_s A_s + R_0(1-A_s)$) is not needed for HSR, the HSR process must account for whether the primitive is subject to blending, which generally means the primitive is treated as not being able to fully occlude prior geometry. Similarly, the HSR process must account for whether the primitive is subject to scissor test, alpha test, color test, stencil test, and other per-fragment operations.

Primitive data is also split. The part of the primitive data needed for HSR is stored into spatial memory 261, and the rest of the primitive data is stored into polygon memory 262. The part of primitive data needed for HSR includes vertex locations and spatial derivatives (i.e., $\delta z/\delta x$, $\delta x/\delta y$, $dx/dy$ for edges, etc.). The part of primitive data not needed for HSR includes vertex colors, texture coordinates, color derivatives, etc. If per-fragment lighting is performed in the pipeline, the entire lighting equation is applied to every fragment. But in a deferred shading pipeline, only visible fragments require lighting calculations. In this case, the polygon memory may also include vertex normals, vertex eye coordinates, vertex surface tangents, vertex binormals, spatial, derivatives of all these attributes, and other per-primitive lighting information.

During the HSR process, a primitive's spatial attributes are accessed repeatedly, especially if the HSR process is done on a per-tile basis. Splitting the scene memory 250 into spatial memory 261 and polygon memory 262 has the advantage of reducing total memory bandwidth.

The output from setup for incremental render 230 is input to the spatial data separation process 263, which stores all the data needed for HSR into spatial memory 261 and the rest of the data into polygon memory 262. The EHSR process 264 receives primitive spatial data (e.g., vertex screen coordinates, spatial derivatives, etc.) and the part of the pipeline state needed for HSR (including all control bits for the per-fragment testing operations).

When visible fragments are output from the EHSR 264, the data matching process 265 matches the vertex state and pipeline state with visible fragments, and tile information is stored in tile buffers 266. The remainder of the pipeline is primarily concerned with the scan out process including sample to/from pixel conversion 267, reading and writing to the frame buffer, double buffered MUX output look-up, and digital to analog (D/A) conversion of the data stored in the frame buffer to the actual analog display device signal values.

Deferred Shading Graphics Pipeline, Third Embodiment (Version 3)

In a third embodiment of the Deferred Shading Graphics Pipeline (Version 3) (DSGPv3), illustrated in FIG. 6, the scene memory 250 is still split into two parts (a spatial memory 261 and polygon memory 262) and in addition the setup for incremental render 230 is replaced by a spatial setup which occurs after data separation and prior to exact hidden surface removal. The remainder of the pipeline structure and processes are unchanged from those already described relative to the first embodiment.

Deferred Shading Graphics Pipeline, Fourth Embodiment (Version 4)

In a fourth embodiment of the Deferred Shading Graphics Pipeline (Version 4) (DSGPv4), illustrated in FIG. 7, the exact hidden surface removal of the third embodiment (FIG. 6) is replace by a conservative hidden surface removal structure and procedure and a down-stream z-buffered blend replaces the blending procedure.

Deferred Shading Graphics Pipeline, Fifth Embodiment (Version 5)

In a fifth embodiment of the Deferred Shading Graphics Pipeline (Version 5) (DSGPv5), illustrated in FIG. 8, exact hidden surface removal is used as in the third embodiment, however, the tiling is added, and a tile sorting procedure is added after data separation, and the read is by tile prior to spatial setup. In addition, the polygon memory of the first three embodiments is replaced with a state memory.

Deferred Shading Graphics Pipeline, Sixth Embodiment (Version 6)

In a sixth embodiment of the Deferred Shading Graphics Pipeline (Version 6) (DSGPv6), illustrated in FIG. 9, the exact hidden surface removal of the fifth embodiment (FIG. 8) is replaced with a conservative hidden surface removal, and the downstream blending of the fifth embodiment is replaced with a z-buffered blending (Testing & Blending). This sixth embodiment is preferred because it incorporates several of the beneficial features provided by the inventive structure and method including: a two-part scene memory, primitive data splitting or separation, spatial setup, tiling and per tile processing, conservative hidden surface removal, and z-buffered blending (Testing & Blending), to name a few features.

Other Possible Embodiments (Versions)

It should be noted that although several exemplary embodiments of the inventive Graphics Pipeline have been shown and described relative to FIGS. 4–9, those workers having ordinary skill in the art in light of the description provided here will readily appreciate that the inventive structures and procedures may be implemented in different combinations and permutations to provide other embodiments of the invention, and that the invention is not limited to the particular combinations specifically identified here.

Overviews of Important Innovations

The pipeline renders primitives, and the invention is described relative to a set of renderable primitives that include: 1) triangles, 2) lines, and 3) points. Polygons with more than three vertices are divided into triangles in the Geometry block, but the DSGP pipeline could be easily modified to render quadrilaterals or polygons with more sides. Therefore, since the pipeline can render any polygon once it is broken up into triangles, the inventive renderer effectively renders any polygon primitive.

To identify what part of a 3D window on the display screen a given primitive may affect, the pipeline divides the 3D window being drawn into a series of smaller regions, called tiles and stamps. The pipeline performs deferred shading, in which pixel colors are not determined until after hidden-surface removal. The use of a Magnitude Comparison Content Addressable Memory (MCCAM) allows the pipeline to perform hidden geometry culling efficiently.

Conservative Deferred Shading

One of the central ideas or inventive concepts provided by the invention pertains to Conservative Hidden Surface Removal (CHSR). The CHSR processes each primitive in time order and, for each sample that a primitive touches, makes conservative decision based on the various API state variables, such at depth test and alpha test. One of the important features of the CHSR process is that color computation does not need to be done during hidden surface removal even though non-depth-dependent tests from the API, such as alpha test, color test, and stencil test can be performed by the DSGP pipeline. The CHSR process can be considered a finite state machine (FSM) per sample.

Hereinafter, each per-sample FSM is called a sample finite state machine (SFSM). Each SFSM maintains per-sample data including: (1) z-coordinate information; (2) primitive information (any information needed to generate the primitive's color at that sample or pixel); and (3) one or more sample state bits (for example, these bits could designate the z-value or z-values to be accurate or conservative). While multiple z-values per sample can be easily used, multiple sets of primitive information per sample would be expensive. Hereinafter, it is assumed that the SFSM maintains primitive information for one primitive. The SFSM may also maintain transparency information, which is used for sorted transparencies, described in the next section.

CHSR and Alpha Test

As an example of the CHSR process dealing with alpha test, consider the diagrammatic illustration of FIGS. 10–14, particularly FIG. 11. This diagram illustrates the rendering of six primitives (Primitives A, B, C, D, E, and F) at different z-coordinate locations for a particular sample, rendered in the following order (starting with a "depth clear" and with "depth test" set to less-than): primitives A, B, and C (with "alpha test" disabled); primitive D (with "alpha test"enabled); and primitives E and F (with "alpha test" disabled). We note from the illustration that $z_A > z_C > z_B > z_E > z_D > z_F$, such that primitive A is at the greatest z-coordinate distance. We also note that alpha test is enabled for primitive D, but disabled for each of the other primitives.

Recall from the earlier description of CHSR, that the CHSR process may be considered to be a sample finite state machine (SFSM). The steps for rendering these six primitives under the conservative hidden surface removal process with alpha test are as follows:

Step 1: The depth clear causes the following result in each sample finite state machine (SFSM): 1) z-values are initialized to the maximum value; 2) primitive information is cleared; and 3) sample state bits are set to indicate the z-value is accurate.

Step 2: When primitive A is processed by the SFSM, the primitive is kept (i.e., it becomes the current best guess for the visible surface), and this causes the SFSM to store: 1) the z-value $z_A$ as the "near" z-value; 2) primitive information needed to color primitive A; and 3) the z-value $zZ_A$) is labeled as accurate.

Step 3: When primitive B is processed by the SFSM, the primitive is kept (its z-value is less-than that of primitive A), and this causes the SFSM to store: 1) the z-value $z_B$ as the "near" z-value ($z_A$ is discarded); 2) primitive information needed to color primitive B (primitive A's information is discarded); and 3) the z-value ($z_B$) is labeled as accurate.

Step 4: When primitive C is processed by the SFSM the primitive is discarded (i.e., it is obscured by the current best guess for the visible surface, primitive B), and the SFSM data is not changed.

Step 5: When primitive D (which has alpha test enabled) is processed by the SFSM, the primitive's visibility can not be determined because it is closer than primitive B and because its alpha value is unknown at the time the SFSM operates. Because a decision can not be made as to which primitive would end up being visible (either primitive B or primitive D) primitive B is sent down the pipeline (to have its colors generated) and primitive D is kept. Hereinafter, this is called "early dispatch" of primitive B. When processing of primitive D has been completed, the SFSM stores: 1) the "near" z-value is $z_D$ and the "far" z-value is $Z_B$; 2) primitive information needed to color primitive D (primitive B's information has undergone early dispatch); and 3) the z-values are labeled as conservative (because both a near and far are being maintained). In this condition, the SFSM can determine that a piece of geometry closer than $z_D$ obscures previous geometry, geometry farther than $z_B$ is obscured, and geometry between $z_D$ and $z_B$ is indeterminate and must be assumed to be visible (hence a conservative assumption is made). When an SFSM is in the conservative state and it contains valid primitive information, the SFSM method considers the depth value of the stored primitive information to be the near depth value.

Step 6: When primitive E (which has alpha test disabled) is processed by the SFSM, the primitive's visibility can not be determined because it is between the near and far z-values (i.e., between $z_D$ and $z_B$). However, primitive E is not sent down the pipeline at this time because it could result in the primitives reaching the z-buffered blend (later described as part of the Pixel Block in the preferred embodiment) out of correct time order. Therefore, primitive D is sent down the pipeline to preserve the time ordering. When processing of primitive E has been completed, the SFSM stores: 1) the "near" z-value is $z_D$ and the "far" z-value is $z_D$. (note these have not changed, and $z_E$ is not kept); 2) primitive information needed to color primitive E (primitive D's information has undergone early dispatch); and 3) the z-values are labeled as conservative (because both a near and far are being maintained).

Step 7: When primitive F is processed by the SFSM, the primitive is kept (its z-value is less-than that of the near z-value), and this causes the SFSM to store: 1) the z-value $z_F$ as the "near" z-value ($z_D$ and $z_B$ are discarded); 2) primitive information needed to color primitive F (primitive E's information is discarded); and 3) the z-value ($z_F$) is labeled as accurate.

Step 8: When all the geometry that touches the tile has been processed (or, in the case there are no tiles, when all the geometry in the frame has been processed), any valid primitive information is sent down the pipeline. In this case, primitive F's information is sent. This is the end-of-tile (or end-of-frame) dispatch, and not an early dispatch.

In summary of this exemplary CHSR process, primitives A through F have been processed, and primitives B, D, and F have been sent down the pipeline. To resolve the visibility of B, D, and F, a z-buffered blend (in the Pixel Block in the preferred embodiment) is included near the end of the pipeline. In this example, only the color primitive F is used for the sample.

CHSR and Stencil Test

In the preferred embodiment of the CHSR process, all stencil operations are done near the end of the pipeline (in the z-buffered blend, called the Pixel Block in the preferred embodiment), and therefore, stencil values are not available to the CSHR method (that takes place in the Cull Block of the preferred embodiment) because they are kept in the frame buffer. While it is possible for the stencil values to be transmitted from the frame buffer for use in the CHSR process, this would generally require a long latency path that would reduce performance. The stencil values can not be accurately maintained within the CHSR process because, in APIs such as OpenGL, the stencil test is performed after alpha test, and the results of alpha test are not known to the CHSR process, which means input to the stencil test can not be accurately modeled. Furthermore, renderers maintain stencil values over many frames (as opposed to depth values that are generally cleared at the start of each frame), and these stencil values are stored in the frame buffer. Because of all this, the CHSR process utilizes a conservative approach to dealing with stencil operations. If a primitive can affect the stencil values in the frame buffer, then the primitive is always sent down the pipeline (hereinafter, this is called a "CullFlushOverlap", and is indicated by the assertion of the signal CullFlushOverlap in the Cull Block) because stencil operations occur before the depth test (see OpenGL specification). A CullFlushOverlap condition sets the SFSM to its most conservative state.

As another possibility, if the stencil reference value (see OpenGL specification) is changed and the stencil test is enabled and configured to discard sample values based on the stencil values in the frame buffer, then all the valid primitive information in the SFSMs are sent down the pipeline (hereinafter, this is called a "CullFlushAll", and is indicated by the assertion of the signal CullFlushAll in the Cull Block) and the z-values are set to their maximum value. This "flushing" is needed because changing the stencil reference value effectively changes the "visibility rules" in the z-buffered blend (or Pixel Block)

As an example of the CHSR process dealing with stencil test (see OpenGL specification), consider the diagrammatic illustration of FIG. 12, which has two primitives (primitives A and C) covering four particular samples (with corresponding SFSMs, labeled SFSM0 through SFSM3) and an additional primitive (primitive B) covering two of those four samples. The three primitives are rendered in the following order (starting with a depth clear and with depth test set to less-than): primitive A (with stencil test disabled); primitive B (with stencil test enabled and StencilOp set to "REPLACE", see OpenGL specification); and primitive C (with stencil test disabled). The steps are as follows:

Step 1: The depth clear causes the following in each of the four SFSMs in this example: 1) z-values are initialized to the maximum value; 2) primitive information is cleared; and 3) sample state bits are set to indicate the z-value is accurate.

Step 2: When primitive A is processed by each SFSM, the primitive is kept (i.e., it becomes the current best guess for the visible surface), and this causes the four SFSMs to store: 1) their corresponding z-values (either $z_{A0}$, $z_{A1}$, $z_{A2}$, or $z_{A3}$ respectively) as the "near" z-value; 2) primitive information needed to color primitive A; and 3) the z-values in each SFSM are labeled as accurate.

Step 3: When primitive B is processed by the SFSMs, only samples 1 and 2 are affected, causing SFSM0 and SFSM3 to be unaffected and causing SFSM1 and SFSM2 to be updated as follows: 1) the far z-values are set to the maximum value and the near z-values are set to the minimum value; 2) primitive information for primitives A and B are sent down the pipeline; and 3) sample state bits are set to indicate the z-values are conservative.

Step 4: When primitive C is processed by each SFSM, the primitive is kept, but the SFSMs do not all handle the primitive the same way. In SFSM0 and SFSM3, the state is updated as: 1) $z_{C0}$ and $z_{C3}$ become the "near" z-values ($z_{A0}$ and $z_{A3}$ are discarded); 2) primitive information needed to color primitive C (primitive A's information is discarded); and 3) the z-values are labeled as accurate. In SFSM1 and SFSM2, the state is updated as: 1) $z_{C1}$ and $z_{C2}$ become the "far" z-values (the near z-values are kept); 2) primitive information needed to color primitive C; and 3) the z-values remain labeled as conservative.

In summary of this example CHSR process, primitives A through C have been processed, and all the primitives were sent down the pipeline, but not in all the samples. To resolve the visibility, a z-buffered blend (in the Pixel Block in the preferred embodiment) is included near the end of the pipeline. Multiple samples were shown in this example to illustrate that CullFlushOverlap "flushes" selected samples while leaving others unaffected.

CHSR and Alpha Blending

Alpha blending is used to combine the colors of two primitives into one color. However, the primitives are still subject to the depth test for the updating of the z-values.

As an example of the CHSR process dealing with alpha blending, consider FIG. 13, which has four primitives (primitives A, B, C, and D) for a particular sample, rendered in the following order (starting with a depth clear and with depth test set to less-than): primitive A (with alpha blending disabled); primitives B and C (with alpha blending enabled); and primitive D (with alpha blending disabled). The steps are as follows:

Step 1: The depth clear causes the following in each CHSR SFSM: 1) z-values are initialized to the maximum value; 2) primitive information is cleared; and 3) sample state bits are set to indicate the z-value is accurate.

Step 2: When primitive A is processed by the SFSM, the primitive is kept (i.e., it becomes the current best guess for the visible surface), and this causes the SFSM to store: 1) the z-value $z_A$ as the "near" z-value; 2) primitive information needed to color primitive A; and 3) the z-value is labeled as accurate.

Step 3: When primitive B is processed by the SFSM, the primitive is kept (because its z-value is less-than that of primitive A), and this causes the SFSM to store: 1) the z-value $z_B$ as the "near" z-value ($z_A$ is discarded); 2) primitive information needed to color primitive B (primitive A's information is sent down the pipeline); and 3) the z-value ($z_B$) is labeled as accurate. Primitive A is sent down the pipeline because, at this point in the rendering process, the color of primitive B is to be blended with primitive A. This preserves the time order of the primitives as they are sent down the pipeline.

Step 4: When primitive C is processed by the SFSM, the primitive is discarded (i.e., it is obscured by the current best guess for the visible surface, primitive B), and the SFSM data is not changed. Note that if primitives B and C need to be rendered as transparent surfaces, then primitive C should not be hidden by primitive B. This could be accomplished by turning off the depth mask while primitive B is being rendered, but for transparency blending to be correct, the surfaces should be blended in either front-to-back or back-to-front order.

If the depth mask (see OpenGL specification) is disabled, writing to the depth buffer (i.e., saving z-values) is not performed; however, the depth test is still performed. In this example, if the depth mask is disabled for primitive B, then the value $z_B$ is not saved in the SFSM. Subsequently, primitive C would then be considered visible because its z-value would be compared to $z_A$.

In summary of this example CHSR process, primitives A through D have been processed, and all the primitives were sent down the pipeline, but not in all the samples. To resolve the visibility, a z-buffered blend (in the Pixel Block in the preferred embodiment) is included near the end of the pipeline. Multiple samples were shown in this example to illustrate that CullFlushOverlap "flushes" selected samples while leaving others unaffected.

CHSR and Greater-than Depth Test

Implementation of the Conservative Hidden Surface Removal procedure, advantageously maintains compatibility with other standard APIs, such as OpenGL. Recall that one complication of many APIs is their ability to change the depth test. Recall that the standard way of thinking about 3D rendering assumes visible objects are closer than obscured objects (i.e., at lesser z-values), and this is accomplished by selecting a "less-than" depth test (i.e., an object is visible if its z-value is "less-than" other geometry). Recall also, however, that most APIs support other depth tests, which may change within a frame, such as: greater-than, less-than, greater-than-or-equal-to, equal, less-than-or-equal-to, less-than, not-equal, and the like algebraic, magnitude, and logical relationships. This essentially dynamically "changes the rules" for what is visible, and as a result, the time order of primitives with different rendering rules must be taken into account.

In the case of the inventive conservative hidden surface removal, different or additional procedures are advantageously implemented for reasons described below, to maintain compatibility with other standard APIs when a "greater-than" depth test is used. Those workers having ordinary skill in the art will also realize that analogous changes may advantageously be employed if the depth test is greater-than-or-equal-to, or other functional relationship that would otherwise result in the anomalies described.

We note further that with a conventional non-deferred shader, one executes a sequence of rules for every geometry item and then look to see the final rendered result. By comparison, in embodiments of the inventive deferred shader, that conventional paradigm is broken. The inventive structure and method anticipate or predict what geometry will actually affect the final values in the frame buffer without having to make or generate all the colors for every pixel inside of every piece of geometry. In principle, the spatial position of the geometry is examined, and a determination is made for any particular sample, the one geometry item that affects the final color in the z-buffer, and then generate only that color.

Additional Considerations for the CHSR Process

Samples are done in parallel, and generally all the samples in all the pixels within a stamp are done in parallel. Hence, if one stamp can be processed per clock cycle (and there are 4 pixels per stamp and 4 samples per pixel), then 16 samples are processed per clock cycle. A "stamp" defines the number of pixels and samples processed at one time. This per-stamp processing is generally pipelined, with pipeline stalls injected if a stamp needs to be processed again before the same stamp (from a previous primitive) has completed (that is, unless out-of-order stamp processing can be handled).

If there are no early dispatches are needed, then only end-of-tile dispatches are needed. This is the case when all the geometry in a tile is opaque and there are no stencil tests or operations and there are no alpha tested primitives that could be visible.

The primitive information in each SFSM can be replaced by a pointer into a memory where all the primitive information is stored. As described in later in the preferred embodiment, the Color Pointer is used to point to a primitive's information in Polygon Memory.

As an alternative, only the far z-value could be kept (the near z-value is not kept), thereby reducing data storage, but requiring the sample state bits to remain "conservative" after primitive F and also causing primitive E to be sent down the pipeline because it would not be known whether primitive E is in front or behind primitive F.

As an alternative to maintaining both a near z-value and a far z-value, only the far z-value could be kept, thereby reducing data storage, but requiring the sample state bits to remain "conservative" when they could have been labeled "accurate", and also causing additional samples to be dispatched down the pipeline. In the first CHSR example above (the one including alpha test), the sample state bits would remain "conservative" after primitive F, and also, primitive E would be sent down the pipeline because it would not be known whether primitive E is in front or behind primitive F due to the lack of the near z-value.

Processing stamps has greater efficiency than simply allowing for SFSMs to operate in parallel on a stamp-by-stamp basis. Stamps are also used to reduce the number of data packets transmitted down the pipeline. That is, when one sample within a stamp is dispatched (either early dispatch or end-of-tile dispatch), other samples within the same stamp and the same primitive are also dispatched (such a joint dispatch is hereinafter called a Visible Stamp Portion, or VSP). In the second CHSR example above (the one including stencil test), if all four samples were in the same stamp, then the early dispatching of samples 1 and 2 would cause early dispatching of samples 0 and 3. While this causes more samples to be sent down the pipeline and appear to increase the amount of color computation, it does not (in general) cause a net increase, but rather a net decrease in color computation. This is due to the spatial coherence within a pixel (i.e., samples within the same pixel tend to be either visible together or hidden together) and a tendency for the edges of polygons with alpha test, color test, stencil test, and/or alpha blending to potentially split otherwise spatially coherent stamps. That is, sending additional samples down the pipeline when they do not appreciably increase the computational load is more than offset by reducing the total number of VSPs that need to be sent. In the second CHSR example above, if all the samples are in the same stamp, then the same number of VSPs would be generated.

In the case of alpha test, if alpha values for a primitive arise only from the alpha values at the vertices (not from other places such as texturing), then a simplified alpha test can be done for entire primitives. That is, the vertex processing block (called GEO in later sections) can determine when any interpolation of the vertex alpha values would be guaranteed to pass the alpha test, and for that primitive, disable the alpha test. This can not be done if the alpha values can not be determined before CHSR is performed.

If a frame does not start with depth clear, then the SFSMs are set to their most conservative state (with near z-values at the minimum and far z-values at the maximum).

In the preferred embodiment, the CHSR process is performed in the Cull Block.

Hardware Sorting by Tile, including Pipeline State Information

In the inventive structure and method, we note that time-order is preserved within each tile, including preserving time-order of pipeline state information. Clear packets are also used. In embodiments of the invention, the sorting is performed in hardware and RAMBUS memories advantageously permit dualoct storage of one vertex. For sorted transparency mode, guaranteed opaque geometry (that is, geometry that is known to obscure more distant geometry) is read out of Sort Memory in the first pass. In subsequent passes, the rest of the geometry is read once in each subsequent pass. In the preferred embodiment, the tile sorting method is performed in the Sort Block.

All vertices and relevant mode packets or state information packets are stored as a time order linear list. For each tile that's touched by a primitive, a pointer is added to the vertex in that linear list that completes the primitive. For example, a triangle primitive is defined by 3 vertices, and a pointer would be added to the (third) vertex in the linear list to complete the triangle primitive. Other schemes that use the first vertex rather than the third vertex may alternatively be implemented.

In essence, a pointer is used to point to one of the vertices in the primitive, with adequate information for finding the other vertices in the primitive. When it's time to read these primitives out, the entire primitive can be reconstructed from the vertices and pointers. Each tile is a list of pointers that point to vertices and permit recreation of the primitive from the list. This approach permits all of the primitives to be stored, even those sharing a vertex with another primitive, yet only storing each vertex once.

In one embodiment of the inventive procedure, one list per tile is maintained. We do not store the primitive in the list, but instead the list stores pointers to the primitives. These pointers are actually pointing to one of the primitives, and is a pointer into one of the vertices in the primitive, and the pointer also includes information adequate to find the other vertices in the same primitive. This sorting structure is advantageously implemented in hardware using the structure comprising three storage structures, a data storage, a tile pointer storage, and a mode pointer storage. For a given tile, the goal is to recreate the time-order sequence-of primitives that touch the particular tile being processed, but ignore the primitives that don't touch the tile. We earlier extracted the modes and stored them separately, now we want to inject the mode packets into this stream of primitives at the right place. We note further that it is not enough to simply extract the mode packet at one stage and then reinject it at another stage, because the mode packet will be needed for processing the primitive, which may overly more than one tile. Therefore, the mode packets must be reassociated with all of the relevant tiles at the appropriate times.

One simple approach would be to write a pointer to the mode packet into every tile list. During subsequent reads of this list, it would be easy to access the mode packet address and read the appropriate mode data. However, this approach is disadvantageous because of the cost associated with writing the pointer to all or the tiles. In the inventive procedure, during processing of each tile, we read an entry from the appropriate tile pointer list and if we have read (fetched) the mode data for that vertex and sent it along, we merely retrieve the vertex from the data storage and send it down the pipeline; however, in the even that the mode data has changed between the last vertex retrieved and the next sequential vertex in the tile pointer list, then the mode data is fetched from the data storage and sent down the pipeline before the next vertex is sent so that the appropriate mode data is available when the vertex arrives. We note that entries in the mode pointer list identify at which vertex the mode changes. In one embodiment, entries. In the mode pointer store the first vertex for which the mode data pertains, however, alternative procedures, such as storing the last vertex for which the mode data applies could be used so long as consistent rules are followed.

Two Modes of DSGP Operation

The DSGP can operate in two distinct modes: 1) Time Order Mode, and 2) Sorted Transparency Mode. Time Order Mode is described above, and is designed to preserve, within any particular tile, the same temporal sequence of primitives. The Sorted Transparency mode is described immediately below. In the preferred embodiment, the control of the pipeline operating mode is done in the Sort Block.

The Sort Block is located in the pipeline between a Mode Extraction Unit (MEX) and Setup (STP) unit. Sort Block operates primarily to take geometry scattered around the display window and sort it into tiles. Sort Block also manages the Sort Memory, which stores all the geometry from the entire scene before it is rasterized, along with some mode information. Sort memory comprises a double-buffered list of vertices and modes. One page collects a scene's geometry (vertex by vertex and mode by mode), while the other page is sending its geometry (primitive by primitive and mode by mode) down the rest of the pipeline.

When a page in sort memory is being written, vertices and modes are written sequentially into the sort memory as they are received by the sort block. When a page is read from sort memory, the read is done on a tile-by-tile basis, and the read process operates in two modes: (1) time order mode, and (2) sorted transparency mode.

Time-Ordered Mode

In time ordered mode, time order of vertices and modes are preserved within each tile, where a tile is a portion of the display window bounded horizontally and vertically. By time order preserved, we mean that for a given tile, vertices and modes are read in the same order as they are written.

Sorted Transparency Mode

In sorted transparency mode, reading of each tile is divided into multiple passes, where, in the first pass, guaranteed opaque geometry is output from the sort block, and in subsequent passes, potentially transparent geometry is output from the sort block. Within each sorted transparency mode pass, the time ordering is preserved, and mode date is inserted in its correct time-order location. Sorted transparency mode by be performed in either back-to-front or front-to-back order. In the preferred embodiment, the sorted transparency method is performed jointly by the Sort Block and the Cull Block.

Multiple-step Hidden Surface Removal

Conventionally hidden surfaces are removed using either an "exact" hidden surface removal procedure, or using z-buffers. In one embodiment of the inventive structure and method, a two-step approach is implemented wherein a (i) "conservative" hidden surface removal is followed by (ii) a z-buffer based procedure. In a different embodiment, a three-step approach is implemented: (i) a particular spatial Cull procedure, (ii) conservative hidden surface removal, and (iii) z-buffer. Various embodiments of conservative hidden surface removal (CHSR) has already been described elsewhere in this disclosure.

Pipeline State Preservation and Caching

Each vertex includes a color pointer, and as vertices are received, the vertices including the color pointer are stored in sort memory data storage. The color pointer is a pointer to a location in the polygon memory vertex storage that includes a color portion of the vertex data. Associated with all of the vertices, of either a strip or a fan, is an Material-Lighting-Mode (MLM) pointer set. MLM includes six main pointers plus two other pointers as described below. Each of the six main pointers comprises an address to the polygon memory state storage, which is a sequential storage of all of the state that has changed in the pipeline, for example, changes in the texture, the pixel, lighting and so forth, so that as a need arises any time in the future, one can recreate the state needed to render a vertex (or the object formed from one or more vertices) from the MLM pointer associated with the vertex, by looking up the MLM pointers and going back into the polygon memory state storage and finding the state that existed at the time.

The Mode Extraction Block (MEX) is a logic block between Geometry and Sort that collects temporally ordered state change data, stores the state in Polygon memory, and attaches appropriate pointers to the vertex data it passes to Sort Memory. In the normal OpenGL pipeline, and in embodiments of the inventive pipeline up to the Sort block, geometry and state data is processed in the order in which it was sent down the pipeline. State changes for material type, lighting, texture, modes, and stipple affect the primitives that follow them. For example, each new object will be preceded by a state change to set the material parameters for that object.

In the inventive pipeline, on the other hand, fragments are sent down the pipeline in Tile order after the Cull block. The Mode Injection Block figures out how to preserve state in the portion of the pipeline that processes data in spatial (Tile) order instead of time order. In addition to geometry data, Mode Extraction Block sends a subset of the Mode data (cull_mode) down the pipeline for use by Cull. Cull_mode packets are produced in Geometry Block. Mode Extraction Block inserts the appropriate color pointer in the Geometry packets.

Pipeline state is broken down into several categories to minimize storage as follows: (1) Spatial pipeline state includes data headed for Sort that changes every vertex; (2) Cull_mode state includes data headed for Cull (via Sort) that changes infrequently; (3) Color includes data headed for Polygon memory that changes every vertex; (4) Material includes data that changes for each object; (5) TextureA includes a first set of state for the Texture Block for textures 0&1; (6) TextureB includes a second set of state for the Texture Block for textures 2 through 7; (7) Mode includes data that hardly ever changes; (8) Light includes data for Phong; (9) Stipple includes data for polygon stipple patterns. Material, Texture, Mode, Light, and Stipple data are collectively referred to as MLM data (for Material, Light and Mode). We are particularly concerned with the MLM pointers fir state preservation.

State change information is accumulated in the MEX until a primitive (Spatial and Color packets) appears. At that time, any MLM data that has changed since the last primitive, is written to Polygon Memory. The Color data, along with the appropriate pointers to MLM data, is also written to Polygon Memory. The spatial data is sent to Sort, along with a pointer into Polygon Memory (the color pointer). Color and MLM data are all stored in Polygon memory. Allocation of space for these records can be optimized in the micro-architecture definition to improve performance.

All of these records are accessed via pointers. Each primitive entry in Sort Memory contains a Color Pointer to the corresponding Color entry in Polygon Memory. The Color Pointer includes a Color Address, Color Offset and Color Type that allows us to construct a point, line, or triangle and locate the MLM pointers. The Color Address points to the final vertex in the primitive. Vertices are stored in order, so the vertices in a primitive are adjacent, except in the case of triangle fans. The Color Offset points back from the Color Address to the first dualoct for this vertex list. (We will refer to a point list, line strip, triangle strip, or triangle fan as a vertex list.) This first dualoct contains pointers to the MLM data for the points, lines, strip, or fan in the vertex list. The subsequent dualocts in the vertex list contain Color data entries. For triangle fans, the three vertices for the triangle are at Color Address, (Color Address-1), and (Color Address-Color Offset +1). Note that this is not quite the same as the way pointers are stored in Sort memory.

State is a time varying entity, and MEX accumulates changes in state so that state can be recreated for any vertex or set of vertices. The MIJ block is responsible for matching state with vertices down stream. Whenever a vertex comes into MEX and certain indicator bits are set, then a subset of the pipeline state information needs to be saved. Only the states that have changed are stored, not all states, since the complete state can be created from the cumulative changes to state. The six MLM pointers for Material, TextureA, TextureB, Mode, Light, and Stipple identify address locations where the most recent changes to the respective state information is stored. Each change in one of these state is identified by an additional entry at the end of a sequentially ordered state storage list stored in a memory. Effectively, all state changes are stored and when particular state corresponding to a point in time (or receipt of a vertex) is needed, the state is reconstructed from the pointers.

This packet of mode that are saved are referred to as mode packets, although the phrase is used to refer to the mode data changes that are stored, as well as to larger sets of mode data that are retrieved or reconstructed by MIJ prior to rendering.

We particularly note that the entire state can be recreated from the information kept in the relatively small color pointer.

Polygon memory vertex storage stores just the color portion. Polygon memory stores the part of pipeline stat that is not needed for hidden surface removal, and it also stores the part of the vertex data which is not needed for hidden surface removal (predominantly the items needed to make colors.)

Texel Reuse Detection and Tile Based Processing

The inventive structure and method may advantageously make use of trilinear mapping of multiple layers (resolutions) of texture maps.

Texture maps are stored in a Texture Memory which may generally comprise a single-buffered memory loaded from the host computer's memory using the AGP interface. In the exemplary embodiment, a single polygon can use up to four textures. Textures are MIP-mapped. That is, each texture comprises a series of texture maps at different levels of detail or resolution, each map representing the appearance of the texture at a given distance from the eye point. To produce a texture value for a given pixel fragment, the Texture block performs tri-linear interpolation from the texture maps, to approximate the correct level of detail. The Texture block can alternatively performs other interpolation methods, such as anisotropic interpolation.

The Texture block supplies interpolated texture values (generally as RGBA color values) to the Phong block on a per-fragment basis. Bump maps represent a special kind of texture map. Instead of a color, each texel of a bump map contains a height field gradient.

The multiple layers are MIP layers, and interpolation is within and between the MIP layers. The first interpolation ii within each layer, then you interpolate between the two adjacent layers, one nominally having resolution greater than required and the other layer having less resolution than required, so that it is done 3-dimensionally to generate an optimum resolution.

The inventive pipeline includes a texture memory which includes a texture cache really a textured reuse register because the structure and operation are different from conventional caches. The host also includes storage for texture, which may typically be very large, but in order to render a texture, it must be loaded into the texture cache which is also referred to as texture memory. Associated with each VSP are S and T's. In order to perform trilinear MIP mapping, we necessarily blend eight (8) samples, so the inventive structure provides a set of eight content addressable (memory) caches running in parallel. n one embodiment, the cache identifier is one of the content addressable tags, and that's the reason the tag part of the cache and the data part of the cache is located are located separate from the tag or index. Conventionally, the tag and data are co-located so that a query on the tag gives the data. In the inventive structure and method, the tags and data are split up and indices are sent down the pipeline.

The data and tags are stored in different blocks and the content addressable lookup is a lookup or query of an address, and even the "data" stored at that address in itself and index that references the actual data which is stored in a different block. The indices are determined, and sent down the pipeline so that the data referenced by the index can be determined. In other words, the tag is in one location, the texture data is in a second location, and the indices provide a link between the two storage structures.

In one embodiment of the invention Texel Reuse Detection Registers (TRDR) comprise a multiplicity of associate memories, generally located on the same integrated circuit as the texel interpolator. In the preferred embodiment, the texel reuse detection method is performed in the Texture Block.

In conventional 3-D graphics pipelines, an object in some orientation in space is rendered. The object has a texture map on it, and its represented by many triangle primitives. The procedure implemented in software, will instruct the hardware to load the particular object texture into a DRAM. Then all of the triangles that are common to the particular object and therefore have the same texture map are fed into the unit and texture interpolation is performed to generate all of the colored pixels need to represent that particular object. When that object has been colored, the texture map in DRAM can be destroyed since the object has been rendered. If there are more than one object that have the same texture map, such as a plurality of identical objects (possibly at different orientations or locations), then all of that type of object may desirably be textured before the texture map in DRAM is discarded. Different geometry may be fed in, but the same texture map could be used for all, thereby eliminating any need to repeatedly retrieve the texture map from host memory and place it temporarily in one or more pipeline structures.

In more sophisticated conventional schemes, more than one texture map may be retrieved and stored in the memory, for example two or several maps may be stored depending on the available memory, the size of the texture maps, the need to store or retain multiple texture maps, and the sophistication of the management scheme. Each of these conventional texture mapping schemes, spatial object coherence is of primary importance. At least for an entire single object, and typically for groups of objects using the same texture map, all of the triangles making up the object are processed together. The phrase spatial coherency is applied to such a scheme because the triangles form the object and are connected in space, and therefore spatially coherent.

In the inventive deferred shader structure and method we do not necessarily rely on or derive appreciable benefit from this type of spatial object coherence. Embodiments of the inventive deferred shader operate on tiles instead. Any given tile might have an entire object, a plurality of objects, some entire objects, or portions of several objects, so that spatial object coherence over the entire tile is typically absent.

Well we break that conventional concept completely because the inventive structure and method are directed to a deferred shader. Even if a tile should happen to have an entire object there will typically be different background, and the inventive Cull Block and Cull procedure will typically generate and send VSPs in a completely jumbled and spatially incoherent order, even if the tile might support some degree of spatial coherency. As a result, the pipeline and texture block are advantageously capable of changing the texture map on the fly in real-time and in response to the texture required for the object primitive (e.g. triangle) received. Any requirement to repeatedly retrieve the texture map from the host to process the particular object primitive (for example, single triangle) just received and then dispose of that texture when the next different object primitive needing a different texture map would be problematic to say the least and would preclude fast operation.

In the inventive structure and method, a sizable memory is supported on the card. In one implementation 128 megabytes are provided, but more or fewer megabytes may be provided. For example, 34 Mb, 64 Mb, 256 Mb, 512 Mb, or more may be provided, depending upon the needs of the user, the real estate available on the card for memory, and the density of memory available.

Rather that reading the 8 textels for every visible fragment, using them, and throwing them away so that the 8 textels for the next fragment can be retrieved and stored, the inventive structure and method stores and reuses them when there is a reasonable chance they will be needed again.

It would be impractical to read and throw away the eight textels every time a visible fragment is received. Rather, it is desirable to make reuse of these textels, because if you're marching along in tile space, your pixel grid within the tile (typically processed along sequential rows in the rectangular tile pixel grid) could come such that while the same texture map is not needed for sequential pixels, the same texture map might be needed for several pixels clustered in a n area of the tile, and hence needed only a few process steps after the first use. Desirably, the invention uses the textels that have been read over and over, so when we need one, we read it, and we know that chances are good that once we have seem one fragment requiring a particular texture map, chances are good that for some period of time afterward while we are in the same tile, we will encounter another fragment from the same object that will need the same texture. So we save those things in this cache, and then on the fly we look up from the cache (texture reuse register) which ones we need. If there is a cache miss, for example, when a fragment and texture map are encountered for the first time, that texture map is retrieved and stored in the cache.

Texture Map retrieval latency is another concern, but is handled through the use of First-In-First-Out (FIFO) data structures and a look-ahead or predictive retrieval procedure. The FIFO's are large and work in association with the CAM. When an item is needed, a determination is made as to whether it is already stored, and a designator is also placed in the FIFO so that if there is a cache miss, it is still possible to go out to the relatively slow memory to retrieve the information and store it. In either event, that is if the data was in the cache or it was retrieved from the host memory, it is placed in the unit memory (and also into the cache if newly retrieved).

Effectively, the FIFO acts as a sort of delay so that once the need for the texture is identified (prior to its actual use) the data can be retrieved and reassociated, before it is needed, such that the retrieval does not typically slow down the processing. The FIFO queues provide and take up the slack in the pipeline so that it always predicts and looks ahead. By examining the FIFO, non-cached texture can be identified, retrieved from host memory, placed in the cache and in a special unit memory, so that it is ready for use when a read is executed.

The FIFO and other structures that provide the look-ahead and predictive retrieval are provided in some sense to get around the problem created when the spatial object coherence typically used in per-object processing is lost in our per-tile processing. One also notes that the inventive structure and method makes use of any spatial coherence within an object, so that if all the pixels in one object are done sequentially, the invention does take advantage of the fact that there's temporal and spatial coherence.

Packetized Data Transfer Protocol

The inventive structure and method advantageously transfer information (such as data and control) from block to block in packets. We refer to this packetized communication as packetized data transfer and the format and/or content of the packetized data as the packetized data transfer protocol (PDTP). The protocol includes a header portion and a data portion.

One benefit of the PDTP is that all of the data can be sent over one bus from block to block thereby alleviating any need for separate busses for different data types. Another advantage of PDTP is that packetizing the information assists in keeping the ordering, which is important for proper rendering. Recall that rendering is sensitive to changes in pipeline state and the like so that maintaining the time order sequence is important generally, and with respect to the MIJ cache for example, management of the flow of packets down the pipeline is especially important.

The transfer of packets is sequential, since the bus is effectively a sequential link wherein packets arrive sequentially in some time order. If for example, a "fill packet" arrives in a block, it goes into the block's FIFO, and if a VSP arrives, it also goes into the block's FIFO. Each processor block waits for packets to arrive at its input, and when a packet arrives looks at the packet header to determine what action to take if any. The action may be to send the packet to the output (that is just pass it on without any other action or processing) or to do something with it. The packetized data structure and use of the packetized data structure alone and in conjunction with a bus, FIFO or other buffer or register scheme have applications broader than 3D graphics systems and may be applied to any pipeline structure where a plurality of functional or processing blocks or units are interconnected and communicate with each other. Use of packetized transfer is particularly beneficial where maintain sequential or time order is important.

In one embodiment of the PDTP each packet has a packet identifier or ID and other information. There are many different types of packets, and every different packet type has a standard length, and includes a header that identifies the type of packet. The different packets have different forms and variable lengths, but each particular packet type has a standard length.

Advantageously, each block includes a FIFO at the input, and the packets flow through the FIFOs where relevant information is accumulated in the FIFO by the block. The packet continues to flow through other or all of the blocks so that information relevant to that blocks function may be extracted.

In one embodiment of the inventive structure and method, the storage cells or registers within the FIFO's has some predetermined width such that small packets may require only one FIFO register and bigger packets require a larger number of registers, for example 2, 3, 5, 10, 20, 50 or more registers. The variable packet length and the possibility that a single packet may consume several FIFO storage registers do not present any problem as the first portion of the packet identifies the type of packet and either directly, or indirectly by virtue of knowing the packet type, the size of the packet and the number of FIFO entries it consumes. The inventive structure and method provide and support numerous packet types which are described in other sections of this document.

Fragment Coloring

Fragment coloring is performed for two-dimensional display space and involves an interpolation of the color from for example the three vertices of a triangle primitive, to the sampled coordinate of the displayed pixel. Essentially, fragment coloring involves applying an interpolation function to the colors at the three fragment vertices to determine a color for a location spatially located between or among the three vertices. Typically, but optionally, some account will be taken of the perspective correctness in performing the interpolation. The interpolation coefficients are cached as are the perspective correction coefficients.

Interpolation of Normals

Various compromises have conventionally be accepted relative to the computation of surface normals, particularly a surface normal that is interpolated between or among other surface normals, in the 3D graphics environment. The compromises have typically traded-off accuracy for computational ease or efficiency. Ideally, surface normals should be interpolated angularly, that is based on the actual angular differences in the angles of the surface normals on which the interpolation is based. In fact such angular computation is not well suited to 3D graphics applications.

Therefore, more typically, surface normals are interpolated based on linear interpolation of the two input normals. For low to moderate quality rendering, linear interpolation of the composite surface normals may provide adequate accuracy; however, considering a two-dimensional interpolation example, when one vector (surface normal) has for example a larger magnitude that the other vector, but comparable angular change to the first vector, the resultant vector will be overly influenced by the larger magnitude vector in spite of the comparable angular difference between the two vectors. This may result in objectionable error, for example, some surface shading or lighting calculation may provide an anomalous result and detract from the output scene.

While some of these problems could be minimized even if a linear interpolation was performed on a normalized set of vectors, this is not always practical, because some APIs support non-normalized vectors and various interpolation schemes, including, for example, three-coordinate interpolation, independent x, y, and z interpolations, and other schemes.

In the inventive structure and method the magnitude is interpolated separately from the direction or angle. The interpolated magnitude are computed then the direction vectors which are equal size. The separately interpreted magnitudes and directions are then recombined, and the direction is normalized.

While the ideal angular interpretation would provide the greatest accuracy, however, the interpolation involves three points on the surface of a sphere and various great-circle calculations. This sort of mathematical complexity is not well suited for real-time fast pipeline processing. The single step linear interpolation is much easier but is susceptible to greater error. In comparison to each of these procedures, the inventive surface normal interpolation procedure has greater accuracy than conventional linear interpolation, and lower computational complexity that conventional angular interpolation.

Spatial Setup

In a preferred embodiment of the invention, spatial setup is performed in the Setup Block (STP). The Setup (STP) block receives a stream of packets from the Sort (SRT) block. These packets have spatial information about the primitives to be rendered. The output of the STP block goes to the Cull (CUL) block. The primitives received from SRT can be filled triangles, line triangles, lines, stippled lines, and points. Each of these primitives can be rendered in aliased or anti-aliased mode. The SRT block sends primitives to STP (and other pipeline stages downstream) in tile order. Within each tile the data is organized in time order or in sorted transparency order. The CUL block receives data from the STP block in tile order (in fact in the order that STP receives primitives from SRT), and culls out parts of the primitives that definitely do not contribute to the rendered images. This is accomplished in two stages. The first stage allows detection of those elements in a rectangular memory array whose content is greater than a given value. The second stage refines on this search by doing a sample by sample content comparison. The STP block prepares the incoming primitives for processing by the CUL block. STP produces a tight bounding box and minimum depth value Zmin for the part of the primitive intersecting the tile for first stage culling, which marks the stamps in the bounding box that may contain depth values less than Zmin. The Z cull stage takes these candidate stamps, and if they are a part of the primitive, computes the actual depth value for samples in that stamp. This more accurate depth value is then used for comparison and possible discard on a sample by sample basis. In addition to the bounding box and Zmin for first stage culling, STP also computes the depth gradients, line slopes, and other reference parameters such as depth and primitive intersection points with the tile edge for the Z cull stage. The CUL unit produces the VSPs used by the other pipeline stages.

In the preferred embodiment of the invention, the spatial setup procedure is performed in the Setup Block. Important aspects of the inventive spatial setup structure and method include: (1) support for and generation of a unified primitive, (2) procedure for calculating a $Z_{min}$ within a tile for a primitive, (3) the use of tile-relative y-values and screen-relative x-values, and (4) performing a edge hop (actually performed in the Cull Block) in addition to a conventional edge walk which also simplifies the down-stream hardware, Under the rubric of a unified primitive, we consider a line primitive to be a rectangle and a triangle to be a degenerate rectangle, and each is represented mathematically as such. Setup converts the line segments into parallelograms which consists of four vertices. A triangle has three vertices. Setup describes the each primitive with a set of four points. Note that not all values are needed for all primitives. For a triangle, Setup uses top, bottom, and either left or right corner, depending on the triangle's orientation. A line segment is treated as a parallelogram, so Setup uses all four points. Note that while the triangle's vertices are the same as the original vertices, Setup generates new vertices to represent the lines as quads. The unified representation of primitives uses primitive descriptors which are assigned to the original set of vertices in the window coordinates. In addition, there are flags which indicate which descriptors have valid and meaningful values.

For triangles, VtxYmin, VtxYmax, VtxLeftC, VtxRightC, LeftCorner, RightCorner descriptors are obtained by sorting the triangle vertices by their y coordinates. For line segments these descriptors are assigned when the line quad vertices are generated. VtxYmin is the vertex with the minimum y value. VtxYmax is the vertex with the maximum y value. VtxLeftC is the vertex that lies to the left of the long y-edge (the edge of the triangle formed by joining the vertices VtxYmin and VtxYmax) in the case of a triangle, and to the left of the diagonal formed by joining the vertices VtxYmin and VtxYmax for parallelograms. If the triangle is such that the long y-edge is also the left edge, then the flag LeftCorner is FALSE (0) indicating that the VtxLeftC is invalid. Similarly, VtxRightC is the vertex that lies to the right of the long y-edge in the case of a triangle, and to the right of the diagonal formed by joining the vertices VtxYmin and VtxYmax for parallelograms. If the triangle is such that the long edge is also the right edge, then the flag RightCorner is FALSE (0) indicating that the VtxRightC is invalid. These descriptors are used for clipping of primitives on top and bottom tile edge. Note that in practice VtxYmin, VtxYmax, VtxLeftC, and VtxRightC are indices into the original primitive vertices.

For triangles, VtxXmin, VtxXmax, VtxTopC, VtxBotC, TopCorner, BottomCorner descriptors are obtained by sorting the triangle vertices by their x coordinates. For line segments these descriptors are assigned when the line quad vertices are generated. VtxXmin is the vertex with the minimum x value. VtxXmax is the vertex with the maximum x value. VtxTopC is the vertex that lies above the long xedge (edge joining vertices VtxXmin and VtxXmax) in the case of a triangle, and above the diagonal formed by joining the vertices VtxXmin and VtxXmax for parallelograms. If the triangle is such that the long x-edge is also the top edge, then the flag TopCorner is FALSE (0) indicating that the VtxTopC is invalid. Similarly, VtxBotC is the vertex that lies below the long x-axis in the case of a triangle, and below the diagonal formed by joining the vertices VtxXmin and VtxXmax for parallelograms. If the triangle is such that the long x-edge is also the bottom edge, then the flag BottomCorner is FALSE (0) indicating that the VtxBotC is invalid. These descriptors are used for clipping of primitives on the left and right tile edges. Note that in practice VtxXmin, VtxXmax, VtxTopC, and VtxBotC are indices into the original primitive vertices. In addition, we use the slopes ($\delta x/\delta y$) of the four polygon edges and the inverse of slopes ($\delta x y \delta x$).

All of these descriptors have valid values for quadrilateral primitives, but all of them may not be valid for triangles. Initially, it seems like a lot of descriptors to describe simple primitives like triangles and quadrilaterals. However, as we shall see later, they can be obtained fairly easily, and they provide a nice uniform way to setup primitives.

Treating lines as rectangles (or equivalently interpreting rectangles as lines) involves specifying two end points in space and a width. Treating triangles as rectangles involves specifying four points, one of which typically y-left or y-right in one particular embodiment, is degenerate and not specified. The goal is to find Zmin inside the tile. The x-values can range over the entire window width while the y-values are tile relative, so that bits are saved in the calculations by making the y-values tile relative coordinates.

Object Tags

A directed acyclical graph representation of 3D scenes typically assigns an identifier to each node in the scene graph. This identifier (the object tag) can be useful in graphical operations such as picking an object in the scene, visibility determination, collision detection, and generation of other statistical parameters for rendering. The pixel pipeline in rendering permits a number of pixel tests such as alpha test, color test, stencil test, and depth test. Alpha and color test are useful in determining if an object has transparent pixels and discarding those values. Stencil test can be used for various special effects and for determination of object intersections in CSG. Depth test is typically used for hidden surface removal.

In this document, a method of tagging objects in the scene and getting feedback about which objects passed the predetermined set of visibility criteria is described.

A two level object assignment scheme is utilized. The object identifier consists if two parts a group (g) and a member tag (t). The group "g" is a 4 bit identifier (but, more bits could be used), and can be used to encode scene graph branch, node level, or any other parameter that may be used grouping the objects. The member tag (t) is a 5 bit value (once again, more bits could be used). In this scheme, each group can thus have up to 32 members. A 32-bit status word is used for each group. The bits of this status word indicate the member that passed the test criteria. The state thus consists of: Object group; Object Tag; and TagTestID {DepthTest, AlphaTest, ColorTest, StencilTest}. The object tags are passed down the pipeline, and are used in the z-buffered blend (or Pixel Block in the preferred embodiment). If the sample is visible, then the object tag is used to set a particular bit in a particular CPU-readable register. This allows objects to be fed into the pipeline and, once rendering is completed, the host CPU (that CPU or CPUs which are running the application program) can determine which objects were at least partially visible.

As an alternative, only the member tag (t) could be used, implying only one group.

Object tags can be used for picking, transparency determination, early object discard, and collision detection. For early object discard, an object can be tested for visibility by having its bounding volume input into the rendering pipeline and tested for "visibility" as described above. However, to prevent the bounding volume from being rendered into the frame buffer, the color, depth, and stencil masks should be cleared (see OpenGL specification for a description of these mask bits).

Single Visibility Bit

As an alternative to the object tags described above, a single bit can be used as feedback to the host CPU. In this method, the object being tested for "visibility" (i.e., for picking, transparency determination, early object discard, collision detection, etc) is isolated in its own frame. Then, if anything in the frame is visible, the single "visibility bit" is set, otherwise it is cleared. This bit is readable by the host CPU. The advantage of this method is its simplicity. The disadvantage is the need to use individual frames for each separate object (or set of objects) that needs to be tested, thereby possibly introducing latency into the "visibility" determination.

Supertile Hop Sequence

When rendering 3D images, there is often a "horizon effect" where a horizontal swath through the picture has much more complexity than the rest of the image. An example is a city skyline in the distance with a simple grass plane in the foreground and the sky above. The grass and sky have very few polygons (possibly one each) while the city has lots of polygons and a large depth complexity. Such horizon effects can also occur along non-horizontal swaths through a scene. If tiles are processed in a simple top-to-bottom and left-to-right order, then the complex tiles will be encountered back-to-back, resulting in a possible load imbalance within the pipeline. Therefore, it would be better to randomly "hop" around the screen when going from tile to tile. However, this would result in a reduction in spatial coherency (because adjacent tiles are not processed sequentially), reducing the efficiency of the caches within the pipeline and reducing performance. As a compromise between spatially sequential tile processing and a totally random pattern, tiles are organized into "SuperTiles", where each SuperTile is a multiplicity of spatially adjacent tiles, and a random pattern of SuperTiles is then processed. Thus, spatial coherency is preserved within a SuperTile, and the horizon effect is avoided. In the preferred embodiment, the SuperTile hop sequence method is performed in the Sort Block

Normalization During Scanout

Normalization during output is an inventive procedure in which either consideration is taken of the prior processing history to determine the values in the frame buffer, or the values in the frame buffer are otherwise determined, and the range of values in the screen are scaled or normalized to that the range of values can be displayed and provide the desired viewing characteristic. Linear and non-linear scalings may be applied, and clipping may also be permitted so that dynamic range is not unduly taken up by a few relatively bright or dark pixels, and the dynamic range fits the conversion range of the digital-to-analog converter.

Some knowledge of the manner in which output pixel values are generated provides greater insight into the advantages of this approach. Sometimes the output pixel values are referred to as intensity or brightness, since they ultimately are displayed in a manner to simulate or represent scene brightness or intensity in the real world.

Advantageously, pixel colors are represented by floating point number so that they can span a very large dynamic range. Integer values though suitable once scaled to the display may not provide sufficient range given the manner the output intensities are computed to permit resealing afterward. We note that under the standard APIs, including OpenGL, that the lights are represented as floating point values, as are the coordinate distances. Therefore, with conventional representations it is relatively easy for a scene to come out all black (dark) or all white (light) or skewed toward a particular brightness range with usable display dynamic range thrown away or wasted.

Under the inventive normalization procedure, the computations are desirable maintained in floating point representations throughout, and the final scene is mapped using some scaling routine to bring the pixel intensity values in line with the output display and D/A converter capability. Such scaling or normalization to the display device may involve operations such as an offset or shift of a range of values to a different range of values without compression or expansion of the range, a linear compress or expansion, a logarithmic compression, an exponential or power expansion, other algebraic or polynomial mapping functions, or combinations of these. Alternatively, a look-up table having arbitrary mapping transfer function may be implemented to perform the output value intensity transformation. When it's time to buffer swap in order to display the picture when it's done, one logarithmically (or otherwise) scale during scanout.

Desirably, the transformation is performed automatically under a set of predetermined rules. For example, a rule specifying pixel histogram based normalization may be implemented, or a rule specifying a Gaussian distribution of pixels, or a rule that linearly scales the output intensities with or without some optional intensity clipping. The variety of mapping functions provided here are merely examples, of the many input/output pixel intensity transformations known in the computer graphics and digital image processing arts.

This approach would also permit somewhat greater leeway in specifying lighting, object color, and the like and still render a final output that was visible. Even if the final result was not esthetically perfect, it would provide a basis for tuning the final mapping, and some interactive adjustment may desirably but optionally be provided as a debugging, fine-tuning, or set-up operation.

Stamp-based z-value Description

When a VSP is dispatched, it corresponds to a single primitive, and the z-buffered blend (i.e., the Pixel Block) needs separate z-values for every sample in the VSP. As an improvement over sending all the per-sample z-values within a VSP (which would take considerable bandwidth), the VSP could include a z-reference-value and the partial derivatives of z with respect to x and y (mathematically, a plane equation for the z-values of the primitive). Then, this information is used in the z-buffered blend (i.e., the Pixel Block) to reconstruct the per-sample z-values, thereby saving bandwidth. Care must be taken so that z-values computed for the CHSR process are the same as those computer in the z-buffered blend (i.e., the Pixel Block) because inconsistencies could cause rendering errors.

In the preferred embodiment, the stamp-based z-value description method is performed in the Cull Block, and per-sample z-values are generated from this description in the Pixel Block.

Object-based Processor Resource Allocation in Phong Block

The Phong Lighting Block advantageously includes a plurality of processors or processing elements. During fragment color generation a lot of state is needed, fragments from a common object use the same state, and therefore desirably for at least reasons of efficiency a minimizing caching requirements, fragments from the same object should be processed by the same processor.

In the inventive structure and method, all fragments that originate from the same object are sent to the same processors (or if there is sever loading to the same plurality of processors). This reduces state caching in the Phong block.

Recall that preferred embodiments of the inventive structure and method implement per-tile processing, and that a single time may include multiple objects. The Phong block cache will therefore typically store state for more than one object, and send appropriate state to the processor which is handling fragments from a common object. Once state for a fragment from a particular object is sent to a particular processor, it is desirable that all other fragments from that object also be directed to that processor.

In this connection, the Mode Injection Unit (MIJ) assigns an object or material, and MIJ allocates cache in all down stream blocks. The Phong unit keeps track of which object data has been cached in which Phong unit processor, and attempts to funnel all fragments belonging that same object to the same processor. The only optional exception to this occurs if there is a local imbalance, in which case the fragments will be allocated to another processor.

This object-tag-based resource allocation (alternatively referred to as material-tag-based resource allocation in other portions of the description) occurs relative to the fragment processors or fragment engines in the Phong unit.

Dynamic Microcode Generation as Pipeline State

The Phong unit is responsible for performing texture environment calculations and for selecting a particular processing element for processing fragments from an object. As described earlier, attempts are made to direct fragments from a common object to the same phong processor or engine. Independent of the particular texture to be applied, properties of the surfaces, colors, or the like, there are a number of choices and as a result changes in the processing environment. While dynamic microcode generation is described here relative to the texture environment and lighting, the incentive structure and procedure may more widely be applied to other types of microcode, machine state, and processing generally.

In the inventive structure and method, each time processing of a triangle strip is initiated, a change material parameters occurs, or a change almost anything that touches the texture environment happens, a microcode engine in the phong unit generates microcode and this microcode is treats as a component of pipeline state. The microcode component of state is an attribute that gets cached just like other pipeline state. Treatment of microcode generated in this manner as machine state generally, and as pipeline state in a 3D graphics processor particularly, as substantial advantages.

For example, the Phong unit includes multiple processors or fragment engines. (Note that the term fragment engines here describes components in the Phong unit responsible for texture processing of the fragments, a different process than the interpolation occurring in the Fragment Block.) The microcode is downloaded into the fragment engines so that any other fragment that would come into the fragment engine and needs the same microcode (state) has it when needed.

Although embodiments of each of the fragment engines in the Phong Block are generically the same, the presence of the downloadable microcode provides a degree of specialization. Different microcode may be downloaded into each one dependent on how the MIJ caching mechanism is operating. Dynamic microcode generation is therefore provided for texture environment and lighting Variable Scale Bump Maps Generating variable scale bump maps involves one or both of two separate procedures: automatic basis generation and automatic gradient field generation. Consider a gray scale image and its derivative in intensity space. Automatic gradient filed takes a derivative, relative to gray scale intensity, of a gray scale image, and uses that derivative as a surface normal perturbation to generate a bump for a bump map. Automatic basis generation saves computation, memory storage in polygon memory, and input bandwidth in the process.

For each triangle vertex, an s,t and surface normal are specified. But the s and t aren't color, rather they are two-dimensional surface normal perturbations to the texture map, and therefore a texture bump map. The s and t are used to specify the directions in which to perturb the surface normals in order to create a usable bump map. The s,t give us an implied coordinate system and reference from which we can specify perturbation direction. Use of the s,t coordinate system at each pixel eliminates any need to specify the surface tangent and the bi-normal at the pixel location. As a result, the inventive structure and method save computation, memory storage and input bandwidth.

Tile Buffer and Pixel Buffers

A set of per-pixel tile staging buffers exists between the PixelOut and the BKE block. Each of these buffers has three state bits Empty, BkeDoneForPix, and PixcDoneForBke associated with it. These bits regulate (or simulate) the handshake between the PixelOut and Backend for the usage of these buffer. Both the backend and the PixelOut unit maintain current InputBuffer and OutputBuffer pointers which indicate the staging buffer that the unit is reading from or writing to.

For preparing the tiles for rendering by PIX, the BKE block takes the next Empty buffer and reads in the data from the frame buffer memory (if needed, as determined by the RGBAClearMask, DepthMask, and StencilMask—if a set of bit planes is not cleared it is read into). After Backend is done with reading in the tile, it sets the BkeDoneForPix bit. PixelOut looks at the BkeDoneForPix bit of the InputTile. If this bit is not set, then pixelOut stalls, else it clears the BkeDoneForPix bit, and the color, depth, and/or stencil bit planes (as needed) in the pixel tile buffer and transfers it to the tile sample buffers appropriately.

On output, the PixelOut unit resolves the samples in the rendered tile into pixels in the pixel tile buffers. The backend unit (BKE) block transfers these buffers to the frame buffer memory. The Pixel buffers are traversed in order by the PixelOut unit. PixelOut emits the rendered sample tile to the same pixel buffer that it came from. After the tile output to the pixel tile buffer is completed, the PixelOut unit sets the PixDoneForBke bit. The BKE block can then take the pixel tile buffer with PixDoneForBke set, clears that bit and transfer it to the frame buffer memory. After the transfer is complete, the Empty bit is set on the buffer.

Windowed Pixel Zooming During Scanout

The Backend Unit is responsible for sending data and or signals to the CRT or other display device and includes a Digital-to-Analog (D/A) converter for converting the digital information to analog signals suitable for driving the display. The backend also includes a bilinear interpolator, so that pixels from the frame buffer can be interpolated to change the spatial scale of the pixels as they are sent to the CRT display. The pixel zooming during scanout does not involve rerendering it just scales or zooms (in or out) resolution on the fly. In one embodiment, the pixel zooming is performed selectively on a per window basis, where a window is a portion of the overall desktop or display area.

Virtual Block Transfer (VBLT) During Scanout

Conventional structures and methods provide an on-screen memory storage and an off-screen memory storage, each having for example, a color buffer, a z-buffer, and some stencil. The 3D rendering process renders to these off-screen buffers. The one screen memory corresponds to the data that is shown on the display. When the rendering has completed to the off-screen memory, the content of the off-screen memory is copied to the on-screen memory in what is referred to as a block transfer (BLT).

In order to save memory bandwidth and realize other benefits described elsewhere in this description, the inventive structure and method perform a "virtual" block transfer or virtual BLT by splicing the data in or reading the data from an alternate location.

Token Insertion for Vertex Lists

A token in this context is an information item interposed between other items fed down the pipeline that tell the pipeline what the entries that follow correspond to. For example, if the x,y,z coordinates of a vertex are fed into the pipeline and they are 32-bit quantities, the tokens are inserted to inform the pipeline that the numbers that follow are vertex x,y,z values since there are no extra bits in the entry itself for identification. The tokens that tell the pipeline hardware how to interpret the data that's being sent in.

BRIEF DESCRIPTION OF THE DRAWINGS

Additional objects and features of the invention will be more readily apparent from the following detailed description and appended claims when taken in conjunction with the drawings, in which:

FIG. 24 is a diagramatic illustration showing packets sent to and exemplary Mode Extraction Block.

FIG. 25 is a diagramatic illustration showing an embodiment of the on-chip state vector partitioning of the exemplary Mode Extraction Block.

FIG. 26 is a diagrammatic illustration showing aspects of a process for saving information to polygon memory.

FIG. 27 is a diagrammatic illustration showing an exemplary configuration for polygon memory relative to MEX.

FIG. 28 is a diagrammatic illustration showing exemplary bit configuration for color information relative to Color Pointer Generation in the MEX Block.

FIG. 29 is a diagrammatic illustration showing exemplary configuration for the color type field in the MEX Block.

FIG. 30 is a diagrammatic illustration showing the contents of the MLM Pointer packet stored in the first dual-oct of a list of point list, line strip, triangle strip, or triangle fan.

FIG. 31 shows a exemplary embodiment of the manner in which data is stored into a Sort Memory Page including the manner in which it is divided into Data Storage and Pointer Storage.

FIGS. 35A and 35B are diagrammatic illustrations showing aspects of the threshold distance calculation in the touched tile procedure.

FIG. 36A is a diagrammatic illustration showing a first relationship between positions of the tile and the triangle for particular relationships between the perpendicular vector and the threshold distance. FIG. 36B is a diagrammatic illustration showing a second relationship between positions of the tile and the triangle for particular relationships between the perpendicular vector and the threshold distance.

FIG. 36C is a diagrammatic illustration showing a third relationship between positions of the tile and the triangle for particular relationships between the perpendicular vector and the threshold distance.

FIG. 41 is a diagrammatic illustration showing the manner in which the user specified point is adjusted to the rendered point in the Geometry Unit.

FIG. 42 is a diagrammatic illustration showing the manner in which anti-aliased line segments are converted into a rectangle in the CUL unit scan converter that rasterizes the parallelograms and triangles uniformly.

FIG. 43 is a diagrammatic illustration showing the manner in which the end points of aliased lines are computed using a parallelogram, as compared to a rectangle in the case of anti-aliased lines.

FIG. 44 is a diagrammatic illustration showing the manner in which rectangles represent visible portions of lines.

FIG. 45 is a diagrammatic illustration showing the manner in which a new line start-point as well as stipple offset stplStartBit is generated for a clipped point.

FIG. 47 is a diagrammatic illustration showing an aspect of how Setup represents lines and triangles, including the vertex assignment.

FIG. 55 is a diagrammatic illustration of exemplary embodiments of tag caches which are fully associative and use Content Addressible Memories (CAMs) for cache tag lookup.

FIG. 59 is a diagrammatic illustration showing aspects of Fragment Block interpolation using perspective corrected barycentric interpolation for triangles.

FIG. 60 shows an example of how interpolating between vectors of unequal magnitude may result in uneven angular granularity and why the inventive structure and method does not interpolate normals and tangents this way.

DETAILED DESCRIPTION OF PREFERRED EMBODIMENTS OF THE INVENTION

System Level Overview

Figure 1:
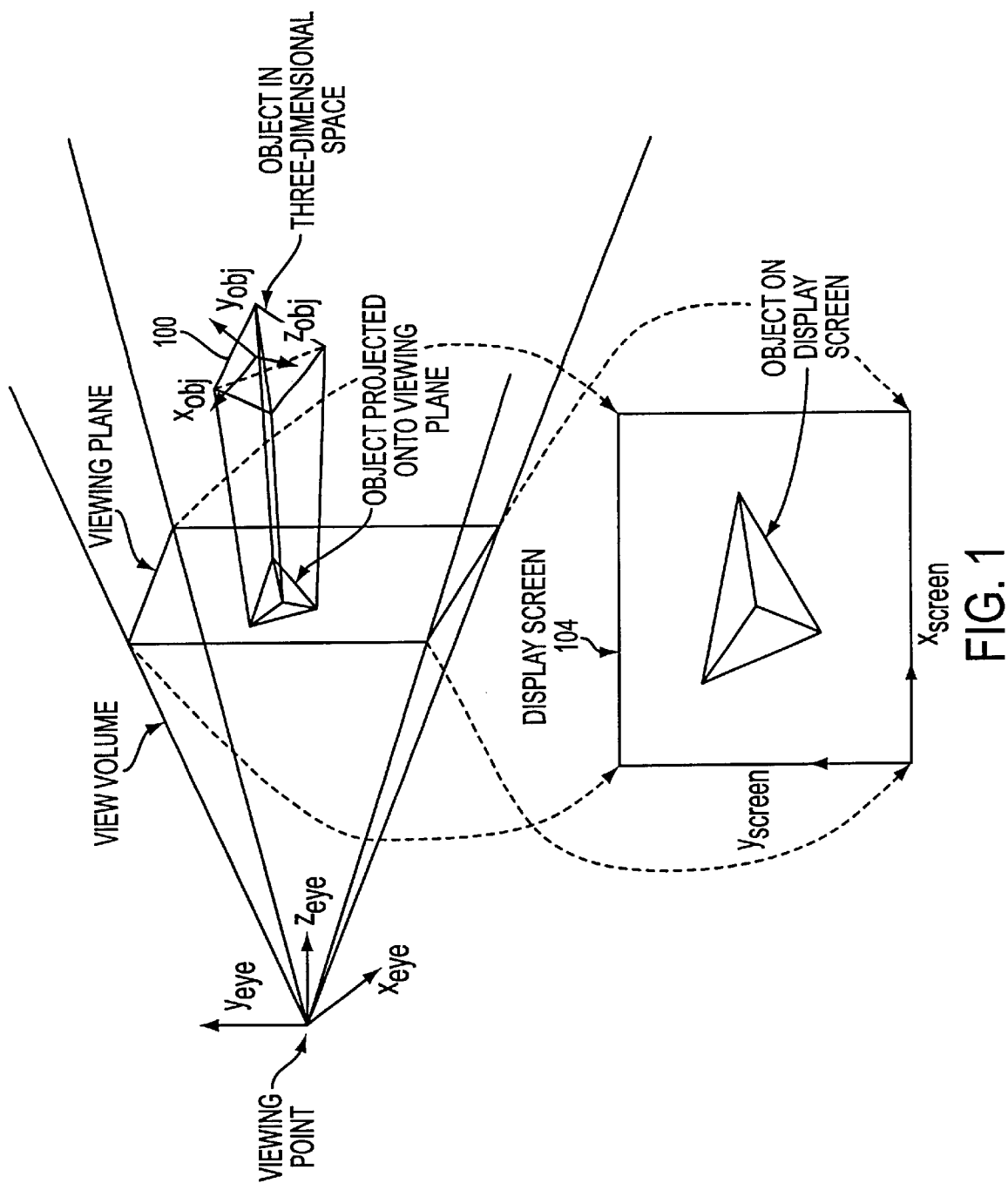
FIG. 1 is a diagrammatic illustration showing a tetrahedron, with its own coordinate axes, a viewing point's coordinate system, and screen coordinates
Figure 2:
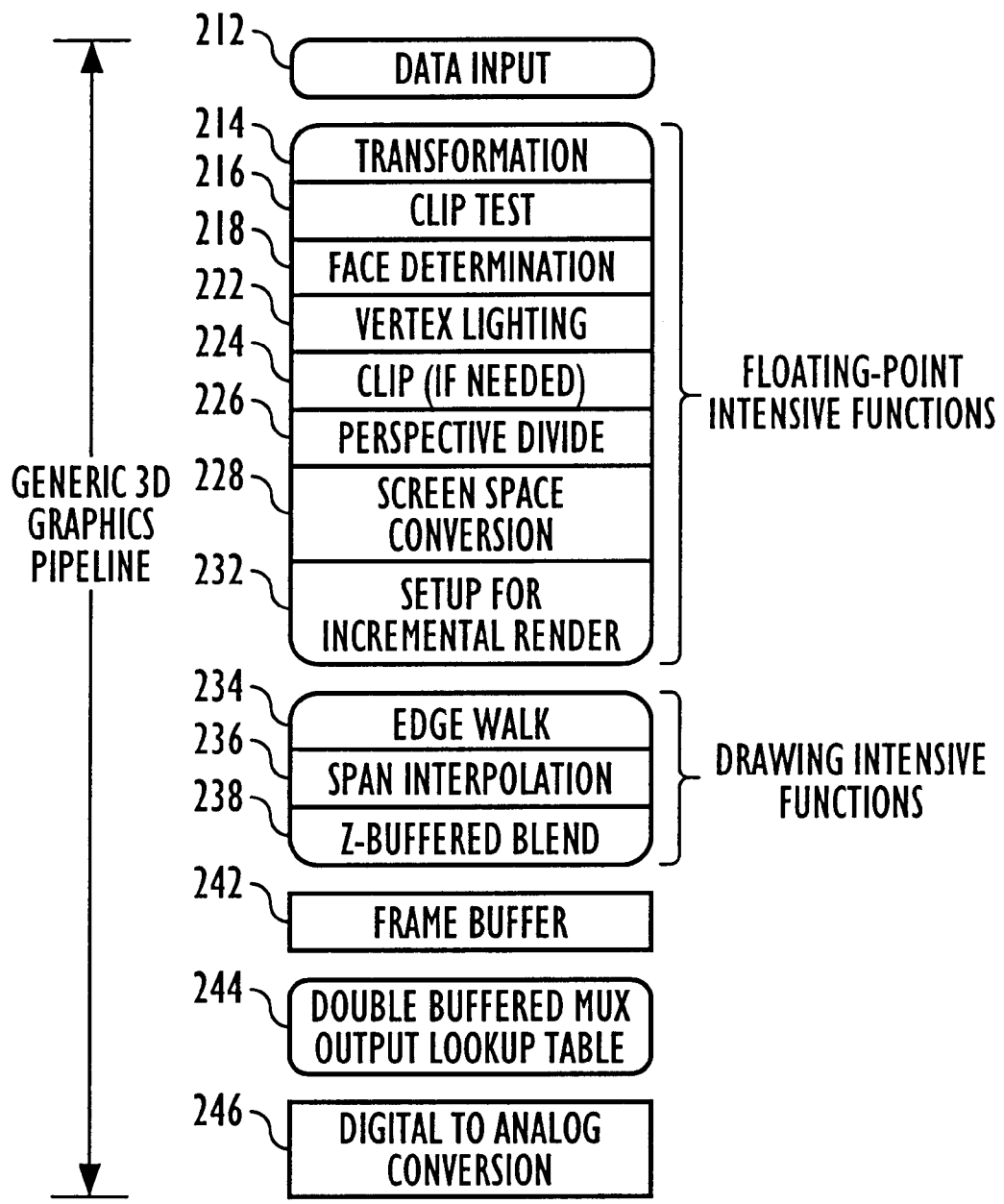
FIG. 2 is a diagrammatic illustration showing a conventional generic renderer for a 3D graphics pipeline.
Figure 3:
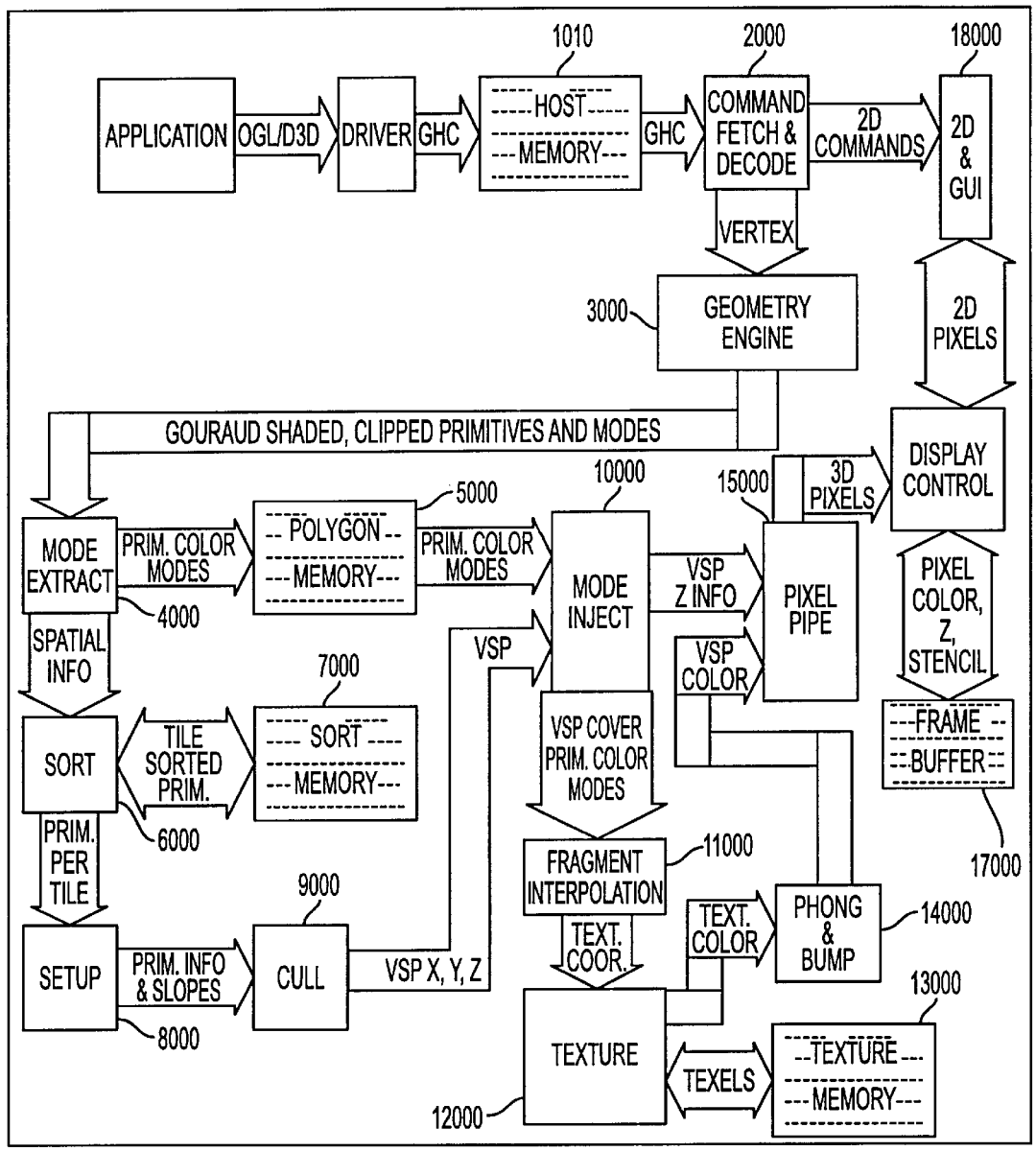
FIG. 3 is a diagrammatic illustration showing an embodiment of the inventive 3-Dimensional graphics pipeline, particularly showing th relationship of the Geometry Engine 3000 with other functional blocks and the Application executing on the host and the Host Memory.
Figure 4:
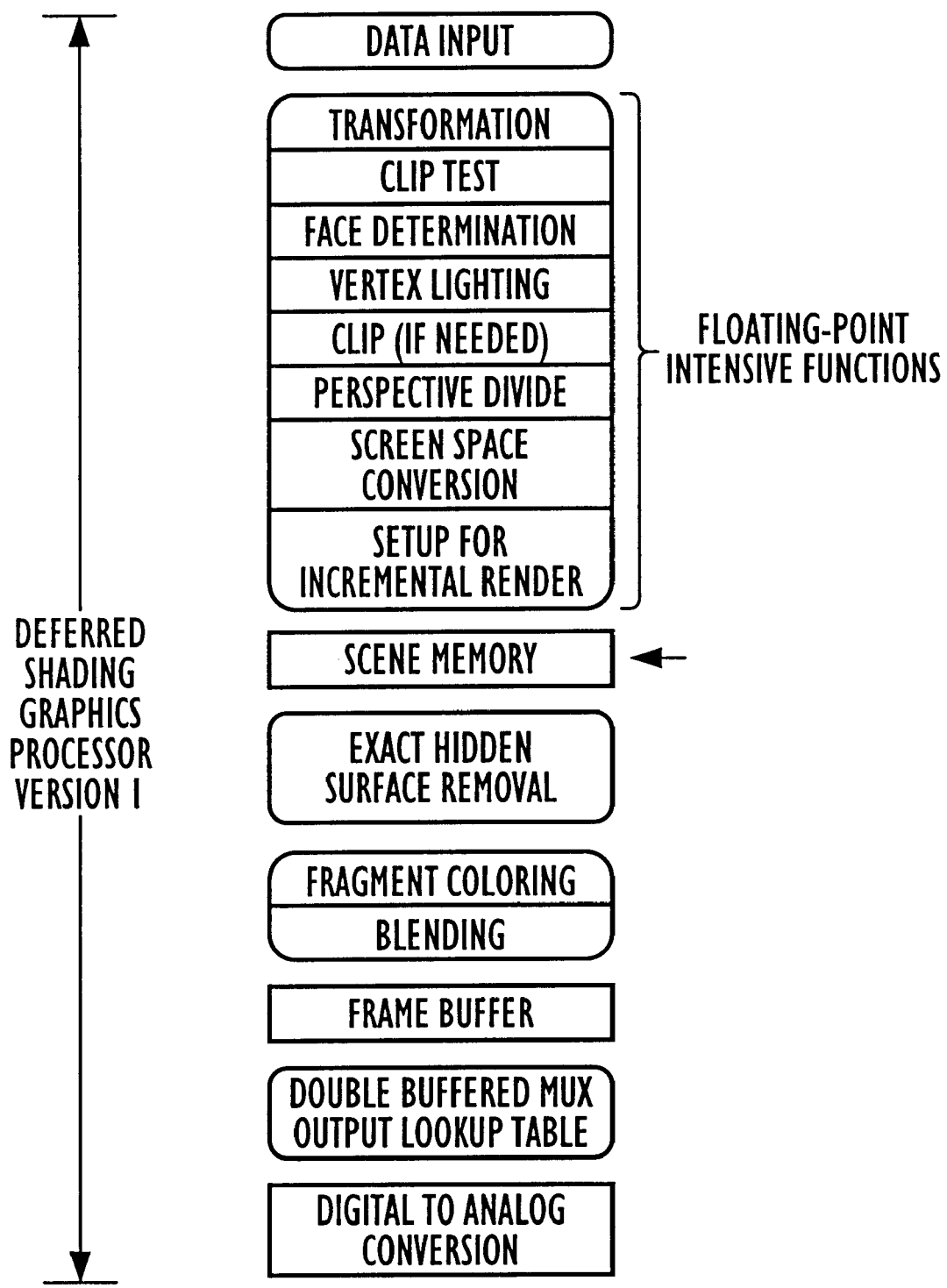
FIG. 4 is a diagrammatic illustration showing a first embodiment of the inventive 3-Dimensional Deferred Shading Graphics Pipeline.
Figure 5:
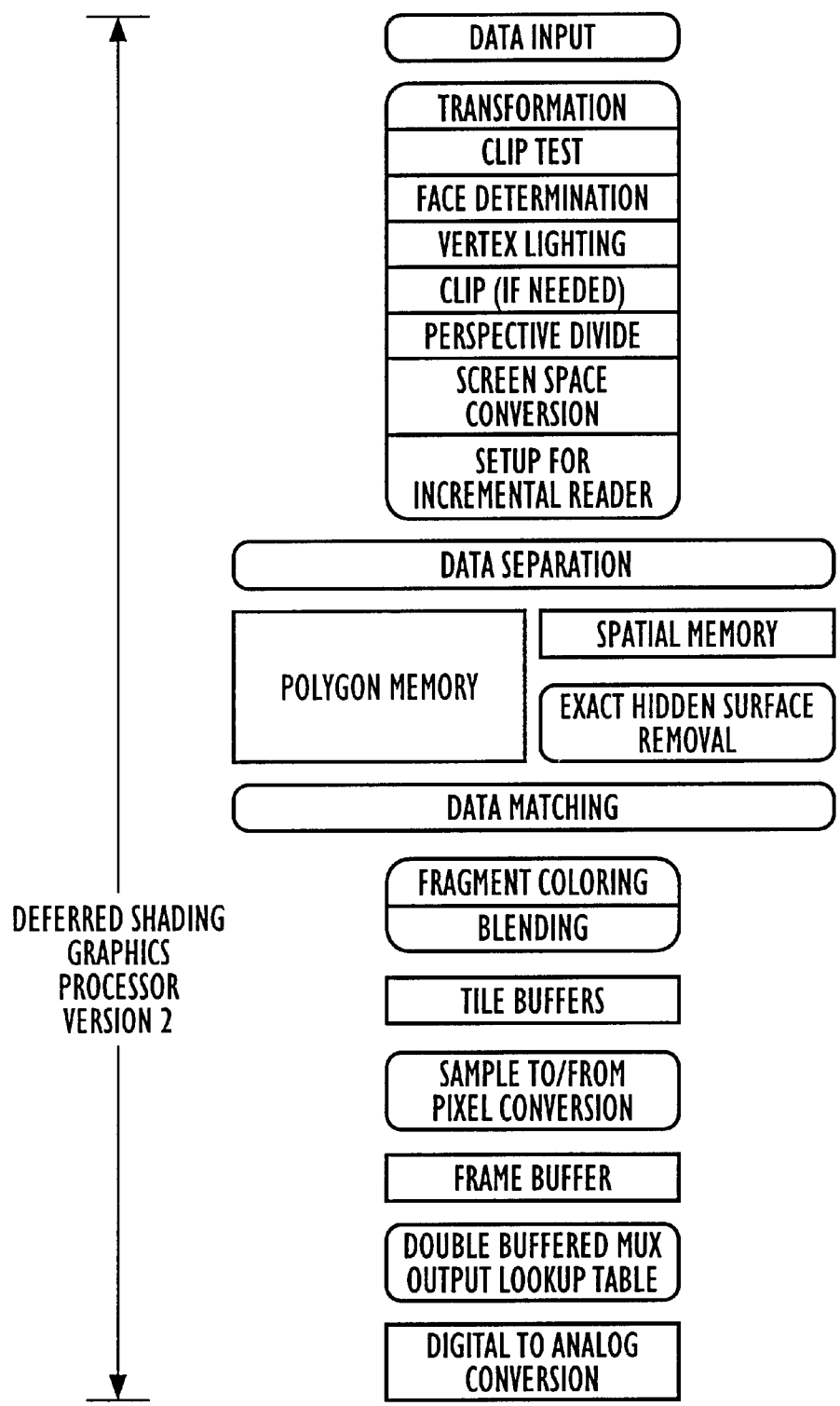
FIG. 5 is a diagrammatic illustration showing a second embodiment of the inventive 3-Dimensional Deferred Shading Graphics Pipeline.
Figure 6:
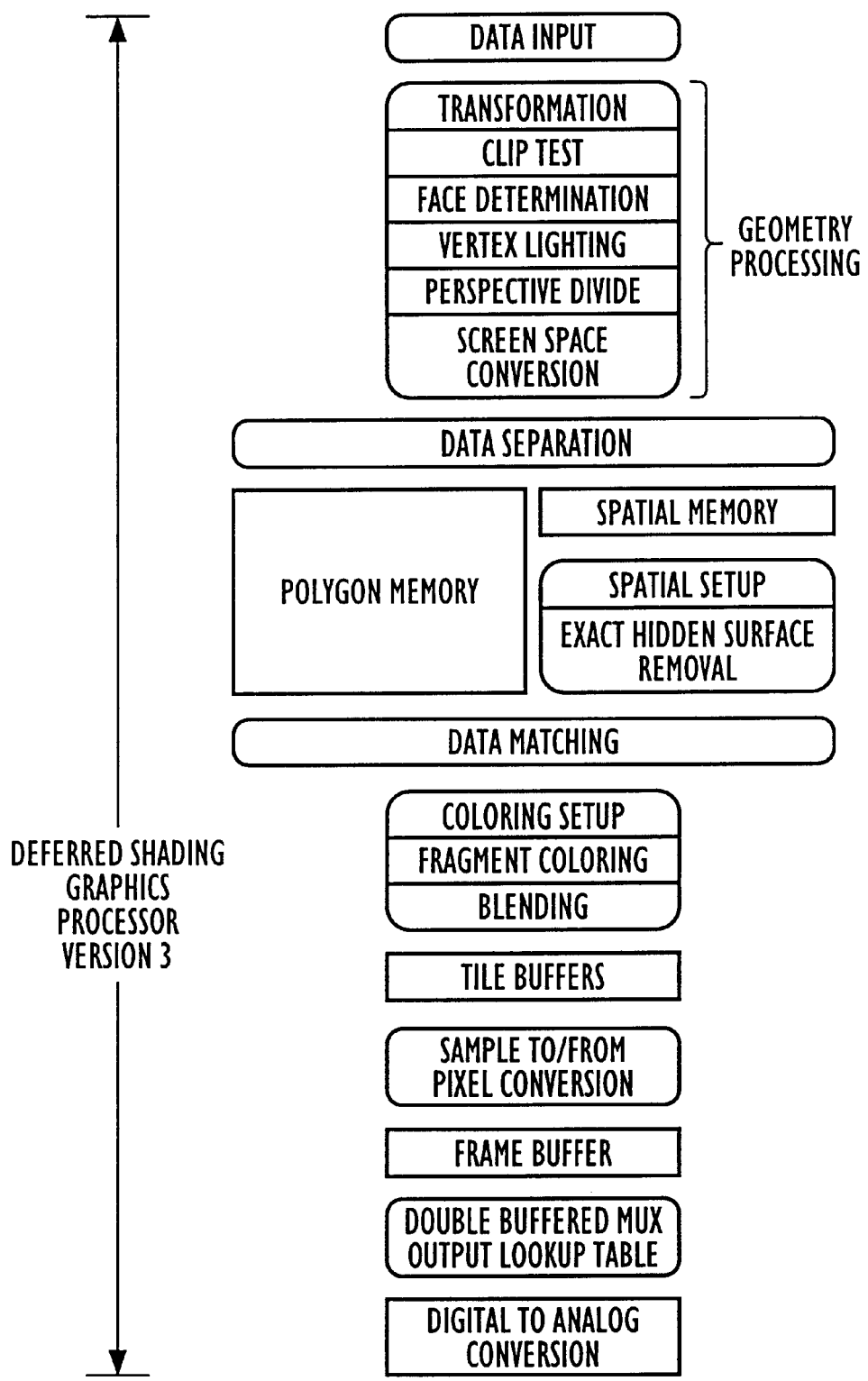
FIG. 6 is a diagrammatic illustration showing a third embodiment of the inventive 3-Dimensional Deferred Shading Graphics Pipeline.
Figure 7:
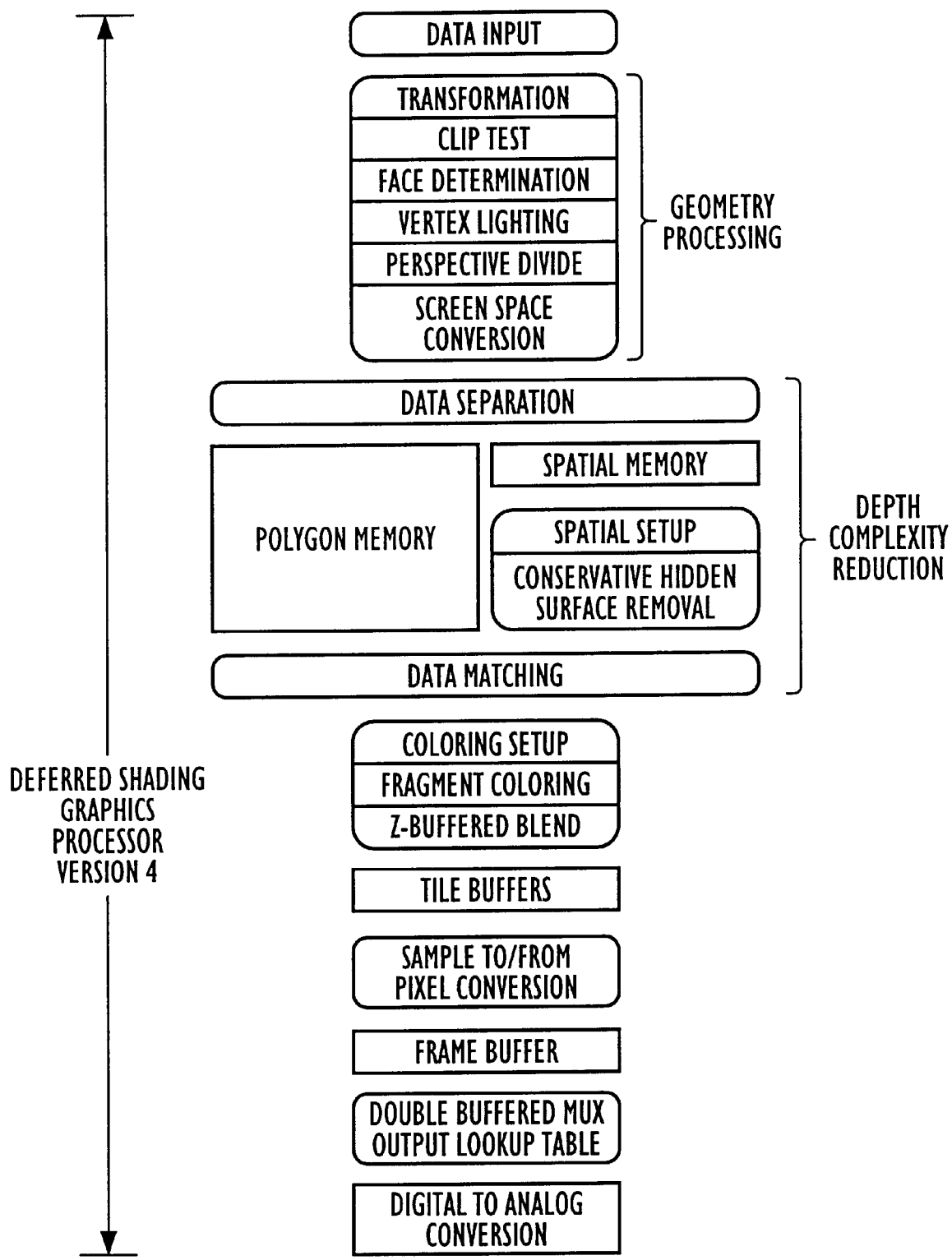
FIG. 7 is a diagrammatic illustration showing a fourth embodiment of the inventive 3-Dimensional Deferred Shading Graphics Pipeline.
Figure 8:
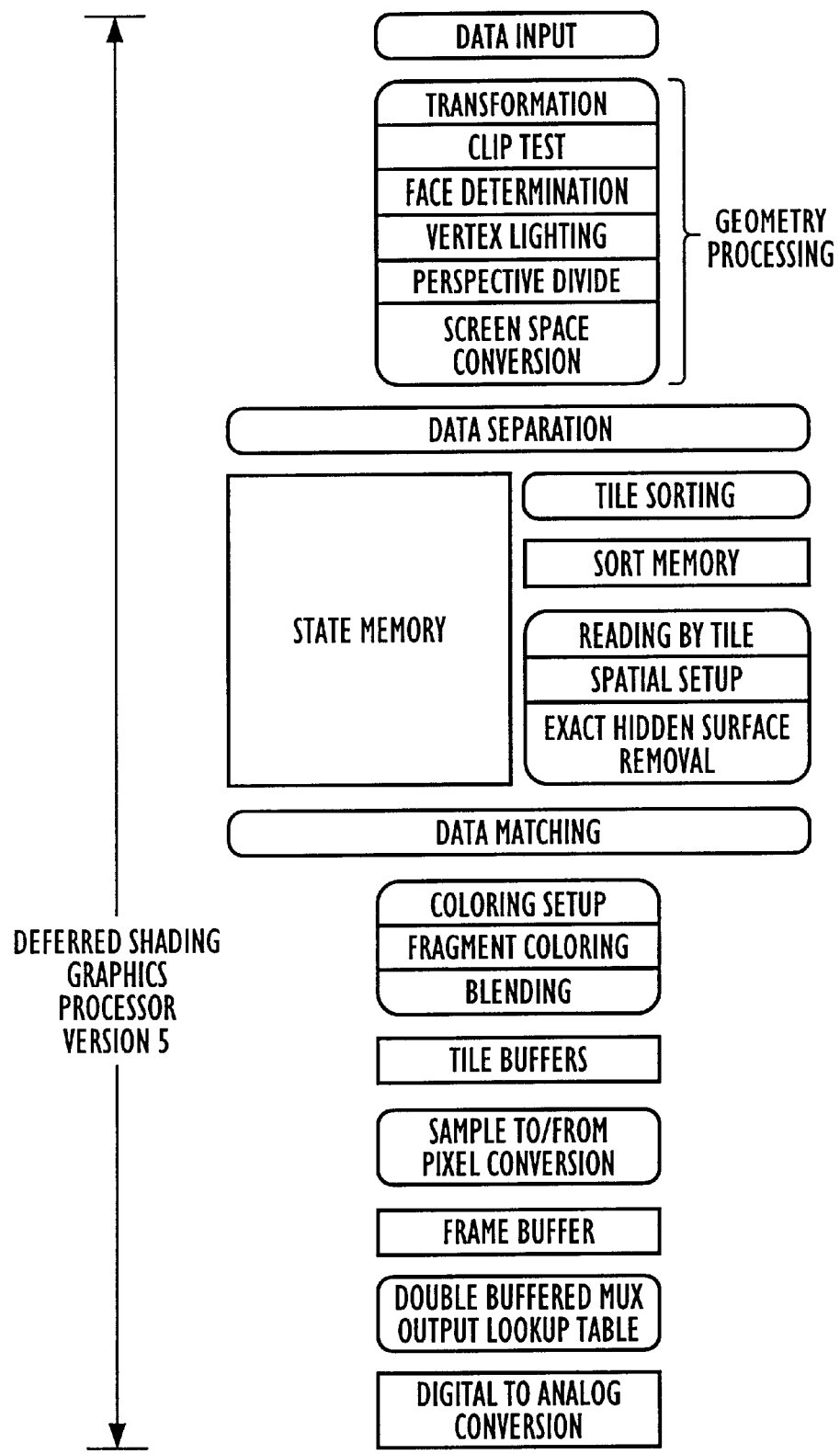
FIG. 8 is a diagrammatic illustration showing a fifth embodiment of the inventive 3-Dimensional Deferred Shading Graphics Pipeline.
Figure 9:
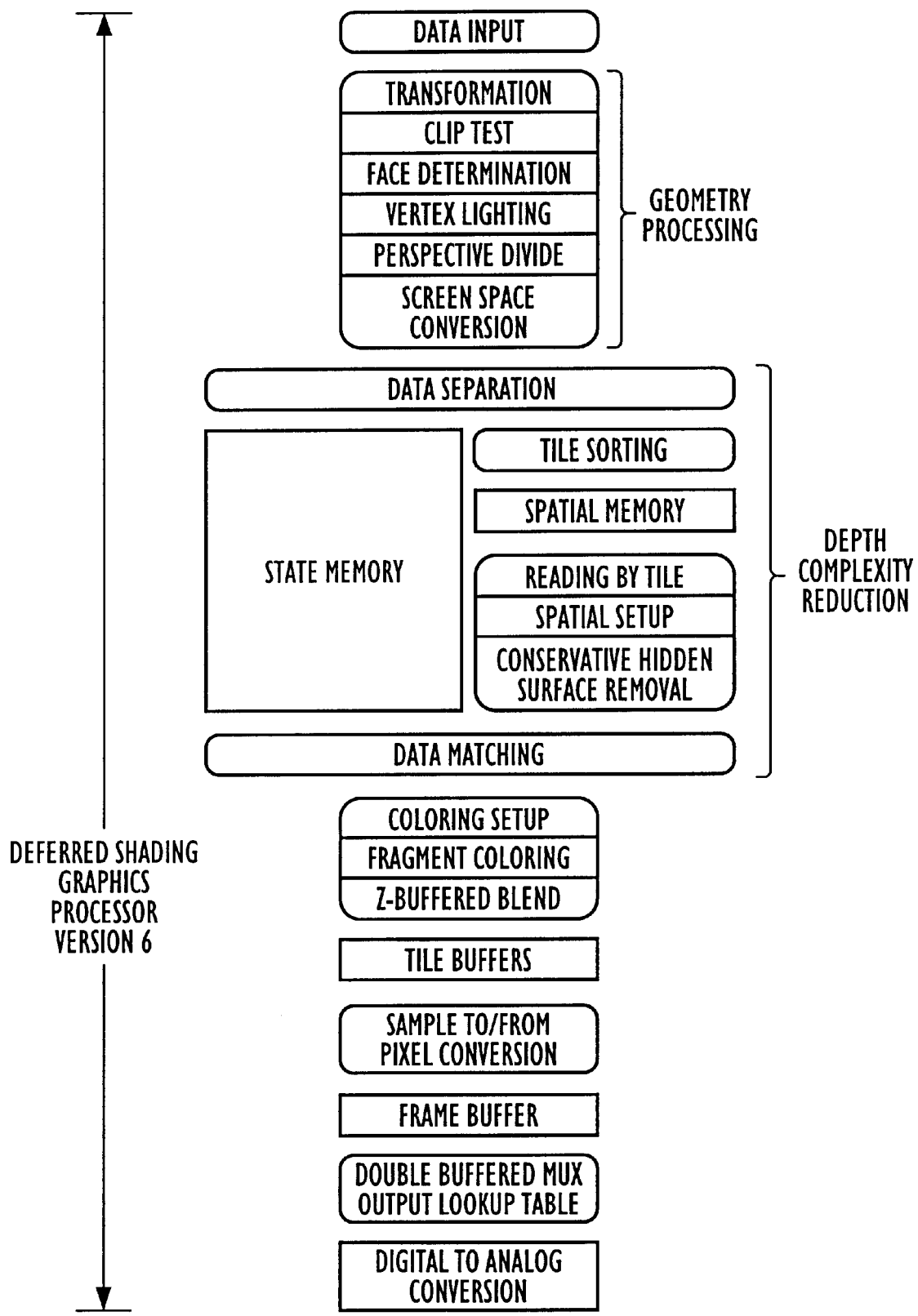
FIG. 9 is a diagrammatic illustration showing a sixth embodiment of the inventive 3-Dimensional Deferred Shading Graphics Pipeline.
Figure 10:
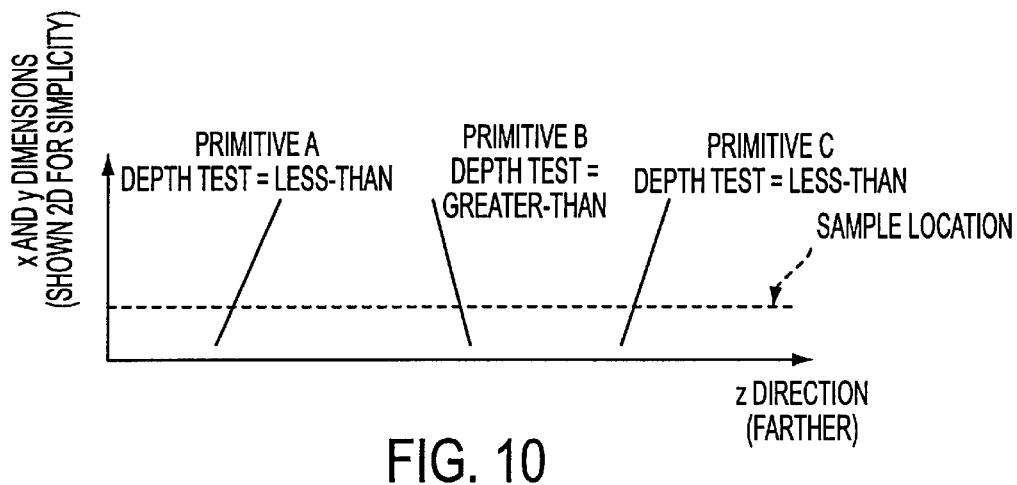
FIG. 10 is a diagrammatic illustration showing considerations for an embodiment of conservative hidden surface removal.
Figure 11:
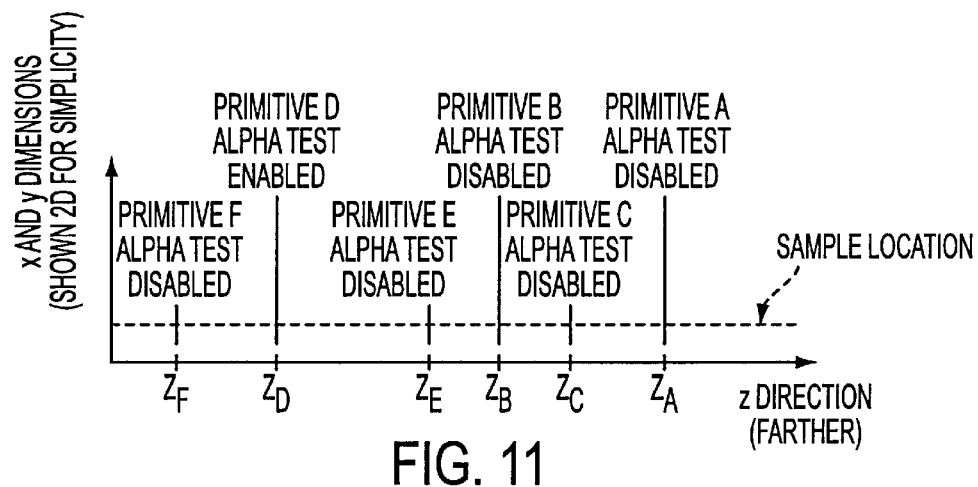
FIG. 11 is a diagrammatic illustration showing considerations for alpha-test and depth-test in an embodiment of conservative hidden surface removal.
Figure 12:
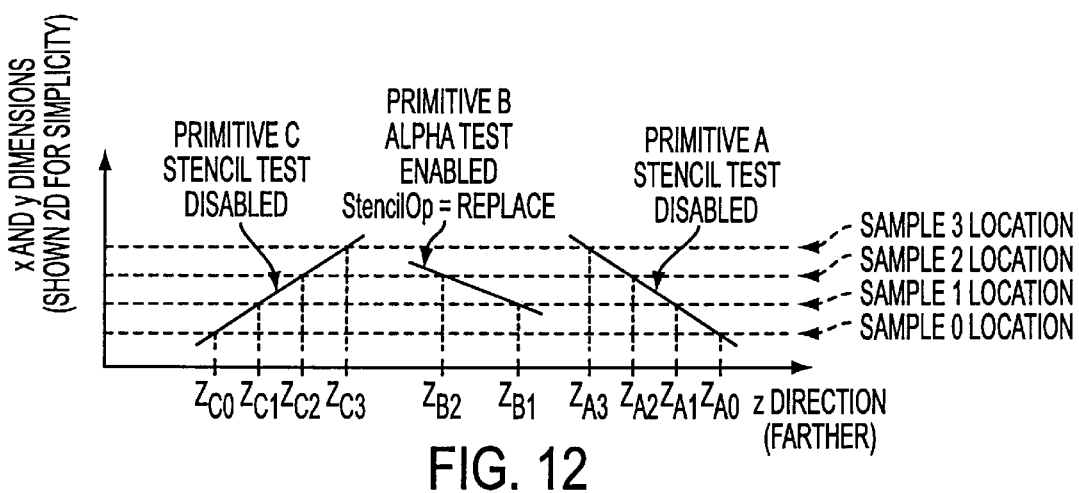
FIG. 12 is a diagrammatic illustration showing considerations for stencil-test in an embodiment of conservative hidden surface removal.
Figure 13:
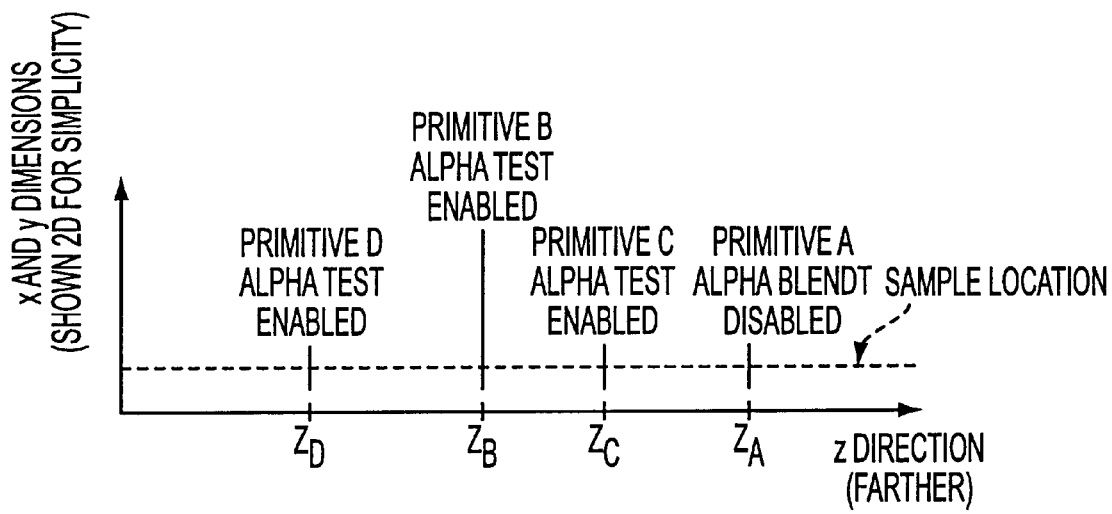
FIG. 13 is a diagrammatic illustration showing considerations for alpha-blending in an embodiment of conservative hidden surface removal.
Figure 14:
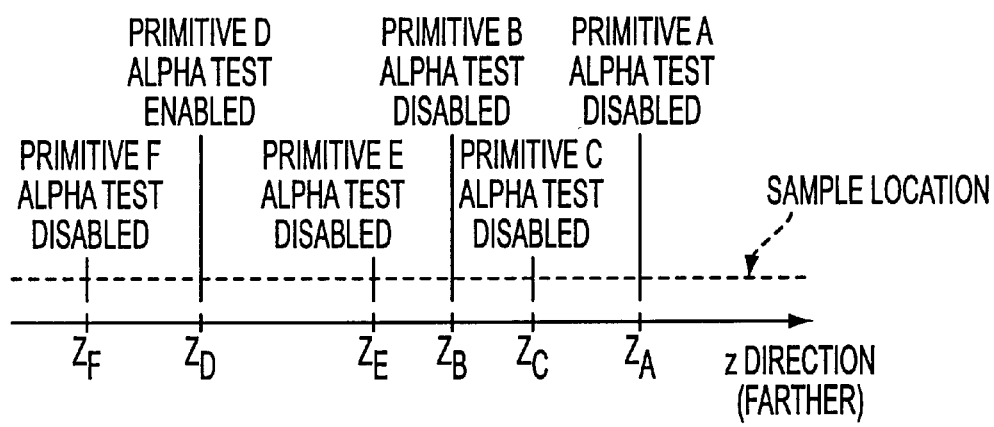
FIG. 14 is a diagrammatic illustration showing additional considerations for an embodiment of conservative hidden surface removal.
Figure 15:
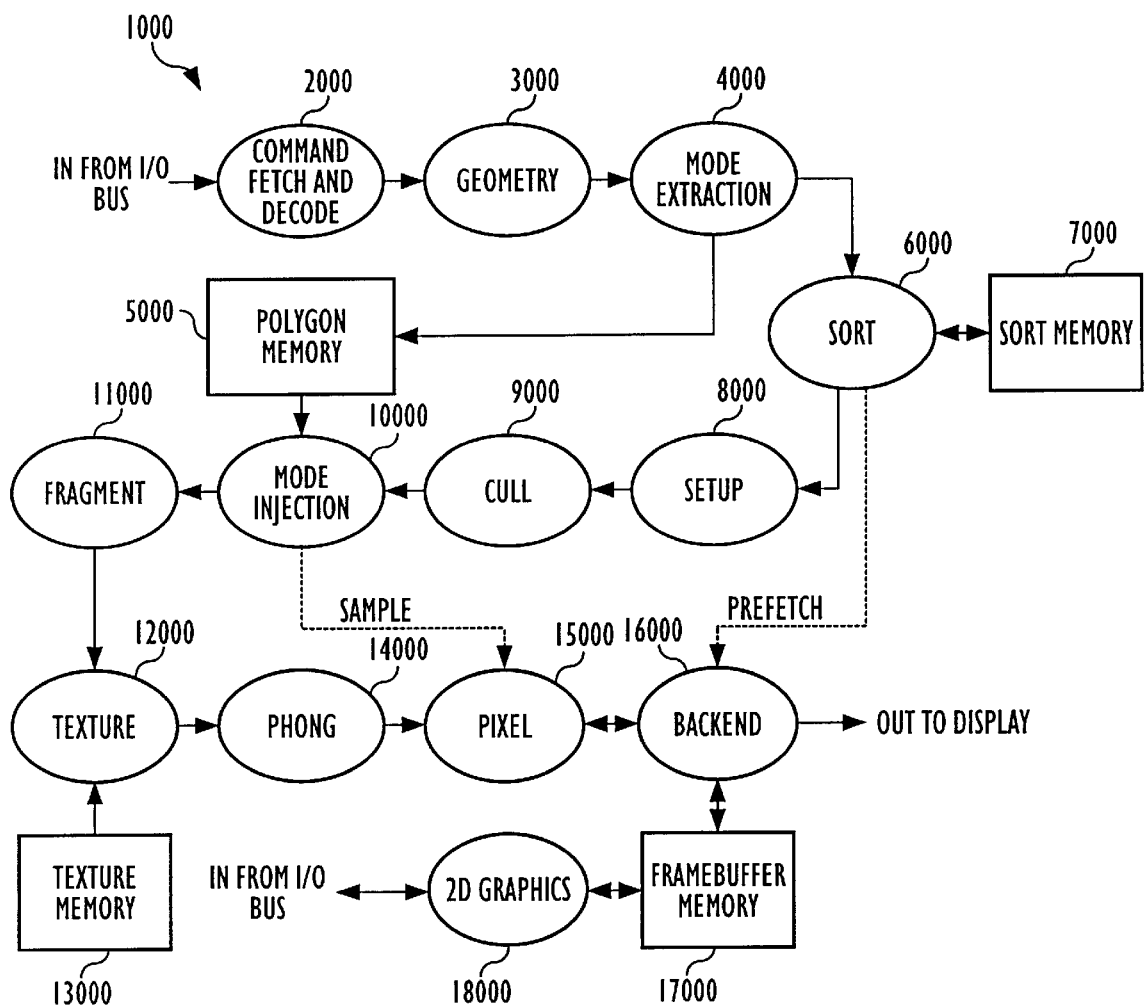
FIG. 15 is a diagramatic illustration showing an exemplary flow of data through blocks of an embodiment of the pipeline.

The pipeline takes data from the host computer's I/O bus, processes it, and sends it to the computer's display. The pipeline is divided into twelve blocks, plus three memory stores and the frame buffer. FIG. 15 shows the flow of data through the pipeline 1000. The blocks that make up the pipeline are discussed below.

Command Fetch and Decode (CFD)

Command Fetch and Decode (CFD) 2000 handles communication with the host computer through the I/O bus. It converts its input into a series of packets, which it passes to the Geometry block. Most of the input stream consists of geometrical data-lines, points, and polygons. The descriptions of these geometrical objects can include colors, surface normals, texture coordinates, and so on. The input stream also contains rendering information, such as lighting, blending modes, and buffer functions.

Geometry (GEO)

The Geometry block 3000 handles four major tasks: transforms, decomposition of all polygons into triangles, clipping, and per-vertex lighting calculations needed for Gouraud shading.

First, the Geometry block transforms incoming graphics primitives into a uniform coordinate space ("world space"). Then it clips the primitives to the viewing volume, or frustum. In addition to the six planes that define the viewing volume (left, right, top, bottom, front and back), the DSGP pipeline provides six user-definable clipping planes. After clipping, the Geometry block breaks polygons with more than three vertices into sets of triangles, to simplify processing.

Finally, if there is any Gouraud shading in the frame, the Geometry block calculates the vertex colors that the Fragment block uses to perform the shading.

Mode Extraction (MEX)

The Mode Extraction block 4000 separates the data stream into two parts: 1) vertices, and 2) everything else. Vertices are sent to the Sort block. The "everything else"—lights, colors, texture coordinates, and so on-is stored in a special buffer called the Polygon Memory, where it can be retrieved by the Mode Injection block. The Polygon Memory is double buffered, so the Mode Injection block can read data for one frame, while the Mode Extraction block is storing data for the next frame. The mode data stored in the Polygon Memory falls into three major categories: per-frame data (such as lighting), per-primitive data (such as material properties) and per-vertex data (such as color). The Mode Extraction and Mode Injection blocks further divide these categories to optimize efficiency.

For each vertex, the Mode Extraction block sends the Sort block a packet containing the vertex data and a pointer into the Polygon Memory. (The pointer is called the color pointer, which is somewhat misleading, since it is used to retrieve all sorts of other information besides color.) The packet also contains fields indicating whether the vertex represents a point, the endpoint of a line, or the corner of a triangle. The vertices are sent in a strict time sequential order, the same order in which they were fed into the pipeline. The packet also specifies whether the current vertex forms the last one in a given primitive (i.e., "completes" the primitive). In the case of triangle strips or fans, and line strips or loops, the vertices are shared between adjacent primitives. In this case, the packets indicate how to identify the other vertices in each primitive.

Sort (SRT)

The Sort block 6000 receives vertices from the Mode Extraction block and sorts the resulting points, lines, and triangles by tile. In the double-buffered Sort Memory 7000, it maintains a list of vertices representing the graphic primitives, and a set of Tile Pointer Lists-one list for each tile in the frame. When it receives a vertex that completes a primitive (such as the third vertex in a triangle), it checks to see which tiles the primitive touches. For each Tile a primitive touches, the Sort block adds a pointer to the vertex to that tile's Tile Pointer List.

When the Sort block has finished sorting all the geometry in a frame, it sends the data to Setup. Each Sort block output packet represents a complete primitive. Sort sends its output in tile-by-tile order: all of the primitives that touch a given tile, then all of the primitives that touch the next tile, and so on. Note that this means that Sort may send the same primitive many times, once for each tile it touches.

Setup (STP)

The Setup block 8000 calculates spatial derivatives for lines and triangles. It processes one tile's worth of data, one primitive at a time. When it's done with a primitive, it sends the data on to the Cull block. The Setup block also breaks stippled lines into separate line segments (each a rectangular region), and computes the minimum z value for each primitive within the tile. Each primitive packet output from Setup represents one primitive: a triangle, line segment or point.

Cull (CUL)

Figure 16:
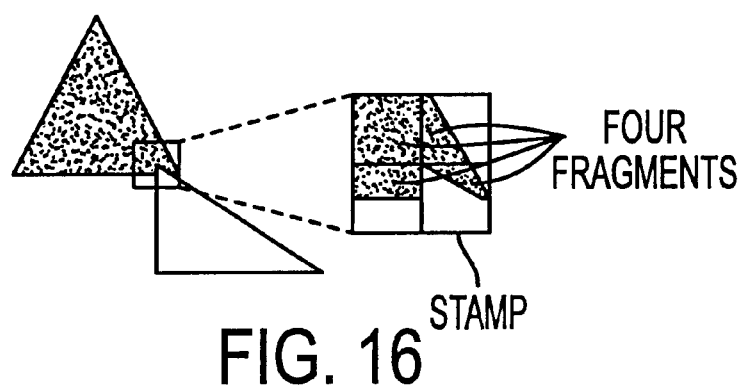
FIG. 16 is a diagramatic illustration showing the manner in which an embodiment of the Cull block produces fragments from a partially obscured triangle.
Figure 17A:
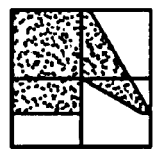
FIG. 17 is a diagramatic illustration showing the manner in which an embodiment of the Pixel block processes a stamp's worth of fragments.
Figure 17B:
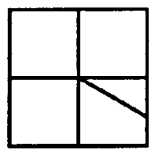
Figure 17C:
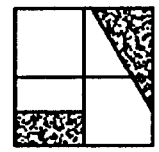
Figure 17D:
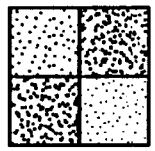

The Cull block 9000 is one of the more complex blocks, and processing is divided into two steps: Magnitude Comparison Content Addressable Memory (MCCAM) Cull, and Subpixel Cull. The Cull block accepts data one tile's worth at a time. The MCCAM Cull discards primitives that are hidden completely by previously processed geometry. The Subpixel Cull takes the remaining primitives (which are partly or entirely visible), and determines the visible fragments. The Subpixel Cull outputs one stamp's worth of fragments at a time, called a Visible Stamp Portion (VSP). FIG. 16 shows an example of how the Cull block produces fragments from a partially obscured triangle.

Note that a Visible Stamp Portion produced by the Cull block contains fragments from only a single primitive, even if multiple primitives touch the stamp. Therefore, in the diagram, the output VSP contains fragments from only the gray triangle. The fragment formed by the tip of the white triangle is sent in a separate VSP, and the colors of the two VSPs are combined later, in the Pixel block.

Each pixel in a VSP is divided up into a number of samples to determine how much of the pixel is covered by a given fragment. The Pixel block uses this information when it blends the fragments to produce the final color for the pixel.

Mode Injection (MIJ)

The Mode Injection block 10000 retrieves mode information—such as colors, material properties, and so on—from the Polygon Memory 5000 and passes it downstream as required. To save bandwidth, the individual downstream blocks cache recently used mode information. The Mode Injection block keeps track of what information is cached downstream, and only sends information as necessary.

Fragment (FRG)

The Fragment block 11000 is somewhat misleadingly named, since its main work is interpolation. It interpolates color values for Gouraud shading, surface normals for Phong shading and texture coordinates for texture mapping. It also interpolates surface tangents for use in the bump mapping algorithm, if bump maps are in use.

The Fragment block performs perspective corrected interpolation using barycentric coefficients.

Texture (TEX)

The Texture block 12000 applies texture maps to the pixel fragments. Texture maps are stored in the Texture Memory 13000. Unlike the other memory stores described previously, the Texture Memory is single-buffered. It is loaded from the host computer's memory using the AGP interface. A single polygon can use up to four textures.

Textures are mip-mapped. That is, each texture comprises a series of texture maps at different levels of detail, each map representing the appearance of the texture at a given distance from the eye point. To produce a texture value for a given pixel fragment, the Texture block performs tri-linear interpolation from the texture maps, to approximate the correct level of detail. The Texture block also performs other interpolation methods, such as anisotropic interpolation.

The Texture block supplies interpolated texture values (generally as RGBA color values) to the Phong block on a per-fragment basis. Bump maps represent a special kind of texture map. Instead of a color, each texel of a bump map contains a height field gradient.

Phong (PHG)

The Phong block 14000 performs Phong shading for each pixel fragment. It uses the material and lighting information supplied by the Mode Injection block, the texture colors from the Texture block, and the surface normal generated by the Fragment block to determine the fragment's apparent color. If bump mapping is in use, the Phong block uses the interpolated height field gradient from the Texture block to perturb the fragment's surface normal before shading.

Pixel (PIX)

The Pixel block 15000 receives VSPs, where each fragment has an independent color value. The Pixel block performs pixel ownership test, scissor test, alpha test, stencil operations, depth test, blending, dithering and logic operations on each sample in each pixel (see OpenGL Spec 1.1, Section 4.1, "Per-Fragment Operations," p. 109). When the Pixel block has accumulated a tile's worth of finished pixels, it blends the samples within each pixel (thereby performing antialiasing of pixels) and sends them to the Backend, to be stored in the framebuffer.

FIG. 17 demonstrates how the Pixel block processes a stamp's worth of fragments. In this example, the Pixel block receives two VSPs, one from a gray triangle and one from a white triangle. It then blends the fragments and the background color to produce the final pixels. It weights each fragment according to how much of the pixel it covers-or to be more precise, by the number of samples it covers.

In addition to this blending, the Pixel Processing block performs stencil testing, alpha blending, and antialiasing of pixels. When it accumulates a tile's worth of finished pixels, it sends them to the Backend, to be stored in the framebuffer.

Backend (BKE)

The Backend 16000 receives a Tile's worth of pixels at a time from the Pixel block, and stores them into the framebuffer 17000. The Backend also sends a Tile's worth of pixels back to the Pixel block, because specific framebuffer values can survive from frame to frame. For example, stencil bit values can constant over many frames, but can be used in all those frames.

In addition to controlling the framebuffer, the Backend performs 2D drawing and sends the finished frame to the output devices. It provides the interface between the framebuffer and the computer monitor and video output.

Communication Between Blocks in the Pipeline

The inventive structure and method provided for packetized communication between the functional blocks of the pipeline. The nature of these packets is described in the individual functional block sections as well as in the earlier description of the operation in Section 3.

Detailed Description of System Blocks

Bus Interface Block (AGI)

The AGI block is responsible for implementing all the functionality mandated by the AGP and/or PCI specifications in order to send and receive data to host memory or the CPU. This block should completely encapsulate the asynchronous boundary between the AGP bus and the rest of the chip. The AGI block should implement the optional Fast Write capability in the AGP 2.0 spec in order to allow fast transfer of commands by PIO. The AGI block is connected to the Read/Write Controller, the DMA Controller and the Interrupt Control Registers on CFD.

Command Fetch and Decode Block (CFD)

Overview

The CFD block is the unit between the AGP interface and the hardware that actually draws pictures. There is a lot of control and data movement units, with little to no math. Most of what the CFD block does is to route data for other blocks. Commands and textures for the 2D, 3D, Backend, and Ring come across the AGP bus and are routed by the front end to the units which consume them. CFD does some decoding and unpacking of commands, manages the AGP interface, and gets involved in DMA transfers and retains some state for context switches. It is one of the least glamorous, but most essential components of the DSGP system.

Figure 18:
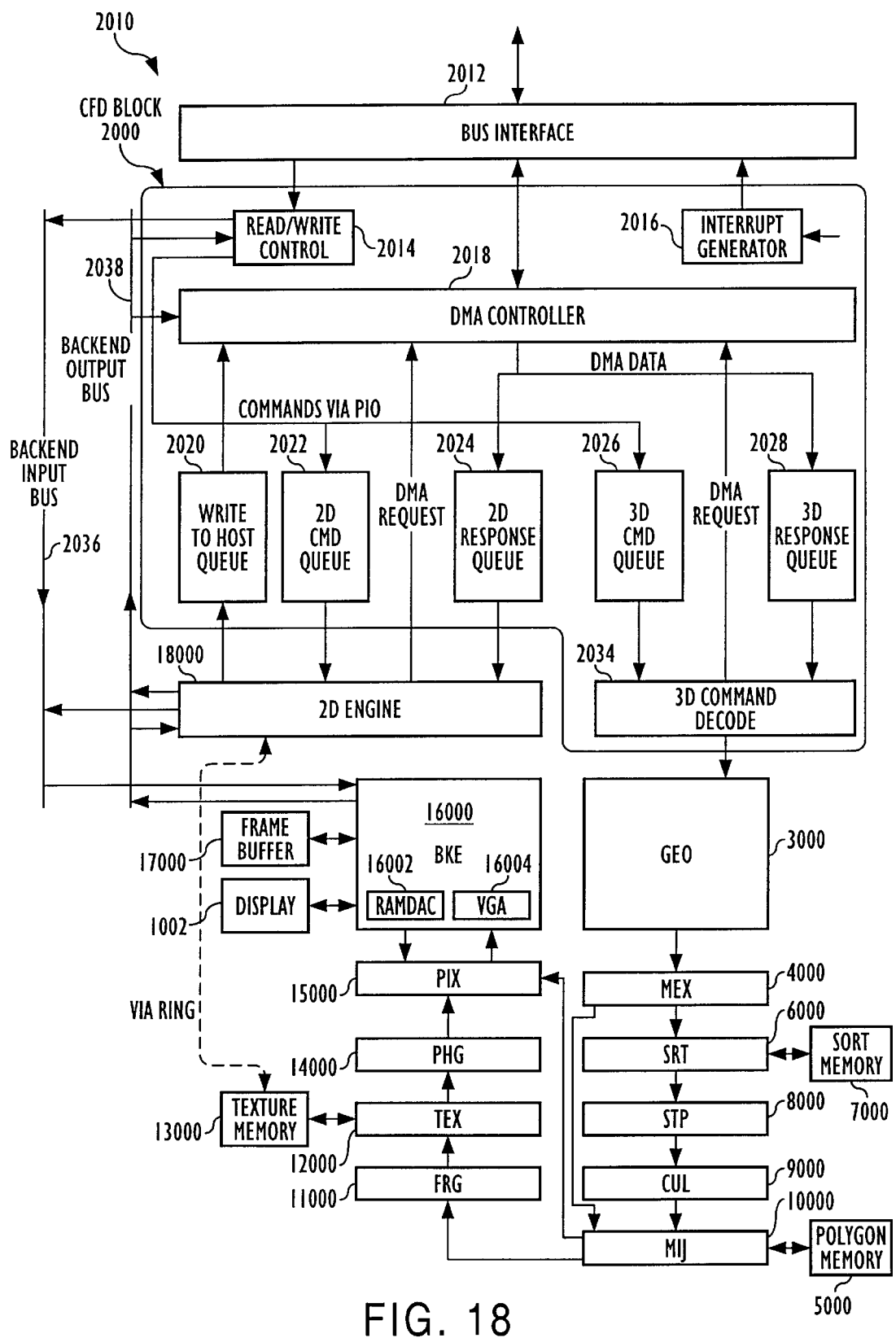
FIG. 18 is a diagramatic illustration showing an exemplary block diagram of an embodiment of the pipeline showing the major functional units in the front-end Command Fetch and Decode Block (CFD) 2000.

FIG. 18 shows a block diagram of the pipeline showing the major functional units in the CFD block 2000. The front end of the DSGP graphics system is broken into two sub-units, the AGI block and the CFD block. The rest of this section will be concerned with describing the architecture of the CFD block. References will be made to AGI, but they will be in the context of requirements which CFD has in dealing with AGI.

Sub-block Descriptions

Read/Write Control

Once the AGI has completed an AGP or PCI read/write transaction, it moves the data to the Read/Write Control 2014. In the case of a write this functional unit uses the address that it receives to multiplex the data into the register or queue corresponding to that physical address (see the Address Space for details). In the case of a read, the decoder multiplexes data from the appropriate register to the AGI Block so that the read transaction can be completed.

The Read/Write Control can read or write into all the visible registers in the CFD address space, can write into the 2D and 3D Command Queues 2022, 2026 and can also transfer reads and writes across the Backend Input Bus 2036.

If the Read/Write Decoder receives a write for a register that is read only or does not exist, it must send a message to the Interrupt Generator 2016 which requests that it trigger an access violation interrupt. It has no further responsibilities for that write, but should continue to accept further reads and writes.

If the Read/Write Decoder receives a read for a register which is write only or does not exist, it must gracefully cancel the read transaction. It should then send a message to the Interrupt Generator to request an access violation interrupt be generated. It has no further responsibilities for that read, but should continue to accept reads and writes.

Command Queue

Because commands for the DSGP graphics hardware have variable latencies and are delivered in bursts from the host, several kilobytes of buffering are required between AGI and 2D. This buffer can be several times smaller than the command buffer for 3D. It should be sized such that it smooths out inequalities between command delivery rate across AGI and performance mode command execution rate by 2D.

This queue is flow controlled in order to avoid overruns. A 2D High water mark register exists which is programmed by the host with the number of entries to allow in the queue. When this number of entries is met or exceeded, a 2D high water interrupt is generated. As soon as the host gets this interrupt, it disables the high water interrupt and enables the low water interrupt. When there are fewer entries in the queue than are in the 2D low water mark register, a low water interrupt is generated. From the time that the high water interrupt is received to the time that the low water is received, the driver is responsible for preventing writes from occurring to the command buffer which is nearly full.

Command Queue

Several kilobytes of buffering are also required between AGI and 3D Command Decode 2034. It should be sized such that it smooths out inequalities between command delivery rate across AGI and performance mode command execution rate by the GEO block.

This queue is flow controlled in order to avoid overruns. A 3D High water mark register exists which is programmed by the host with the number of entries to allow in the queue. When this number of entries is met or exceeded, a 3D high water interrupt is generated. As soon as the host gets this interrupt, it disables the high water interrupt and enables the low water interrupt. When there are fewer entries in the queue than are in the 3D low water mark register, a low water interrupt is generated. From the time that the high water interrupt is received to the time that the low water is received, the driver is responsible for preventing writes from occurring to the command buffer which is nearly full.

Command Decode

The command decoder 2034 is responsible for reading and interpreting commands from the 3D Cmd Queue 2026 and 3D Response Queue 2028 and sending them as reformatted packets to the GEO block. The decoder performs data conversions for "fast" commands prior to feeding them to the GEO block or shadowing the state they change. The 3D Command Decode must be able to perform format conversions. The input data formats include all those allowed by the API (generally, al those allowed in the C language, or other programming language). The output formats from the 3D Command Decode are limited to those that can be processed by the hardware, and are generally either floating point or "color" formats. The exact bit definition of the color data format depends on how colors are represented through the rest of the pipeline. The Command Decode starts at power up reading from the 3D Command Queue. When a DMA command is detected, the command decoder sends the command and data to the DMA controller 2018. The DMA controller will begin transferring the data requested into the 3D response queue. The 3D Command Decoder then reads as many bytes as are specified in the DMA command from the 3D Response Queue, interpreting the data in the response queue as a normal command stream. When it has read the number of bytes specified in the DMA command, it switches back to reading from the regular command queue. While reading from the 3D Response Queue, all DMA commands are considered invalid commands.

This 3D command decoder is responsible for detecting invalid commands. Any invalid command should result in the generation of an Invalid Command Interrupt (see Interrupt Control for more details).

The 3D Command Decode also interprets and saves the current state vector required to send a vertex packet when a vertex command is detected in the queue. It also remembers the last 3 completed vertices inside the current "begin" (see OpenGL specification) and their associated states, as well as the kind of "begin" which was last encountered. When a context switch occurs, the 3D Command Decode must make these shadowed values available to the host for readout, so that the host can "re-prime the pipe" restarting the context later.

DMA Controller

The CFD DMA Controller 2018 is responsible for starting and maintaining all DMA transactions to or from the DSGP card. DSGP is always the master of any DMA transfer, there is no need for the DMA controller to be a slave. The 2D Engine and the 3D Command Decode contend to be master of the DMA Controller. Both DMA writes and DMA reads are supported, although only the 2D block can initiate a DMA write. DSGP is always master of a DMA.

A DMA transfer is initiated as follows. A DMA command, along with the physical address of the starting location, and the number of bytes to transfer is written into either the 2D or 3D command queue. When that command is read by the 3D Command Decoder or 2D unit, a DMA request with the data is sent to the DMA Controller. In the case of a DMA write by 2D, the 2D unit begins to put data in the Write To Host Queue 2020. Once the DMA controller finishes up any previous DMA, it acknowledges the DMA request and begins transferring data. If the DMA is a DMA write, the controller moves data from the Write To Host Queue either through AGI to system memory or through the Backend Input Bus to the framebuffer. If the DMA is a DMA read, the controller pulls data either from system memory through AGI or from the backend through the Backend Output Bus 2038 into either the 2D Response Queue or 3D Response Queue. Once the controller has transferred the required number of bytes, it releases the DMA request, allowing the requesting unit to read the next command out of its Command Queue.

The DMA Controller should try to maximize the performance of the AGP Logic by doing non-cache line aligned read/write to start the transaction (if necessary) followed by cache line transfers until the remainder of the transfer is less than a cache line (as recommended by the Maximizing AGP Performance white paper).

D Response Queue

The 2D Response queue is the repository for data from a DMA read initiated by the 2D block. After the DMA request is sent, the 2D Engine reads from the 2D Response Queue, treating the contents the same as commands in the 2D Command Queue. The only restriction is if a DMA command is encountered in the response queue, it must be treated as an invalid command. After the number of bytes specified in the current DMA command are read from the response queue, the 2D Engine returns to reading commands from the 2D Command Queue.

Response Queue

The 3D Response queue is the repository for data from a DMA read initiated by 3D Command Decode. After the DMA request is sent, the command decode reads from the 3D Response Queue, treating the contents the same as commands in the 3D Command Queue. The only restriction is if a DMA command is encountered in the response queue, it must be treated as an invalid command. After the number of bytes specified in the current DMA command are read from the response queue, the 3D Command Decode returns to reading commands from the 3D Command Queue.

Write To Host Queue

The write to host queue contains data which 2D wants to write to the host through DMA. After 2D requests a DMA transfer that is to go out to system memory, it fills the host queue with the data, which may come from the ring or Backend. Having this small buffer allows the DMA engine to achieve peak AGP performance moving the data.

Interrupt Generator

An important part of the communication between the host and the DSGP board is done by interrupts. Interrupts are generally used to indicate infrequently occurring events and exceptions to normal operation. There are two Interrupt Cause Registers on the board that allow the host to read the registers and determine which interrupt(s) caused the interrupt to be generated. One of the Cause Registers is reserved for dedicated interrupts like retrace, and the other is for generic interrupts that are allocated by the kernel. For each of these, there are two physical addresses that the host can read in order to access the register. The first address is for polling, and does not affect the data in the Interrupt Cause Register. The second address is for servicing of interrupts and atomically clears the interrupt when it is read. The host is then responsible for servicing all the interrupts that that read returns as being on. For each of the Interrupt Cause Registers, there is an Interrupt Mask Register which determines whether an interrupt is generated when that bit in the Cause makes a 0ρ1 transition.

DSGP supports up to 64 different causes for an interrupt, a few of which are fixed, and a few of which are generic. Listed below are brief descriptions of each.

Retrace

The retrace interrupt happens approximately 85–120 times per second and is raised by the Backend hardware at some point in the vertical blanking period of the monitor. The precise timing is programmed into the Backend unit via register writes over the Backend Input Bus.

3D FIFO High Water

The 3D FIFO high water interrupt rarely happens when the pipe is running in performance mode but may occur frequently when the 3D pipeline is running at lower performance. The kernel mode driver programs the 3D High Water Entries register that indicates the number of entries which are allowed in the 3D Cmd Buffer. Whenever there are more entries than this are in the buffer, the high water interrupt is triggered. The kernel mode driver is then required to field the interrupt and prevent writes from occurring which might overflow the 3D buffer. In the interrupt handler, the kernel will check to see whether the pipe is close to draining below the high water mark. If it is not, it will disable the high water interrupt and enable the low water interrupt.

3D FIFO Low Water

When the 3D FIFO low water interrupt is enabled, an interrupt is generated if the number of entries in the 3D FIFO is less than the number in the 3D Low Water Entries register. This signals to the kernel that the 3D FIFO has cleared out enough that it is safe to allow programs to write to the 3D FIFO again.

2D FIFO High Water

This is exactly analogous to the 3D FIFO high water interrupt except that it monitors the 2D FIFO. The 2D FIFO high water interrupt rarely happens when the pipe is running in performance mode but may occur frequently when the 2D pipeline is running at lower performance. The kernel mode driver programs the 2D High Water Entries register that indicates the number of entries which are allowed in the 2D Cmd Buffer. Whenever there are more entries than this are in the buffer, the high water interrupt is triggered. The kernel mode driver is then required to field the interrupt and prevent writes from occurring which might overflow the 2D buffer. In the interrupt handler, the kernel will check to see whether the pipe is close to draining below the high water mark. If it is not, it will disable the high water interrupt and enable the low water interrupt.

2D FIFO Low Water

When the 2D FIFO low water interrupt is enabled, an interrupt is generated if the number of entries in the 2D FIFO is less than the number in the 2D Low Water Entries register. This signals to the kernel that the 2D FIFO has cleared out enough that it is safe to allow programs to write to the 2D FIFO again.

Access Violation

This should be triggered whenever there is a write or read to a nonexistent register.

Invalid Command

This should be triggered whenever a garbage command is detected in a FIFO (if possible) or if a privileged command is written into a FIFO by a user program. The kernel should field this interrupt and kill the offending task.

Texture miss

This interrupt is generated when the texture unit tries to access a texture that is not loaded into texture memory. The texture unit sends the write to the Interrupt Cause Register across the ring, and precedes this write with a ring write to the Texture Miss ID register. The kernel fields the interrupt and reads the Texture Miss ID register to determine which texture is missing, sets up a texture DMA to download the texture and update the texture TLB, and then clears the interrupt.

Generic Interrupts

The rest of the interrupts in the Interrupt Cause register are generic. Generic interrupts are triggered by software sending a command which, upon completion, sends a message to the interrupt generator turning on that interrupt number. All of these interrupts are generated by a given command reaching the bottom of the Backend unit, having come from either the 2D or 3D pipeline. Backend sends a write through dedicated wires to the Interrupt Cause Register (it is on the same chip, so using the ring would be overkill).

Geometry Block (GEO)

Graphical Pipeline Position

The GEO block is the first computation unit at the front end of the graphical pipeline. It deals mainly with per-vertex operations, like the transformation of vertex coordinates and normals. The Frontend (i.e., AGI and CFD Blocks) deals with fetching and decoding the Graphics Hardware Commands. The Frontend loads the necessary transform matrices, material and light parameters and other mode settings into the input registers of the GEO block. The GEO block sends transformed vertex coordinates, normals, generated and/or transformed texture coordinates, and per-vertex colors, to the Mode Extraction and Sort blocks. Mode Extraction stores the "color" data and modes in the Polygon memory. Sort organizes the per-vertex "spatial" data by Tile and writes it into the Sort Memory.

Operation Modes

The pipeline can operate in maximum performance mode when only a certain subset of its features is in use. In this mode, the GEO block carries out only a subset of all possible operations for each primitive. As more features are enabled, the pipeline moves through a series of lower-performance modes. The Geometry engine reuses the available computational elements to process primitives at a slower rate for the non-performance mode settings. The mapping of features to performance modes is described in the following sections.

Functional Overview of the GEO Block

The GEO block operates on vertices that define geometric primitives: points, lines, triangles, quads, and polygons. It performs coordinate transformations and Gouraud shading operations on a per-vertex basis. Only during the Primitive Assembly phase does it group vertices together into lines and triangles (in the process, it breaks down quads and polygons into sets of triangles). It performs clipping and surface tangent generation for each primitive.

Vertex Coordinate Transformation

Each vertex is specified by a set of object coordinates (Xo, Yo, Zo, Wo). The addition of the fourth coordinate enables the vertices to be expressed in homogeneous coordinates. In a homogeneous system, a series of transformations involving rotation, scaling and translation can be combined in a single transform matrix called the Model-View matrix. The vertex object coordinates are transformed to vertex eye coordinates by multiplying them with the 4×4 Model-View matrix:

$$(Xe,Ye,Ze,We)^T = M_{MV} \star (Xo,Yo,Zo,Wo)^T$$

Another matrix, called the projection matrix, is applied to the eye coordinates to yield the clip coordinates. A perspective division is carried out on clip coordinates to yield normalized device coordinates. A final viewport transformation is applied to convert these coordinates into window coordinates.

$$(Xc,Yc,Zc,Wc)^T = M_P \star (Xe,Ye,Ze,We)^T$$

$$Xd,Yd,Zd)T = (Xc,Yc,Zc^T/Wc$$

$$(Xw,Yw,Zw)^T = (Xd,Yd,Zd)^T . (Sx,Sy,Sz)^T + (Ox,Oy,Oz)^T$$

In full performance mode the pipeline doesn't need to preserve eye coordinates. Therefore, it uses a single combined matrix to transform the vertex-object coordinates to clip coordinates.

$$(Xc,Yc,Zc,Wc)^T = M_{MVP} \star (Xo,Yo,Zo,WO)^T$$

Figure 19:
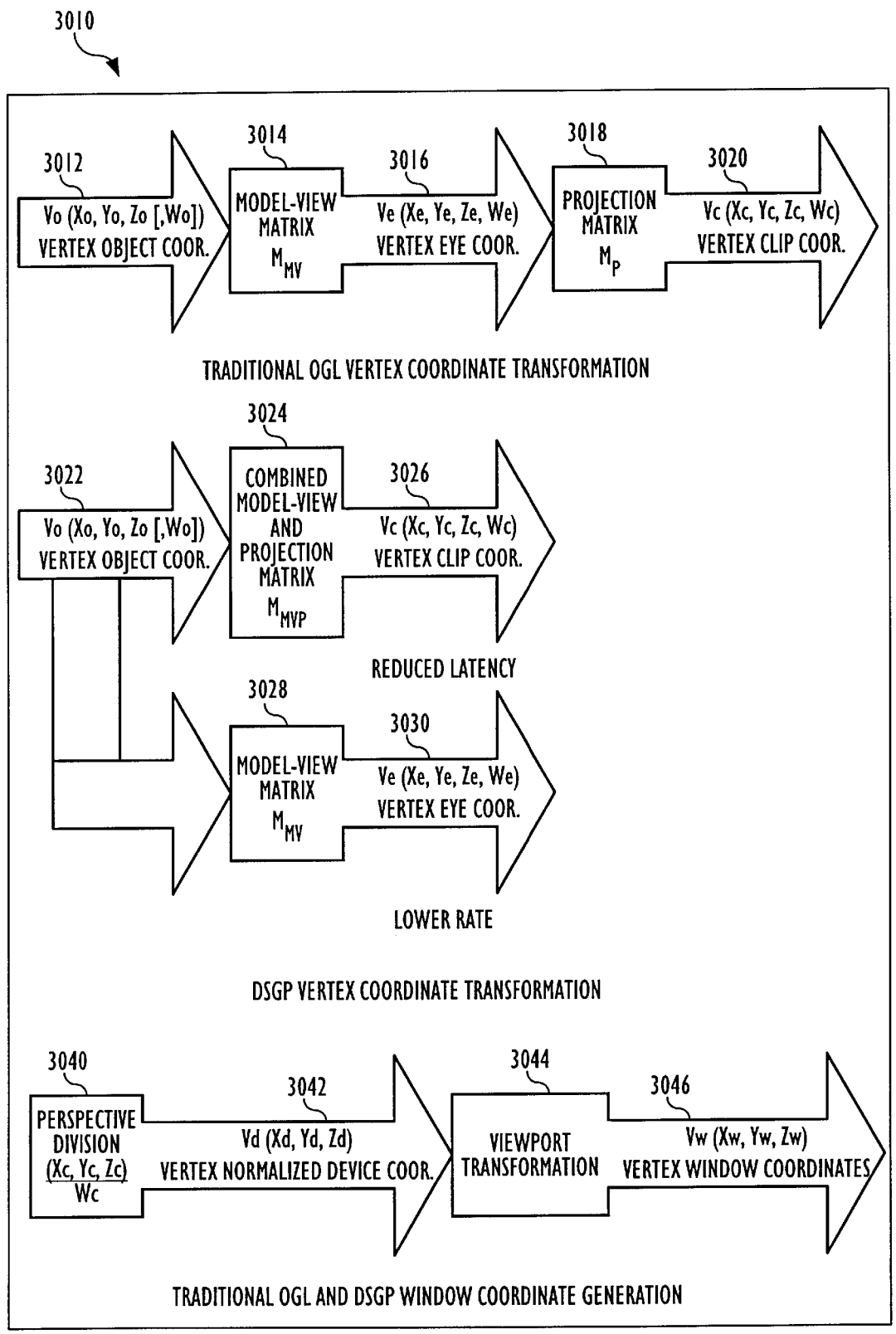
FIG. 19 is a diagramatic illustration hightlighting the manner in which one embodiment of the Deferred Shading Graphics Processor (DSGP) transforms vertex coordinates.

FIG. 19 summarizes how the DSGP transforms vertex coordinates.

Normal, Tangent, and Binormal Evaluation

In addition to spatial coordinates, the GEO block may have to process a current normal, current texture coordinates, and current color for each vertex. Normals affect the lighting calculations. The current normal is a three-dimensional vector (Nxo, Nyo, Nzo). Texture coordinates determine how a texture image is mapped onto a primitive.

The GEO block receives normals represented in object coordinates. It uses the inverse Model-View matrix to transform the normals into eye coordinates:

$$(Nxe, Nye, Nze)^T = M_{MVI} \star (Nxo, Nyo, Nzo)^T$$

Inverting the upper leftmost 3×3 matrix taken from Mmv forms the matrix Mmvi. After transforming the normals, the GEO block renormalizes them to unit length.

$$(Nxu, Nyu, Nzu)^T = (Nxe, Nye, Nze)^T \star (1/SQRT(Nxe^2 + Nye^2 + Nze^2))$$

For bump mapping, user may provide up to two more vectors, the [surface] tangent and the binormal. The GEO block transforms and renormalizes these as it does the normal. It can also generate these vectors if the user doesn't supply them. The GEO block generates the tangent using the texture coordinates and the vertex eye coordinates, and the binormal from a cross product of the normal and the tangent.

The GEO block produces tangents and binormals needed for bump mapping at half rate.

Figure 20:
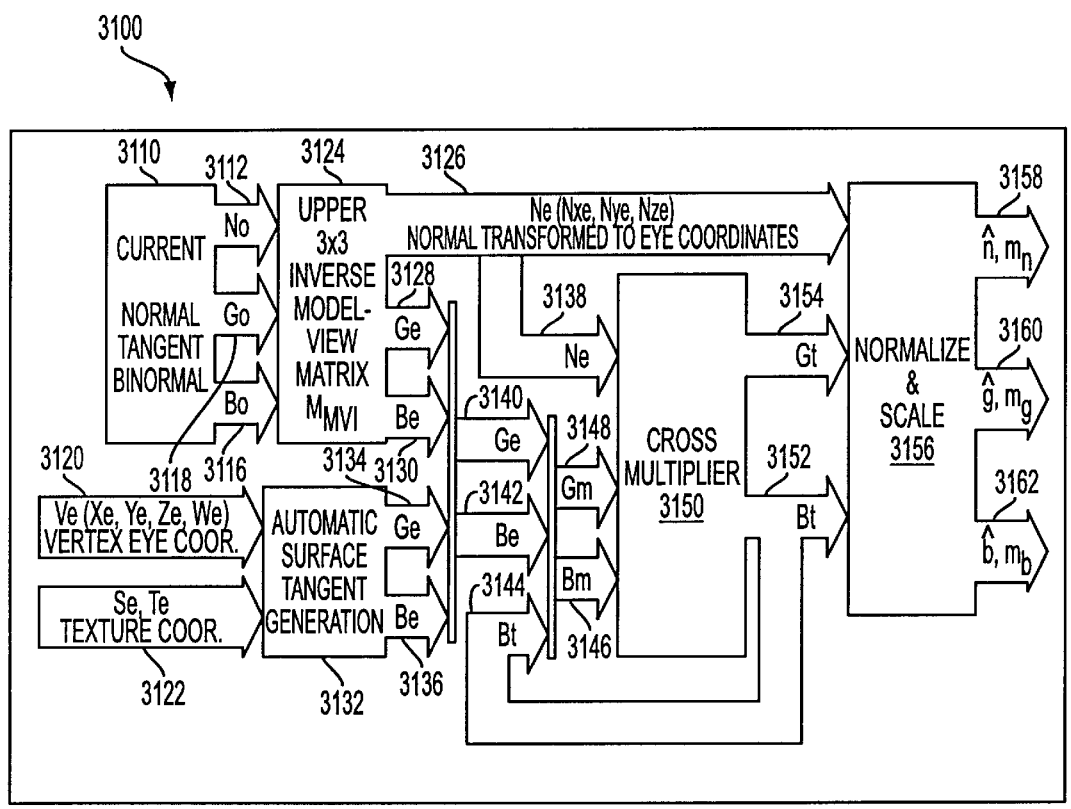
FIG. 20 is a diagramatic illustration highlighting the manner in which one embodiment of the Deferred Shading Graphics Processor (DSGP) transforms normals, tangents, and binormals.
Figure 21:
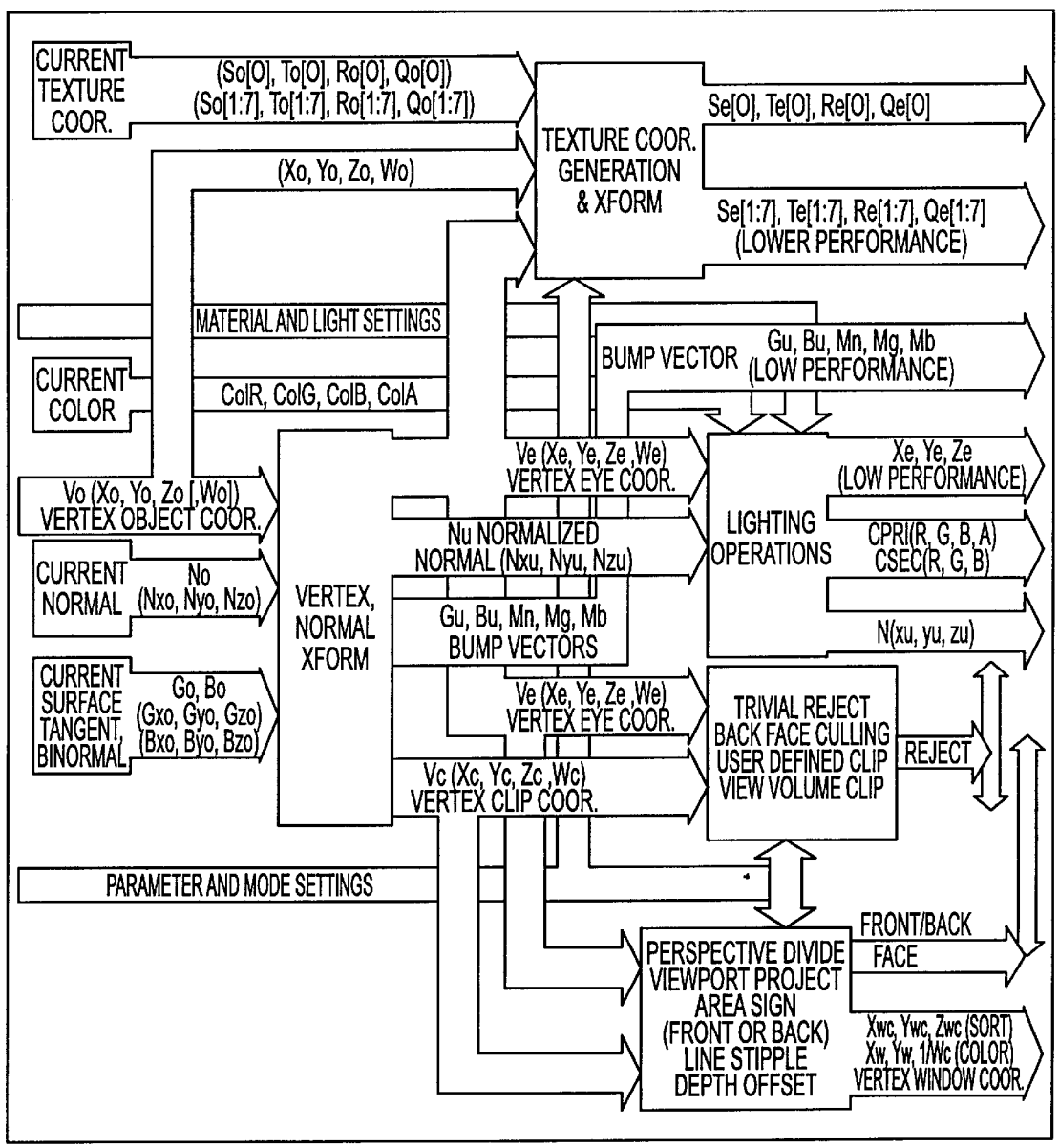
FIG. 21 is a diagrammatic illustration showing a functional block diagram of the Geometry Block (GEO).
Figure 22:
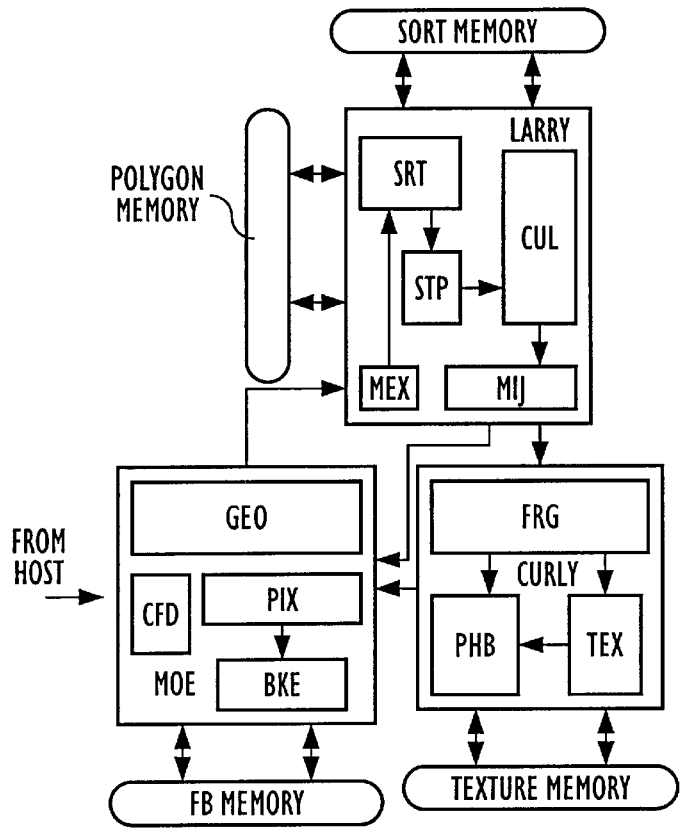
FIG. 22 is a diagrammatic illustration showing relationships between functional blocks on semiconductor chips in a three-chip embodiment of the inventive structure.

FIG. 20 summarizes how DSGP transforms normals, tangents, and binormals. An overview of the Geometry Block (GEO) is provided in FIG. 21. FIG. 22 is a diagrammatic illustration showing relationships between functional blocks on semiconductor chips in a three-chip embodiment of the inventive structure.

Vertex Colors

When lighting is disabled, the current color determines the vertex color. When lighting is enabled, the GEO block uses the vertex normal, lighting and material parameters to evaluate the vertex color. The material colors can also be derived optionally from the current color. Colors are specified as four values: R, G, B, and A; or a single color index value. Colors are converted by CFD to floating point numbers before they are used in the GEO block. At the end of the vertex lighting evaluation, the resulting colors are clamped back into eight-bit fixed point representing a range of 0.0 to 1.0, inclusive.

Texture Coordinate Processing

Texture coordinates can also be generated using vertex coordinates or the normal instead of being provided by the user. A transformation matrix can be optionally applied to the texture coordinates. Texture coordinates are specified using the homogeneous coordinates named s, t, r, and q. The transformation matrix is a 4×4 matrix. In the performance case, the resulting q is 1, r is ignored and s and t are used to access the texture map. At reduced performance, q is used to divide the texture coordinates for perspective scaling. The texture coordinate r is used for three dimensional textures and shadows. Up to eight sets of texture coordinates are supported in the GEO block. Two texture coordinates can be transformed and transformed at half performance. Five texture coordinates can be handled at one-third of the full performance rate. Finally, all eight texture coordinates can be generated and transformed at quarter performance rate.

Clipping

The GEO block compares vertex clip coordinates to the clip planes generate outcodes. It uses these outcodes to reject primitives that are outside the view volume (for example, if all of the vertices in a primitive are above the top clipping plane, the primitive is rejected). Some primitives can not be trivially rejected even if they are completely outside of the view volume. If the outcodes indicate that the primitive is entirely inside the view volume and doesn't intersect any clipping planes, the primitive is accepted and no further clipping calculations are required.

Primitives that are not trivially accepted or rejected will be clipped against the view volume and user defined clip planes for which the outcodes indicate an edge intersecting a clip plane. When one vertex of a primitive is clipped, the GEO block must generate one or more new vertices. The GEO block doesn't interpolate "color" data for these new vertices: they share the "color" data from the vertices of the original primitive. This is done by assigning the same color pointer by Mode Extract to all clipped vertices generated from the same triangle specified by the last color vertex.

The window coordinates of the current vertex and previous vertices are used to determine the face direction of polygons and optionally perform back face culling.

Lighting

In the full performance mode lighting operations are done for two lights at infinity, no local viewer, and no spot lights.

For Gouraud shading two sets of colors are evaluated per vertex. The primary color includes the Ambient, the Emissive and the Diffuse components of the color, attenuated and highlighted by spotlights. It has Red, Green, Blue, and Alpha components (RGBA). All lights and the current material settings contribute to the primary color. The secondary color corresponds to the Specular component of the vertex lighting. It has R, G, and B components. It is also attenuated by distance and includes the spot light effects. If separate Specular color mode setting is not on, then the primary color includes also the Specular component, and secondary color is cleared (R=0, G=0, B=0).

The Fragment block interpolates the primary and secondary colors separately. The primary color is blended with the texture color before the secondary color is applied for a given fragment to determine the final pixel color.

For Phong shading the GEO block does not do any extra work. The DSGP pipeline supports both Phong and Gouraud shading simultaneously for separate lights. This increases the total number of lights significantly using Gouraud and the quality of the lighting using up to eight Phong lights. Phong uses the GEO block Primary and Secondary color output as the "current" colors for color material.

Mode Extraction Block (MEX)

The Mode Extraction block (MEX) in conjunction with the Mode Injection (MIJ) block is responsible for the management of graphics state related information. In a traditional graphics pipeline the state changes are incremental; that is, the value of a state parameter remains in effect until it is changed. Therefore, the applications only need to update the parameters that change. Furthermore, the rendering is linear; that is, primitives are rendered in the order received. Points, lines, triangle strips, triangle fans, polygons, quads, and quad strips are examples of graphical primitives. Thus, state changes are accumulated until the spatial information for a primitive is received, and those accumulated states are in effect during the rendering of that primitive.

In the DSGP pipeline, rendering is deferred until after hidden surface removal. The Geometry (GEO) block receives the primitives in order, performs all vertex operations (transformations, vertex lighting, clipping, and primitive assembly), and sends the data down the pipeline. The Sort block receives the time ordered data and bins it by the tiles it touches. (Within each tile, the list is in time order.) The CUL block receives the data from the SRT block in tile order, and culls out parts of the primitives that definitely do not contribute to the rendered images. The CUL block generates the VSPs. A VSP corresponds to the visible portion of a polygon on the stamp. The TEX and PHG units receive the VSPs and are responsible for the texturing and lighting of the fragments respectively. The last block, i.e. the Pixel block consumes the VSPs and the fragment colors to generate the final picture.

A primitive may touch many tiles and therefore, unlike traditional rendering pipelines, may be visited many times (once for each tile it touches) during the course of rendering the frame. The pipeline must remember the graphics state in effect at the time the primitive entered the pipeline, and recall it every time it is visited by the pipeline stages downstream from SRT. MEX is a logic block between Geometry and Sort blocks that collects and saves the temporally ordered state change data, and attaches appropriate pointers to the primitive vertices in order to associate the correct state with the primitive when it is rendered. The Mode Injection (MIJ) block is responsible for the retrieval of the state and any other information associated with the state pointer (in this document, generally called the MLM Pointer) when it is needed. It is also responsible for the repackaging of the information as appropriate. An example of the repackaging occurs when the vertex data in polygon memory is retrieved and bundled into triangle input packets for fragment.

We first discuss the theory of operation and general principles behind DSGP state management. We then discuss the MEX block and interfaces to the MEX block. We describe how the data associated with various state pointers is organized in RDRAM. We discuss the any repackaging or processing needed by MEX. This is followed with enumeration of MEX input and output packets and a brief discussion of memory size and bandwidth analysis.

State Management

The graphics state affects the appearance of the rendered primitives. Different parts of the DSGP pipeline use different state information. Here, we are only concerned with the pipeline stages downstream from the GEO block. DSGP breaks up the graphics state into several categories based on how that state information is used by the various pipeline stages. The proper partitioning of the state is very important. It can affect the performance (by becoming bandwidth and access limited), size of the chips (larger caches and/or logic complications), and the pin count.

Mode Extraction Block Functionality

The MEX block is responsible for the following:

1. Receiving the data packets from Geometry.
2. Performing any reprocessing needed on those data packets.
3. Appropriately saving the information needed by the shading portion of the pipeline (for retrieval later by MIJ) in Polygon memory.
4. Attaching state pointers to primitives sent to the Sort unit, so that MIJ knows the state associated with this primitive.
5. Sending the information needed by Sort, Setup, and Cull to the Sort block.
6. Handling polygon and sort memory overflow.

Figure 23:
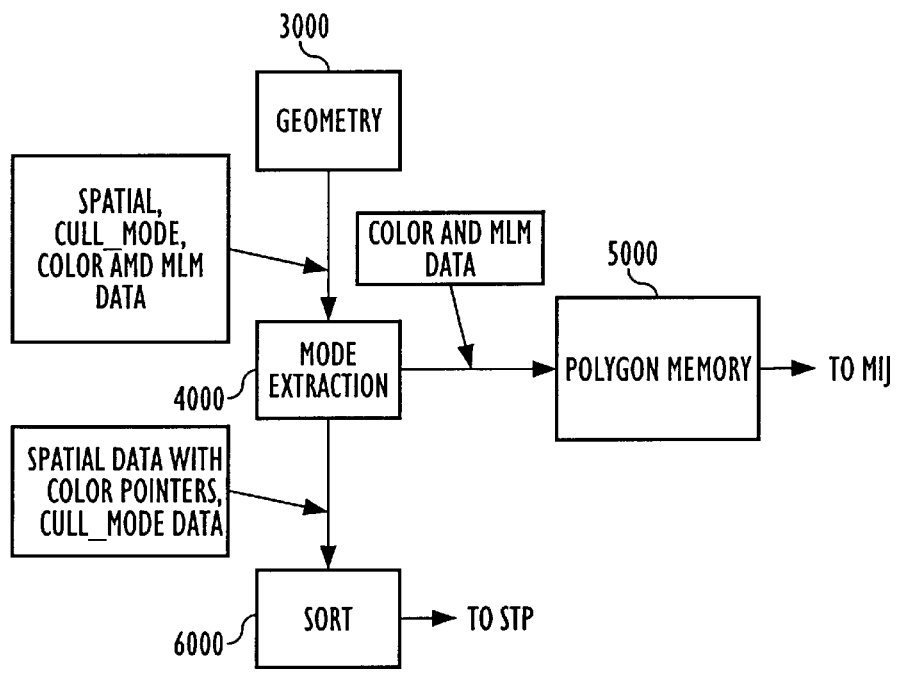
FIG. 23 is a diagramatic illustration exemplary data flow in one embodiment of the Mode Extraction Block (MEX).

Another view of the MEX data flow is shown in FIG. 23.

The state saved in Polygon memory is the one used by the blocks downstream from MIJ, e.g. Fragment, Texture, Phong and Pixel blocks. This state is partitioned as described elsewhere in this description.

Mode Injection Block

The MIJ is responsible for the following:

1. Routing various control packets such as BeginFrame, EndFrame, and BeginTile to Fragment and Pixel units.
2. Associating the state with each VSP received from the CUL block.
3. Retrieving the state packets from the polygon memory.
4. Constructing primitives. Polygon memory stores per-vertex data. Depending on the primitive type of the VSP, MIJ retrieves the required vertices (3 for triangle, 2 for line, and 1 for point primitives) from the polygon memory.
5. Keeping track of the contents of the Color, TexA, TexB, Light, Material, PixelMode, and Stipple caches and associating the appropriate cache pointer to each cache miss data packet.
6. Sending data to the fragment and pixel blocks.
7. Processing stalls in the pipeline.

Mode injection thus deals with the retrieval of state as well as the per-vertex data needed for computing the final colors for each fragment in the VSP.

Graphics State Partitioning

DSGP partitions the graphics state into a plurality of parts, and hereinafter seven parts is assumed. This is in addition to the per-vertex information stored for each primitive. This section provides an overview of the state information.

State and Spatial Data needed by Sort, Setup, and Cull

This is the state information needed by the Sort, Setup and Cull blocks. This is not saved in the Polygon memory. This information is received as three packets. A CullModes packet, a VertexModes packet and a Spatial packet. These packets are destined for the SRT block and come from the Geometry unit. The information in the cull packet includes the target draw buffer(s) and control bits needed by the CUL block.

The VertexModes packet contains the mode information generated by the host computer (i.e., software) that MEX attaches to each spatial packet before it is passed on to the Sort block. The VertexModes packet includes: line width, point size, line stipple information, and depth test operation control bits.

The Spatial packet contains the window coordinates of the vertex and other per-vertex information generated by the Geometry block such as the start bit for the stipple pattern for line primitives. The spatial packet includes: window coordinates of the vertex, polygon winding, vertex reuse in polygon fans and strips, edge flags, and blending operation control bits (such as alpha test and alpha blending). The vertex modes are generated by software. Geometry block receives the cull modes and vertex modes from software. It sends cull and vertex modes to MEX as described above. MEX construct a spatial packet for sort by attaching the vertex modes to the spatial packet. MEX block also attaches state MLM Pointers to this packet before passing it on to the Sort block. Furthermore, the MEX block collapses the line width and point width parameters into one parameter, since the primitive can not be both a point and a line at the same time. It uses the Sort primitive type to determine if the primitive is a point, a line or a polygon. If the primitive is a point it sends the point width down to Sort otherwise it sends the line width. Other fields are left untouched.

Texture Parameters

Because texturing has many parameters, especially when multiple textures are included, it is advantageous to have a multiplicity of texture packets. Hereinafter, it is assumed there are two texture parameter packets (called TexA and TexB), but the parameters could be split into additional packets. The texture parameter packets contain information needed for retrieval and filtering of texels. This document assumes there are eight possible textures assigned to each vertex. TexA parameter packet contains parameters for the first two textures and TexB parameter packet contains the same (per-texture) information for up to 6 additional textures. This non-symmetrical partition is chosen because, in most cases, there will be only one or two textures active at a time. In some rare cases, more than two textures may be used. This helps keep the size of the texture parameter cache on-chip small. The TexA and TexB packets are received from the Geometry unit. Per-texture information includes: texture ID, number of texture dimensions (i.e., 1 D, 2D, or 3D), texture size (i.e., width, height, and depth), texture boarder information, texture format, texture filter control bits, texture wrapping control bits, texture clamping control bits, level of detail control bits, and texture comparison operation control bits.

Once again, the TexA packet contains one or two of these entries and the TexB packet can contain up to 6 entries. TexA and TexB packets are generated by the software and sent to MEX via the GEO block. MEX manages TexA and TexB as two state partitions, and saves them in the Polygon memory. Each TexA and TexB state partition has a pointer associated with it. Mode Injection block retrieves these packets as needed later on. Geometry block does not use any of this information.

Given the texture id, its (s, t, r) coordinates, and the mipmap level, the Texture block is responsible for retrieving the texels, unpacking and filtering the texel data as needed. Fragment block sends texture id, s, t, r, mip level, as well as the texture mode information to Texture block. Note that s, t, r, and mip level coming from Fragment are floating point values. For each texture, TEX block outputs one 36 bit texel value to PHG. Texture block does not combine the fragment and texture colors; that happens in the Phong block. Texture block needs the texture parameters and the texture coordinates. Texture parameters are obtained from the two texture parameter caches in the Texture block. Fragment block uses the texture width and height parameters in the miplevel computation. Fragment uses the TextureDimension field to determine if the texture dimension and if it is enabled (0 means that the texture is disabled) and TexCoordSet to associate a coordinate set with it.

Lighting Parameters

The "lighting" partition of the state contains information for a multiplicity of lights (hereinafter, this document assumes a maximum of 8 lights) used in fragment lighting computations as well as the global state affecting the lighting of a fragment such as the fog parameters etc. Light cache packet includes the following per-light information: light type, attenuation constants, spotlight parameters, light positional information, and light color information (including ambient, diffuse, and specular colors). The light cache packet also includes the following global lighting information: global ambient lighting, fog parameters, and number of lights in use.

A light cache entry is about 300 bytes, (approximately 300 bits for each of the eight lights plus 120 bits of global light modes). The LightCache packet is generated by the software and sent to MEX via the GEO block. MEX manages the LightCache packet as one of the state partitions, and saves it in the Polygon memory when necessary. The LightCache state partition has a pointer associated with it. Mode Injection block retrieves this packet from polygon memory as needed later on. Geometry block does not use any of this information.

As an alternate way of caching lighting state, per-light cache entries could be used rather than caching the entire lighting state. This would allow less data to be transmitted down the pipeline when there is a light parameter cache miss. Thus, application programs would be provided "lighter weight" switching of lighting parameters when a single light is changed. This would, however, require additional complexity in management of the lighting state.

Fragment Material Parameters

The material partition of the graphics state contains all the information about the material used in fragment lighting computation. Note that the fragment material state is different from the material state attached to the vertex of a primitive. The fragment-material state information is not used during the vertex lighting computations performed in the GEO block. This packet includes: texture enable control bits (selection of active textures), texture environment parameters, material color parameters (emissive, ambient, diffuse, and specular colors, and shininess), shininess cutoff value, and color material parameters.

Because there can be up to eight textures, up to eight texels for each fragment can be received by the PHG from TEX. The texels are received in the same order as the texture entries in the material state packet.

Pixel Modes

Pixel modes affect the per-fragment operations in the PIX block. Software creates the pixel mode packet and it is sent to MEX via GEO. MEX saves the packet in Polygon memory. MIJ retrieves the packet, and sends it to the PIX block. Pixel modes include the following information: frame buffer write masks (depth, color, and stencil masks), blending operations, depth function, stencil function, and scissor operations.

Note that some of the information in this packet is the same as that included in the VertexModes destined for SRT. Software is responsible for duplicating the state information as needed in various mode packets.

Stipple

The stipple packet specifies the polygon stipple pattern. It is efficient for the stipple pattern to be cached separately because it is not used often, and when used, does not change often. It is a large number of bytes (usually 128 bytes due to the need for 32×32 bit pattern), so to include it in any other parameter cache would add a large additional overhead to the associated packet.

Per-Vertex Data for Fragment-Texture-Phong Blocks

For each VSP, the fragment block interpolates the supplied per-vertex data and generates the information needed for the blocks downstream from the Fragment block. The interpolated parameters may consist of some or all of the possible parameters depending on the state pointer attached to the VSP. To account for the variability in the number of parameters, the packet size stored into Polygon Memory is variable, depending on the number and type of parameters used for a particular vertex. These parameters include: primitive type, vertex reuse to construct polygon fans and strips, unclipped vertex x, y, and 1w values, vertex eye coordinates ($x_{eye}$, $y_{eye}$, $z_{eye}$), inverse perspective term, vertex primary and secondary colors, vertex normal vector, tangent vector, binormal vectors, and up to 8 sets of texture coordinates. The normal, tangent, and binormal vectors can each be represented as either a single vector or as a unit vector (i.e., the vector's direction) and a corresponding magnitude.

Unclipped vertex x, y, and 1/w values are particularly useful because interpolated primitive parameters (such as colors, normals, texture coordinates, etc.) can be generated from the original vertex parameters of the primitive, even if the primitive gets clipped to the display screen. Thus, when a primitive is clipped, new vertices are created in order to keep all primitives on-screen. This would usually require all vertex parameters to be interpolated at these new vertex locations (along the display screen edges), which is an expensive set of operations. The interpolation of these parameters at clip-generated vertices is avoided by storing clipped values into Sort Memory (i.e., the spatial x, y, and z values), but storing unclipped vertex parameters into Polygon Memory. Thus, there is a many-to-one correspondence between primitives in Sort Memory to those in Polygon Memory. This saves both computation and storage space in Polygon Memory.

Separating the normal, tangent, and binormal vectors into separate direction and magnitude makes it easy to interpolate the direction separately from the magnitude. Interpolating the direction separately from the magnitude provides a truer angular interpolation, especially when the magnitudes of the original vectors (i.e., the vectors at the vertices) differ by a large factor.

The Geo block generates per-vertex information that is stored in polygon memory. The MIJ block is responsible for retrieving the needed state and vertices from the polygon memory in order to reconstruct the primitive that includes the VSP.

Note that the triangle vertex texture coordinates are sent to Fragment unit and not the texture unit. The texture unit receives the interpolated and perspective corrected texture coordinates for each fragment from the Fragment block.

Functional Details of MEX Block

Functional Overview of the MEX Block

In order to understand what MEX needs to accomplish and how it does it, let us consider an example shown in FIG. 24.

MEX receives a sequence of packets from GEO. For each primitive, MEX first receives the relevant state packets and then it receives the geometry packets. (Color vertex information is received before the sort vertex information.) The sort vertex data consists of the information needed for sorting and culling of primitives such as the clipped window coordinates. The VtxMode packet contains information about depth test etc. The information in CullMode, VtxMode and sort vertex packets is sent to the Sort-Setup-Cull part of the pipeline. The "color" vertex data consists of information needed for lighting and texturing of primitive fragments such as the vertex eye-coordinates, vertex normals, texture coordinates etc and is saved in polygon memory to be retrieved later.

The Sort-Setup-Cull part of the pipeline converts the primitives into VSPs. These VSPs are then textured and lit by the Fragment-Texture-Phong part of the pipeline. The VSPs output from the Cull block to MIJ block are not necessarily ordered by primitives. In most cases, they will be in the VSP scan order on the tile, i.e. the VSPs for different primitives may be interleaved. Clearly, Fragment-Texture-Phong part of the pipeline needs to know which primitive a particular VSP belongs to; as well as the graphics state at the time that primitive was first introduced. MEX associates a "color pointer" with each Sort Vertex (which is then passed on to each VSP in this primitive). MIJ decodes the pointer, and retrieves needed information from the Polygon memory.

MEX thus needs to accumulate any state changes that have happened since the last state save. The state changes become effective as soon as a vertex is encountered. MEX keeps a state vector on chip. This state vector has 10 partitions as shown in FIG. 25. MEX needs nearly 1170 bytes of on-chip memory to store the state vector.

The VertexModes are held in a register in MEX and are appended to the vertices passed on to the Sort-Setup-Cull part of the pipeline. The CullModes are sent to Sort as Mex2SrtCullModePkt. MEX keeps a dirty bit and a pointer (in polygon memory) for each partition in the state vector. Thus there are 10 dirty bits and 9 mode pointers, since cull modes do not get saved in the polygon memory and therefore do not require a pointer. Every time MEX receives an input packet corresponding to a state partition from the Geo block, it updates that partition in the state vector. MEX also sets the dirty bit corresponding to that partition. When MEX receives a color vertex, it examines the dirty bits to see if any part of the state has been updated since the last save. All state partitions that have been updated and are relevant to the rendering of the current primitive are saved to the polygon memory and their pointers updated. Their dirty bits are also cleared. Note that the dirty bits are only cleared for the primitives that are saved to the polygon memory. Which TextureA, TextureB, and Material gets saved to the polygon memory depends on the "face" of the primitive and the dirty bits. This is schematically outlined in FIG. 26.

MEX constructs a composite color pointer called the MLM Pointer containing the pointer to the last saved location of the applicable TextureA, TextureB, Material, Light, Stipple, and PixelMode. This pointer is attached to the vertices passed on to the Sort block.

Note that Clear packets are also processed similarly. When a clear packet is received, MEX examines the SendToPixel flag. If sendToPixel flag is set, then MEX checks to see if the PixelModes are dirty. If PixelMode dirty bit is set, then MEX saves the PixModes to polygon memory, updates the PixModePtr, clears the PixMode dirty bit, creates a new MLM Pointer and attaches that pointer to the clear packet before passing it on to the Sort block.

Input Packet Processing

The actions taken in Mode Extraction block for each of the input packets from the Geometry block are illustrated in the figures. Note that, we use "mesh" to indicate a new sequence of points following a change in state. A "mesh" can thus be a sequence of points, line strip, line segments, or a triangle list or fan.

Polygon Memory Management

The polygon memory can be viewed as a linear array of dual-octs. The primitive data is filled in from the top of the memory heap and the mode data from the bottom of the heap. All writes to the memory are in 144-bit words (or 1 dual-oct). For the example in FIG. 24, the polygon memory layout would look something like the FIG. 27.

Some things to note are that

1. The partitions in the state vector undergo a lazy save in polygon memory. We only save what we need.

2. There is no default reset of state vectors. It is the responsibility of the driver/software to make sure that all state is initialized appropriately.

3. All vertices in a mesh are the same size.

4. The color offset is 8 bits, therefore can be at most 256 vertices in a mesh.

5. MEX keeps current vertexPointer, vertexCount, and the previous (up to) two vertices needed to complete the primitive. It also keeps the modePointer.

The vertexPointer is the pointer to the current vertex entry in polygon memory. VertexCount is the number of vertices saved in polygon memory since the last state change. VertexCount is assigned to the ColorOffset. VertexPointer is assigned to the colorPointer for the Sort primitives. Previous vertices are used during handling of memory overflow. MIJ uses the colorPointer, ColorOffset and the vertex size information (encoded in the ColorType received from Geo) to retrieve the MLM Pointers and the primitive vertices from the polygon memory.

Memory Double Buffering and Overflow

In some rare cases, Polygon memory can overflow. Polygon memory and/or Sort memory will overflow if a single user frame contains too much information. The overflow point depends on the size of Polygon memory; the frequency of material, mode, texture, and light changes in the frame; and the primitive features used. When memory fills up, all primitives will be flushed down the pipe and the user frame finished with another fill of the Polygon Memory buffer. Note that Sort memory overflow will trigger the same overflow mechanism. Polygon memory and Sort memory buffers must be kept consistent. Any skid in one memory due to overflow in the other must be backed out (or, better yet, avoided). Thus in MEX, a frame break due to overflow may result due to a signal from Sort that a Sort memory overflow occurred or due to memory overflow in MEX itself. A Sort memory overflow signal in MEX is handled in the same way as an overflow in MEX polygon memory itself.

Note that the polygon memory overflow can be quite expensive. The polygon memory, like Sort memory is double buffered. Thus MEX will be writing to one buffer, while MIJ is reading from the other. This situation will cause a delay in processing of frames, since MEX needs to wait for MIJ to be done with the frame before it can move on to the next (third) frame. Note that MEX and SRT are reasonably well synchronized. However, Cull needs to have processed a tile's worth of data before MIJ can start reading the frame that MEX is done with. Thus for each frame, there this possible delay or stall. The situation can become much worse, if there is memory overflow. In a typical overflow situation, the first frame is likely to have a lot of data and the second frame very little data. The elapsed time before MEX can start processing the next frame in the sequence is (time taken by MEX for the full frame+CUL tile latency+MIJ frame processing for the full frame) and not (time taken by MEX for the full frame +time taken by MEX for the overflow frame). Note that the elapsed time is nearly twice the time for a normal frame. The only way to reduce this cost is for software to get an estimate of the scene size, and break the frame in two roughly equally complex frames. Other than that, the hardware can implement a policy where we create an overflow only when we have to.

Mode Extraction needs to store the triangle (and its state) that caused the overflow in the next buffer. Depending on where we are in the vertex list we may need to send vertices to the next buffer that have already been written to the current buffer. This can be done by reading back the vertices or by keeping a couple of vertices around in MEX. Note that lines will need only one previous vertex while points are not paired with other vertices at all. DoColorVertex code in takes into account this requirement. Overflow is also handled. MIJ sends a signal to MEX when done. Since Setup and Cull can start processing the primitives on a tile only after MEX and Sort are done, MIJ may stall waiting for the VSPs to start arriving.

Color Pointer Generation

MEX attaches a "colorPointer", a "colorOffset", and a "colorType" with every primitive vertex sent to Sort. The "colorPointer" points to a vertex entry in the Polygon memory. This vertex entry is the vertex that completes the triangle (line, or point) that the Sort primitive is associated with. In the example given above (see FIG. 27), the sort vertices $V_a$, $V_b$, $V_2$ are all assigned the color pointer corresponding to the color vertex $V_3$, as the vertex $V_3$ completes $D_1V_2V_3$, that $\Delta V_1V_aV_b$ and $\Delta V_1V_bV_2$ are associated with. The vertex parameters, i.e. normals, colors, texture coordinates etc of $\Delta V_1V_2V_3$ are used in lighting and texturing of the fragments in the VSPs generated for $\Delta V_1V_aV_b$ and $\Delta V_1V_bV_2$.

The "colorOffset" is the number of vertices separating the vertex at the colorPointer to the dual-oct that is used to store the MLM Pointer applicable to this primitive. Again in the above example, the color offset associated with $V_a$, $V_b$, and $V_2$ is the number of vertices separating st0 and cv3, i.e. 3. The colorOffset helps MIJ retrieved the MLM Pointer (MLM Pointer=colorPointer -colorOffset★vertexSize-1), which is in turn decoded to retrieve the Light, TexA, TexB, Material, PixMode, and stipple pointers. Note that this limits the maximum number of vertices in a mesh in Polygon memory to 256. (The colorOffset is an unsigned 8 bit integer, therefore the value can be 0–255; adding the last vertex at colorPointer we get 256 vertices max.)

The "colorType" tells the MIJ how to retrieve the complete primitive from the Polygon. Vertices are stored in order, so the vertices in a primitive are adjacent, except in the case of triangle fans. For points, we only need the vertex pointed to by the colorPointer. For lines we need the vertex pointed to by ColorPointer and the vertex before this in the color vertex array. For triangle strips, we need the vertex at colorPointer and two previous vertices. For triangle fans we need the vertex at colorPointer, the vertex before that and the first vertex in the array after the MLM Pointer. In the example above, the sort primitive defined by vertex $V_8$, MIJ will need to retrieve vertices $V_5$, $V_7$, and $V_8$. Thus, for a triangle fan, the three vertices for the triangle are at ColorPointer, (ColorPointer-1), and at (ColorPointer-ColorOffset).

Bits used for "color" information are shown in FIG. 28.

The Color Type field is constructed from the "vertexType" in input packet header and the vertex packet length. It specifies both the size of the packet and the type of primitive it belongs to. The values for the color type field are listed in FIG. 29.

FIG. 30 shows the contents of the MLM Pointer packet stored in the first dual-oct of a list of point list, line strip, triangle strip, or triangle fan.

Processing of State

By and large, MEX does not need to know the contents of most of the packets received by it. It only needs to know their type and size. There are some exceptions to this rule.

For "color" vertex packets, MEX needs to know the information about the primitive defined by the current vertex. In particular, MEX needs to know its type (point, line, triangle strip or fan) and if a triangle—whether it is front facing. This information is used in saving appropriate vertex entries on chip to be able to construct the primitive in case of an overflow. This information is encapsulated in the packet header by the Geometry block.

MEX accumulates Material and Texture data for both front and back faces of the triangle. Only one set of state is written to Polygon memory based on the "FrontFace" bit. Note that the front/back orientation does not change in a triangle strip or fan. The "FrontFace" is used to associate correct TextureA, TextureB parameters and the material objects with the primitive. If a mesh changes orientation in the middle, GEO will break it into two or more meshes such that each new mesh is either front facing or back facing.

Similarly, for CullModes, MEX needs to be able to strip away one of the LineWidth and PointWidth attributes depending on the primitive type. If the vertex defines a point then LineWidth is thrown away and if the vertex defines a line, then PointWidth is thrown away. Mex passes down only one of the line or point width to the Sort unit.

In the case of "Clear" packets, MEX examines to see if SendToPixel flag is set. If this flag is set, then MEX saves the PixelMode (if necessary) and creates an appropriate ColorPointer to attach to the output clear packet.

Sort Block (SRT)

Functional Overview of the SRT Block

The Sort Block is located in the pipeline between Mode Extraction (MEX) and Setup (STP). The primary function of the Sort Block is to take geometry scattered around the display window and sort it into tiles. The Sort Block manages the Sort Memory, which stores all the geometry for an entire scene before it is rasterized, along with a small amount of mode information. The Sort Memory is a double buffered list of vertices and modes. One page collects a scene's geometry (vertex by vertex and mode by mode), while the other page is sending its geometry (primitive by primitive and mode by mode) down the rest of the pipeline.

As described in the chapter "Architectural Overievw", the window (the display area on the screen) is divided horizontally and vertically into a set of tiles, and Sort keeps an ordered list for each tile. When a page of Sort Memory is being written, vertices and modes are written sequentially into the Sort Memory as they are received by the Sort Block. When a page of Sort Memory is read, it is done on a tile-by-tile basis. The read process operates in two modes: 1) Time Order Mode; and 2) Sorted Transparency Mode. In Time Order Mode, time order of vertices and modes are preserved within each tile. That is, for a given tile, vertices and modes are read in the same order as they are written. In Sorted Transparency Mode, reading of each tile is divided into multiple passes, where, in the first pass, guaranteed opaque geometry is output from the Sort Block, and, in subsequent passes, potentially transparent geometry is output from the Sort Block. Within each pass, the time ordering is preserved, and mode data is inserted in its correct time-order location.

At the input to the Sort Block, the beginning of a frame is designated by the reception of a MEX Output Begin Frame Packet, and always corresponds to the start of a user frame (that is, the application is starting to draw a new picture). These begin frame packets are passed from Sort down the pipeline to Setup when Sort Memory Pages are swapped. The ending of a frame is designated by the reception of a MEX Output End Frame Packet, but only corresponds to the end of a user frame if a memory overflow did not occur and software did not force the user frame to split. A memory overflow occurs when either Sort Memory or Polygon Memory becomes full. Therefore, there are two kinds of end frame packets that come into the Sort Block: 1) end of a user frame; and 2) end of a frame caused by the need to split a user frame into multiple frames within the pipeline. The second half of the pipeline (Setup and beyond) will be asked to process a tile multiple times when a user frame is split into multiple frames. Because each frame is independent, and could be input from different contexts, all the pipeline state information must be stored into either Sort Memory (as mode packets) or Polygon Memory on a per-frame basis.

Within frames, the Sort Block receives and outputs Sort Primitives, which are: points, lines, and triangles. A Sort Primitive triangle can be either a filled triangle or a line mode triangle. However, primitives are sorted according to Cull Primitives, which include: points, lines, filled triangles, and lines that are edges of triangles.

The primary difference between Sort Primitives and Cull Primitives is that edges of line mode triangles are considered separate primitives. If a line mode triangle is received by the Sort Block, it is sorted according to the tiles its edges touch. Any edge of the triangle (that has its LineFlag TRUE) causes the entire triangle to be sorted into the tiles that the edge touches, but a triangle with multiple edges in the same tile only cause one Pointer Entry per tile. This reduces the number of primitives per tile, because, for example, if a large line mode triangle surrounds several tiles without any of its edges touching the tiles, no Cull Primitives are read for this triangle in these tiles. The Cull Primitive is further described in the Setup Block document, but the CullType parameter is essentially the SortPrimitiveType parameter with an additional bit to choose amongst the three edges of a line mode triangle.

FIG. 31 shows a simple example of data stored into a Sort Memory Page, including only six tiles and eight primitives. As seen the example, each Sort Memory Page is divided in two: 1) Data Storage; and 2) Pointer Storage. Data Storage stores its data in the received order, and stores two types of Storage Entries: 1) vertex packets and 2) mode packets. The example in FIG. 31 shows thirteen (13) vertex packets and three mode packets. Pointer Storage contains two types of lists: 1) Tile Pointer Lists, one for each tile; and 2) a Mode Pointer List. The example in FIG. 31 shows six Tile Pointer Lists containing a total of 18 Vertex Pointers, and also shows the Mode Pointer List containing a Clear Pointer and three Cull Pointers. The size of vertex packets and mode packets is always a single Rambus Dualoct. Hence, the addresses shown in FIG. 31 are Dualoct addresses.

As vertices are fed into the Sort Block and sequentially written into Data Storage, a Tile Pointer List is constructed for each tile. Each Vertex Pointer in a Tile Pointer List includes the address (i.e., pointer) in Data Storage of the last Sort Memory Vertex Packet of a Sort Primitive that includes a Cull Primitive that covers part of the corresponding tile. For example, in FIG. 31, the triangle completed by vertex 11 (i.e., the Sort Memory Vertex Packet written into Dualoct address 11) touches three tiles, and a pointer to this vertex is added to the Tile Pointer List for the three touched tiles (tiles 2, 4, and 5).

In addition to an address, each Vertex Pointer also includes an offset. If the offset is zero, the Sort Primitive type is a point. An example in FIG. 31 is the point represented by vertex 16, forming the fourth Pointer Entry in Tile 5. If the offset is one, the primitive type is a line. An example in FIG. 31 is the line formed by vertex 14 and vertex 15, forming the first Pointer Entry in Tile 0 and the fourth Pointer Entry in Tile 2. In these two entries, the address field is 15, which points to the last vertex in the line. For lines, the other vertex is always the vertex at the immediately preceding address. If the offset is two or more, then the Sort Primitive type is a triangle, and the offset is used to determine the location of the first vertex in the triangle. For example, in FIG. 31, vertex 12 is the third vertex of a triangle. The second vertex is always the immediately prior address, in this example, vertex 11. The first vertex is found by subtracting the offset from the address. In this example, the offset is 4, and the first vertex is vertex 8 (i.e., 12−4=8). Hence, four Vertex Pointers are added to Pointer Storage by adding an entry to the lists for Tile 2, Tile 3, Tile 4, and Tile 5. Each of these four entries have address=12 and offset=4.

In addition to an address and an offset, each Vertex Pointer also includes a Transparent flag bit. This boolean variable is only used when the pipeline is in Sorted Transparency Mode. When it is TRUE, the primitive is treated as possibly transparent; and when FALSE, indicates the primitive is guaranteed to be opaque. In this context, "opaque" means the primitive completely obscures more distant geometry that occupies the same area in the window. In the example shown in FIG. 31, the triangles completed by vertices 9 through 11 have their Transparent bit set to TRUE, indicated by a "T" in the Vertex Pointers. These three triangles touch nine tiles, so there are nine entries with the "T" indicator.

As mode packets are fed into the Sort Block and sequentially written into Data Storage, a single Mode Pointer List is constructed. Each entry in the Mode Pointer List is the address of a mode packet in Data Storage. There are two types of pointers, each with a corresponding mode packet type: 1) Clear Pointers, containing the address of a Sort Memory Clear Packet; and 2) Cull Pointers, containing the address of a Sort Memory Cull Packets.

Both Clear Pointers and Cull Pointers include the ModePktType parameter, indicating the type of mode packet. Both pointer include is a boolean variable (SubFrameBreakOnClear and SubFrameBreakOnCull) that indicates the mode packet could cause a frame to be divided into SubFrames at that point. If the boolean variable is TRUE, and the current SubFrame already includes transparent geometry, then the frame is divided immediately prior to that mode packet. In the example shown in FIG. 31, one Cull Pointer has its SubFrameBreakOnCull bit set to TRUE, indicated by a "S" in that Cull Pointer. Clear Pointers also include another boolean, SendToPixel, indicating the buffer clear operation must occur in the Pixel block.

During the reading of a Sort Memory Page, multiple vertices are assembled into Sort Primitives, and modes are injected into the output stream of every tile such that Sort Memory addresses are always increasing. In the example of FIG. 31, when Tile 3 is read, the order of output packets is (specified as Data Storage addresses): 0, 1, 4, 5, 6, 7, 12, and 13. Notice only the primitives that touch Tile 3 (i.e., 4, 5, 6, and 12) are output, but all four mode packets are output. In general, all mode packets are sent during every tile, however, some mode packets are not fed to the output stream because they can be eliminated or are not relevant for the target draw buffer. This is discussed in detail in a later section.

In addition to vertex packets and mode packets, Sort Memory also stores data packets that are considered to be between user frames, called "Tween Packets". Specifically, Tween Packets can only be input into the pipeline after software issues an end user frame and before software issues a begin user frame. From an architectural perspective, Tween Packets are not considered part of a Sort Memory Page. However, because there is no other place in Sort Memory to store data, Tween Packets are stored at the beginning of Data Storage within a Sort Memory Page by the Sort Write Process. Tween Packets are primarily used for 2D commands that need to be synchronized with a 3D frame. For example, if geometry is rendered to an off-screen buffer (a "p-buffer"), and then a stretch-Blt operation transfers the data to the frame buffer, this operation must occur between frames. Tween Packets are also used for all accumulation buffer operations.

Figure 32:
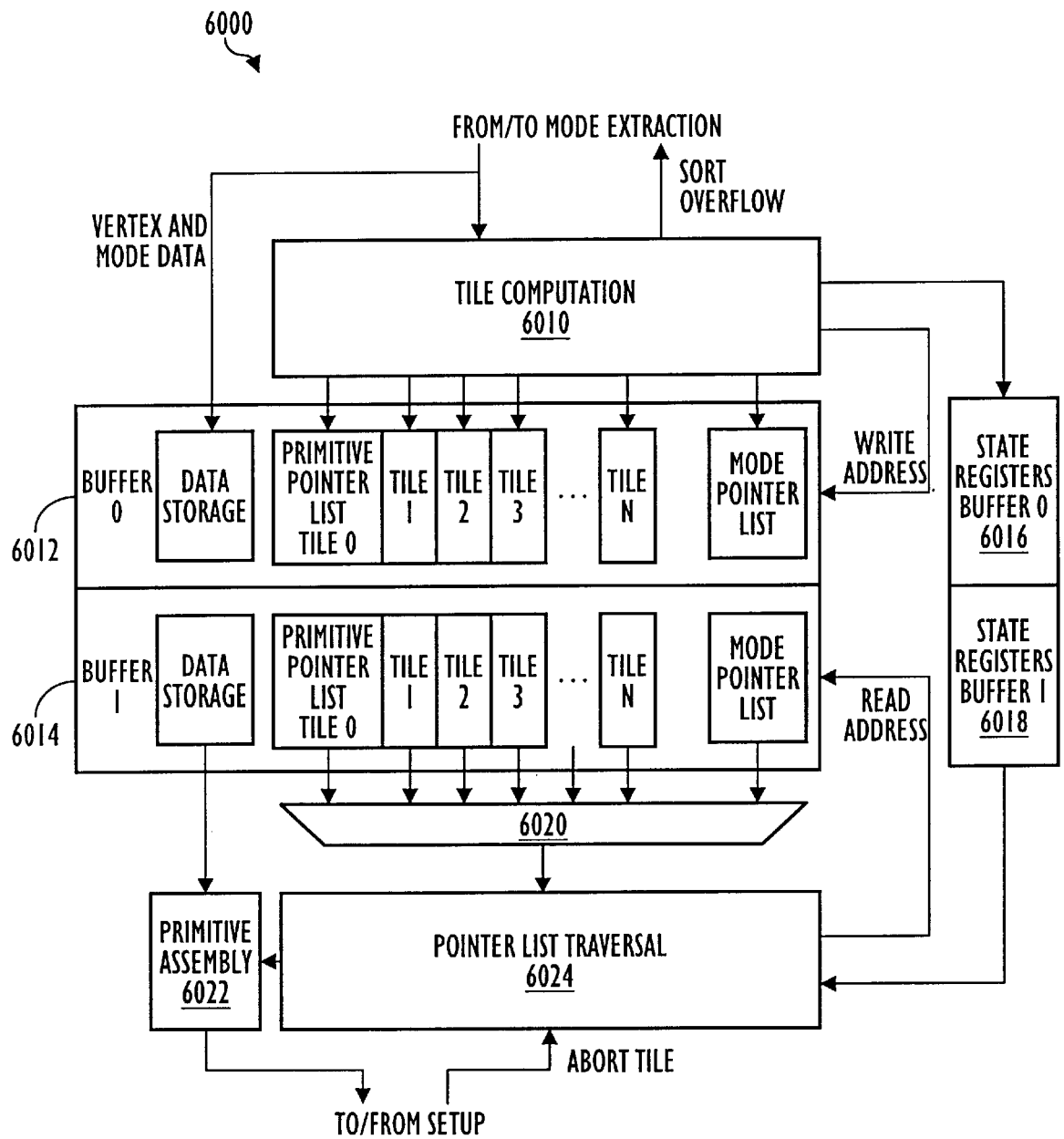
FIG. 32 shows a simplified block diagram of an exemplary embodiment of the Sort Block.

FIG. 32 shows a simplified block diagram of the Sort Block. In addition to the features already discussed, FIG. 32 shows double buffered state registers. These registers store the parameters of the frames being written and read. Parameters include: number of tiles horizontally, number of tiles vertically, whether the target draw buffer is double buffered, whether the target draw buffer is stereo, whether the frame is in Time Order Mode or Sorted Transparency Mode, sample location selection within pixels, sample weighting, and whether the frame was caused by an overflow in either Sort Memory or Polygon Memory.

From an algorithmic perspective, tiles are independent, and can be read in any order. However, to maximize texture reuse, tile groups, called "supertiles" are read sequentially. The number of tiles per supertile is selectable, but we expect to always select 2×2 tiles per supertile. And, to minimize load imbalance due to scene horizon complexity effect, supertiles are not read either row-by-row or column-by-column. Rather, supertiles are read in a spatially staggered (pseudo-random) fashion. The exact order is not important, but a sequentially read set of supertiles should not fall in a straight line across the window. An algorithm for this pseudo-random walk is described later.

For stereo 3D windows, the left and right buffers are considered separate, each with a separate set of tiles. For example, a 1024×768 window has 64×48 tiles (3072 tiles total), but a stereo window has 2×64×48 tiles (6144 tiles total), and has two tiles at each (x, y) location (one for left and one for right).

When an application renders to both front and back buffers for a specific tile within the same frame, that tile needs to be processed in two passes, first for the back buffer, then for the front buffer. However, because geometry rendered only to the back buffer can change the results of the depth test for geometry rendered only to the front buffer (and visa versa), all the geometry (both front and back) must be sent down the pipeline during both passes. In addition, the same starting depth and stencil values must be used for both passes. Therefore, the back and front passes for a give tile must occur consecutively (i.e., no other tiles in between) so that the Back End can load the same initial depth and stencil values from the frame buffer into consecutive tile buffers in the Pixel Block. If the pass for the back buffer were to complete before the initial loading of the pass for the front buffer, then a rendering error could occur. The Backend must guarantee this.

During the writing process, it is important to only assign primitives to tiles if their area actually covers part of the tile. While a simple bounding box could be used, this would result in wasting Sort Memory bandwidth, especially for diagonal lines and long skinny diagonal triangles. In a later section, a precise algorithm for Touched Tile Calculation is presented.

Approximately half of a Sort Memory Page is used for pointers. Therefore, the number of bytes needed in Sort Memory is approximately 64 times the maximum number of vertices (mode packets don't contribute much). Each vertex requires 16 bytes, pointers requires an additional 16 bytes, and there are two pages required.

The Sort Block keeps track of several performance meters, such as the number of triangles in each frame. Please see the subsection "Performance Metering Capabilities, Readable from the Host", in the section "Output from the Sort Block".

Sort Block Functional Details

The Sort block includes two processes the operation in parallel: 1) the Sort Write Process; and 2) the Sort Read Process. The Sort Write Process is the "master" of the two, because it initiates the Sort Read Process when writing is completed and the read process is idle. The pseudo-code assumes all the variables are "global". Other functional details are included in this section, such as Touched Tile Calculation, which determines which tiles are touched by a primitive.

Sort Write Process

For a Sort Memory Page, the Sort Write Process creates a sequential list of vertex and mode packets in Data Storage (see FIG. 31). The Sort Write Process also creates a Tile Pointer List per tile and one Mode Pointer List per frame.

Sort Read Process

The Sort Read Process generates output packet sequences in a strict tile-by-tile fashion, and left tiles and right tiles are treated separately.

Sort Read Process Outer Control Loop

The outer control loop of the Sort Read Process includes three functional components: 1) TimeOrderMode; 2) Sorted Transparency Mode OpaqueLoop(); and 3) SortedTransparency Mode TranspLoop(), Each of these are described in the following sections.

Caching of mode packets should be done on a FILO basis, because the first mode packets will be output in every tile. Also, the caching mechanism should look ahead at least two mode packets to prevent address comparisons (to determine time ordering) that choose the mode packet from injecting bubbles into the processing.

Time Order Packet Processing

This pertains to the actions taken for each Sort Memory packet type when the pipeline is in Time Order Mode.

Sorted Transparency Packet Processing, Sending Opaque Geometry

This pertains to the actions taken for each Sort Memory packet type when the pipeline is in Sorted Transparency Mode during the single pass for opaque geometry.

Sorted Transparency Packet Processing, Sending Transparent Geometry

This involves the action taken for each Sort Memory packet type when the pipeline is in Sorted Transparency Mode during the multiple passes for transparent geometry. Sort Memory Clear Packets are always skipped during transparency processing.

Clear Register Functionality

If StencilMode has set the window in 2-bit stencil mode, then software replicates the two least significant bits of StencilMask and StencilValue across all eight bits. Software also takes into account OpenGL DepthMask when setting the value of ClearDepth. This is because the Backend block does not check DepthMask when doing a clear.

Cull Register Functionality

CullFlushAllReg is the only signal that is actually "accumulated". SoftSubFrameBreak and OnlySoftSubFrameBreak are not used by the Sort Read Process, but are included in the Sort Memory Cull Packet for debug purposes.

Touched Tile Calculation

Figure 33:
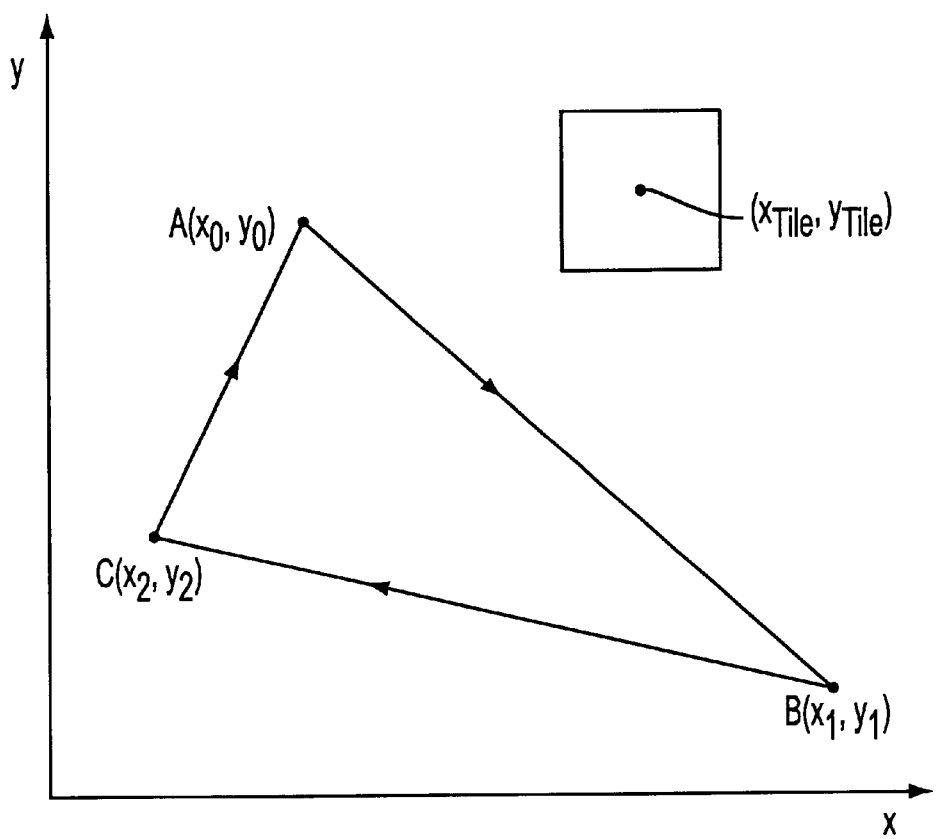
FIG. 33 is a diagrammatic illustration showing aspects of the Touched Tile calculation procedure for a tile ABC and a tile ceneterd at ($x_{Tile}$, $y_{Tile}$).

Given a triangle, ABC, and a Tile with its center at ($x_{Tile}$, $y_{Tile}$) we want to determine whether the triangle touches the Tile (FIG. 33). The algorithm relies on the fact that each line in the triangle divides the plane into two half-planes: an interior half-plane, and an exterior half-plane. If the Tile is entirely within the exterior half-plane defined by any of the lines then it is not touched by the triangle. To be touched by the triangle, the Tile must be at least partly contained in all three interior half-planes.

The touched tile calculation is also applied to lines, however, line stippling is ignored for purposes of the touched tile calculation.

Figure 34:
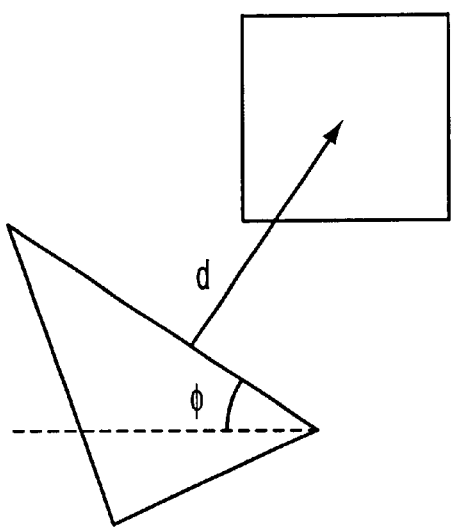
FIG. 34 is a diagrammatic illustration showing aspects of the touched tile calculation procedure.

To begin, we imagine a vector perpendicular to one of the lines of the triangle, running from the line to the center of the Tile, as shown in FIG. 34.

By calculating the magnitude, d, of this perpendicular vector, we can determine how far from the line the Tile center lies, and whether it is in the interior or the exterior half-plane. A negative value for d indicates that the Tile center lies in the interior half-plane defined by the line. We then calculate the threshold distance, t, at which the line will intersect the Tile. As shown in FIGS. 35A and 35B, this distance is a function of the angle of the line relative to one of the sides of the Tile ($\phi$).

If the perpendicular vector, d, is larger than the threshold distance, t, then the Tile is entirely outside the triangle (FIG. 36C). If d is between 0 and t, then the line intersects the Tile (FIG. 36B), and if d is negative, then the Tile center is in the interior half-plane defined by the line (FIG. 36A).

By performing these calculations for each line in the triangle, we can determine whether the triangle touches the Tile.

The Perpendicular Vector

For the line AB, from $(x_0, y_0)$ to $(x_1, y_1)$, the equation is:

$$\Delta x_0 = (x_1 - x_0) \quad \Delta y_0 = (y_1 - y_0)$$

$$(x - x_0)\Delta Y_0 - (y - y_0)\Delta x_0 = 0$$

One equation of a line perpendicular to this line, passing through $(x_{Tile}, y_{Tile})$ is:

$$(y - y_{Tile}) = -\frac{\Delta x_0}{\Delta y_0}(x - x_{Tile})$$

Next we determine the intersection of the original line and the perpendicular:

$$x = (y - y_0)\frac{\Delta x_0}{\Delta y_0} + x_0 \therefore (y - y_{Tile})\Delta y_0 + \left((y - y_0)\frac{\Delta x_0}{\Delta y_0} + x_0 - x_{Tile}\right)\Delta x_0$$

$$= 0 \therefore (y - y_{Tile})(\Delta y_0)^2 + (y - y_0)(\Delta x_0)^2 + (x_0 - x_{Tile})\Delta x_0 \Delta y_0$$

$$= 0 \therefore ((\Delta x_0)^2 + (\Delta y_0)^2)y$$

$$= (x_{Tile} - x_0)\Delta x_0 \Delta y_0 + y_{Tile}(\Delta y_0)^2 + Y_0(\Delta x_0)^2 - y_0(\Delta y_0)^2 + y_0(\Delta y_0)^2$$

$$\therefore ((\Delta x_0)^2 + (\Delta y_0)^2)(y - y_0)$$

$$= (x_{Tile} - x_0)\Delta x_0 \Delta y_0 + (y_{Tile} - y_0) + (\Delta y_0)^2 \therefore (y - y_0)$$

$$= \frac{\Delta y_0}{(\Delta x_0)^2 + (\Delta y_0)^2}((x_{Tile} - x_0)\Delta x_0 + (y_{Tile} - y_0)\Delta y_0))y$$

$$= x_0 + \frac{\Delta x_0}{(\Delta x_0)^2 + (\Delta y_0)^2}((x_{Tile} - x_0)\Delta x_0) + (y_{Tile} - y_0)\Delta y_0)$$

For convenience, we rewrite these equations as:

$$y = y_0 + \Delta y_0 A_0$$

$$x = x_0 + \Delta x_0 A_0$$

$$A_0 = \frac{(x_{Tile} - x_0)\Delta x_0 + (y_{Tile} - y_0)\Delta y_0}{(\Delta x_0)^2 + (\Delta y_0)^2}$$

Next, we calculate the distance between $(x, y)$ and $(x_{Tile}, y_{Tile})$:

$$d_0 = \sqrt{(x_{Tile} - x_0 - \Delta x_0 A_0)^2 + (y_{Tile} - y_0 - \Delta y_0 A_0)^2}$$

$$(d_0)^2 = (x_{Tile} - x_0)^2 + (\Delta x_0)^2 A_0^2 - 2\Delta x_0 A_0 (x_{Tile} - x_0) +$$
$$(y_{Tile} - y_0)^2 + (\Delta y_0)^2 A_0^2 - 2\Delta y_0 A_0 (y_{Tile} - y_0)$$

$$(d_0)^2 = (x_{Tile} - x_0)^2 + (y_{Tile} - y_0)^2 + \left(\frac{((x_{Tile} - x_0)\Delta x_0 + (y_{Tile} - y_0)\Delta y_0)^2}{(\Delta x_0)^2 + (\Delta y_0)^2}\right)$$

$$(d_0)^2 = (x_{Tile} - x_0)^2((\Delta x_0)^2 + (\Delta y_0)^2) +$$
$$(y_{Tile} - y_0)^2((\Delta x_0)^2 + (\Delta y_0)^2) - (x_{Tile} - x_0)^2(\Delta x_0)^2 -$$
$$(y_{Tile} - y_0)^2(\Delta y_0)^2 - 2(x_{Tile} - x_0)(y_{Tile} - y_0)\Delta x_0 \Delta(y_0$$

$$(d_0))^2 = (x_{Tile} - x_0)^2 + (\Delta y_0)^2 + (y_{Tile} - y_0)^2(\Delta x_0)^2 -$$
$$2(x_{Tile} - x_0)(y_{Tile} - y_0)\Delta x_0 \Delta y_0$$

$$d_0 = \frac{(x_{Tile} - x_0)\Delta y_0 - (y_{Tile} - y_0)\Delta x_0}{\sqrt{(\Delta x_0)^2 + (\Delta y_0)^2}}$$

Determining the Threshold Distance

Figure 37:
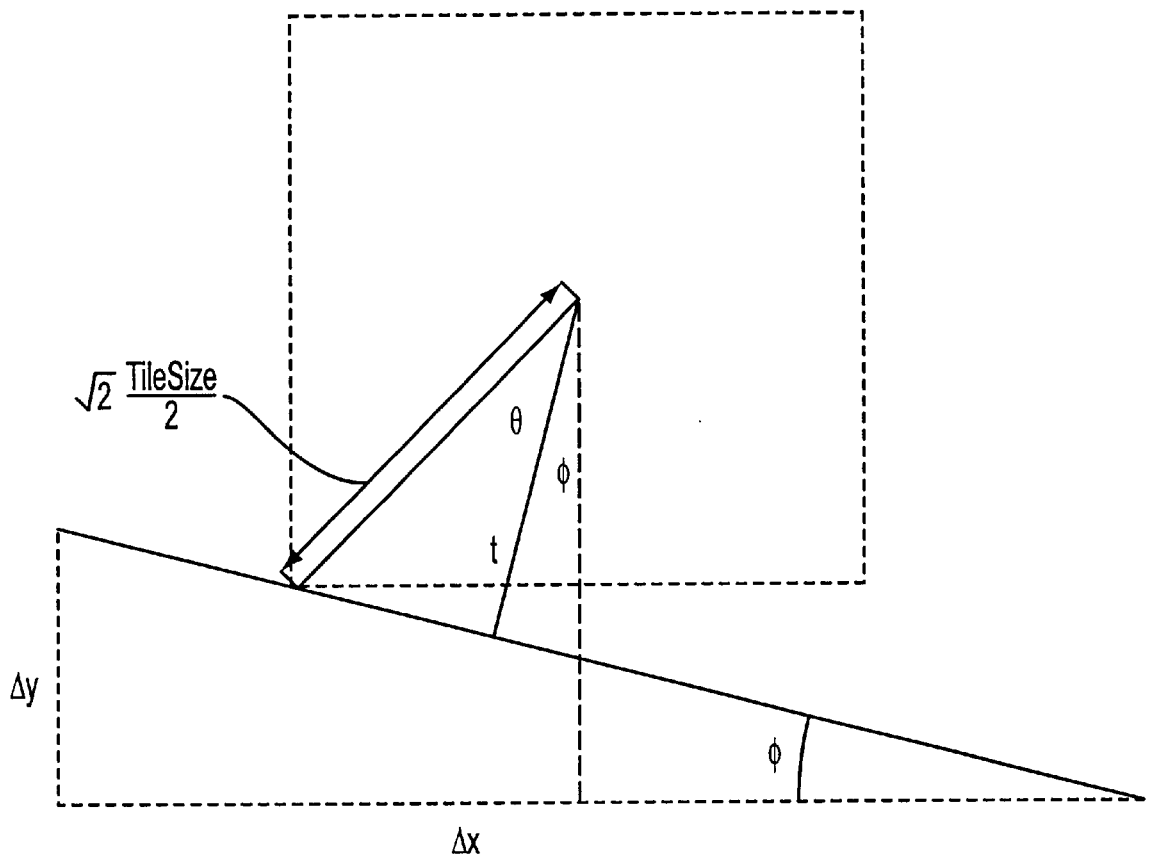
FIG. 37 is a diagrammatic illustration showing elements of the threshold distance determination including the relationship between the angle of the line with respect to one of the sides of the tile.

To determine the threshold distance, we need to look at the angle of the line with respect to one of the sides of the Tile, as shown in FIG. 37.

$$\theta = \frac{\pi}{4} - \phi$$

$$t = \cos(\theta)\sqrt{2}\frac{TileSize}{2}$$

$$\cos(\phi) = \frac{\Delta x_0}{\sqrt{(\Delta x_0)^2 + (\Delta y_0)^2}} \quad \sin(\phi) = \frac{\Delta y_0}{\sqrt{(\Delta x_0)^2 + (\Delta y_0)^2}}$$

$$\cos(\theta) = \cos(\frac{\pi}{4} - \phi) = \cos(\frac{\pi}{4})\cos(\phi) + \sin(\frac{\pi}{4})\sin(\phi)$$

$$\cos(\theta) = \frac{1}{\sqrt{2}}\frac{\Delta x_0}{\sqrt{(\Delta x_0)^2 + (\Delta y_0)^2}} + \frac{1}{\sqrt{2}}\frac{\Delta y_0}{\sqrt{(\Delta x_0)^2 + (\Delta y_0)^2}} =$$

$$\frac{1}{\sqrt{2}}\frac{\Delta x_0 + \Delta y_0}{\sqrt{(\Delta x_0)^2 + (\Delta y_0)^2}}$$

$$t = \sqrt{2}\frac{TileSize}{2}\left(\frac{1}{\sqrt{2}}\frac{\Delta x_0 + \Delta y_0}{\sqrt{(\Delta x_0)^2 + (\Delta y_0)^2}}\right) = \frac{TileSize}{2}\left(\frac{\Delta x_0 + \Delta y_0}{\sqrt{(\Delta x_0)^2 + (\Delta y_0)^2}}\right)$$

Adding It All Up

So, to determine whether the Tile is outside the triangle based on a given line, we make the following comparison.

$$\frac{(x_{Tile} - x_0)\Delta y_0 - (y_{Tile} - y_0)\Delta x_0}{\sqrt{(\Delta x_0)^2 + (\Delta y_0)^2}} > \frac{TileSize}{2}\left(\frac{\Delta x_0 + \Delta y_0}{\sqrt{(\Delta x_0)^2 + (\Delta y_0)^2}}\right)$$

$$\frac{(x_{Tile} - x_0)\Delta y_0 - (y_{Tile} - y_0)\Delta x_0}{\Delta x_0 + \Delta y_0} > \frac{TileSize}{2}$$

For the sake of this comparison, we transform the angles into the first quadrant, so the actual test is:

$$\frac{(x_{Tile} - x_0)\Delta y_0 - (y_{Tile} - y_0)\Delta x_0}{|\Delta x_0| + |\Delta y_0|} > \frac{TileSize}{2}$$

If this test is true, the Tile is outside of the triangle. We can make analogous comparisons for the other lines in the triangles:

$$\frac{(x_{Tile} - x_1)\Delta y_1 - (y_{Tile} - y_1)\Delta x_1}{|\Delta x_1| + |\Delta y_1|} > \frac{TileSize}{2}$$

$$\frac{(x_{Tile} - x_2)\Delta y_2 - (y_{Tile} - y_2)\Delta x_2}{|\Delta x_2| + |\Delta y_2|} > \frac{TileSize}{2}$$

where:

$$\Delta x_1 = (x_2 - x_1); \Delta y_1 = (y_2 - y_1)$$

$$\Delta x_2 = (x_0 - x_2); \Delta y_2 = (y_0 - y_2)$$

If all three tests are false, then the triangle touches the Tile.

For lines, the calculation is similar to the calculation for one side of a triangle, but we're only interested in whether the line intersects the tile (that is, we don't have to worry about "inside" or "outside" as we did with triangles). So we disregard the sign of d, and only consider its magnitude. We also have to take line width into account. Making these two changes gives us the following test:

$$\left| \frac{(x_{Tile} - x_0)\Delta y_0 - (y_{Tile} - y_0)\Delta x_0}{|\Delta x_0| + |\Delta y_0|} \right| > \frac{TileSize}{2} + \frac{LineWidth}{2}$$

If this test is false, the line touches the Tile.

For reference, please look at: Andreas Schilling, "A new simple and efficient antialiasing with subpixel masks"; Computer Graphics, July 1991.

SuperTile Hop Sequence

When rendering 3D images, there is often a "horizon effect" where a horizontal swath through the picture has much more complexity than the rest of the image. An example is a city skyline in the distance with a simple grass plane in the foreground and the sky above. The grass and sky have very few polygons (possibly one each) while the city has lots of polygons and a large depth complexity. Such horizon effects can also occur along non-horizontal swaths through a scene. If tiles are processed in a simple top-to-bottom and left-to-right order, then the complex tiles will be encountered back-to-back, resulting in a possible load imbalance within the pipeline. Therefore, it would be better to randomly "hop" around the screen when going from tile to tile. However, this would result in a reduction in spatial coherency (because adjacent tiles are not processed sequentially), reducing the efficiency of the caches within the pipeline and reducing performance. As a compromise between spatially sequential tile processing and a totally random pattern, tiles are organized into "SuperTiles", where each SuperTile is a multiplicity of spatially adjacent tiles, and a random pattern of SuperTiles is then processed. Thus, spatial coherency is preserved within a SuperTile, and the horizon effect is avoided.

The 3D window is divided into tiles, and these tiles are grouped into "SuperTiles". The number of tiles in a SuperTile is selectable with the parameter SuperTileSize, included in the MEX Output Begin Frame packet. The sequence in which tiles are processed (called the "SuperTile Hop Sequence") is controlled by SuperTileStep, also included in the MEX Output Begin Frame packet.

Figure 38A:
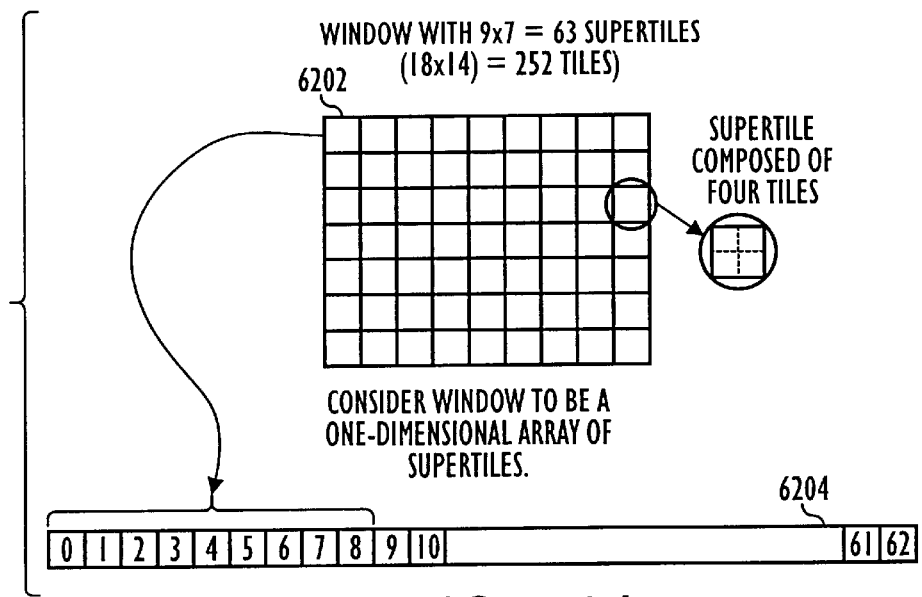
FIG. 38A is a diagrammatic illustration showing an exemplary embodiment of the SuperTile Hop procedure sequence for a window having 252 tiles in an 18×14 array.

FIG. 38A describes a simple example of the SuperTile Hop Sequence. The example shows a window 6202 composed of 252 tiles in an 18×14 array. The SuperTileSize is assumed to be 2×2 tiles (but can be any size, including 1×1, 1×2, 2×1, 2×2, 2×3, 3×2, 3×3, 3×4, 4×3, or 4×4), so there are 63 SuperTiles in a 9×7 array. The list of SuperTiles is considered to converted to a linear list, which can be done by numbering the Supertiles in a row-by-row manner starting in the upper left. Define the following variables:

N=number of SuperTiles in the window

M=SuperTileStep $T_n = n^{th}$ SuperTile to be processed

The sequence of SuperTile processing is:

$T_0 = 0$ $T_{n+1} = \text{mod}_N(T_n + M)$

Figure 38B:
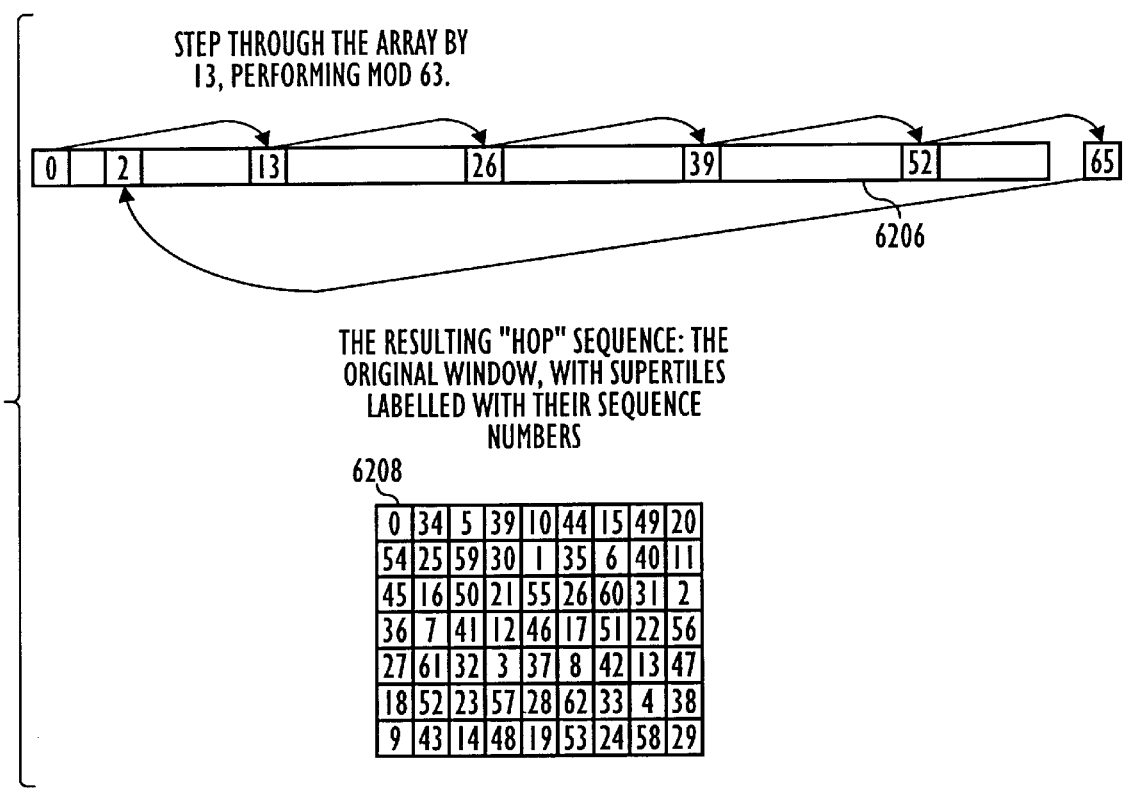
FIG. 38B is a diagrammatic illustration showing an exemplary sequence for the SuperTile Hop procedure for N=63 and M=13 in FIG. 38A.

In the example of FIG. 38A, N=63, and M=13. This results in the sequence, illustrated in FIG. 38B, such that $T_0=0$, $T_1=13$, $T_2=26$, $T_3=39$, $T_4=52$, $T_5=2$, $T_6=15$, . . . It is not required that M be less than N.

This iterative algorithm will hit every SuperTile as long as N and M are mutually prime (that is, their greatest common factor is 1). Neither N nor M need to be prime numbers, but if M is always selected to be a prime number, then every SuperTile will be hit.

As an alternate implementation, the SuperTiles array could be larger than needed to cover the entire window, and be assumed to be $2^a \times 2^a = 2^{2a}$, thus guaranteeing the total number of SuperTiles to be an integer power of two. This would make it possible to do "$\text{mod}_N$" calculation simply by throwing away high order bits. The down side to this approach is that nonexistent SuperTiles will be included in the sequence. These nonexistent SuperTiles must be detected and skipped.

Line Flags

For line mode triangles, the Sort block determines, independently for each line, which tiles are touched by a line. However, if multiple lines from the same triangle touch a tile, only one pointer is added to the Tile Pointer List for that triangle. This is because the Sort block is sorting Sort Primitives (not Cull Primitives).

When a line mode triangle is received, (i.e., LineMode is TRUE, and one or more bits in the LineFlags parameter is TRUE), the triangle is to be drawn as one or more lines, rather than as a filled triangle. There are three bits in LineFlags, one for each edge of the triangle, each indicating whether its corresponding edge is to be drawn as a line. The three bits represent: 1) bit 0 (the LSB) corresponds to the edge between vertices 0 and 1; 2) bit 1 corresponds to the edge between vertices 1 and 2; and 3) bit 2 (the MSB) corresponds to the edge between vertices 2 and 0. The LineFlags parameter is set in the GEO block because it is the part of the pipeline that determines which vertices complete polygons, and also because it is responsible for clipping.

The three LineFlags bits independently control their corresponding edge because some edge lines should not be drawn. For example, an OpenGL quadrilateral is always split into two triangles, but when drawn in line mode, the edges interior to the quadrilateral are not drawn. Hence, the two edges in each triangle that correspond to an edge in the original quadrilateral have their Line Flags set to TRUE, while the other edges in the triangles (the shared edges interior to the quadrilateral) have their Line Flags set to FALSE.

Splitting Triangle Fans

The Offset parameter in each Pointer Entry has six bits, which implies a maximum offset of 63. If a triangle fan requires an offset greater than 63, the fan is split by replicating two vertices in Data Storage. A similar phenomena occurs in Color Memory, and the pointers into Color Memory that accompany the rest of the data in the Sort Block Input Packets must take this into account.

Line Width Considerations

In OpenGL, lines are drawn as an antialiased rectangle whose width is specified as a number of pixel widths, and whose length is the distance between the endpoints. In addition, these lines can be stippled, which breaks the rectangle into a series of antialiased squares along its length, and each square can be designated to be either colored in the usual way or completely transparent. Stippled lines can be thought of as fancy dashed lines.

When a line primitive (either a line or a line mode triangle) is received by the Sort Block, the width of the lines may cause the primitive to "spill" into adjacent tiles.

Setup Block (STP)

The Setup (STP) block receives a stream of packets from the Sort (SRT) block. These packets have spatial information about the primitives to be rendered. The output of the STP block goes to the Cull (CUL) block. The primitives received from SRT can be filled triangles, line triangles, lines, stippled lines, and points. Each of these primitives can be rendered in aliased or anti-aliased mode. The SRT block sends primitives to STP (and other pipeline stages downstream) in tile order. Within each tile the data is organized in time order or in sorted transparency order. The CUL block receives data from the STP block in tile order (in fact in the order that STP receives primitives from SRT), and culls out parts of the primitives that definitely do not contribute to the rendered images. This is accomplished in two stages. The first stage, MCCAM Cull, allows detection of those elements in a rectangular memory array whose content is greater than a given value. The second stage refines on this search by doing a sample by sample content comparison. The STP block prepares the incoming primitives for processing by the CUL block. STP produces a tight bounding box and minimum depth value Zmin for the part of the primitive intersecting the tile for MCCAM culling. MCCAM cull stage marks the stamps in the bounding box that may contain depth values less than Zmin. The Z cull stage takes these candidate stamps, and if they are a part of the primitive, computes the actual depth value for samples in that stamp. This more accurate depth value is then used for comparison and possible discard on a sample by sample basis. In addition to the bounding box and Zmin for MCCAM culling, STP also computes the depth gradients, line slopes, and other reference parameters such as depth and primitive intersection points with the tile edge for the Z cull stage. The CUL unit produces the VSPs used by the other pipeline stages.

To set the context, we briefly describe various STP primitives.

Polygons

Figure 39:
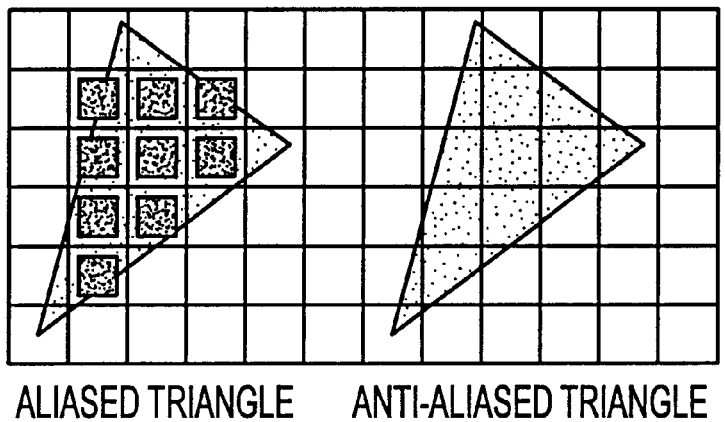
FIG. 39 is a diagrammatic illustration showing DSGP triangles arriving at the STP Block and which can be rendered in the aliased or anti-aliased mode

Polygons arriving at the STP block are essentially triangles. The triangles can be rendered in the aliased or anti-aliased mode. FIG. 39 shows DSGP triangles. The STP unit processes the aliased and anti-aliased triangles identically. The pipeline units downstream render aliased triangles by locating all samples at the center of the pixel. In the anti-aliased case the sample locations are determined by the SampleLocSel parameters passed down with one of the control packets. A sample belongs to the triangle if it falls within the geometric boundary of the triangle. If the sample falls exactly on the edge of the triangle, then the inclusion rules are used to determine whether or not that sample belongs to the triangle.

Lines

Figures 40A, 40B, 40C:
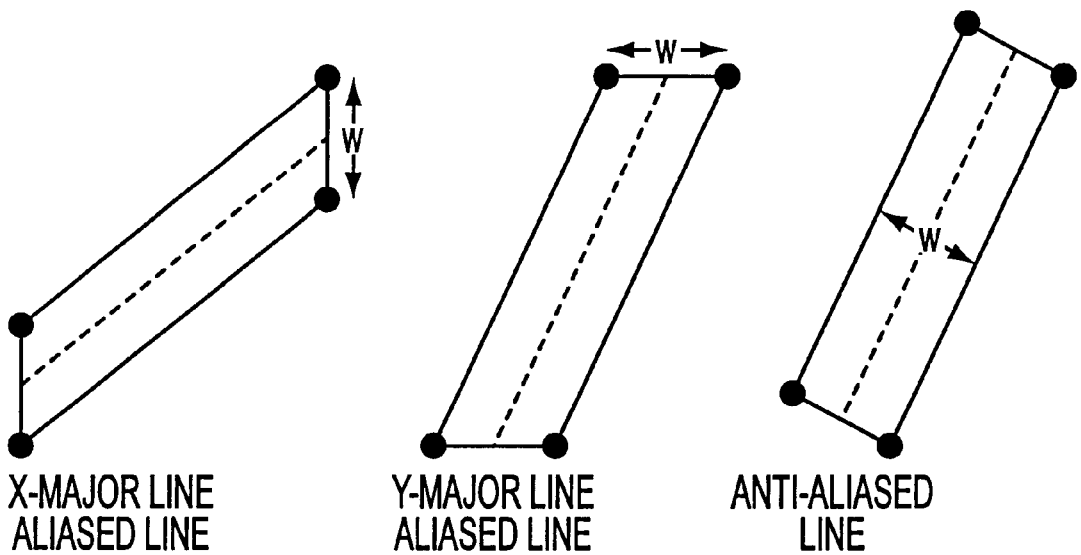
FIG. 40 is a diagrammatic illustration showing the manner in which DSGP renders lines by converting them into quads and various quads generated for the drawing of aliased and anti-aliased lines of various orientations.

DSGP renders lines by converting them into quads. FIG. 40 shows various quads generated for the drawing of aliased and anti-aliased lines of various orientations. The width of the lines is rounded to the nearest supported width. The width adjustment needs to be done prior to the SORT stage. It can be done by the software. STP does not modify the incoming line widths.

Note that the quads are generated differently for aliased and anti-aliased lines. For aliased lines the quad vertices also depend on whether the line is x-major or y-major.

Points

DSGP renders anti-aliased points as circles and aliased points as squares. The circles are centered at the user specified position. The diameter of the circle is the width specified by the user rounded to the nearest supported width. For drawing of aliased points, the user specified position of the point is snapped to the center of the pixel or rounded to a corner of the pixel depending on whether the resulting width is odd or even respectively. As in the case of lines the adjustment of point size and position should happen in the pipeline prior to the SORT block. Since the position of the point is subject to transformations, Geometry unit seems like the right place to do this. FIG. 41 shows the rendered point. The user specified point is indicated by the circle.

Setup Block Functional Overview

In this section, we outline the action setup takes for each of these primitives. Details of specific processing are given in Section 3.

Filled polygons

Setup prepares filled polygons for the CUL unit to process. STP receives the window coordinates (x, y, z) for the three triangle vertices. It also receives the "factor" used in computation of the polygon offset. Note that antialiasing state does not alter the manner in which filled triangle setup is done. The CUL and Pixel blocks handle the rasterization of aliased triangles by collapsing all samples to the center of the pixel. We also assume that the vertices of the triangle fall within the valid range of window coordinates; i.e. triangle coordinates have been clipped to the boundaries of the window.

Any edge-on triangles are discarded. The edge-on triangles are not expected to generate any VSPs. If we do not discard them in STP, then there will be a processing overhead in CUL associated with the rasterization of these triangles. Furthermore, in the rare event that such a triangle generates a VSP, the pixel intensity may be anomalous. This is detected when two of the edge slopes are found to be equal.

For each filled polygon, STP does the following:

1. Orders the vertices to provide top, bottom, left (or right) vertices. Also sets the leftC or rightC flags which indicate if the middle vertex is to the left or the right of the long edge in y, i.e. the edge joining the vertices with the largest and the smallest y-values.

2. Computes the partial derivatives of z along x and y ($\delta z/\delta x$, $\delta x/\delta y$).

3. Computes the polygon offset, if polygon offset computation is enabled, and adds the offset to the z value of each of the vertices.

4. Computes the slopes of the three edges for the CUL unit. Discard edge-on triangles.

5. Clips the triangle to the tile boundaries.

6. Computes the bounding box, top edge intersects, and the minimum z of the triangle area intersecting the tile, as well as a reference z value (for the reference stamp) for the CUL unit.

7. Assigns a code to the primitive and sends the relevant information to the CUL unit.

As mentioned before the bounding box and the Zmin are used in MCCAM cull. The top edge intersections, line slopes, corner points, reference z value, and the z gradients are used in Z culling by the CUL block.

Anti-aliased Solid Lines

The CUL unit implements a scan converter that rasterizes the parallelograms and triangles uniformly. Anti-aliased line segments are converted into a rectangle as shown in FIG. 42.

The rectangle vertices at each end of the line are assigned the same z values as the line end-point, thereby making the line of constant z perpendicular to the line itself. For each line segment, STP does the following:

1. Determines the x and y vertex displacements (xhw, yhw).

2. Determines the vertices of the rectangle. The computed vertices depend on whether the line is aliased or anti-aliased.

3. Computes the slopes of the minor and major axes for the CUL unit. (Minor axis is perpendicular to major axis.)

4. Orders the vertices to provide top, bottom, left, and right vertices.

5. Computes the partial derivatives of z for this rectangle along x and y ($\delta z \delta x$, $\delta/\delta y$).

6. Clips the rectangle to tile boundaries.

7. Computes the bounding box, top edge intersects, and minimum z of the rectangle area intersecting the tile, as well as a reference z value for a reference stamp for the CUL unit.

8. Assigns a primitive code and sends the relevant information to the CUL unit.

Aliased Solid Lines

As mentioned before, the end points of aliased lines are computed differently from the way the anti-aliased line end points are computed. Instead of a rectangle as in the case of anti-aliased lines, we compute a parallelogram for aliased lines. Two of the edges of the parallelogram are parallel to the length of the line and the other two edges are either vertical (for x-major lines) or horizontal (for y-major lines) as shown in FIG. 43.

OpenGL requires that the parallelogram vertices be computed such that

1. There are no gaps or overstrikes while drawing consecutive polyline segments if both segments are either x-major or y-major.

2. There is at most one column (or row) disparity between the total number of fragments rasterized using the OpenGL diamond exit rule and DSGP method.

4. The coordinates of the rasterized fragments deviate by no more than one unit in the x and y directions.

This, however, places certain restrictions on how CUL rasterizes the parallelograms and triangles. CUL needs to implement fragment inclusion rules such that a fragment lying exactly on the edge shared by two primitives is included in only one of them. (For anti-aliased rendering inclusion rules apply to samples rather than the fragments.) Setup does the following for the drawing of aliased wide lines:

1. Determines the x and y vertex displacements (xhw, yhw).

2. Determines the vertices of the parallelogram by looking at the slope of the line. The line end points are not modified.

3. Computes the slope along the edge parallel to the length of the line for the CUL unit. The other axis is horizontal or vertical.

4. Orders the vertices to provide top, bottom, left, and right vertices.

5. Computes the partial derivatives of z for this rectangle along x and y (dz/dx, dz/dy).

6. Computes the intersection of the quad with the tile boundaries.

7. Computes the bounding box, top edge intersects, and minimum z of the area intersecting the tile, as well as a reference z value for a reference stamp for the CUL unit.

8. Assigns an appropriate primitive code and sends the relevant information to the CUL unit.

Note that steps 2–8 can be implemented identically for the aliased and anti-aliased lines.

Stippled Lines

The state associated with stippling includes a 16 bit stipple pattern, stipple repeat factor r, stplStartBit, and stplRepeatStrt. The stipple pattern must continue over each segment of line strips, line loops, and polygons drawn in line mode. stplStartBit and stplRepeatStart are state parameters used to implement this continuity. Setup gets the information about stplStartBit and StplRepeatStart for each line segment. Geometry unit is responsible for computing the stplStartBit and stplRepeatStart offsets at the beginning of each line segment. The line width, w, also controls the appearance of the generated line segments. Setup breaks the continuous sequences of is in the stipple pattern into quads. For anti-aliased lines the quads are rectangles. These rectangles are "nr" long and w wide; where n is the number of 1 s in that sequence. These represent the visible portions of the line (FIG. 44).

For non-antialiased lines the quads are parallelograms. Since STP generates a quadrangle for each run of 1 bits, some of these quads might be outside the tile boundaries. In order to reduce the unnecessary processing of these quads we clip the stipple segments giving rise to the quads that lie wholly outside the tile. If the start point of the line (x0, y0) lies outside the tile, then we clip the line to the tile boundaries closest to the start point. The clipped line start points is generated such that the first line quad is completely included. This will ensure that there is continuity across the tile boundary. This is equivalent to placing a clipping guard band around the tile. A new line start-point as well as stipple offset stplStartBit is generated for the clipped point. (We retain the old stplRepeatStart.) This is shown in FIG. 45.

The line is clipped to the edge of the tile displaced by xhw and yhw in x and y direction respectively. The processing of stippled lines thus has the following steps.

1. Determine vertex displacements depending on whether the line is aliased or anti-aliased.

2. Clip the head of the line to the tile with a guard band (tileXmin−xhw, tileYmin−yhw, tileXmax+xhw, tileYmax+yhw), such that the clipped point lies on or outside of the guarded tile. The length of the clipped segment is in units of stipple bits. Get new stplStartBit.

3. For each sequence of 1 bits in the stipple construct a quad and send it down the pipe.

This process continues till the new start point falls outside the tile guard band.

Line Triangles

Figure 46:
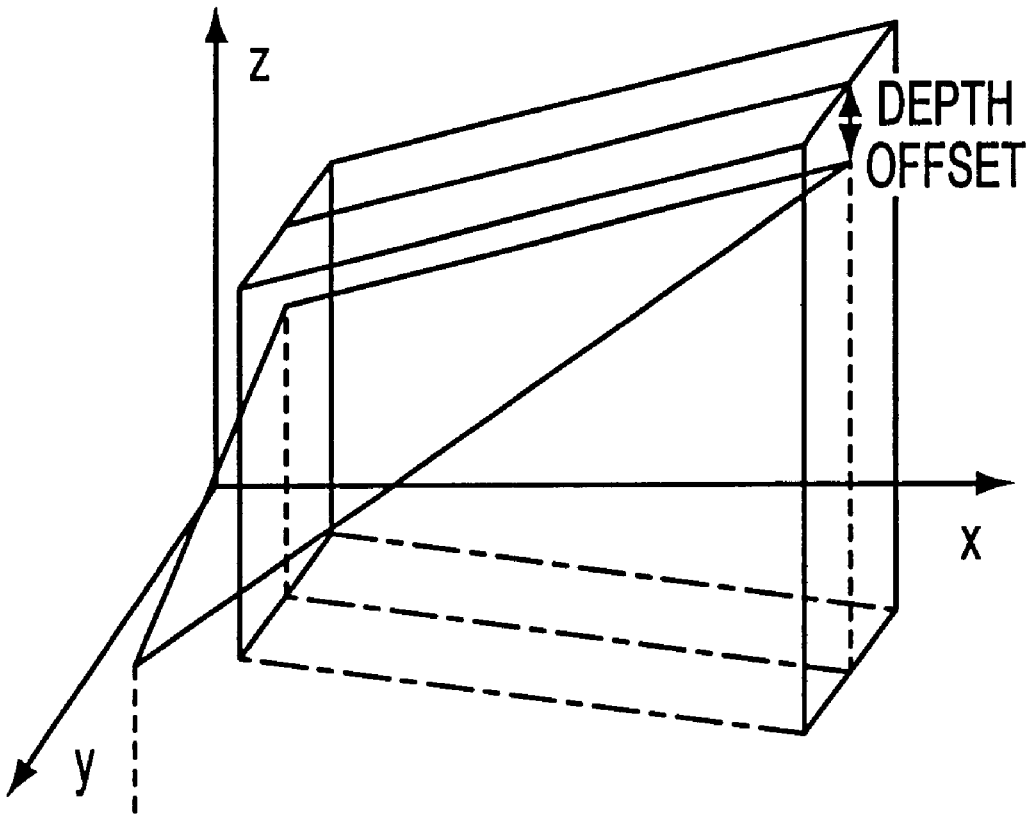
FIG. 46 is a diagrammatic illustration showing the geometry of line mode triangles
Figure 48A:
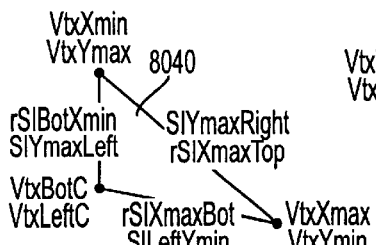
FIG. 48 is a diagrammatic illustration showing an aspect of how Setup represents lines and triangles, including the slope assignments.
Figure 48B:
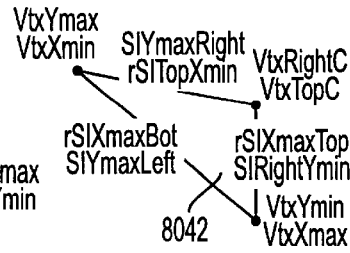
Figure 48C:
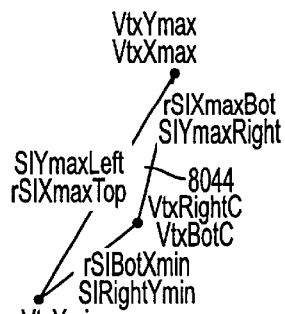
Figure 48D:
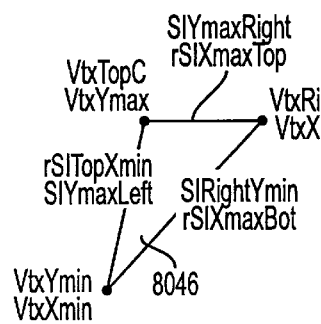
Figure 48E:
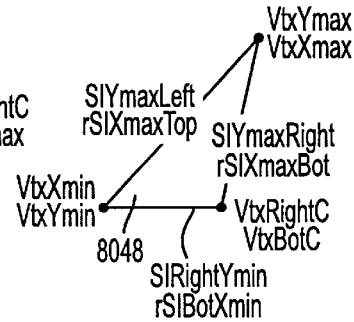
Figure 48F:
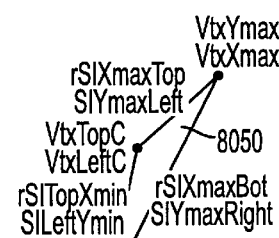
Figure 48G:
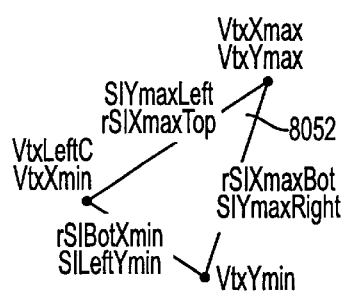
Figure 48H:
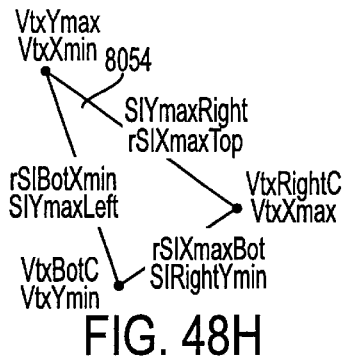
Figure 48I:
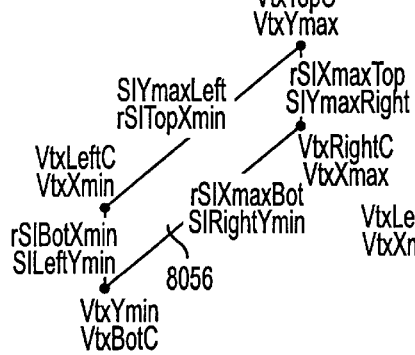
Figure 48J:
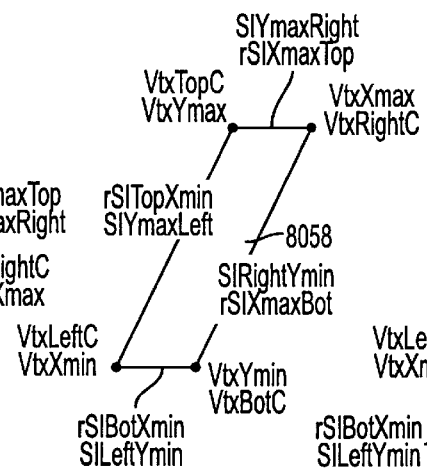
Figure 48K:
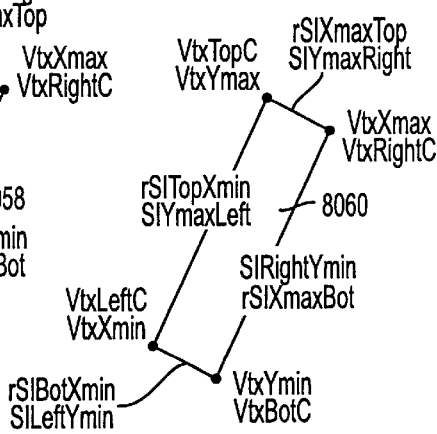

For drawing the triangles in line mode, the STP unit receives the edge flags in addition to window coordinates (x, y, z) for the three triangle vertices. These edge flags tell the Setup unit which edges are to be drawn. Setup unit also receives the "factor" used in the computation of polygon offset. The edges that are to be drawn are first offset by the polygon offset and then drawn as ribbons of width w (line attribute). These lines may also be stippled if stippling is enabled. FIG. 46 shows the geometry of line mode triangles.

For each line polygon, STP does the following:

1. Discards any edge-on triangles. Please see the section on filled triangles for more on this.

2. Computes the partial derivatives of z along x and y ($\delta x/\delta x$, $\delta z/\delta y$ ). Note that these z gradients are for the triangle and are needed to compute the z offset for the triangle. These gradients do not need to be computed if 'factor' is zero.

3. Computes the polygon offset, if polygon offset computation is enabled, and adds the offset to the z value at each of the three vertices.

4. Traverses the edges in order. If the edge is visible, then draws the edge using line attributes such as the width and stipple. STP processes one triangle edge at a time.

5. Draw the line based on line attributes such as anti-aliased or aliased, stipple, width etc.

6. Assign appropriate primitive code to the rectangle depending on which edge of the triangle it represents and send it to CUL.

Aliased and Anti-aliased Points

Setup finds the Ytop, Xcenter, and Yoffset and sends these values along with the point width and aliasing state to CUL.

Setup Block Functional Details

The processing of various primitives as outlined in the preceding sections has a lot of commonality. We represent primitives in a unified way to leverage this commonality.

Unified Primitive Representation

As mentioned earlier, Setup converts the line segments into parallelograms which consists of four vertices. A triangle has three vertices. Setup describes the each primitive with a set of four points. Note that not all values are needed for all primitives. For a triangle, Setup uses top, bottom, and either left or right corner, depending on the triangle's orientation. A line segment is treated as a parallelogram, so Setup uses all four points. FIGS. 47–51 show how Setup represents triangles and lines. Note that while the triangle's vertices are the same as the original vertices, Setup generates new vertices to represent the lines as quads.

The unified representation of primitives uses primitive descriptors which are assigned to the original set of vertices in the window coordinates. In addition, there are flags which indicate which descriptors have valid and meaningful values: VtxYmin, VtxYmax, VtxLeftC, VtxRightC, LeftCorner, and RightCorner.

For triangles, these descriptors are obtained by sorting the triangle vertices by their y coordinates. For line segments these descriptors are assigned when the line quad vertices are generated. VtxYmin is the vertex with the minimum y value. VtxYmax is the vertex with the maximum y value. VtxLeftC is the vertex that lies to the left of the long y-edge (the edge of the triangle formed by joining the vertices VtxYmin and VtxYmax) in the case of a triangle, and to the left of the diagonal formed by joining the vertices VtxYmin and VtxYmax for parallelograms. If the triangle is such that the long y-edge is also the left edge, then the flag LeftCorner is FALSE (0) indicating that the VtxLeftC is invalid. Similarly, VtxRightC is the vertex that lies to the right of the long y-edge in the case of a triangle, and to the right of the diagonal formed by joining the vertices VtxYmin and VtxYmax for parallelograms. If the triangle is such that the long edge is also the right edge, then the flag RightCorner is FALSE (0) indicating that the VtxRightC is invalid. These descriptors are used for clipping of primitives on top and bottom tile edge. Note that in practice VtxYmin, VtxYmax, VtxLeftC, and VtxRightC are indices into the original primitive vertices.

Additional descriptors are: VtxXmin, VtxXmax, VtxTopC, VtxBotC, TopCorner, and BottomCorner. For triangles, these descriptors are obtained by sorting the triangle vertices by their x coordinates. For line segments these descriptors are assigned when the line quad vertices are generated. VtxXmin is the vertex with the minimum x value. VtxXmax is the vertex with the maximum x value. VtxTopC is the vertex that lies above the long x-edge (edge joining vertices VtxXmin and VtxXmax) in the case of a triangle, and above the diagonal formed by joining the vertices VtxXmin and VtxXmax for parallelograms. If the triangle is such that the long x-edge is also the top edge, then the flag TopCorner is FALSE (0) indicating that the VtxTopC is invalid. Similarly, VtxBotC is the vertex that lies below the long x-axis in the case of a triangle, and below the diagonal formed by joining the vertices VtxXmin and VtxXmax for parallelograms. If the triangle is such that the long x-edge is also the bottom edge, then the flag BottomCorner is FALSE (0) indicating that the VtxBotC is invalid. These descriptors are used for clipping of primitives on the left and right tile edges. Note that in practice VtxXmin, VtxXmax, VtxTopC, and VtxBotC are indices into the original primitive vertices.

FIG. 47 shows the vertex assignment graphically. In addition, we use the slopes ($\delta x/\delta y$) of the four polygon edges—represented as {SIYmaxLeft, SIYmaxRight, SILeftYmin, SIRightYmin} and the inverse of slopes (dy/dx) {rSIXminTop, rSIXminBot, rSITopXmax, rSIBotXmax}. Slope naming convention used is SIStrtEnd. SI is for slope, Strt is first vertex identifier and End is the second vertex identifier of the edge. Thus SIYmaxLeft is the slope of the left edge—connecting the VtxYMax and VtxLeftC. If leftC is not valid then, SIYmaxLeft is the slope of the long edge. The letter r in front indicates that the slope is reciprocal, i.e. represents ($\delta y/\delta x$) instead of ($\delta x/\delta y$). FIG. 48 shows the slope assignments graphically.

All of these descriptors have valid values for quadrilateral primitives, but all of them may not be valid for triangles. Initially, it seems like a lot of descriptors to describe simple primitives like triangles and quadrilaterals. However, as we shall see later, they can be obtained fairly easily, and they provide a nice uniform way to setup primitives.

An examination of the steps in the processing of various primitives by STP yields the following functional units:

1. Triangle descriptors.
2. Depth gradient and offset computation.
3. Vertex generation for converting lines into quads.
4. Stippled line preprocessing.
5. Quad clipping to tile.
6. Zmin, Zref, Bbox computation.
7. Point Processor Following subsections detail the architecture of each of these units.

Triangle Descriptors

For triangles, Setup starts with a set of vertices, $(x_0, y_0, z_0)$, $(x_1, y_1, z_1)$, and $(x_2, y_2, z_2)$. The three indices i0, i1, and i2 for the vertices sorted by y (in the ascending order) are determined, as are the indices j0, j1, j2 for vertices sorted by x (in the ascending order).

The indices i0, i1, and i2 are used to compute a set of (dx/dy) derivatives. And indices j0, j1, and j2 are used to compute the (dy/dx) derivatives for the edges.

$$\frac{dx_2}{dy} = \frac{v[i2] \cdot x - v[i1] \cdot x}{v[i2] \cdot y - v[i1] \cdot y}; \quad \frac{dy_2}{dx} = \frac{v[j2] \cdot y - v[j1] \cdot y}{v[j2] \cdot x - v[j1] \cdot x};$$

-continued $$\frac{dx_1}{dy} = \frac{v[i1] \cdot x - v[i0] \cdot x}{v[i1] \cdot y - v[i0] \cdot y}; \quad \frac{dy_1}{dx} = \frac{v[j1] \cdot y - v[j0] \cdot y}{v[j1] \cdot x - v[j0] \cdot x};$$

$$\frac{dx_0}{dy} = \frac{v[i2] \cdot x - v[i0] \cdot x}{v[i2] \cdot y - v[i1] \cdot y}; \quad \frac{dy_0}{dx} = \frac{v[j2] \cdot y - v[j0] \cdot y}{v[j2] \cdot x - v[j0] \cdot x};$$

We discard edge-on triangles, i.e. triangles having two edges with equal slopes. Whether the middle vertex is on the left or the right is determined by comparing the slopes dx2/dy of line formed by vertices v[i2] and v[i1], and dx0/dy of the line formed by vertices v[i2] and v[i0]. If (dx2/dy>dx0/dy) then the middle vertex is to the right of the long edge else it is to the left of the long edge. The computed values are then assigned to the primitive descriptors. Assigning the x descriptors is similar. We thus have the edge slopes and vertex descriptors we need for the processing of triangles.

Depth gradient, and Offset Computation

Depth gradients are the partial derivatives of z along the x- and y-axes. We use the following equations:

$$\frac{\delta z}{\delta x} = \frac{(y_2 - y_0)(z_1 - z_0) - (y_1 - y_0)(z_2 - z_0)}{(x_1 - x_0)(y_2 - y_0) - (x_2 - x_0)(y_1 - y_0)}$$

$$\frac{\delta z}{\delta y} = \frac{(x_1 - x_0)(z_2 - z_0) - (x_2 - x_0)(z_1 - z_0)}{(x_1 - x_0)(y_2 - y_0) - (x_2 - x_0)(y_1 - y_0)}$$

Setup receives 26 bits (s25) for each vertex z-value from Sort unit. The partial derivatives are computed as 1.24.10 precision values. The x, y coordinates are 14 bit integers with precision corresponding to the (8×8) sub-raster grid per pixel. The partial derivatives are computed on the scale of the sub-raster grid.

The polygon offset is given by:

offset=8×factor×Max(|δz|δx|,|δz|δy|)+(r★unit)

The "factor" is passed down to from the SRT block. The (r★unit) offset part is taken care of in GEO. We compute the first term only in STP. Multiplication by 8 is done to account for the gradient scale. The depth values are represented as 24 bit integers. This offset is added to each of the vertex z values. The computed offset is clamped to 24 bits (in fact s24) before being added to the z values.

Quad Vertex Generation

Figure 49:
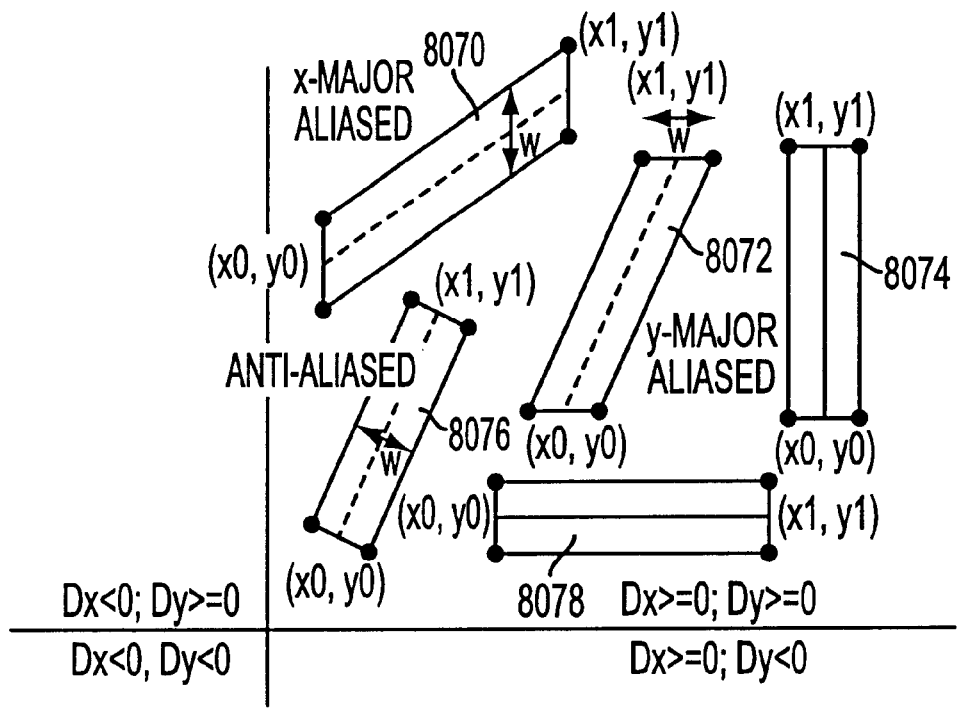
FIG. 49 is a diagrammatic illustration showing an aspect of how Setup represents lines and triangles, including the quadrant assignment based on the orientation of the line.

We convert the line segments into parallelograms of width w. We discard the end-on lines, i.e. lines with co-incident end points. Not discarding the end-on lines will generate a quad of zero width for the line. This would cause an unnecessary packet to be sent down the pipe, which, in the rare event might even generate a VSP, causing anomalous pixel intensity. The process of computing the offset and assigning the vertices to the descriptors has been indicated earlier and is quite intuitive. The architectural pipeline though requires watching out for possible pitfalls. Given the line end-points, we compute the trigonometric functions as follows:

run=|x1−x0|; rise=|(y1−y0)|;

tan(a)=rise/run;

cos(a)=1/sqrt(1+tan(a)★tan(a));

sin(a)=tan(a)/sqrt(1+tan(a)★tan(a));

Let us also assume that width of the line is w, and that the horizontal and vertical vertex displacement at the end points is given by xhw and yhw respectively as shown in FIGS. 42 and 43. The four quad vertices are then assigned as:

V[0]=(x0−xhw, y0+yhw); V[1]=(x0+xhw, y0−yhw);

V[2]=(x1−xhw, y1+yhw); V[3]=(x1+xhw, y1−yhw);

The computation of xhw and yhw and hence quad vertices is done based on the orientation of the line and its aliasing state. FIG. 49 shows the quadrant assignment based on the orientation of the line.

Which quadrant the line lies in is determined by looking at the relative position of (x1, y1) with respect to (x0, y0). The xhw, yhw and the primitive descriptors for each quadrant are determined. We also added assignment of StrtClipX, StrtClipY, EndClipX, EndClipY, OpX, and OpY here. These six parameters are used during the processing of stippled lines. StrtClipX, StrtClipY, OpX, and OpY are used during the initial removal of any stipple segments wholly outside the tile. EndClipX, EndClipY along with the ops are used to determine when the line has exited the tile.

This gives us the vertices and the primitive descriptors for the quad for further processing.

Stipple Line Preprocessing

As outlined elsewhere in this specification, stippled line preprocessing has two stages. We first remove the stipple segments that do not touch the tile, and calculate the new start stipple bit. We then traverse the line and generate line lengths corresponding to sequences of 1 bits in the stipple. We assume that quad vertex generation has provided us with the half width displacements. The first step is to find the first intersection point of the line with the tile boundaries after displacing the edges by the guard band. Note that SRT block should only send us lines that touch the tile. Therefore, it is unnecessary to check for trivial rejection of lines based on their slopes and such. StrtClipX, StrtClipY, OpX, and OpY were obtained in the previous section.

Once the intersection point (xint, yint) is computed, find the number of stipple pattern bits (nbits) that pass between the given starting point and the intersection point. This stplStart is added to nbits and we consider the low 4 bits to get find the current stipple bit we need to consider. The stplRepeatStart remains unmodified. The line start point is displaced by the length of the line used to render "nbits" stipple pattern bits.

Note that we could have done tighter clipping and generated a new stplRepeatStart. This is procedure is not followed because it would have saved us the processing of at most 1 additional quad in the best case. That benefit does not justify the added hardware cost.

We now traverse the line segment to generate quads for each run of 1 bits in the stipple pattern, starting at stplStart bit with a further repeat factor start at stplRepeatStart for the first bit. Let us consider an example. If the stplStart is 14, and stplRepeat is 5, and stplRepeatStart is 4, then we shall paint the 14th bit in the stipple pattern once, before moving on to the 15th, i.e. the last bit in the stipple pattern. If both bit 14 and 15th are set, and the 0th stipple bit is nor set, then the quad line segment will have a length of 6. The Xscale and Yscale used in the pseudo-code are the same as those computed in the subroutine DoStippleClip earlier during the stippled line preprocessing.

Once the line segment end points are obtained it can be rendered as a solid line. Optimization should be implemented in the micro-architecture so that parameters common to all quads in the line are computed only once. Depth gradients, line slopes, depth offsets, and xhw, yhw are common to all stipple quads and therefore need to be generated only once.

Quad Clipping to Tile Boundary

Figure 50:
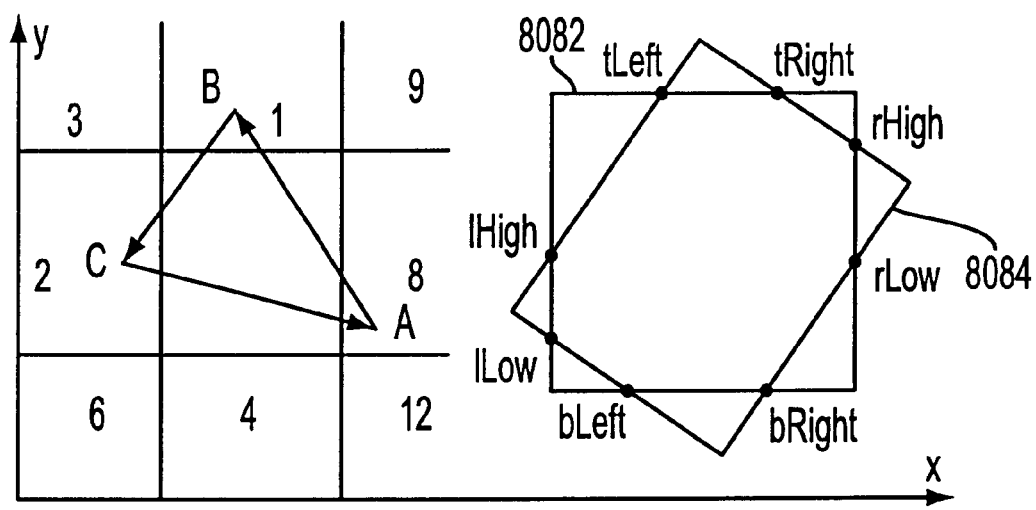
FIG. 50 is a diagrammatic illustration showing how Setup represents lines and triangles, including the naming of the clip descriptors and the assignment of clip codes to verticies.

We need to determine the intersection of the primitive on the current tile in order to get the minimum z and bounding parameters needed for MCCAM cull in the CUL block. In our unified primitive representation, we use a generalized quad to represent the triangles as well. We use primitive clip descriptors to describe the intersection of the primitive on the tile. These descriptors are the intersection points of the primitive with the four edges of the tile and the associated valid flags to indicate if the intersection created a valid value. The naming of the clip descriptors is indicated in FIG. 50. The following subsections detail the algorithms used in clipping the primitives to tiles.

Compute Vertex Clip Codes

We first compute the clipcodes for each of the primitive vertices. The clipcodes are assigned to the vertices as shown in FIG. 50, and are obtained as follows for each of the vertices.

C[i]=((v[i].y>tile_ymax)<<3)||

((v[i].x<tile_xmin)<<2)||

((v[i].y<tile_ymin)<<1)||

(v[i].x>tile_xmax));

Intersection Computation

We use the clipcodes to determine the edges that need to be clipped and to which boundaries. The primitives under consideration are convex. Each tile edge defines a half plane and therefore we have either two intersection points or no intersection points at each edge.

Clipping on top tile edge yields tLeft and tRight, which are the left and right clip vertices on the top tile edge.

Clipping on bottom tile edge is performed identically to that on the top edge. Bottom edge clipping yields the bLeft and bRight-the bottom left and bottom right clip vertices.

Left and right edge clipping uses vertices sorted in x and yields the high and low intersection points ILow, IHigh on the left edge and rLow and rHigh on the right edge. Note that the procedure for the left edge is identical to the bottom edge and that for right edge is identical to the top edge. Note also that we are using the inverse slope descriptors instead of the slope descriptors.

Clipping on the left tile edge is done identically to the right tile edge. The output of left edge clipping are the two points ILow and IHigh.

Now we have all eight points, namely tLeft, tRight, bLeft, bRight, ILow, IHigh, rLow, and rHigh.

Validation of Intersection Points

First validate them to make sure that they are within the right range. For example, the intersection points with the top tile edge may be such that they are both to the left of the tile. In this case, the intersection points are marked invalid. If the intersection with the edge is such that one or both tile top corners are included in the intersection, then new intersection points are generated that are valid.

A primitive is discarded if none of the intersection points are found to be valid. Note that in most cases the triangles lying outside the tile will be discarded by the SRT block. However, in some rare cases we might get a triangle that is completely outside the tile, for example a long thin triangle, where the vertex snapping to 11.3 causes reversal of winding. In this case the valid flags will allow us to discard the triangle.

Quad Vertices Outside of Window

With wide lines on tiles at the edge of the window, it is possible that one or more of the calculated vertices may lie outside of the window range. Setup can handle this by carrying 2 bits of extra coordinate range, one to allow for negative values, one to increase the magnitude range. The range and precision of the data sent to the CUL block (14.2 for x coordinates) is just enough to define the points inside the window range. The data that the CUL block gets from Setup includes the left and right corner points. In cases where a quad vertex falls outside of the window range, Setup will pass the following values to CUL:

If tRight.x is right of the window range then clamp to right window edge

If tLeft.x is left of window range then clamp to left window edge

If v[VtxRightC].x is right of window range then send vertex rLow, i.e. lower clip point on the right tile edge as the right corner.

If v[VtxLeftC].x is left of window range then send ILow, i.e. the lower clip point on the left tile edge as the left corner.

Figure 51:
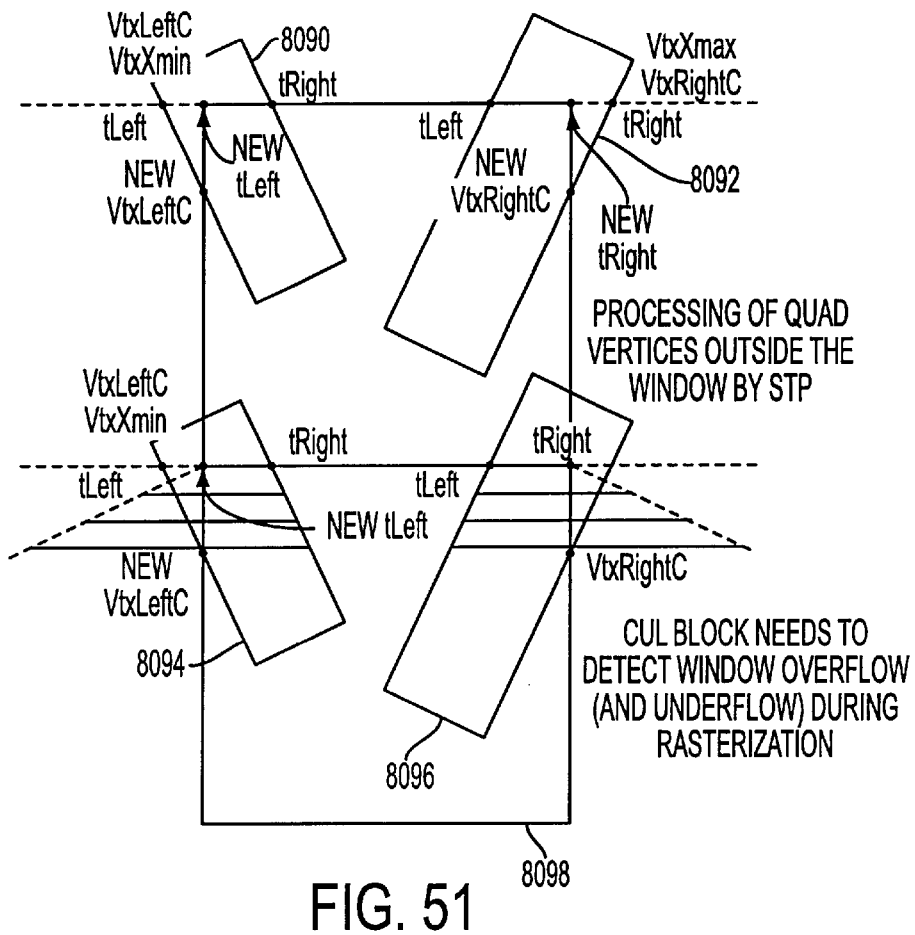
FIG. 51 is a diagrammatic illustration showing an aspect of how Setup represents lines and triangles, including aspects of how Setup passes particular values to CUL.

This is graphically represented in FIG. 51.

Note that triangles are clipped to the valid window range by geometry. We only need to worry about the quads generated for wide lines. Cull needs to detect overflow and underflow when it calculates the span end points during the rasterization, because out of range x values may be caused during edge walking. If an overflow or underflow occurs then the x-range should be clamped to within the tile range.

We have now got the clipped points and the valid flags. We can now proceed to computation of zmin, bounding box and the reference stamp.

Bounding box, Minimum Z and Reference Stamp Determination

In order to compute the bounding box, zMin, and reference stamp values, we use the intersection of the primitive with the tile. We compute the minimum Z value for the part of the primitive lying within the tile. Clipping the primitive to tile boundaries is important to get a tight estimation of Zmin for MCCAM cull in the Cull block.

Bounding Box Computation

The bounding box of the primitive intersection is determined by examining the clipped vertices. We use these eight points to compute the bounding box. We first initialize the bounding box to the tile boundaries, and then move in to the tile by examining the edge clip points.

We have now got the bounding box. These xmin, xmax, ymin, ymax pixel coordinates need to be converted to the stamp coordinates. This can be accomplished by first converting the coordinates to tile-relative values and then considering the high three bits only (i.e. shift right by 1 bit). This works; except when xmax (and/or ymax) is at the edge of the tile. In that case, we decrement the xmax (and/or ymax) by 1 unit before shifting.

Minimum Z Computation

We now compute minimum z value for the intersection of the primitive with the tile. We need to consider the eight intersection points and the vertex i1 as it may not have been included in the clipping computation. Note that depth computation is an expensive operation, and we therefore want to minimize the number of depth computations that need to be carried out. By examining the signs of the partial z derivatives in x and y, we can find the tile corner that would correspond to the minimum depth value if the primitive completely covered the tile. Once we have determined the tile corner, then we only need to compute the depth value at the two nearest clipped points. These two values along with the z value at vertex i1 provide us with the minimum z value.

We now know the minimum z value and the clip vertex it is obtained from. Z-value is clamped to 24 bits before sending to CUL. We now compute the reference stamp and reference z value.

Reference Stamp and Reference Z Computation

Instead of passing Z values for each vertex of the primitive, Setup passes a single Z value, representing the Z value at a specific point within the primitive. Setup chooses a reference stamp that contains the vertex with the minimum z. We accomplish this by truncating the vertex coordinates to the integer values and finding the corresponding stamp. For vertices on the right edge, the x-coordinates is decremented and for the top edge the y-coordinate is decremented before the reference stamp is computed. Logic used to identify the reference stamp.

The reference stamp is identified by adding the increment values to the x and y coordinates of the clip vertex and finding the containing stamp by truncating the x and y values to the nearest even value.

The reference Z value, $Z_{RefTile}$, is calculated at the center of the reference stamp. Setup identifies the Reference Stamp with a pair of 3 bit values, $x_{RefStamp}$ and $y_{RefStamp}$, that specify its location in the Tile. Note that the reference stamp is identified as an offset in stamps from the corner of the Tile.

We have to multiply by eight (the number of subpixels in a stamp) to get an offset in screen space.

$$z = \frac{\delta z}{\delta x} 8_{(refX - v[i2] \cdot x)} + \frac{\delta z}{\delta y} 8_{(refY - v[i2] \cdot y)} + v[i2] \cdot z$$

We have now got everything we need for the processing of triangles and parallelograms by Cull.

Point Processing

Figures 52A, 52B:
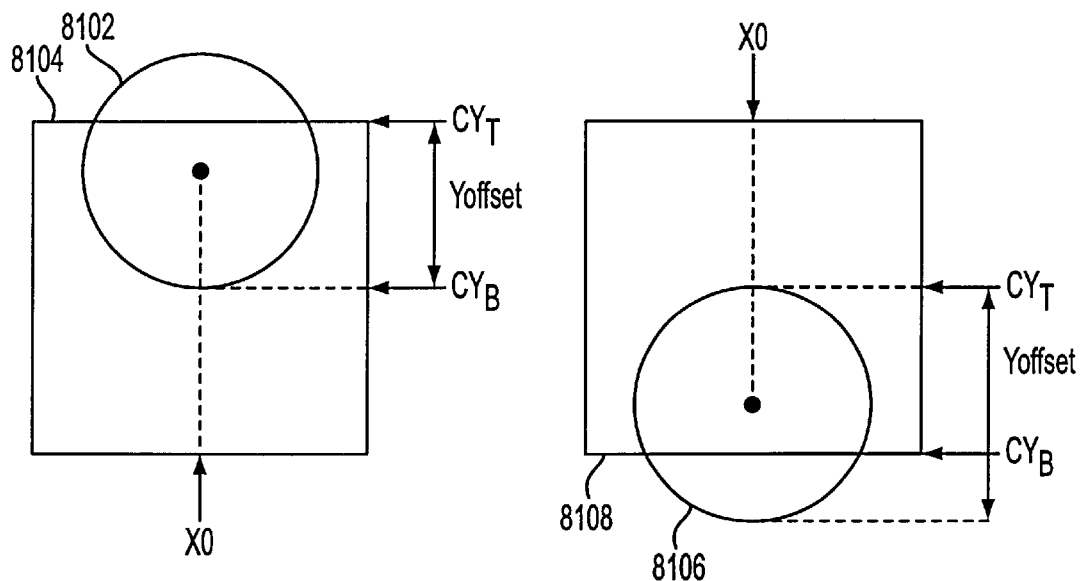
FIG. 52 is a diagrammatic illustration showing determination of tile coordinates in conjunction with point processing.

In case of points, find (See FIG. 52) the following:

$CY_T$ (the circle's topmost point, clipped by the tile's top edge, in tile coordinates)

$CY_B$ (the circle's bottom most point, clipped by the tile's bottom edge, in tile coordinates)

$Y_{offset}$ (the distance between CYT and the bottom of the unclipped circle)

XO ( the X coordinate of the center, in window coordinates)

Note that in the required calculations for points, we use 8 bits for tile relative y values, which can range from 0.0 to 16.0. This requires 5 integer bits. 3 fractional bits are to account for 8 sub-rasters per pixel.

Infinite dx/dy

An infinite dx/dy implies that an edge is perfectly horizontal. In the case of horizontal edges, one of the two end-points has got to be a corner vertex (VtxLeftC or VtxRightC). With a primitive whose coordinates lie within the window range, Cull will not make use of an infinite slope. This is because with Cull's edge walking algorithm, it will be able to tell from the y value of the left and/or right corner vertices that it has turned a corner and that it will not need to walk along the horizontal edge at all.

Unfortunately, when quad vertices fall outside of the window range we run into slight problems, particularly with non-antialiased lines. Consider the case of a non-antialiased line whose top right corner is outside of the window range. RightC is then moved onto the rLow clip point, and Cull's edge walking will not think to turn a corner on the horizontal edge and it will try to calculate the span end-point from tRight (or tLeft). (See FIG. 51).

In this case, Cull's edge walking will need a slope. Since the start point for edge walking is at the very edge of the window, any X that edge walking calculates with a correctly signed slope will cause an overflow (or underflow) and X will simply be clamped back to the window edge. So it is actually unimportant what value of slope it uses as long as it is of the correct sign.

A value of infinity is also a don't care for setup's own usage of slopes. Setup uses slopes to calculate intercepts of primitive edges with tile edges. The equation for calculating the intercept is of the form $X = X_0 + \Delta Y * dx/dy$. In this case, a dx/dy of infinity necessarily implies a $\Delta Y$ of zero. Hence, the value of dx/dy is a don't care.

Setup calculates slopes internally in floating point format. The floating point units will assert an infinity flag should an infinite result occur. Because Setup doesn't care about infinite slopes, and Cull doesn't care about the magnitude of infinite slopes, but does care about the sign, we don't really need to express infinity. To save the trouble of determining the correct sign, Setup will force an infinite slope to ZERO before it passes it onto Cull.

Cull Block (CUL)

Functional Overview of the CUL Block

The Cull unit is responsible for: 1) pre-shading hidden surface removal; and 2) breaking down primitive geometry entities (triangles, lines and points) to stamp based geometry entities called Visible Stamp Portions (VSPs). The Cull unit does, in general, a conservative culling of hidden surfaces. Cull can only conservatively remove hidden surfaces because it does not handle some "fragment operations" such as alpha test and stencil test. The Cull block's sample z-buffer can hold two depth values, but the Cull block can only store the attributes of one primitive per sample. Thus, whenever a sample requires blending colors from two pieces of geometry, Cull has to send the first primitive (using time order) down the pipeline, even though there may be later geometry that hides both pieces of the blended geometry.

The Cull Unit receives Setup Output Primitive Packets that each describe, on a per tile basis, either a triangle, a line or a point. Sort is the unit that bins the incoming geometry entities to tiles. Setup is the unit that pre-processed the primitives to provide more detailed geometric information for Cull to do the hidden surface removal. Setup will pre-calculate the slope value for all the edges, the bounding box of the primitive within the tile, minimum depth value (front most) of the primitive within the tile, and other relevant data. Prior to Sort, Mode Extraction has already extracted the information of color, light, texture and related mode data, Cull only gets the mode data that is relevant to Cull and a pointer, called Color Pointer, that points to color, light and texture data stored in Polygon Memory.

The Cull Unit sends one Visible Stamp Portion (VSP) at a time to the Mode Injection unit. A VSP is a visible portion of a geometry entity within a stamp. Mode Injection reconnects the VSP with its color, light and texture data and sends it to Fragment and later stages in the pipeline.

The Cull Unit performs two main functions. The primary function is to remove geometry that is guaranteed to not affect the final results in the frame buffer (i.e., a conservative form of hidden surface removal). The second function is to break primitives into units of stamp portions (SPs). A stamp portion is the intersection of a primitive with a given stamp. The portion amount is determined by sampling. Any stamp will have 16 predetermined sample points (actually each pixel within a stamp has 4 predetermined sample points). The portion "size" is then given by the number and the set of sample points covered by a primitive in a given stamp.

Cull processes primitives one tile at a time. However, for the current frame, the pipeline is in one of two modes: 1) Time Order Mode; or 2) Sorted Transparency Mode. In Time Order Mode, time order of vertices and modes are preserved within each tile, and the tile is processed in a single pass through the data. That is, for a given tile, vertices and modes are read in the same order as they are written, but are skipped if they do not affect the current tile. In Sorted Transparency Mode, the processing of each tile is divided into multiple passes, where, in the first pass, guaranteed opaque geometry is processed (the Sort Block only send non-transparent geometry for this pass). In subsequent passes, potentially transparent geometry is processed (the Sort Block repeatedly sends all the transparent geometry for each pass). Within each pass, the time ordering is preserved, and mode data is inserted in its correct time-order location.

In Time Order Mode, when there is only "simple opaque geometry" (i.e. no scissor testing, alpha testing, color testing, stencil testing, blending, or logicop) in a tile, Cull will process all the primitives in the tile before dispatching any VSPs to Mode Injection. This is because the Cull hidden surface removal algorithm can unambiguously determine, for each sample, the single primitive that covers (i.e., colors) that sample. The case of "simple opaque geometry" is a special case that renderers do not generally see too often.

In Time Order Mode, when the input geometry is not limited to "simple opaque geometry" within a tile, early dispatch of VSPs (entire set of VSPs or selected VSPs) may be required. However, without exceptions all the VSPs of a given tile are dispatched before any of the VSPs of a different tile can be dispatched. In general, early dispatch is required when more than one piece of geometry could possibly affect the final tile values (in Pixel) for any sample.

In Sorted Transparency Mode, each tile is processed in multiple passes (assuming there is at least some transparent geometry in the tile). In each pass, there is no early dispatch of VSPs.

If the input packet is a primitive packet, the PrimType parameter indicates the primitive type (triangle, line or point). The spatial location of the primitive (including derivatives, etc.) is done using a "unified description". That is, the packet describes the primitive as a quadrilateral (not screen aligned), and triangles and points are degenerate cases. This "unified description" is described in great detail in the section "Setup Output Primitive Packet". The packet includes a color pointer, used by Mode Injection. The packet also includes several mode bits, many of which can change primitive-by-primitive. The following are considered to be "mode bits", and are input to the Z Cull state machine: CullFlushCurrent, DoAlphaTest; DoABlend, DepthFunc, DepthTestEnabled, DepthTestMask, and NoColor.

In addition to primitives, Cull receives the following packet types: Setup Output Clear Packet; Setup Output Cull Packet; Setup Output Begin Frame Packet; Setup Output End Frame Packet; Setup Output Begin Tile Packet; and Setup Output Tween Packet. Each of these packet types is described in detail in a later section. But, collectively, these packets are known as "mode packets" (admittedly, a somewhat misleading name).

The Setup Output Clear Packet indicates some type of buffer clear is to be performed. However, buffer clears that occur at the beginning of a user frame (and not subject to scissor test) are included in the begin tile packet.

The Setup Output Cull Packet is a packet of mode bits. This packet includes bits for: 1) enabling/disabling the MCCAM Cull and Z Cull processes; 2) a bit, CullFlushAll, that causes a flush of all the VSPs from the Cull block; and 3) AliasPolys, AliasLines, and AliasPoints, which disable antialiasing for the three types of primitives.

The Setup Output Begin Frame Packet tells Cull that a new frame is starting. The next packet will be a Sort Output Begin Tile Packet. The Setup Output Begin Frame Packet contains all the per-frame information that is needed throughout the pipeline.

The Setup Output End Frame Packet indicates the frame has ended, and that the current tile's input has completed.

The Setup Output Begin Tile Packet tells Cull that the current tile has ended and the processed data should be flushed down the pipeline. And, at the same time, it should start to process the new tile's primitives. If a tile is to be repeated due to the pipeline being in Sorted Transparency Mode, then this requires another Setup Output Begin Tile Packet. Hence, if a particular tile needs an opaque pass and four transparent-passes, then a total of five begin tile packets are sent from Setup. This packet specifies the location of the tile within the window.

The and Setup Output Tween Packet can only occur between (hence tween) frames, which, of course is between tiles. Cull treats this packet as a black box, and just passes it down the pipeline. This packet has only one parameter, TweenData, which is 144 bits.

Figure 53:
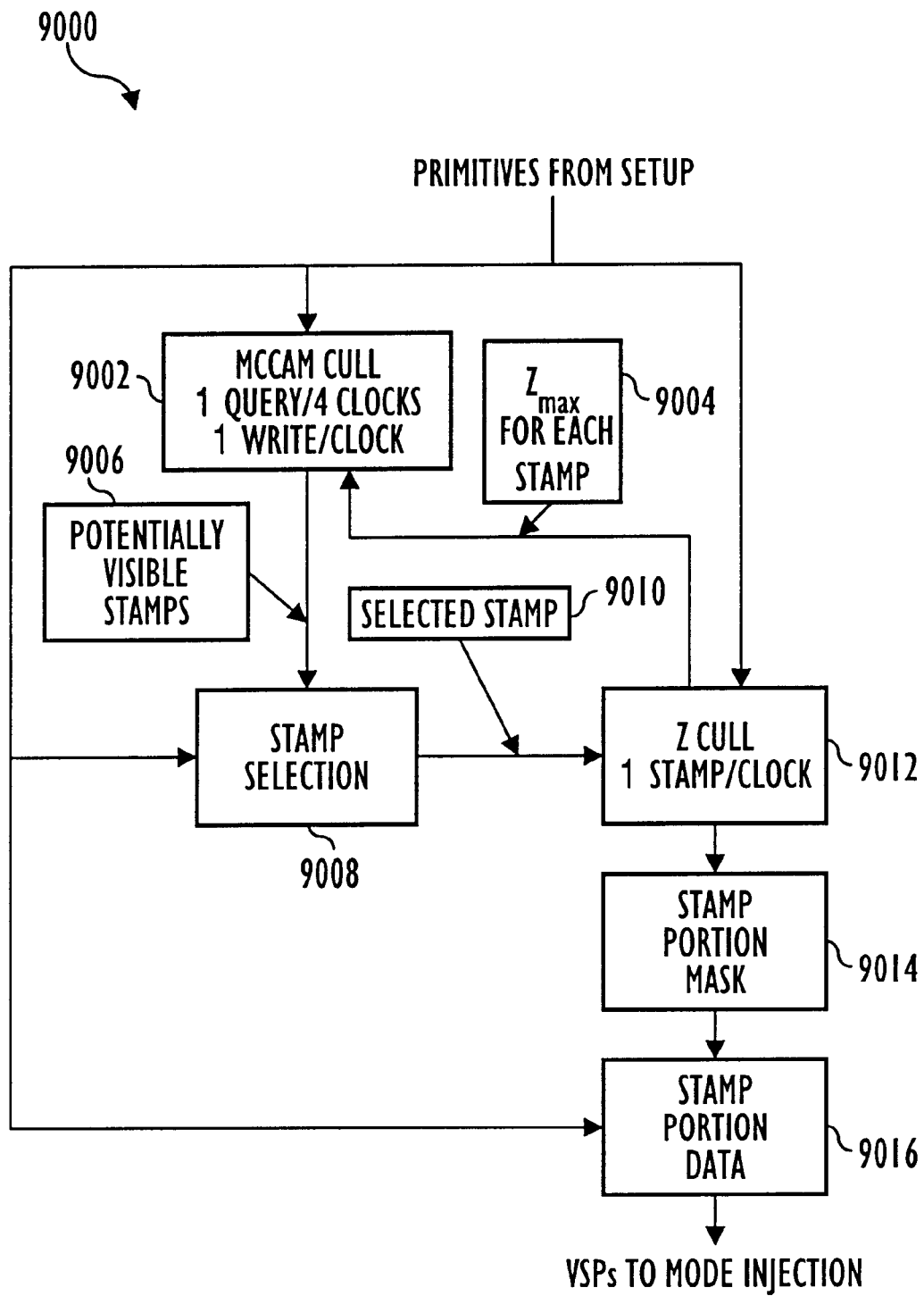
FIG. 53 is a diagrammatic illustration of an exemplary embodiment of the Cull Block.

FIG. 53 shows a basic block diagram of the Cull block.

Whenever a primitive is received, Cull will attempt to eliminate it by querying the MCCAM 9002 with the primitive's bounding box. If MCCAM says that it is completely hidden within the tile, then it is thrown away. If MCCAM cannot reject the primitive completely, it will generate a stamp list, each stamp in the list may contain a portion of the primitive that may be visible. This list of potentially visible stamps is sent to the stamp selection block 9008 of Cull. The stamp selection block will use the geometry data of the primitive to determine the set of stamps within each stamp row of the tile that is actually touched by the primitive. Combined with the stamp list produced by MCCAM, the stamp selection block dispatches one potential visible stamp 9006 at a time to the Z Cull block 9012. Each stamp is divided into a grid of 16 by 16 sub-pixels. Each horizontal grid line is called a subraster line. Each of the 16 sample points per stamp has to fall (for antialiased primitives) at the center of one of the 256 possible sub-pixel locations. Each pixel has 4 sample points within its boundary. The process of determining the set of stamps within a stamp row that is touched by a primitive involves the calculation of the left most and right most position of the primitive in each subraster line that contain at least I sample point. We shall call these left most and right most position XleftSubS$_i$ and XrightSubS$_i$ which stands for x left most subraster line for sample i and x right most subraster line for sample i respectively. Samples are enumerated from 0 to 15. The determination of XleftSubS$_i$ and XrightSubS$_i$ is typically called the edge walking process. If we know a point on an edge (x0, y0), then the value of x1 corresponding to the y position of y1 can easily be determined by:

$$x1 = x0 + \frac{dx}{dy}x(y1 - y0)$$

In addition to the stamp number, the set of 16 pairs of XleftSubS$_i$ and XrightSubS$_i$ is also sent by stamp selection block to Z Cull.

The Z Cull unit receives one stamp number (or StampID) at a time. Each stamp number contains a portion of a primitive that may be visible as determined by MCCAM. The set of 16 pairs of XleftSubS$_i$ and XrightSubS$_i$ allows us to decide which of the 16 sample points are covered by the primitive. Sample i is covered if Xsample$_i$, the x-coordinate value of sample i satisfies:

XleftSubS$_i$≦Xsample$_i$<XrightSubS$_i$

For each sample that is covered, we calculate the primitive's z-value at that sample point. At the same time, the current z-values and z-states for all 16 sample points are read from the sample z-buffer. Each sample point can have a z-state of "conservative" or "accurate". The z-state combined with the mode bits received by Cull drives the sample finite state machine. Each sample point has a FSM independent of other samples. The state machine controls the comparison on a per sample basis between the primitive's z-value and the z-buffer's z-value. The result of the comparison is used to determine if the new primitive is visible or hidden at each sample point that the primitive covers. If the primitive contains any sample point that is visible, the visible sample pattern is made into a new VSP coverage mask. A sample's pixel FSM also determines how the z-buffer should be updated for that sample, and if the sample point of the new VSP should be dispatched early. In addition, it determines if any old VSP that may contain the sample point should be destroyed or should be dispatched early. These per sample control signals are generated as the SendNew, KeepOld and SendOld masks by Z Cull and sent to the stamp portion mask unit 9014. The state table for pixel finite state is described in the architecture specification and is not repeated here. The maximum of the 16 sample points's z-value is used to update the MCCAM.

The case of sorted transparency presents additional issue for Z Cull, and brings in the discussion of Zfar and Znear values for the sample z-buffer. In Sorted Transparency Mode, we want the transparent primitive to be rasterized in the spatial order starting with the layer closest to front most opaque layer instead of the regular mode of time order rasterization. This requires the transparent primitives for a tile to go through the Cull unit several times The first time, the Sort unit send only the opaque primitives. The z-values are updated as described in the last paragraph. We call the z-values for opaque primitives of type Zfar. At the end of the pass, the opaque VSPs are dispatched. The second time Sort will only send the transparent primitives for the tile to Cull. Initially the Znear portion of the z-buffer are preset to smallest z-value possible. A sample point with z-value behind Zfar is hidden, but a z-value before Zfar and behind Znear is closer to opaque and therefore replaces the current Znear's z-value. At the end of the pass, we would have the z-value of the layer that is closest to the opaque layer. The VSPs representing the closest to opaque layer is dispatched. The role of Znear and Zfar is the switched, and Z Cull receives the second pass of transparent primitives. This process continues until Z Cull determines that it has processed all possible layers of transparent primitives. Z Cull in sorted transparent mode is also controlled by the pixel finite state machines.

The stamp portion mask block contains the VSP coverage masks for each stamp in the tile. The maximum number of VSPs a stamp can have is 16. The VSP masks need to be updated or dispatched early when a New VSP comes in from Z Cull. The stamp portion mask block will perform the mask update or dispatched strictly depending on the SendNew, KeepOld and SendOld control signals. The update has to occur at the same time for a maximum of 16 old VSPs in a stamp because a new VSP can potentially modify the coverage mask of all the old VSPs in the stamp. The stamp portion data block 9016 contains other information associated with a VSP including but not limited to the color pointer. The stamp portion data memory also needs to hold the data for all VSPs contained in a tile. Whenever a new VSP is created, its associated data need to be stored in the memory. And whenever an old VSP is dispatched, its data need to be retrieved from the memory.

Cull Block Functional Details

Figure 54:
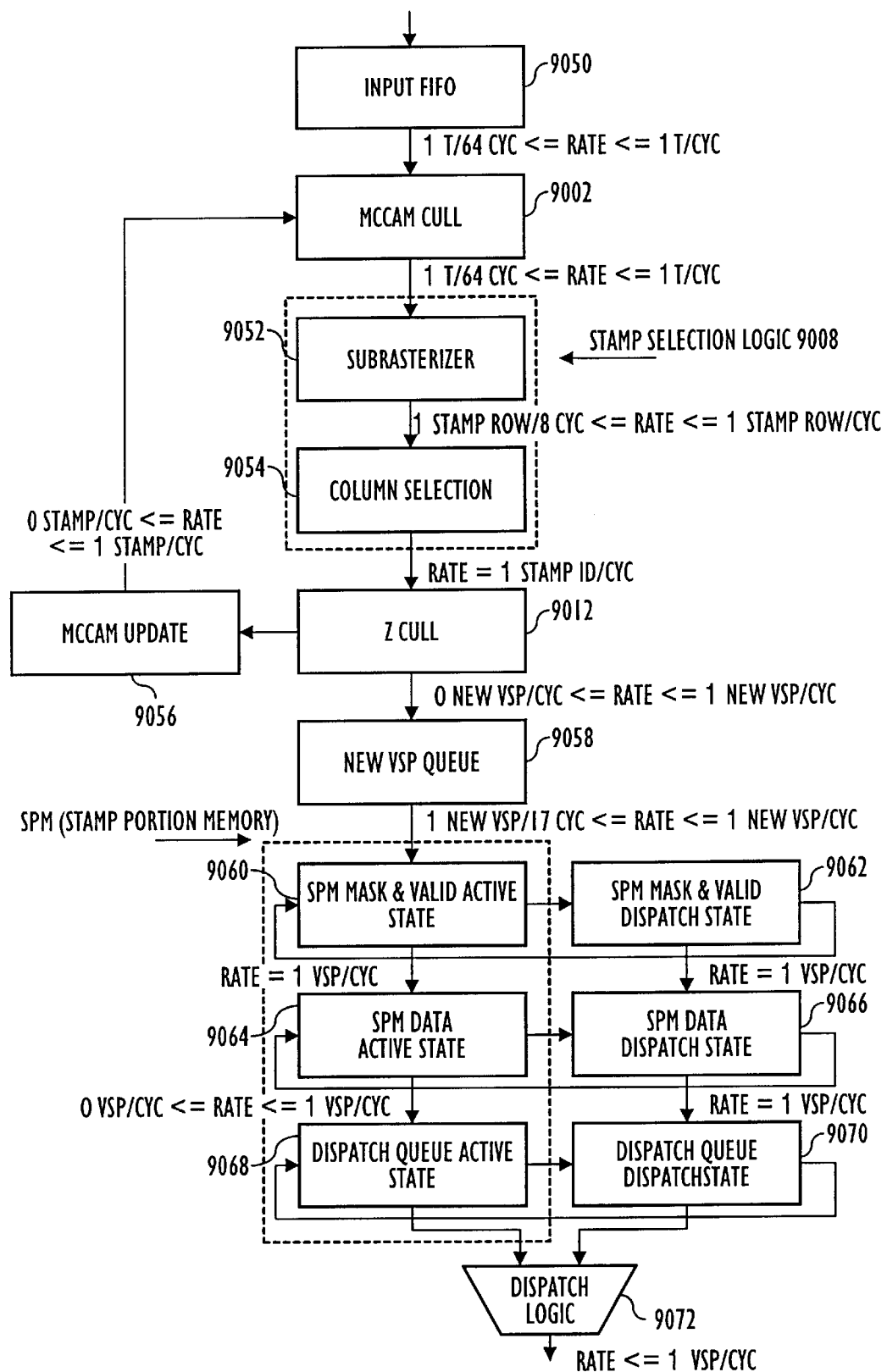
FIG. 54 is a diagrammatic illustration of exemplary embodiments of the Cull Block sub-units.

The Cull block is composed of the following sub-units: 1) Input FIFO; 2) MCCAM Cull; 3) Subrasterizer; 4) Column Selection; 5) Z Cull; 6) MCCAM Update; 7) New VSP Queue; 8) Stamp Portion Memory Mask; 9) Stamp Portion Memory Data; 10) Dispatch Queue; and 11) Dispatch Logic. These sub-units are described in the following sections. FIG. 54 shows a block diagram of the Cull sub-units.

Input FIFO

The input FIFO sub-unit 9050 interfaces with the Setup unit 8000. It receives data packets from Setup and stores each packet in a queue. The number of needed FIFO memory locations is between 16 to 32, but we currently assume the depth to be 16.

MCCAM Cull

The MCCAM Cull sub-block 9002 uses the Spatial Addressable Memory (MCCAM) to perform a spatial query on a primitive's bounding box to determine the set of stamps within the bounding box that may be visible. The value that it will use for Z comparison is ZminTile. MCCAM Cull can process one primitive per cycle from the input FIFO. Read operations form the FIFO occur when the FIFO is not empty and either the last primitive removed is completely hidden as determined by MCCAM Cull or the last primitive is being processed by the Subrasterizer unit 9052. In other words, MCCAM Cull will not "work ahead" of the Subrasterizer. Rather, it only gets the next primitive that the Subrasterizer needs to process, and then waits.

Subrasterizer within the Stamp Selection Logic

The subrasterizer 9052 is the sub-unit that does the edge walking (actually, the computation is not iterative, as the term "walking" would imply). For each row of stamps that MCCAM Cull indicates to be potentially visible. It simultaneously calculates the XleftSub$_i$ and XrightSub$_i$ for each of the 16 sample points. Each pair of XleftSub$_i$ and XrightSub$_i$ will specify a set of stamps in the row that is touched by the primitive. The Subrasterizer determines the set of stamps touched in a stamp row for each subraster line where a sample point is located, and combines the 16 sets of stamps touched into 1 touched stamp list. The Subraterizer passes a request to MCCAM Cull for each stamp row, and receives a visible stamp list. The visible stamp list is combined with the touched stamp list, thereby determining the final potential visible stamp set in a stamp row. For each row, the visible stamp set is sent to the Column Selection portion of the Stamp Selection Logic. The Subrasterizer can process one row of stamps per cycle. If a primitive contains more than 1 row of stamps then the Subrasterizer will take more than 1 cycle to process the primitive and therefore need to request MCCAM to stall the removal of primitives from input FIFO. The Subrasterizer itself can be stalled if a request is made by the Column Selection unit.

Column Selection within Stamp Selection Logic

The column selection sub-unit 9054 tells the Z Cull unit 9012 which stamp to process in each clock cycle. If a stamp row contains more than 1 potentially visible stamp, the Column Selection unit needs to request the Subrasterizer to stall.

Z Cull

The Z Cull sub-unit 9012 contains the sample z-buffer. Based on the XleftSub$_i$ and XrightSub$_i$ calculated by the Subrasterizer, it determines the set of sample points in the stamp that is covered by the primitive. It then calculates the z-value of the primitive at those sample points and compare the resulting z-values to the corresponding z-values stored in the z-buffer for that stamp. Based on the result of the comparison, current Cull mode bits and the states of the sample state machines, the z-buffer is updated. For each sample, the finite state machine in Z Cull generate the bits: OldSampleKeep; OldSampleSend; NewSampleMask; and NewSampleSend. The set of NewSampleMask bits (16 of them) constitute a new Stamp Portion (SP) coverage mask. The new SP is dispatched to the NewVSP queue. In the event that the primitive is not visible at all in the stamp (all NewSampleMask bits are FALSE), then nothing is sent to the NewVSP queue.

MCCAM Update

The MCCAM Update sub-unit 9056 determines the maximum of the 16 updated z-values for the 16 sample points and sends it to the MCCAM unit to update MCCAM.

NewVSP Queue

The Z Cull sub-unit generates 4 set of bits per Stamp Portion per clock cycle: OldSampleKeep; OldSampleSend; NewSampleMask; and NewSampleSend. Under "ideal" circumstances, the SPM Mask&Valid sub-unit can store one new Stamp Portion every clock cycle. However, the SPM Mask&Valid sub-unit requires multiple clocks for a new Stamp Portion when early dispatch of VSPs occur. When this occurs, the NewVSP Queue 9058 stores new Stamp Portions, thus allowing Z Cull to proceed without stalling.

The NewVSP Queue is a simple queue. This queue is useful only in the case of early dispatch. The SPM Mask&Valid unit can only handle 1 VSP at a time. If early dispatch involves more than 1 VSP, the Z Cull unit would have to stall if we did not have the NewVSP Queue. Based upon the performance analysis, we expect to have 450 stamps touched in a tile. With depth complexity of 2, we would expect to get 225 VSPs coming out of Z Cull per tile. The means that we can see on average about 4 VSPs per stamp. A triangle with blend turned on covering 50 pixel area can touch on average 3 tiles, and the number of stamps it touch within a tile should be less than 8. We, therefore, want to set the NewVSP Queue depth to be 32.

The SPM Mask&Valid

The Stamp Portion Memory Mask and Valid sub-unit contains the VSP coverage masks for the tile. Each VSP entry will require a valid bit to indicate if there is a valid VSP stored there. The valid bits for the VSPs are stored in a separate memory. This sub-unit is double buffered (i.e. there are two copies) as shown in the microarchitecture block diagram. The active state page will contain VSPs for the current tile while the dispatch state page will contain VSPs of last tile (currently being dispatched). As a new VSP is removed from the NewVSP Queue, the active state SPM Mask&Valid unit 9060 will update the VSPMask for the VSPs that already exist in its mask memory and add the new VSP to the memory content. When color blending or other conditions occur that require early dispatch, the active state SPM Mask&Valid will dispatch VSPs through the SPM Data unit to the dispatch queue. The behavior of mask update or early dispatch is controlled by the OldSampleKeep; OldSampleSend; and NewSampleSend control signals generated in Z Cull. The state transition from active to dispatch and vice versa is controlled by mode packets. Receiving a packet signaling end of a tile (Begin Tile, End Frame, Buffer Clear, or Cull Packet with CullFlushAll set to TRUE) will cause the active state one to switch over to dispatch state and vice versa. The page in dispatch state simply cycles through each stamp and sends all VSPs to the SPM Data unit 9064, which forwards them to the dispatch queue.

The SPM Data

The Stamp Portion Memory Data sub-unit 9064 stores the Zstamp, dz/dx, dz/dy and the ColorPointer for every VSP in the tile. This unit is also double buffered. The SPM Mask&Valid sends the new VSP information to the SPM Data and tells it whether it should send the new VSP or save the new VSP to its memory. If the new VSP should be saved, the SPM Mask&Valid will also tell it which location among the 16 possible slots the new VSP should occupy. In addition, for the case of early dispatch, SPM Data also gets a list of old VSP locations and the associated VSPMasks that need early dispatch. The SPM Data block will first check to see if there is any old VSP that need to be dispatched. If it finds any, it will simply read the VSP data from its memory, merge with the VSPMask sent from SPM Mask&Valid block, and put the VSP into the dispatch queue. It then checks if the new VSP should be sent too, and if it is affirmative, then it passes the new VSP data to the dispatch queue. If the new VSP should not be sent, it writes the new VSP data into its memory.

The Dispatch Queue and Dispatch Logic

This unit will attempt to send one entry's worth of data from one of the two SPMs' dispatch queues to Mode Inject unit. It will attempt to dispatch from the dispatch state SPM first. Only after the dispatch state Stamp Portion Memory has exhausted all of its VSPs, it will try to dispatch from the active state SPM dispatch queue.

Mode Injection Block (MIJ)

Introduction

The Mode Injection (MIJ) block in conjunction with the Mode Extraction block is responsible for the management of graphics state related information. In a traditional graphics pipeline the state changes are incremental, i.e. the value of a state parameter remains in effect until it is changed. Therefore, the applications only need to update the parameters that change. Furthermore, the rendering is linear, i.e. primitives are rendered in the order received. Points, lines, triangle strips, triangle fans, polygons, quads, and quad strips are examples of graphical primitives. Thus, all state changes accumulated until the spatial information about a primitive is received are effective during the rendering of that primitive.

In the one embodiment of the invention, referred to as the APEX pipeline, rendering is tile based. The Geometry (GEO) block receives the primitives in order, performs all vertex operations (transformations, vertex lighting, clipping, and primitive assembly), and sends the data down the pipeline. The Sort block receives the time ordered data and bins it by the tiles it touches. (Within each tile, the list is in time order.) The CUL block receives the data from the SRT block in tile order, and culls out parts of the primitives that definitely do not contribute to the rendered images. The CUL block generates the VSPs. A VSP corresponds to the visible portion of a polygon on the stamp. A stamp is a 2×2 pixel area of the image. The TEX and PHG units receive the VSPs and are responsible for the texturing and lighting of the fragments respectively. The last block, i.e. the Pixel block consumes the VSPs and the fragment colors to generate the final picture.

A primitive may touch many tiles and therefore, unlike traditional rendering pipelines, may be visited many times (once for each tile it touches) during the course of rendering the frame. The pipeline must remember the graphics state in effect at the time the primitive entered the pipeline, and recall it every time it is visited by the pipeline stages downstream from SRT. MEX is a logic block between Geometry and Sort blocks that collects and saves the temporally ordered state change data, and attaches appropriate pointers to the primitive vertices in order to associate the correct state with the primitive when it is rendered.

The Mode Injection (MIJ) block is responsible for the retrieval of the state and any other information associated with the state pointer (aka the MLM Pointer) when it is needed. It is also responsible for the repackaging of the information as appropriate. An example of the repackaging occurs when the vertex data in polygon memory is retrieved and bundled into primitive (triangle, line, point) input packets for fragment.

Theory of operation and general principles behind APEX state management are discussed in the architecture specification of the MEX block. The organization of various data packets in polygon memory is also described in detail in the MEX block specification. We recommend that the readers of this document go through the MEX block architecture specification first.

In this document, we first describe the functional requirements of the MIJ block. We then discuss the input and output interfaces to the MIJ block. This is followed by the functional details and algorithms used by the MIJ block. Lastly, we discuss the performance and memory bandwidth requirements.

Functional Overview of MIJ block

As outlined earlier, MIJ receives VSP packets from the CUL block. Each VSP packet corresponds to the visible portion of a primitive on the 2×2 pixel stamp. The VSPs output from the Cull block to MIJ block are not necessarily ordered by primitives. In most cases, they will be in the VSP scan order on the tile, i.e. the VSPs for different primitives may be interleaved. In order to light, texture and composite the fragments in the VSPs, the pipeline stages downstream from the MIJ block need information about the type of the primitive (i.e. point, line, triangle, line-mode triangle); its geometry such as window and eye coordinates, normal, color, and texture coordinates at the vertices of the primitive; and the rendering state such as the PixelModes, TextureA, TextureB, Light, Material, and Stipple applicable to the primitive. This information is saved in the polygon memory by MEX. MEX also attaches ColorPointers {ColorAddress, ColorOffset, and ColorType} to each primitive sent to Sort, which is in turn passed on to each of the VSPs of that primitive. MIJ decodes this pointer to retrieve the necessary information from the polygon memory.

MIJ starts working on a frame after it receives a BeginFrame packet from CUL. The VSP processing for the frame begins when CUL is done with the first tile in the frame and MIJ receives the first VSP for that tile.

Color Pointer Decode

The color pointer consists of three parts, the ColorAddress, ColorOffset, and ColorType. (We refer the reader to the Mode Extraction Architecture Specification for details of the ColorPointer and the MLM_Pointer.) The ColorAddress points to the ColorVertex that completes the primitive. ColorOffset provides the number of vertices separating the ColorAddress from the dualoct that contains the MLM_Pointer. ColorType contains information about the type of the primitive, size of each ColorVertex, and the enabled edges for line mode triangles. The ColorVertices making up the primitive may be 2, 4, 6, or 9 dualocts long. MIJ decodes the ColorPointer to obtain addresses of the dualocts containing the MLM_Pointer, and all the ColorVertices that make up the primitive. The MLM_Pointer contains the dualoct address of the six state packets in polygon memory.

Cache Management

Problem Overview

The MIJ block is responsible for making sure that the Fragment, Texture, Phong and Pixel blocks have all the information they need for processing the fragments in the VSP, before the VSP arrives at that stage. In other words, the ColorVertices of the primitive as well as the six state packets pointed to by the pointers in the MLM_Pointer need to be resident in the blocks that need them, before the VSP fragments can be processed. If MIJ was to retrieve the MLM_pointer, the state packets, and ColorVertices for each of the VSPs, it will amount to nearly 1 KB of data per VSP. This is equivalent to 125 GB/sec of polygon memory bandwidth for reading the data, and as much for writing out the data to FRG and PIX blocks. Clearly, it is not possible to retrieve the data for each VSP—and some form of caching is required.

It is reasonable to assume that there will be some coherence in VSPs and the primitives; i.e. we are likely to get a sequence of VSPs corresponding to the same primitive. We use this coherence to reduce the amount of data read from polygon memory and transferred to Fragment and Pixel blocks. If the current VSP originates from the same primitive as the preceding VSP, we do not need to do any data retrieval. As pointed out earlier, the VSPs do not arrive at MIJ in primitive order. Instead, they are in the VSP scan order on the tile, i.e. the VSPs for different primitives crossing the scan-line may be interleaved. Because of this reason, the caching scheme based on the current and previous VSP alone will cut down the bandwidth by approximately 80%. Other schemes will provide even greater performance. For example, a scheme that takes advantage of primitive coherence on the entire tile, in fact on the quad-tile. Clearly, we can do this by keeping caches for MLM_Pointers, each of state partitions, and the color primitives in MIJ. The size of each of the caches is determined be their frequency of incidence on the tile. Note that while this scheme can solve the problem or retrieving the data from the polygon memory, we still need to deal with data transfer from MIJ to Fragment and Pixel blocks every time the data changes. We resolve this in the following way.

Decoupling of Cached Data and Tags

The data retrieved by MIJ is consumed by other blocks. Therefore, we store the cache data within those blocks. Each of the Fragment, Texture, Phong, and Pixel blocks have a set of caches. These caches hold the actual data that goes in their cache-line entries. Since MIJ is responsible for retrieving the relevant data for each of the units from Polygon memory and sending it down to the units—it needs to know the current state of each of the caches in the four aforementioned units. This is accomplished by keeping tags for each of the caches and allowing MIJ to do all cache management. Thus cache data resides in the block that needs it and the cache tags reside in MIJ.

MIJ manages seven caches for the downstream blocks—one for FRG (ColorData Cache 10016) and two each for the TEX (TexA 10018, TexB 10020), PHG (Light 10024, Material 10022), and PIX (PixMode 10026 and Stipple 10028) blocks. For each of these caches the tags are cached in MIJ and the data is cached in the corresponding block. MIJ also maintains the index of the data entry along with the tag. In addition to these seven caches, MIJ also maintains two caches internally for efficiency, one is the ColorVertex cache 10012 and the other is the MLM_Pointer cache 10014. For these, both the tag and the data reside in MIJ. All of these nine tag caches are fully associative and we use CAMs for Cache tag lookup. These caches are listed in FIG. 55

We briefly describe the caching mechanisms for each of these caches in the subsequent sections.

Modified FIFO Replacement Policy

For all the caches in MIJ, we use a modified FIFO algorithm for cache replacement. In this algorithm, for each entry in the cache we keep a WasHit flag along with the entry tag. A counter is used to indicate the current entry to be replaced in the cache.

Color Caching

"Color" caching is used to cache color primitives. Depending on the extent of the processing features enabled, a ColorVertex may be 2, 4, 6, or 9 dualocts long in the polygon memory. Furthermore, a primitive may require one, two or three ColorVertices depending on if it is a point, line or a filled triangle respectively. Unlike other caches, Color Caching needs to deal with the problem of variable data sizes in additions to the usual problems of cache lookup and replacement.

Note that even though the quarter performance color vertices in polygon memory occupy 9 dualocts, we do not really need entire 9 dualocts. Actually, there are 1200 bits in the quarter performance ColorVertex. A primitive may contain up to three ColorVertices. We assume that each entry in the ColorCache is 900 bits wide. Thus a full performance filled triangle will fit in one color cache entry, a half performance filled triangle will fit in two color cache entries. We assign 4 Color cache entries to the one third performance rate and the quarter performance rate triangles. Note that even though the one third performance rate triangle will fit in three Color cache entries, we assign 4 entries to it. This makes cache maintenance a lot simpler than if we were to use three Color cache entries for one third rate primitives. We do not have to deal with partially invalidated primitives.

The Color cache in Fragment block can hold 256 full performance color primitives. The TagRam in MIJ has a 1-to-1 correspondence with the Color data cache in the Fragment block. Note that in the APEX pipeline a ColorAddress uniquely identifies a Color primitive. We therefore use the 24 bit ColorAddress as tag for the color cache.

The Color data fetch request is sent to the ColorDataFetch subblock. This block uses the Color Address and the Color type to determine the number of vertices needed for this primitive, the size of each vertex and the ColorAddress of each vertex to be fetched. We expect a substantial number of "color" primitives to be a part of the strip or fans. There is an opportunity to exploit the coherence in ColorVertex retrieval patterns here. This is done via Vertex caching. The CCIX is incorporated in the VSP going out to the Fragment block.

Other Caching

The inventive structure also provides for Vertex Caching, MLM-Pointer Caching, Mode packet caching, Control Packet Processing, and for Fragment and Pixel Output Queue Management.

Functional Units

The Mode Injection block resides between the CUL block and the rest of the pipeline downstream from CUL. MIJ receives the control and VSP packets from the CUL block. On the output side, MIJ interfaces with the Fragment and Pixel blocks.

The MIJ is responsible for the following:

1. Routing various control packets such as BeginFrame, EndFrame, and BeginTile to Fragment and Pixel units.

2. Routing prefetch packets from SORT to Pixel.

3. Determining the ColorPointer for all the vertices of the primitive corresponding to the VSP.

4. Determining the location of the MLMpointer in polygon memory and retrieving it.

5. Determining the location of various state packets in the polygon memory.

6. Determining which packets need to be retrieved.

7. Keeping track of the contents of the Color, TexA, TexB, Light, and Material caches (for the Fragment, Texture, and Phong blocks) and PixelMode and Stipple caches (for the Pixel block) and associating the appropriate cache pointer to each cache miss data packet.

8. Retrieving the state and color vertex packets from the polygon memory.

9. Constructing primitives. Polygon memory stores per-vertex data. Depending on the primitive type of the VSP, MIJ retrieves the required vertices (3 for a triangle, 2 for a line, and 1 for point primitives) from the polygon memory.

10. Sending data to the fragment and pixel blocks.

11. Processing stalls in the pipeline.

12. Signaling to MEX when done.

Mode injection thus deals with the retrieval of state as well as the per-vertex data needed for computing the final colors for each fragment in the VSP.

Fragment Block (FRG)

Overview

The Fragment block is located after Cull and Mode Injection and before Texture, Phong, and Bump. It receives Visible Stamp Portions (VSPs) that consist of up to 4 fragments that need to be shaded. The fragments in a VSP always belongs to the same primitive, therefore the fragments share the primitive data defined at vertices including all the mode settings. A sample mask, sMask, defines which subpixel samples of the VSP are active. If one or more of the four samples for a given pixel is active. This means a fragment is needed for the pixel, and the vertex-based data for primitive will be interpolated to make fragment-based data. The active subpixel sample locations are used to determine the corresponding x and y coordinates of the fragment.

Figure 56:
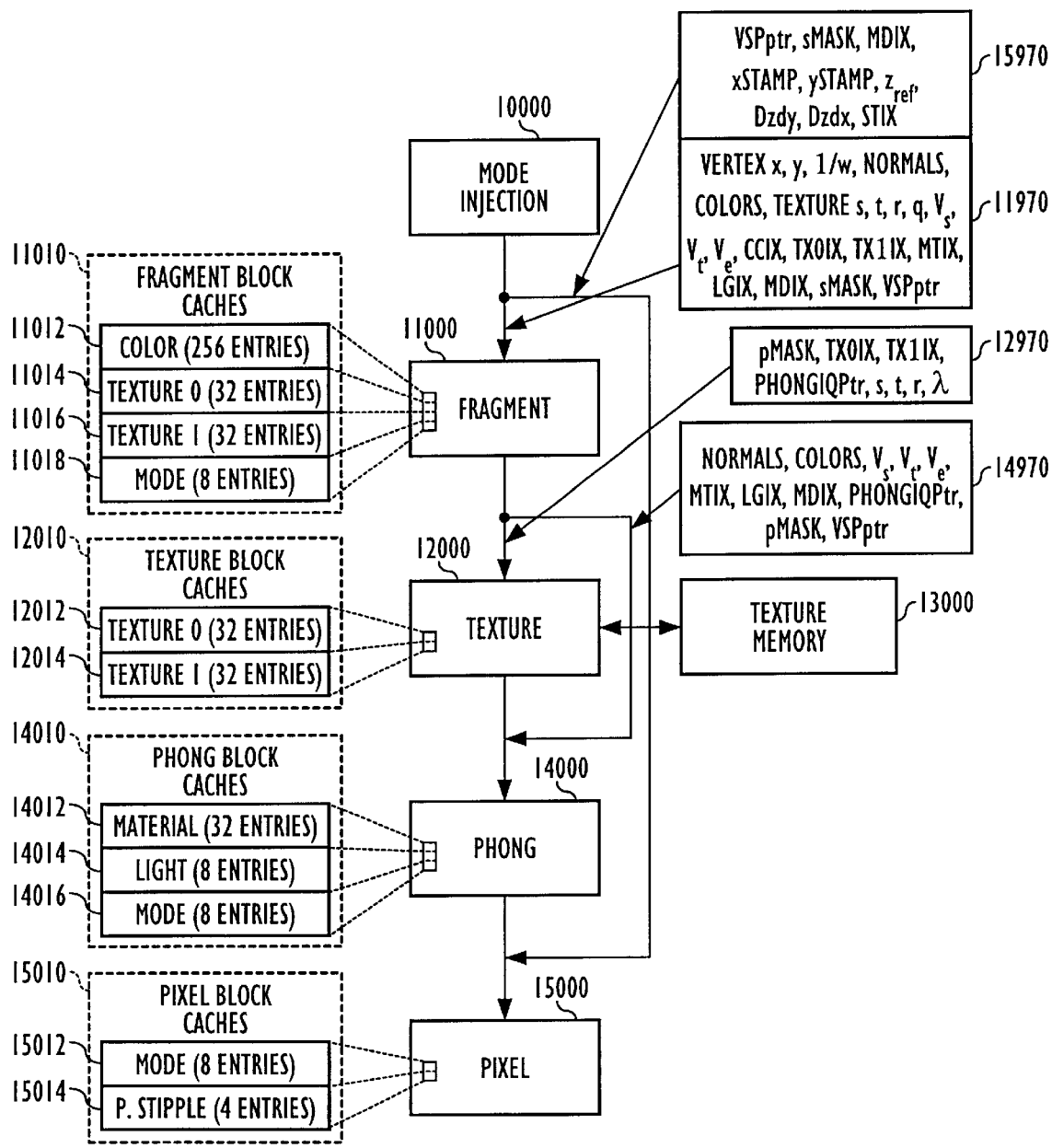
FIG. 56 is a diagrammatic illustration showing the manner in which mde data flows and is cached in portions of the DSGP pipeline.

In order to save bandwidth, the Fragment block caches the color data to be reused by multiple VPSs belonging to the same primitive. Before sending a VSP, Mode Injection identifies if the color cache contains the required data. If it is a hit, Mode Injection sends the VSP, which includes an index into the cache. On a cache miss, Mode Injection replaces an entry from the cache with the new color data, prior to sending the VSP packet with the Color cache index pointing to the new entry. Similarly all modes, materials, texture info, and light info settings are cached in the blocks in which they are used. An index for each of these caches is also included in the VSP packet. In addition to the polygon data, the Fragment block caches some texture and mode info. FIG. 56 shows the flow and caching of mode data in the last half of the DSGP pipeline.

The Fragment block's main function is the interpolation of the polygon information provided at the vertices for all active fragments in a VSP. At the output of the Fragment block we still have stamps, with all the interpolated data per fragment. The Fragment block can perform the interpolations of a given fragment in parallel and fragments within a VSP can be done in an arbitrary order. Fully interpolated stamps are forwarded to the Texture, Phong and Bump blocks in the same order as received. In addition, the Fragment block generates Level of Detail (LOD or λ) values for up to four textures and sends them to the Texture block.

The Fragment block will have an adequately sized FIFO in its input to smooth variable stamp processing time and the Color cache fill latency.

Figure 57:
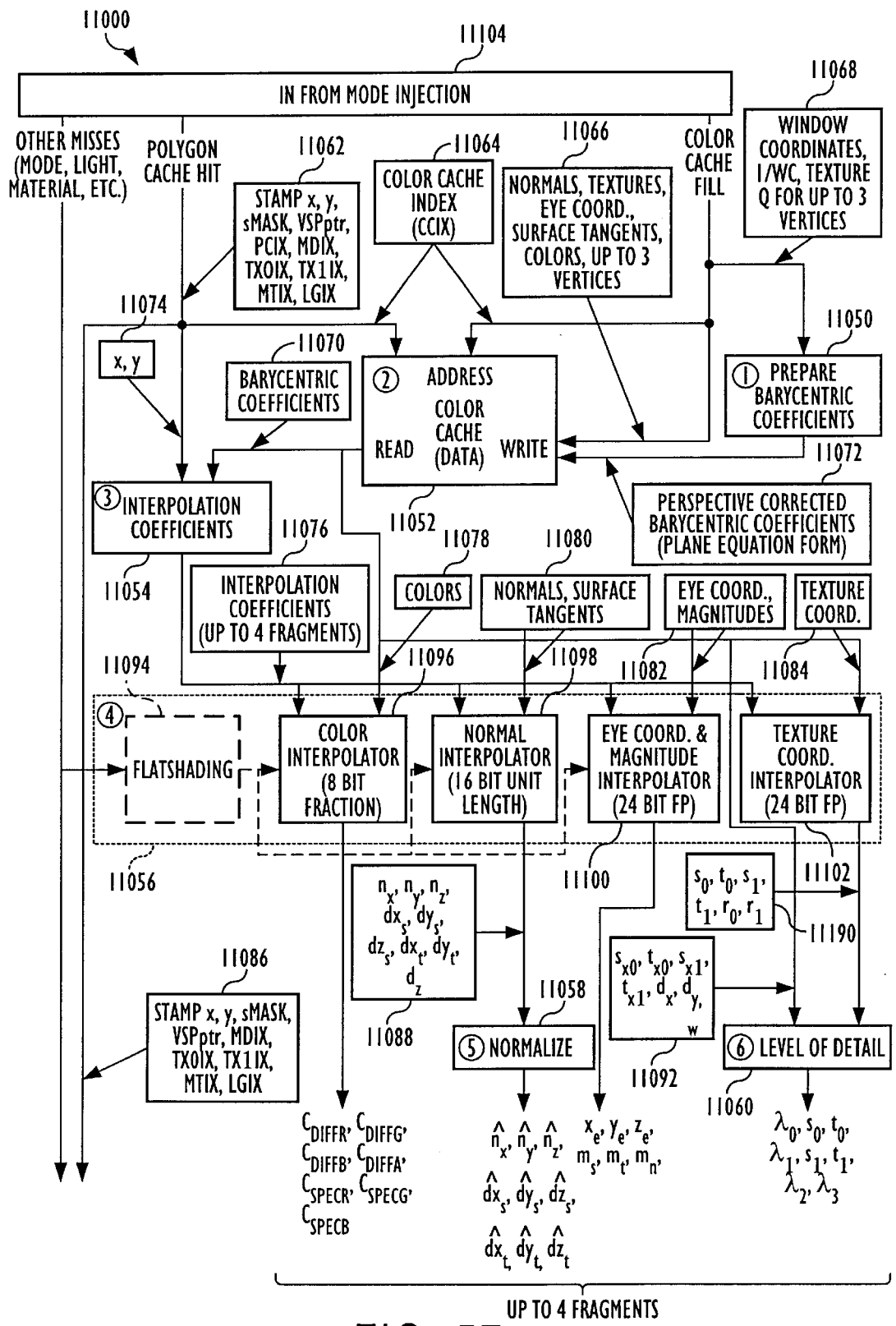
FIG. 57 is a diagrammatic illustration of an exemplary embodiment of the Fragment Block.
Figure 58A:
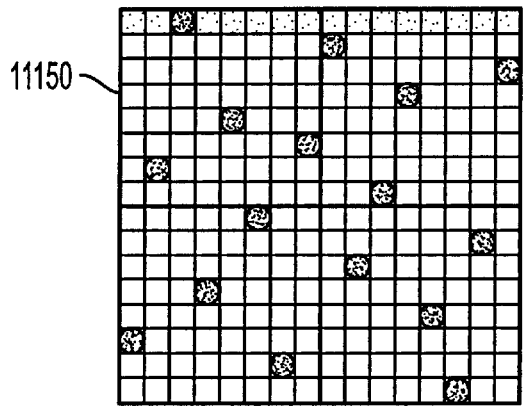
FIG. 58 is a diagrammatic illustration showing examples of VSPs with the pixel fragments formed by various primitives.
Figure 58B:
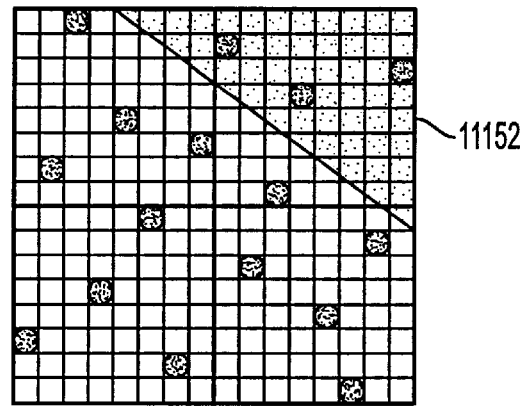
Figure 58C:
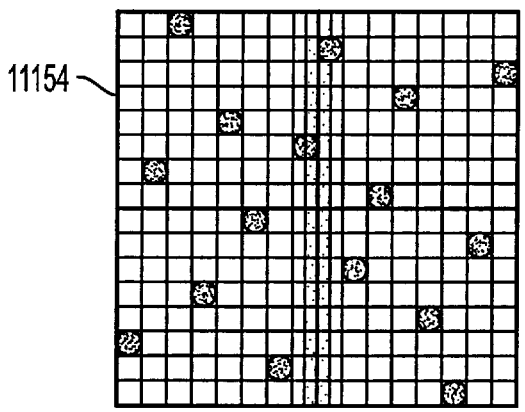
Figure 58D:
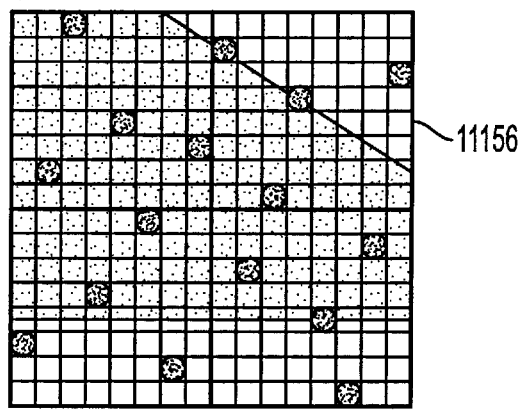

FIG. 57 shows a block diagram of the Fragment block.

The Fragment block can be divided into six sub-blocks. Namely:

1. The cache fill sub-block 11050
2. The Color cache 11052
3. The Interpolation Coefficients sub-block 11054
4. The Interpolation sub-block 11056
5. The Normalization sub-block 11058
6. The LOD sub-block 11060

The first block handles Color cache misses. New polygon data replaces old data in the cache. The Color cache index, CCIX, points to the entry to be replaced. The block doesn't write all of the polygon data directly into the cache. It uses the vertex coordinates, the reciprocal of the w coordinate, and the optional texture q coordinate to calculate the barycentric coefficients. It writes the barycentric coefficients into the cache, instead of the info used to calculate them.

The second sub-block implements the Color cache. When Fragment receives a VSP packet (hit), the cache entry pointed to by CCIX is read to access the polygon data at the vertices and the associated barycentric coefficients.

The third sub-block prepares the interpolation coefficients for the first fragment of the VSP. The coefficients are expressed in plane equation form for the numerator and the denominator to facilitate incremental computation of the next fragment's coefficients. The total area of the triangle divides both the numerator and denominator, therefore can be simplified. Also, since the barycentric coefficients have redundancy built-in (the sum of the fractions are equal to the whole), additional storage and bandwidth is saved by only providing two out of three sets of barycentric coordinates along with the denominator. As a non-performance case, texture coordinates with a q other than 1 will be interpolated using 3 more coefficients for the denominator.

The x and y coordinates given per stamp correspond to the lower left pixel in the stamp. Only the position of the stamp in a tile is determined by these coordinates. A separate packet provides the coordinates of the tile that subsequent stamps belong to. A lookup table is used with the corresponding bits in sMask to determine the lower bits of the fragment x and y coordinates at subpixel accuracy. This choosing of an interpolation location at an active sample location ensures that the interpolation coefficients will always be positive with their sum being equal to one.

The fourth sub-block interpolates the colors, normals, texture coordinates, eye coordinates, and Bump tangents for each covered pixel. The interpolators are divided in four groups according to their precision. The first group interpolates 8 bit fixed point color fractions. The values are between 0 and 1, the binary representation of the value 1 is with all the bits set to one. The second set interpolates sixteen bit, fixed point, unit vectors for the normals and the surface tangent directions. The third set interpolates 24 bit floating point numbers with sixteen bit mantissas. The vertex eye coordinates and the magnitudes of the normals and surface tangents fall into this category. The last group interpolates the texture coordinates which are also 24 bit FP numbers but may have different interpolation coefficients. All interpolation coefficients are generated as 24 bit FP values but fewer bits or fixed point representation can be used when interpolating 8 bit or 16 bit fixed point values.

The fifth sub-block re-normalizes the normal and surface tangents. The magnitudes obtained during this process are discarded. The original magnitudes are interpolated separately before being forwarded to the Phong and Bump block.

The texture map u, v coordinates and Level of Detail (LOD) are evaluated in the sixth sub-block. The barycentric coefficients are used in determining the texture LOD. Up to four separate textures associated with two texture coordinates are supported. Therefore the unit can produce up to four LODs and two sets of s, t coordinates per fragment, represented as 24 bit FP values.

sMask and pMask

FIG. 58 shows examples of VSPs with the pixel fragments formed by various primitives. A copy of the sMask is also sent directly to the Pixel block, bypassing the shading blocks (Fragment, Texture, Phong and Bump). The bypass packet also includes the z values, the Mode and Polygon Stipple Indices and is written in the reorder buffer at the location pointed to by the VSPptr. The pMask is generated in the Fragment block and sent Texture and Phong instead of the sMask. The actual coverage is evaluated in Pixel.

Barycentric Interpolation for Triangles

The Fragment block interpolates values using perspective corrected barycentric interpolation. This section describes the process.

As for the data associated with each fragment produced by rasterizing a triangle, we begin by specifying how these values are produced for fragments in a triangle. We define barycentric coordinates for a triangle 11170 (FIG. 59). Barycentric coordinates are a set of three numbers, $A_0$, $A_1$, and $A_2$, each in the range of [0,1], with $A_0+A_1+A_2=1$. These coordinates uniquely specify any point p within the triangle or on the triangle's boundary as:

$$p(x, y) = A_0(x, y) \times V_0 + A_1(x, y) \times V_1 + A_2(x, y) \times V_2$$

where $V_0$, $V_1$, and $V_2$ are the vertices of the triangle. $A_0$, $A_1$, and $A_2$ can be found as:

$$A_0(x, y) = \frac{Area(p, V_1, V_2)}{Area(V_0, V_1, V_2)}, \quad A_1(x, y) = \frac{Area(p, V_0, V_2)}{Area(V_0, V_1, V_2)},$$

$$A_2(x, y) = \frac{Area(p, V_0, V_1)}{Area(V_0, V_1, V_2)}$$

where Area(i,j,k) denotes the area in window coordinates of the triangle with vertices i, j, and k. One way to compute this area is:

$$Area(V_0, V_1, V_2) = \tfrac{1}{2}(x_{w0}xy_{w1} - x_{w1}xy_{w0} + x_{w1}xy_{w2} - x_{w2}xy_{w1} + x_{w2}xy_{w0} - x_{w0}xy_{w2})$$

Denote a datum at $V_0$, $V$, and $V_2$ as $f_0$, $f_1$, and $f_2$, respectively. Then the value f(x,y) of a datum at a fragment with window coordinate x and y produced by rasterizing a triangle is given by:

$$f(x, y) = \frac{A_0(x, y) \times f_0/w_{c0} + A_1(x, y) \times f_1/w_{c1} + A_2(x, y) \times f_2/w_{c2}}{A_0(x, y) \times a_0/w_{c0} + A_1(x, y) \times a_1/w_{c1} + A_2(x, y) \times a_2/w_{c2}}$$

where $w_{c0}$, $w_{c1}$, $w_{c2}$, are the clip w coordinates of $V_0$, $V_1$, and $V_2$, respectively. $A_0$, $A_1$, and $A_2$, are the barycentric coordinates of the fragment for which the data are produced.

$$a_0 = a_1 = a_2 - 1$$

except for texture s and t coordinates for which:

$$a_0 = q_0, \ a_1 = q_1, \ a_2 = q_2$$

Interpolation for Lines

For interpolation of fragment data along a line a slightly different formula is used:

Let the window coordinates of a produced fragment center be given by $p_r=(x,y)$ and let the $p_2=(x_2,y_2)$ and $p_1=(x_1,y_1)$ the endpoints (vertices) of the line. Set t as the following and note that t=0 at $p_1$ and t=1 at $p_2$:

$$t = \frac{(p_r - p_1) \cdot (p_2 - p_1)}{\|p_2 - p_1\|^2}$$

$$f(x, y) = \frac{(1-t) \times f_1/w_{c1} + t \times f_2/w_{c2}}{(1-t) \times a_1/w_{c1} + t \times a_2/w_{c2}}$$

Interpolation for points

If the primitive is a point no interpolation is done. Vertex 2 is assumed to hold the data. In case q is not equal to one the s, t, and rcoordinates need to be divided by q.

Vector Interpolation

For bump mapping the normal and surface tangents may have a magnitude associated with directional unit vectors. In this case we interpolate the unit vector components separately from the scalar magnitudes. This apparently gives a better visual result than interpolating the x, y and z components with their magnitudes. This is especially important when the direction and the magnitude are used separately.

FIG. 60 shows how interpolating between vectors of unequal magnitude results in uneven angular granularity, which is why we do not interpolate normals and tangents this way.

Fragment x and y Coordinates

Figure 61:
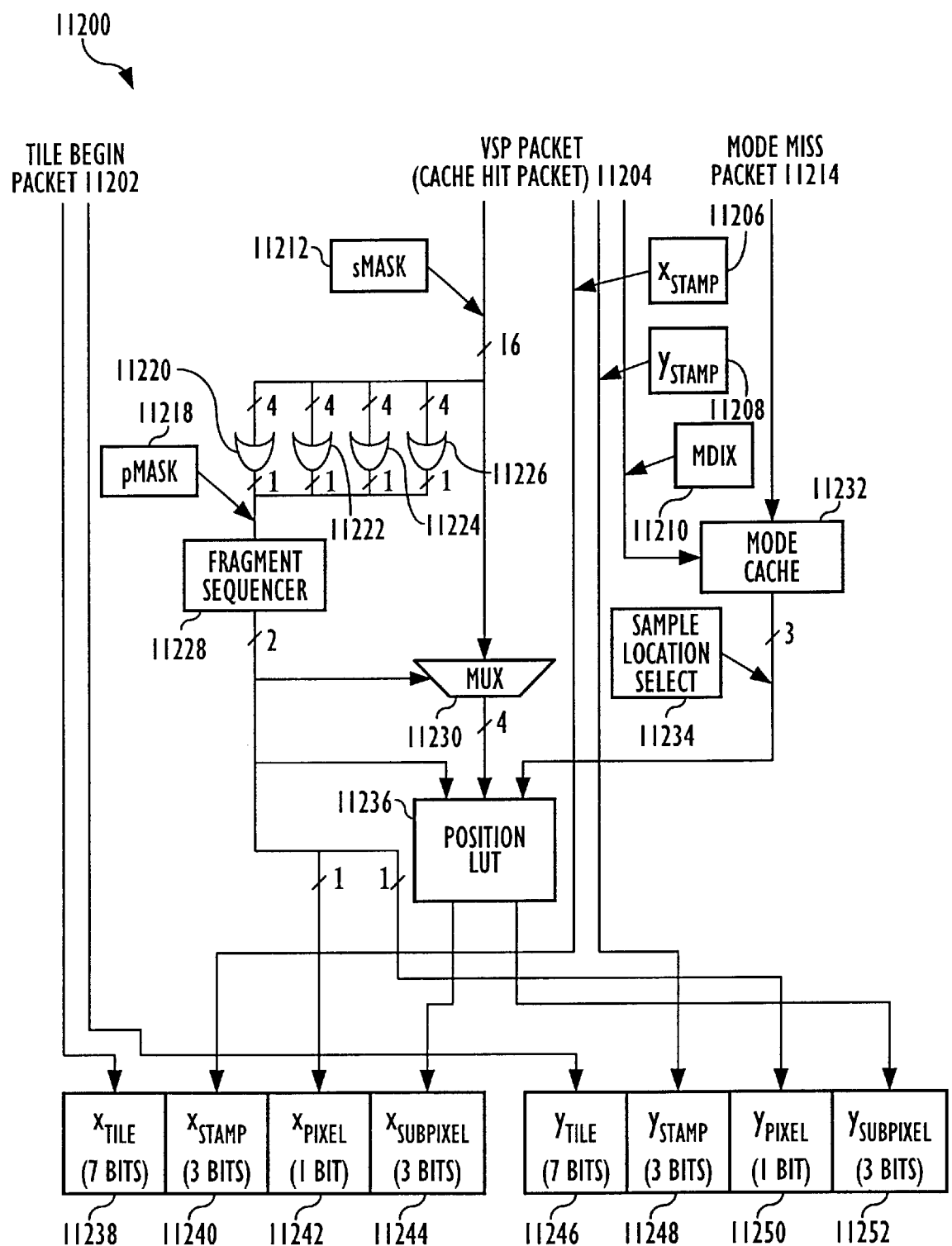
FIG. 61 is a diagrammatic illustration showing how the fragment x and y coordinates used to form the interpolation coefficients in the Fragment Block are formed

FIG. 61 shows how the fragment x and y coordinates used to form the interpolation coefficients are formed. The tile x and y coordinates, set at the beginning of a tile processing form the most significant bits. The sample mask (sMask) is used to find which fragments need to be processed. A lookup table provides the least significant bits of the coordinates at sub-pixel accuracy. We may be able to reduce the size of the LUT if we can get away with 2 bits of sample location select.

Equations

Cache Miss Calculations

First barycentric coefficients will need to be evaluated in the Fragment Unit on a Color cache miss. For a triangle:

$$b_{x0}=y_{w1}-y_{w2}; \ b_{y0}=x_{w2}-x_{w1}; \ b_{k0}=x_{w1}xy_{w2}-x_{w2}xy_{w1}$$

$$b_{x1}=y_{w2}-y_{w0}; \ b_{y1}=x_{w0}-x_{w2}; \ b_{k1}=x_{w2}xy_{w0}-x_{w0}xy_{w2}$$

$$b_{x2}=y_{w0}y_{w1}, \ b_{y2}=x_{w1}-x_{w0}, \ b_{k2}=x_{w0}xy_{w1}-x_{w1}xy_{w0}$$

In the equations above, $x_{w0}$, $x_{w1}$, $x_{w2}$, are the window x-coordinates of the three triangle vertices. Similarly, $y_{w0}$, $y_{w1}$, $y_{w2}$, are the three y-coordinates of the triangle vertices. With the actual barycentric coefficients, all the components need to be divided by the area of the triangle. This is not necessary in our case because of the perspective correction, that forms a denominator with coefficients also divided by the area. For a line with vertex coordinates $x_{w1}$, $x_{w2}$ and $y_{w1}$, $y_{w2}$:

$$b_{x2}=x_{w2}-x_{w1}; \ b_{y2}=y_{w2}-y_{w1}; \ b_{k2}=-(x_{w1} \times b_{x2}+y_{w1} \times b_{y2})$$

$$b_{x1}=-b_{x2}; \ b_{y1}=-b_{y2}; \ b_{k1}=x_{w2} \times b_{x2}+y_{w2} \times b_{y2}$$

$$b_{x0}=0; \ b_{y0}=0; \ b_{k0}=0$$

We now form the perspective corrected barycentric coefficient components:

$$C_{x0}=b_{x0} \times w_{ic0}; \ C_{y0}=b_{y0} \times w_{ic0}; \ C_{k0}=b_{k0} \times w_{ic0}$$

$$C_{x1}=b_{x1} \times w_{ic1}; \ C_{y1}=b_{y1} \times w_{ic1}; \ C_{k1}=b_{k1} \times w_{ic1}$$

$$C_{x2}=b_{x2} \times w_{ic2}, \ C_{y2}=b_{y2} \times w_{ic2}, \ C_{k2}=b_{k2} \times w_{ic2}$$

Where $w_{ic0}$ is the reciprocal of the clip w-coordinate of vertex 0 (reciprocal done in Geometry):

$$w_{ic0} = \frac{1}{w_{c0}}; \quad w_{ic1} = \frac{1}{w_{c1}}; \quad w_{ic2} = \frac{1}{w_{c2}}$$

The denominator components can be formed by adding the individual constants in the numerator:

$$D_x = C_{x0} + C_{x1} + C_{x2}; \quad D_y = C_{y0} + C_{y1} + C_{y2}; \quad D_k = C_{k0} + C_{k1} + C_{k2}$$

The above calculations need to be done only once per triangle. The color memory cache is used to save the coefficients for the next VSP of the same triangle. On a cache miss the coefficients need to be re-evaluated.

Interpolation Coefficients

Next, we prepare the barycentric coordinates for the first pixel of the VSP with coordinates (x,y):

$$W_i(x,y) = D_x \times x + D_y \times y + D_k$$

$$G_0(x,y) = C_{x0} \times x + C_{y0} \times y + C_{k0}$$

$$G_1(x,y) = C_{x1} \times x + C_{y1} \times y + C_{k1}$$

$$G_2(x,y) = W_i(x,y) - G_0(x,y) - G_1(x,y)$$

$$L_0(x,y) = \frac{G_0(x,y)}{W_i(x,y)}; \quad L_1(x,y) = \frac{G_1(x,y)}{W_i(x,y)}; \quad L_2(x,y) = \frac{G_2(x,y)}{W_i(x,y)}$$

Then, for the next pixel in the x direction:

$$W_i(x+1,y) = W_i(x,y) + D_x$$

$$G_0(x+1,y) = G_0(x,y) + C_{x0}$$

$$G_1(x+1,y) = G_1(x,y) + C_{x1}$$

$$G_2(x+1,y) = G_2(x,y) + C_{x2}$$

$$L_0(x+1,y) = \frac{G_0(x+1,y)}{W_i(x+1,y)};$$

$$L_1(x+1,y) = \frac{G_1(x+1,y)}{W_i(x+1,y)};$$

$$L_2(x+1,y) = \frac{G_2(x+1,y)}{W_i(x+1,y)}$$

Or, for the next pixel in the y direction:

$$W_i(x+1,y) = W_i(x\ y) + D_x$$

$$G_0(x+1,y) = G_0(x,y) + C_{x0}$$

$$G_1(x+1,y) = G_1(x,y) + C_{x1}$$

$$G_2(x+1,y) = G_2(x,y) + C_{x2}$$

$$L_0(x+1,y) = \frac{G_0(x+1,y)}{W_i(x+1,y)}; \quad L_1(x+1,y) = \frac{G_1(x+1,y)}{W_i(x+1,y)};$$

$$L_2(x+1,y) = \frac{G_2(x+1,y)}{W_i(x+1,y)}$$

As a non-performance case (half-rate), when texture coordinate $q_n[m]$ is not equal to one, where n is the vertex number (0 to 2) and m is the texture number (0 to 3), an additional denominator f or interpolating texture coordinates is evaluated:

$$D_{qx}[m] = C_x \times q_0[m] + C_{x1} \times q_1[m] + C_{x2} \times q_2[m]$$

$$D_{qy}[m] = C_{y0} \times q_0[m] + C_{y1} \times q_1[m] + C_{y2} \times q_2[m] \text{ if} q_n[m] \neq 1; n=0,1,2; m=0,1,2,3$$

$$D_{qz}[m] = C_{z0} \times q_0[m] + C_{z1} \times q_1[m] + C_{z2} \times q_2[m]$$

$$W_{qi}(x,y)[m] = D_{qx}[m] \times x + D_{qy}[m] \times y + D_{qk}[m]$$

$$L_{q0}(x,y)[m] = \frac{G_0(x,y)}{W_{qi}(x,y)[m]};$$

$$L_{q1}(x,y)[m] = \frac{G_1(x,y)}{W_{qi}(x,y)[m]};$$

$$L_{q2}(x,y)[m] = \frac{G_2(x,y)}{W_{qi}(x,y)[m]}$$

When the barycentric coordinates for a given pixel with (x,y) coordinates are evaluated we use then by interpolate. For a line L0 is not needed but is assumed to be zero in the following formulas.

Interpolation Equations

For full performance mode, we interpolate one set of texture coordinates:

$$s[0] = L_0(x,y) \times s_0[0] + L_1(x,y) \times s_1[0] + L_2(x,y) \times s_2[0]$$

$$t[0] = L_0(x,y) \times t_0[0] + L_1(x,y) \times t_1[0] + L_2(x,y) \times t_2[0]$$

Diffuse and specular colors:

$$R_{Diff} = L_0(x,y) \times R_{Diff_0} + L_1(x,y) \times R_{Diff_1} + L_2(x,y) \times R_{Diff_2}$$

$$G_{Diff} = L_0(x,y) \times G_{Diff_0} + L_1(x,y) \times G_{Diff_1} + L_2(x,y) \times G_{Diff_2}$$

$$B_{Diff} = L_0(x,y) \times B_{Diff_0} + L_1(x,y) \times B_{Diff_1} + L_2(x,y) \times B_{Diff_2}$$

$$A_{Diff} = L_0(x,y) \times A_{Diff_0} + L_1(x,y) \times A_{Diff_1} + L_2(x,y) \times A_{Diff_2}$$

$$R_{Spec} = L_0(x,y) \times R_{Spec_0} + L_1(x,y) \times R_{Spec_1} + L_2(x,y) \times R_{Spec_2}$$

$$G_{Spec} = L_0(x,y) \times G_{Spec_0} + L_1(x,y) \times G_{Spec_1} + L_2(x,y) \times G_{Spec_2}$$

$$B_{Spec} = L_0(x,y) \times B_{Spec_0} + L_1(x,y) \times B_{Spec_1} + L_2(x,y) \times B_{Spec_2}$$

Note that the 8-bit color values are actually fraction between 0 and 1 inclusive. By convention, the missing represented number is $1-2^{-8}$. The value one is represented with all the bits set taking the place of the missing representation. When color index is used instead of R, G, B and A, the 8-bit index value replaces the R value of the Diffuse and the Specular component of the color.

And surface normals:

$$n_x = L_0(x,y) \times n_{ux0} + L_1(x,y) \times n_{ux1} + L_2(x,y) \times n_{ux2}$$

$$n_y = L_0(x,y) \times n_{uy0} + L_1(x,y) \times n_{uy1} + L_2(x,y) \times n_{uy2}$$

$$n_z = L_0(x,y) \times n_{uz0} + L_1(x,y) \times n_{uz1} + L_2(x,y) \times n_{uz2}$$

The normal vector has to be re-normalized after the interpolation:

$$\left\| \begin{matrix} 0 \\ h \end{matrix} \right\|^{-1} = \frac{1}{\sqrt{n_x^2 + n_y^2 + n_z^2}}$$

$$\hat{n}_x = n_x \times \left\| \begin{matrix} 0 \\ h \end{matrix} \right\|^{-1}$$

$$\hat{n}_y = n_y \times \left\| \begin{matrix} 0 \\ h \end{matrix} \right\|^{-1}$$

$$\hat{n}_z = n_x \times \left\| \begin{matrix} 0 \\ h \end{matrix} \right\|^{-1}$$

At half-rate (accumulative) we interpolate the vertex eye coordinate when needed:

$$x_e = L_0(x,y) \times x_{e0} + L_1(x,y) \times x_{e1} + L_2(x,y) \times x_{e2}$$

$$y_e = L_0(x,y) \times y_{e0} + L_1(x,y) \times y_{e1} + L_2(x,y) \times y_{e2}$$

$$z_e = L_0(x,y) \times z_{e0} + L_1(x,y) \times z_{e1} + L_2(x,y) \times z_{e2}$$

At half-rate (accumulative) we interpolate up to four texture coordinates. This is done either using the plane equations or barycentric coordinates. The r-texture coordinates are also interpolated for volume texture rendering but at one third of the full rate.

$$s[1] = L_0(x,y) \times s_0[1] + L_1(x,y) \times s_1[1] + L_2(x,y) \times s_2[1]$$

$$t[1] = L_0(x,y) \times t_0[1] + L_1(x,y) \times t_1[1] + L_2(x,y) \times t_2[1]$$

$$r[0] = L_0(x,y) \times r_0[1] + L_1(x,y) \times r_1[1] + L_2(x,y) \times r_2[0]$$

$$r[1] = L_0(x,y) \times r_0[1] + L_1(x,y) \times r_1[1] + L_2(x,y) \times r_2[1]$$

In case the partials are provided by the user as the bump tangents per vertex, we need to interpolate them. As a simplification the hardware will always interpolate the surface tangents at half rate:

$$\frac{\partial x_e}{\partial s} = L_0(x,y) \times \frac{\partial x_{e0}}{\partial s} + L_1(x,y) \times \frac{\partial x_{e1}}{\partial s} + L_2(x,y) \times \frac{\partial x_{e2}}{\partial s}$$

$$\frac{\partial x_e}{\partial t} = L_0(x,y) \times \frac{\partial x_{e0}}{\partial t} + L_1(x,y) \times \frac{\partial x_{e1}}{\partial t} + L_2(x,y) \times \frac{\partial x_{e2}}{\partial t}$$

$$\frac{\partial y_e}{\partial s} = L_0(x,y) \times \frac{\partial y_{e0}}{\partial s} + L_1(x,y) \times \frac{\partial y_{e1}}{\partial s} + L_2(x,y) \times \frac{\partial y_{e2}}{\partial s}$$

$$\frac{\partial y_e}{\partial t} = L_0(x,y) \times \frac{\partial y_{e0}}{\partial t} + L_1(x,y) \times \frac{\partial y_{e1}}{\partial t} + L_2(x,y) \times \frac{\partial y_{e2}}{\partial t}$$

$$\frac{\partial z_e}{\partial s} = L_0(x,y) \times \frac{\partial z_{e0}}{\partial s} + L_1(x,y) \times \frac{\partial z_{e1}}{\partial s} + L_2(x,y) \times \frac{\partial z_{e2}}{\partial s}$$

$$\frac{\partial z_e}{\partial t} = L_0(x,y) \times \frac{\partial z_{e0}}{\partial t} + L_1(x,y) \times \frac{\partial z_{e1}}{\partial t} + L_2(x,y) \times \frac{\partial z_{e2}}{\partial t}$$

The surface tangents also have to be normalized, like the normals, after interpolation.

We also use the barycentric coefficients to evaluate the partial derivatives of the texture coordinates s and t with respect to window x and y-coordinates:

$$\frac{\partial s}{\partial x}[m] = \frac{\partial L_0(x,y)}{\partial x} \times s_0[m] + \frac{\partial L_1(x,y)}{\partial x} \times s_1[m] + \frac{\partial L_2(x,y)}{\partial x} \times s_2[m]$$

$$\frac{\partial t}{\partial x}[m] = \frac{\partial L_0(x,y)}{\partial x} \times t_0[m] + \frac{\partial L_1(x,y)}{\partial x} \times t_1[m] + \frac{\partial L_2(x,y)}{\partial x} \times t_2[m]$$

-continued $$\frac{\partial s}{\partial y}[m] = \frac{\partial L_0(x,y)}{\partial y} \times s_0[m] + \frac{\partial L_1(x,y)}{\partial y} \times s_1[m] + \frac{\partial L_2(x,y)}{\partial y} \times s_2[m]$$

$$\frac{\partial t}{\partial y}[m] = \frac{\partial L_0(x,y)}{\partial y} \times t_0[m] + \frac{\partial L_1(x,y)}{\partial y} \times t_1[m] + \frac{\partial L_2(x,y)}{\partial y} \times t_2[m]$$

$$\frac{\partial L_0(x,y)}{\partial x} = \frac{C_{x0} - D_x \times L_0(x,y)}{W_i(x,y)}$$

$$\frac{\partial L_1(x,y)}{\partial x} = \frac{C_{x1} - D_x \times L_1(x,y)}{W_i(x,y)}$$

$$\frac{\partial L_2(x,y)}{\partial x} = \frac{C_{x2} - D_x \times L_2(x,y)}{W_i(x,y)}$$

$$\frac{\partial L_0(x,y)}{\partial y} = \frac{C_{y0} - D_y \times L_1(x,y)}{W_i(x,y)}$$

$$\frac{\partial L_1(x,y)}{\partial y} = \frac{C_{y1} - D_y \times L_1(x,y)}{W_i(x,y)}$$

$$\frac{\partial L_2(x,y)}{\partial y} = \frac{C_{y2} - D_y \times L_2(x,y)}{W_i(x,y)}$$

$$\frac{\partial s}{\partial x}[m] = \frac{C_{x0} \times s_0[m] + C_{x1} \times s_1[m] + C_{x2} \times s_2[m] - D_x \times s[m]}{W_i(x,y)}$$

$$\frac{\partial t}{\partial x}[m] = \frac{C_{x0} \times t_0[m] + C_{x1} \times t_1[m] + C_{x2} \times t_2[m] - D_x \times t[m]}{W_i(x,y)}$$

$$\frac{\partial s}{\partial y}[m] = \frac{C_{y0} \times s_0[m]_{C_{y1}} \times s_1[m] + \times C_{y2} \times s_2[m] - D_y \times s[m]}{W_i(x,y)}$$

$$\frac{\partial t}{\partial y}[m] = \frac{C_{y0} \times t_0[m] + C_{y1} \times t_1[m] + C_{y2} \times t_2[m] - D_y \times t[m]}{W_i(x,y)}$$

In the event of $q_n[m]$ is not equal to one, $W_i(x,y)$ is replaced by $W_{qi}[m](x,y)$.

This is a good introduction for an alternative way of evaluating the interpolated s, t and their partials:

$$s[m] = \frac{S_x[m] \times x + S_y[m] \times y + S_k[m]}{W_i(x,y)}$$

$$S_x[m] = C_{x0} \times s_0[m] + C_{x1} \times s_1[m] + C_{x2} \times s_2[m]$$

$$S_y[m] = C_{y0} \times s_0[m] + C_{y1} \times s_1[m] + C_{y2} \times s_2[m]$$

$$S_k[m] = C_{k0} \times s_0[m] + C_{k1} \times s_1[m] + C_{k2} \times s_2[m]$$

$$\frac{\partial s}{\partial x}[m] = \frac{S_x[m] - D_x \times s[m]}{W_i(x,y)}$$

$$s[m](x+1, y) = \frac{s_n(x,y)[m]_{s_x}(m)}{W_i(x,y) + D_x}$$

$$s_n(x,y)[m] = S_x[m] \times x + S_y[m] \times y + S_k[m]$$

Other terms can be evaluated similarly. Note that all values that need to be interpolated, like colors and normals could be expressed in this plane equation mode and saved in the triangle info cache to reduce the computation requirements with the incremental evaluation approach.

We define:

$$u(x,y) = 2^n \times s(x,y)$$

$$v(x,y) = 2^m \times t(x,y)$$

$$\rho(x,y) = \max\left\{\sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial v}{\partial y}\right)^2}\right\}$$

$$\lambda = \log_2[\rho(x,y)]$$

Here, λ is called the Level of Detail (LOD) and p is called the scale factor that governs the magnification or minification of the texture image. n and m are the width and the height of a two dimensional texture map. The partial derivatives of u and v are obtained using the partials of s and t. For one dimension texture map t, v, and the partial derivatives δv/δx and δv/δy are set to zero.

For a line the formula is:

$\Delta x = x_2 - x_1; \Delta y = y_2 - y_1$

The DSGP pipeline supports up to four textures with two sets of texture coordinates. Specifically, for i=0..3 if: TEXTURE_1D[i]==1 or TEXTURE_2D[i]==1 then we compute λ using the texture coordinates TEXTURE_COORD_SET_SOURCE[i].

The Fragment block passes s, t, r, and λ to the Texture block for each active texture. Note that λ is not the final LOD. The Texture block applies additional rules such as LOD clamping to obtain the final value for λ.

Memory Caching Schemes

Fragment uses three caches to perform the needed operations. The primary cache is the Color cache. It holds the color data for the primitive (triangle, line, or point). The cache miss determination and replacement logic is actually located in the Mode Inject block. The Fragment block normally receives a "hit" packet with an index pointing to the entry that hold the associated Color data. If a miss is detected by the Mode Inject block, a "fill" packet is sent first to replace an entry in the cache with the new data before any "hit" packets are sent to use the new data. Therefore it is important not to change the order of packets sent by Mode Inject, since the cache replacement and use logic assumes that the incoming packets are processed in order.

The Fragment block modifies some of the data before writing in the Color cache during cache fills. This is done to prepare the barycentric coefficients during miss time. The vertex window coordinates, the reciprocal of the clip-w coordinates at the vertices and texture q coordinates at the vertices are used and replaced by the $C_{x[1:0]}, C_{y[1:0]}, C_{k[1:0]}$, $D_x, D_y, D_k$ barycentric coefficients. Similarly the $S_x, S_y, T_x$, and $T_y$, values are evaluated during cache misses and stored along with the other data.

The Color cache is currently organized as a 256 entry, four set associative cache. The microArchitecture of the Mode Inject and Fragment Units may change this organization provided that the performance goals are retained. It assumed that at full rate the Color cache misses will be less than 15% of the average processed VSPs.

The data needed at half rate is stored as two consecutive entries in the Color cache. The index provided in this case will be always be an even number.

For the texture information used in the Fragment block two texture mode caches are used. These are identically organized caches each holding information for two textures. Two texture indices, TX0IX and TX1IX, are provided in every "hit" packet to associate the texture coordinates with up to four textures. Per texture the following data is read from the texture mode caches:

TEXTURE_1D, TEXTURE_2D, TEXTURE_3D are the enable bits for a given texture.

TEXTURE_HIGH, TEXTURE_WIDTH define respectively the m and n values used in the u and v calculations.

TEXTURE_COORD_SET_SOURCE identifies which texture coordinate is bound to a given texture.

The texture mode caches are organized as a 32 entry fully associative cache. The assumed miss rate for texture mode cache 0 is less than 0.2% per VSP.

In addition, modes are also cached in Fragment in a Mode Cache. The Mode Cache is organized as a fully associative, eight-entry cache. The assumed miss rate is 0.001% per VSP (negligible). The following info is cached in the Mode Cache:

SHADE_MODEL (1 bit),
BUMP_NOINTERPOLATE (1 bit)
SAMPLE_LOCATION_SELECT (3 bits)

Possible Future Considerations

The order of processing of VSPs can also be changed. A reorder buffer before the Pixel block reassembles the stamps. VSPs that share the same x and y coordinates (belonging to separate primitives) need to be presented to Pixel in arrival order. VSPptr accompanies each VSP, indicating the VSP's position in the reorder buffer. The buffer is organized as a FIFO, where the front-most stamp for which the shading has completed is forwarded to the Pixel block.

Another consideration for the VSP processing order is the various mode caches. Mode index assumes that "hit" packets will not cross "miss" packets. This means the "miss" packets form a barrier for the "hit" packets. Obviously the process order can be changed after fetching the corresponding mode cache info, provided the downstream block sees the packets at the same order provided by Mode Injection.

Texture Block (TEX)

Overview

Polygons are used in 3D graphics to define the shape of objects. Texture mapping is a technique for simulating surface textures by coloring polygons with detailed images. Typically, a single texture map will cover an entire object that consists of many polygons. A texture map consists of one or more rectangular arrays of RGBA color (up to 2 K by 2 K in Apex). The user supplies coordinates, either manually or automatically in the Geometry Block, into the texture map at each vertex. These coordinates are interpolated for each fragment, the texture values are looked up in the texture map and the color assigned to the fragment. Bump map coefficients are obtained similarly using the light_texture extension. See the Phong Block for details.

Because objects appear smaller when they're farther from the viewer, texture maps must be scaled so that the texture pattern appears the same size relative to the object being textured. Of course, scaling and filtering a texture image for each fragment is an expensive proposition. Mipmapping allows the renderer to avoid some of this work at run-time. The user provides a series of texture arrays at successively lower resolutions, each array representing the texture at a specified level of detail (LOD or λ). The Fragment Block calculates a level of detail value for each fragment, based on its distance from the viewer, and the Texture Block interpolates between the two closest mipmap arrays to produce a texture value for the fragment. For example, if a fragment has λ=0.5, the Texture Block interpolates between the arrays representing λ=0 and λ=1.

The Apex Board supports texture mapping with tri-linear mipmapping at 250 M textured fragments/sec. Up to eight texture maps and eight sets of texture coordinates per fragment are supported at proportionally lower performance. Apex handles bump maps as textures, using either the SGI extensions or height gradient fields. It will perform 3-D texture mapping at a somewhat slower rate, because the texel cache will perform less efficiently due to less optimal texel reuse.

We will support the following extensions to OpenGL 1.1 in Apex:

Multitexture . . . up to 8 texture maps and 8 sets of texture coordinates per fragment 3D textures . . . 3D textures are supported with bi-linear blending. Tri-linear mip-mapping for 3D textures is handled in software.

LOD clamping . . . requiring that only a subset of the texture LODs be used for mip-mapping.

Edge Clamp . . . a sane way to do clamped textures.

Shadow . . . a simple extension to support multipass shadows.

signed data type support for bump and depth textures (12-12-12 and 16-16)

Edge Clamping, LOD clamping, and 3D textures are part of OpenGL 1.2.

The Texture Block caches texels to get local reuse. Texture maps are stored in texture memory in 2×2 blocks of RGBA data (16 bytes per block) except for normal vectors, which may be stored in 18 byte blocks (6-6-6).

Virtual Texture Numbers

The user provides a texture number when the texture is passed from user space with OpenGL calls. The user can send some triangles to be textured with one map and then change the texture data associated with the same texture number to texture other triangles in the same frame. Our pipeline requires that all sets of texture data for a frame be available to the Texture Block. In software, we assign a virtual texture number to each texture map.

Texture Memory

Texture Memory stores texture arrays that the Texture Block is currently using. Software manages the texture memory, copying texture arrays from host memory into Texture Memory. It also maintains a table of texture array addresses in Texture Memory.

Texture Addressing

Figure 62:
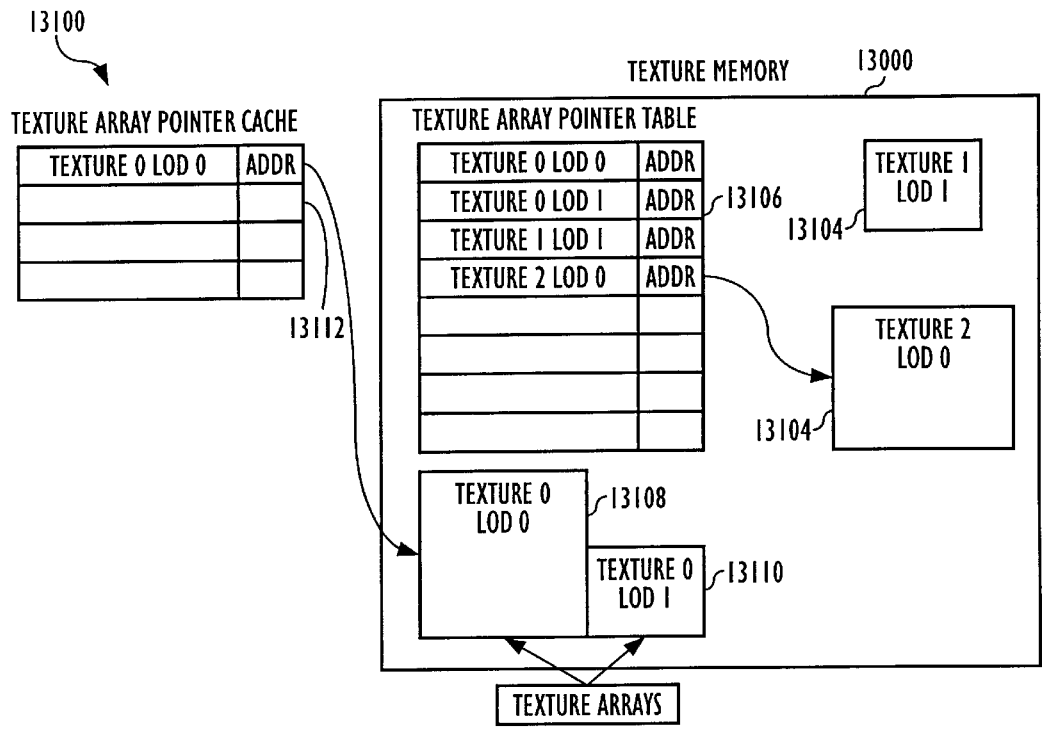
FIG. 62 is a diagrammatic illustration showing an overview of texture array addressing.

The Texture Block identifies texture arrays by virtual texture number and LOD. The arrays for the highest LODs are lumped into a single record. (In one embodiment, seven LOD s each contain 21 kilobytes.) A texture array pointer table associates a texture array ID (virtual texture number concatenated with the LOD) with an address in Texture Memory. We need to support thousands of texture array pointers, so the texture array pointer table will have to be stored in Texture Memory. We need to map texture array IDs to addresses ~500 M times per second. Fortunately, adjacent fragments will usually share the same the texture array, so we should get good hit rates with a cache for the texture array pointers. (In one embodiment, the size of the texture array cache is 128 entries, but other sizes, larger or smaller, may be implemented.) FIG. 62 gives an overview of texture array addressing.

The Texture Block implements a double hashing algorithm to search the pointer table in memory. Software manages the texture array pointer table, using the hardware hashing algorithm to store table elements.

Texture Memory Allocation

Software handles allocation of texture memory. The Texture Block sends an interrupt to the host when it needs a texture array that is not already in texture memory. The host copies the texture array from main memory to texture memory, and updates the texture array pointer table, as described above. The host controls which texture arrays are overwritten by new data.

The host will need to rearrange texture memory to do garbage collection, etc. The hardware will support the following memory copies:

host to memory memory to host memory to memory

A synchronization scheme will be implemented to insure correct behavior. A brute force approach would be to flush the Texture Block prior to any memory copy activity. However, we can probably get away with a more relaxed scheme based around the texture array pointer table 13106. Software can control synchronization through a few commands to start, stop, and flush the texture pipeline. See "Host Commands," below.

Contents of Texture Memory

A texture array is divided into 2×2 texel blocks. Each texel block in an array is represented in Texture Memory by a 16 or 18 byte record containing RGBA, RGB, or height gradient data for four texels. Texturing a given fragment with tri-linear mip-mapping requires accessing 2 to 8 of these blocks, depending on where the fragment falls relative to the 2×2 blocks.

Texture Memory Data Paths

In addition to the normal path between Texture Memory and the Texture Block, there is a path from host memory to Texture Memory. The bandwidth should be about 500 MB/s. This "Back Door Bus" path connects the framebuffer and Texture Memory to the host. We also support memory to memory copies in Texture Memory under the control of software.

Texture Formats

In hardware, we support the OpenGL internal formats RGBA8, RGB12 (signed), and LUMINANCE16_ALPHA16 (signed). Software will support the other formats that use a subset of the storage of these formats, e.g., RGB8. Some uses of Texture Memory, e.g., for bump map coefficients, may interpret the texel bits in other ways. We will support 16-bit interpolations for bump map textures. After the Texture Block, all colors are treated as 8 bit quantities except for light_texture quantities like normals, depth, and height fields.

To support the formats described above, we need to perform linear interpolation calculations on two sets 16-bit values, three sets of 12-bit values, or four sets of 8-bit values. The Texture Block uses four sets of arithmetic units for the calculations: two with 16 bit precision, one with 12 bit precision, and one with 8 bit precision.

Note that all 16 and 12 bit operations are signed. Treating regular colors as signed 12 bit numbers will still preserve more than 8 bits unsigned.

Video Textures

Video feed will be in one of several YUV (or YIQ) formats. We will do the conversion to RGB and pack the values into texel format (2×2 blocks instead of scanline order) by using the 2D core to translate to RGB and using the Rambus masked writes to store the texels in 2×2 blocks.

Phong and Bump Mapping Block (PHB)

Algorithm Overview

The Phong Block calculates the color of a fragment by combining the color, material, geometric, and lighting information from the Fragment Block with the texture information from the Texture Block. The result is a colored fragment, which is forwarded to the Pixel Block where it is blended with any color information already residing in the frame buffer.

Note that Phong does not care about the concepts of frames, tiles, or screen-space.

Color Index Mode

Texture and fragment lighting operations do not take place in color index mode. The only calculations performed by the Phong Block are the fog calculations. In this case the mantissa of the R value of the incoming fragment color is interpreted as an 8-bit color index varying from 0 to 255, and is routed directly to the fog block for processing.

Pipeline Position

The Phong Block is located after Texture and before Pixel. It receives packets from both Texture and Fragment. Fragment sends per-fragment data as well as cache fill packets that are passed through from mode injection. Texture sends only texel data.

Figure 63:
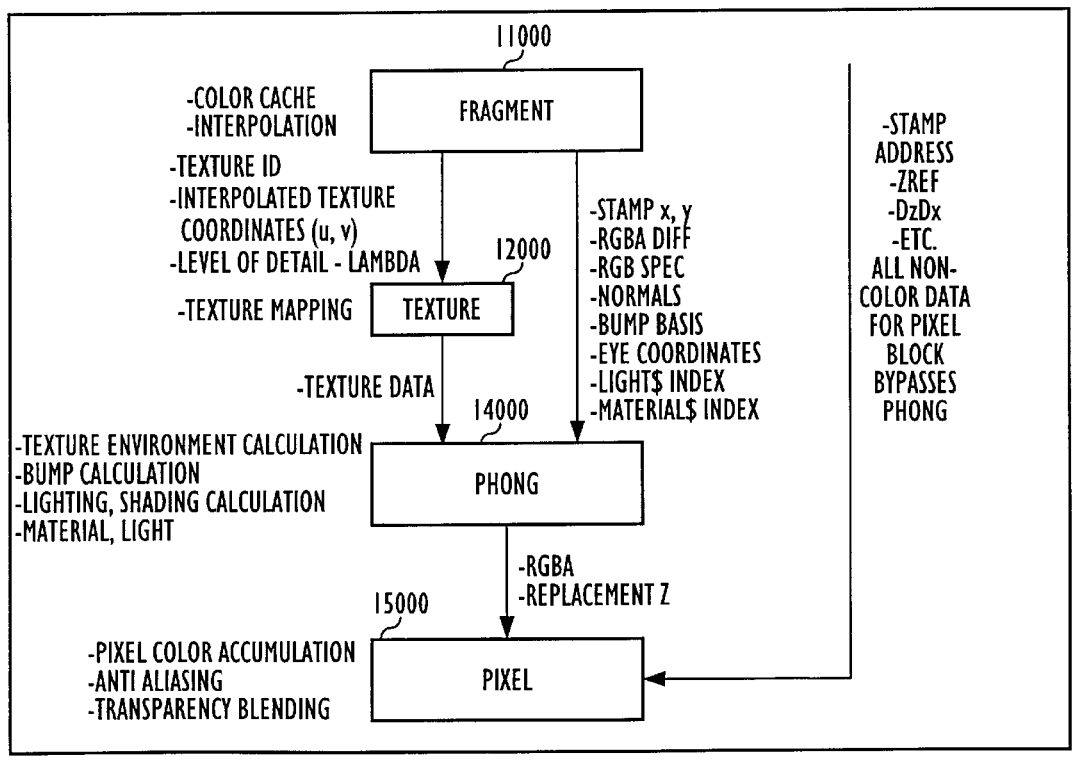
FIG. 63 is a diagrammatic illustration showing the Phong unit position in the pipeline and relationship to adjacent blocks.

Only the results produced by Phong are sent to Pixel; all other data required by Pixel comes via a separate data path. FIG. 63 shows Phong's position in the pipeline and relationship to adjacent blocks.

The Phong Block has two internal caches: the "light" cache which holds infrequently changing information such as scene lights and global rendering modes, and the "material" cache which holds information that generally changes on a per-object basis.

Phong Computational Blocks

Figure 64:
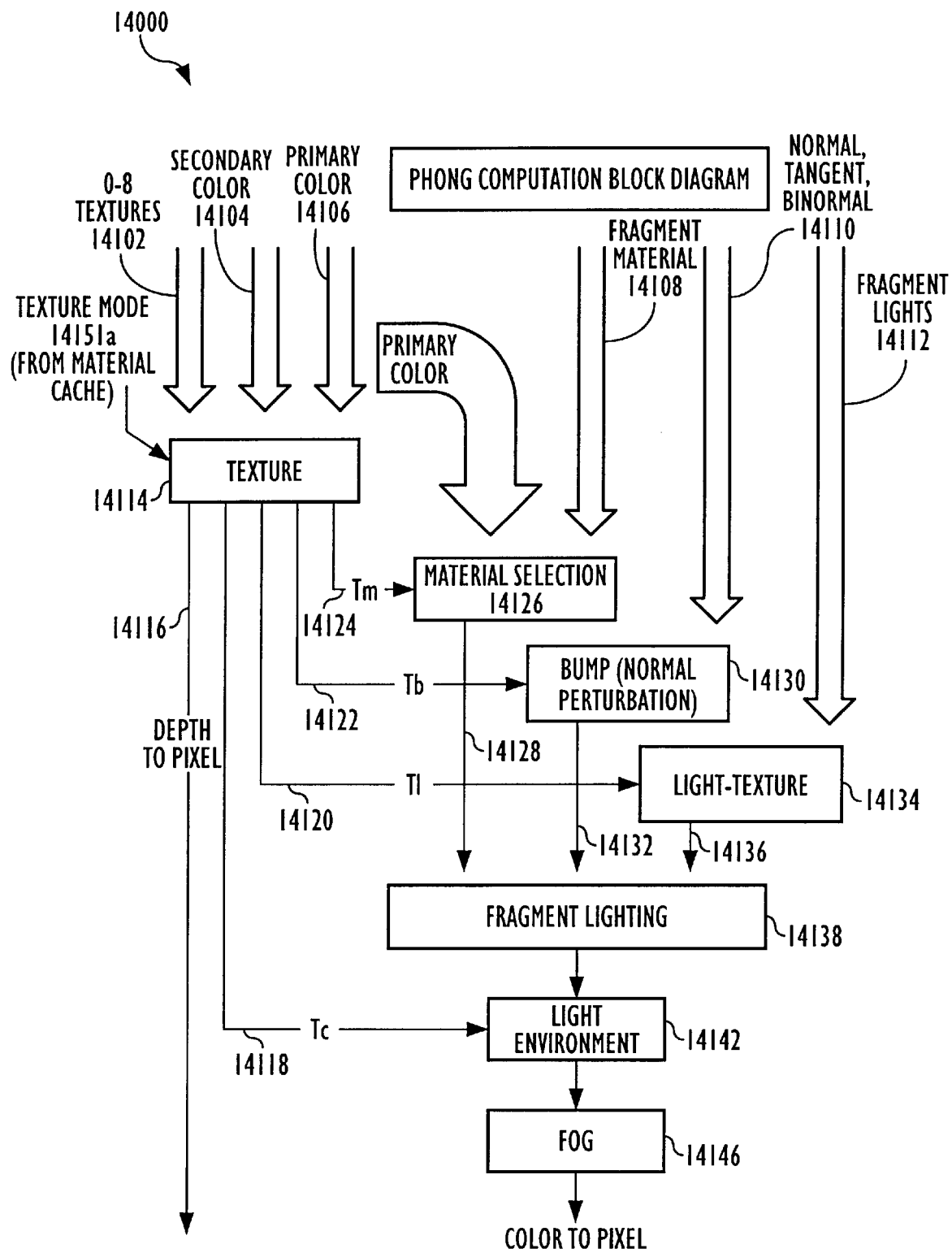
FIG. 64 is a diagrammatic illustration showing a block diagram of Phong comprised of several sub-units.

The Phong procedure is composed of several sub-computations, which are summarized here. Pseudo-code along with details of required data and state information are describe later in this specification. FIG. 64 shows a block diagram of Phong, showing the various computations performed.

Texture Computation

Texture computation 14114 accepts incoming texels from the Texture Block and texture mode information from the material cache. Applies the texture-environment calculation and merges multiple textures if present. Forwards the result to the light-environment subunit in the case of the conventional use of textures, or to other subunits such as bump in case the texture is to be interpreted as modifying some parameter of the Phong calculation other than color.

Material Computation

Material computation 14126 determines the source of the material values for the lighting computation. Using current material mode bits, may decide to replace the fragment material with texture values or with incoming primary color originating in the Gouraud calculation. This data will be stored in Texture Memory and displayed as a normal texture.

Bump Computation

Bump computation 14130 determines the surface normal. May simply pass through the normal as interpolated by Fragment, or may use a texel value in a calculation that involves a 3x3 matrix multiply.

Light-Texture Computation

Light-Texture computation 14134 decides whether any of the components of the lights should be replaced by a texel forwarded from the texture computation.

Fragment Lighting Computation

Fragment lighting computation 14138 performs the actual lighting calculation for this fragment using an equation similar to that used for per-vertex lighting in the GEO block.

Light Environment Computation

Light environment computation 14142 blends the result of the fragment lighting computation with the texture color forwarded from the Texture Block.

Fog Computation

Fog computation 14146 applies "fog"; modifies the fragment color using a computation that depends only on the distance from the viewer's eye to the fragment. Forwards the final result to the Pixel Block.

Pixel Block (PIX)

Overview of the Pixel Block

The Pixel Block (PIX) is the last block before the Backend in the 3D pipeline. It is responsible for OpenGL and Direct3D per-fragment operations. These operations include alpha test, stencil test, depth test, blending, dithering, and logic operations. The pixel ownership test is a part of the window system (see Ch. 4 of the OpenGL 1.1 Specification) and is done in the Backend. In addition to these operations, Pixel performs sample accumulation for antialiasing.

The pipeline stages before PIX convert the primitives into VSPs. A VSP corresponds to the visible portion of a polygon on the stamp. A stamp is a 2×2 pixel area of the image. The SRT block is responsible for collecting the primitives for each tile. The CUL block receives the data from the SRT block in tile order, and culls out parts of the primitives that definitely do not contribute to the rendered images. The CUL block generates the VSPs. The TEX and PHG units also receive the VSPs and are responsible for the texturing and lighting of the fragments respectively.

The PIX block receives input from the Mode Injection (MIJ) and Phong (PHG) Blocks. The VSPs and the mode packets are received from MIJ, while fragment colors for the VSPs are received from PHG. PHG may also supply per-fragment z values for VSPs. This happens when an object has a depth texture applied to it. Note is that the fragment colors for the VSPs arrive at the PIX block in the same order as the VSPs. The PIX block processes the data for each visible sample according to the applicable mode settings. When PIX finishes processing all stamps for the current Tile, it signals the PixelOut (PXO) unit to output the color, z-, and stencil buffers for the Tile. The PixelOut unit processes the pixel samples to generate color, z, and stencil values for the pixels. These pixel values are sent to the Backend (BKE) block. The RDRAM memory controller for the framebuffer is in the BKE block. The BKE block prepares the current tile buffers for rendering of geometry (VSPs) by PIX. This may involve loading of the existing color, z, and stencil values from the framebuffer.

Figure 65:
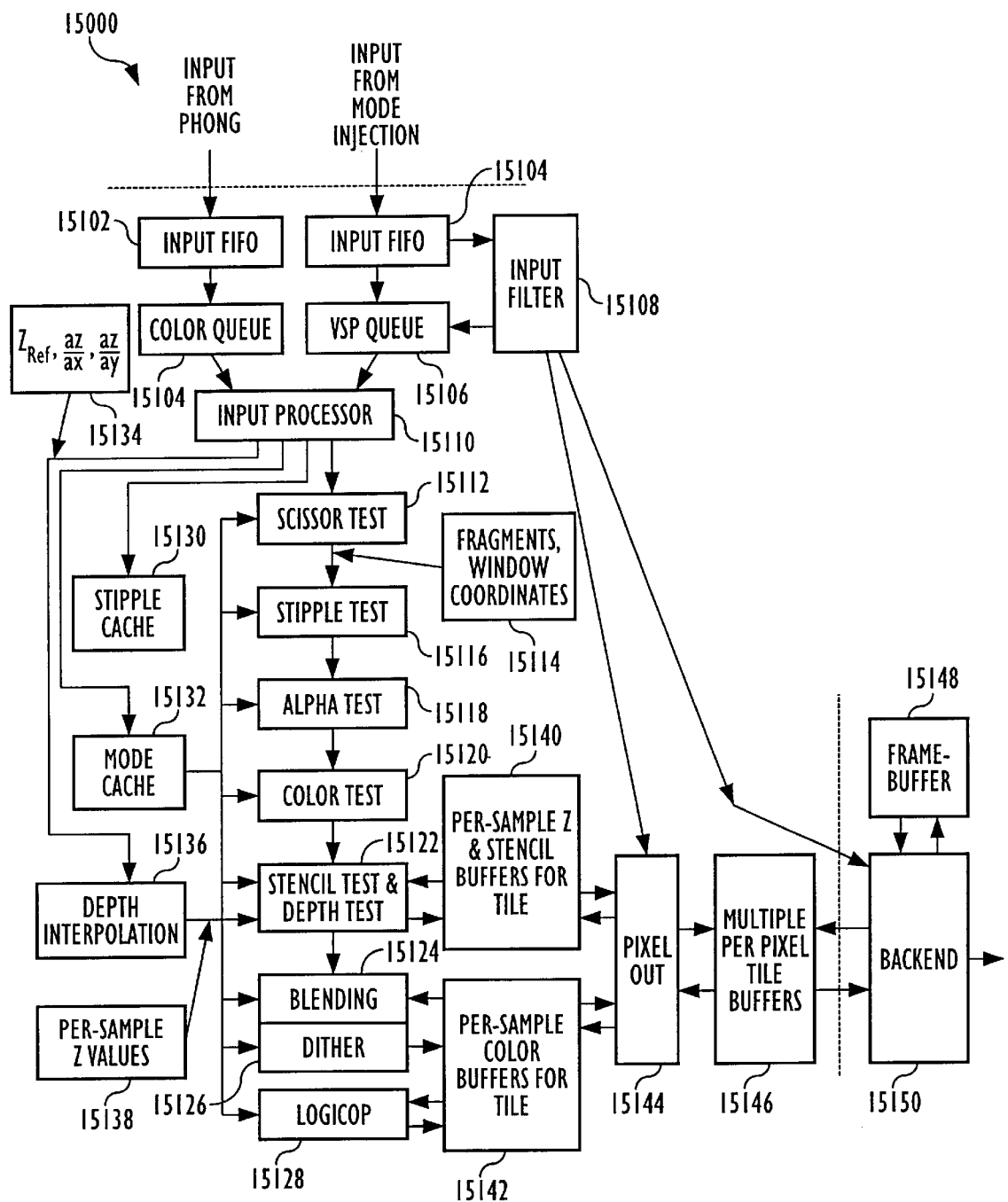
FIG. 65 is a diagrammatic illustration showing a block diagram of the PIX block.

FIG. 65 shows a block diagram of the Pixel Block (PIX) block.

The per-sample z, stencil and color buffer are double buffered. Thus, while PixelOut is sending one Tile to the backend, the depth and blend units may be writing to the second Tile. The per-sample color, z-, and stencil buffers are large enough to store one Tile's worth of data, i.e. 1024 samples. There is also a set of per-pixel z, stencil, and color buffers for each tile. These per-pixel buffers are used as intermediate storage for interfacing with the BKE block.

PIX also receives some packets bound for the backend (BKE) block from MIJ. The input filter appropriately passes these packets on to the Backend Prefetch Queue, where they are processed in the order received. Some packets are also sent to the queue in the PixelOut unit. As mentioned before, the PIX block receives input from the MIJ and PHG blocks. There are two input queues to handle these two inputs. The data packets from MIJ go to the VSP queue and the fragment Color/depth packets from PHG go to the Color queue. The PIX block may also receive some packets bound for the BKE block. Some of the packets are also copied into the input queue of the PixelOut unit. The BKE and PXO blocks process the data packets in the order received. MIJ places the data packets in the input FIFO. The input filter examines the packet header, and sends the data bound for the BKE block to the BKE block and the data packets needed by PIX to the VSP queue. Majority of the packets received from MIJ are bound for the VSP queue, some go only to the BKE block, and some are copied into the VSP queue as well as sent to the BKE and PXO units.

We digress a little to explain need and mechanism for tile preparation. A typical rendering sequence may have the following operations:

1. Initialize the color, z, and stencil buffers to their clear values if needed
2. Bit background image(s) into the buffer(s) if needed
3. Render geometry
4. Another Bit
5. Render some more geometry
6. Done and flip If the Bit operation in step 2 covers the entire window, then clearing operation for that buffer may not be needed. If the Bit covers the partial window then clear may be needed. Furthermore, the operations 1 and 2 may happen in reverse order, i.e. there may be a Bit to (perhaps) the whole window followed by a clearing of a part of the window. The pre-geometry Bits that cover the entire window and do not require scissor test, tile alignment, and scaling may be carried out by the BKE block as image read back into the tile buffers. The post-geometry Bits and the Bits that cover part of the window or involve scaling are implemented as textured primitives in the pipeline. Similarly, the Clear operation is broken into two kinds. The entire window Clear operation is carried out in the PixelOut unit and the Clear operation that covers only part of the window is carried out in the PIX pipeline. Both PIX (and PixelOut, which is part of PIX) and BKE are aware of the write masks for various buffers at the time the operation is invoked. In fact, BKE block uses the write masks to determine if it needs to read back the tile buffers. The readback of tile buffers may also arise when the rendering of a frame causes Polygon or Sort Memory to overflow. The pipeline breaks a user frame into two or more sequential frames. Thus for the same user frame, a tile may be visited more than once in the PIX block. The first time a tile is encountered, the PIX (perhaps the PixelOut unit) block may need to clear the on-chip tile buffers with the "clear values" prior to rendering. For rendering the Tiles in subsequent frames, the pixel color, z, and stencil values are read back from the framebuffer memory. Another very likely scenario occurs when z-buffer is cleared and the color and stencil buffers are loaded into tiles from a pre-rendered image. Thus as a part of the tile preparation, two things happens. The background image is read back from the framebuffer memory into the bit planes that are not enabled and the enabled bit planes (corresponding to the color, z, and stencil masks) are cleared. The pipeline stages upstream from PIX need to be aware of these functional capabilities, since they are responsible for sending the "Clear" information.

PIX compares the z values of the incoming samples to those of the existing pixels to decide which samples to keep. Pixel also provides state bits so that any color bleeding artifacts resulting from the splitting of a user frame due to overflow are minimized.

Functional Units Within the Pixel Block

For the functional units within the Pixel block, note that color, alpha, and stipple values are generated per-fragment, and therefore the results of corresponding test apply to all samples in the fragment. The same is true of the scissor test as well. It is tempting to implement optimizations based on the per-fragment and per-sample computations.

The major difference between pixel stencil operations and sample stencil operations lies in how the stencil value is retrieved from and written into the tile buffer.

Backend Block (BKE)

Functional Overview

Terminology

The following terms are defined below before they are used to ease the reading of this document. The reader may prefer to skip this section and refer to it as needed.

Pixel Ownership (PO BOX) is a sub-unit that determines for a given pixel on the screen the window ID it belongs. Using this mechanism, scanout determines if there is an overlay window associated with that pixel, and 3D tile write checks the write permission for that pixel.

BKE Bus is the interconnect that interfaces BKE with TDG, CFD and AGI. This bus is used to read and write into the Frame Buffer Memory and BKE registers.

Frame Buffer (FB) is the memory controlled by BKE that holds all the color and depth values associated with 2D and 3D windows. It includes the screen buffer that is displayed on the monitor by scanning-out the pixel colors at refresh rate. It also holds off screen overlay and p-buffers, display lists and vertex arrays, and accumulation buffers. The screen buffer and the 3D p-buffers can be dual buffered.

Main Functions

Figure 66:
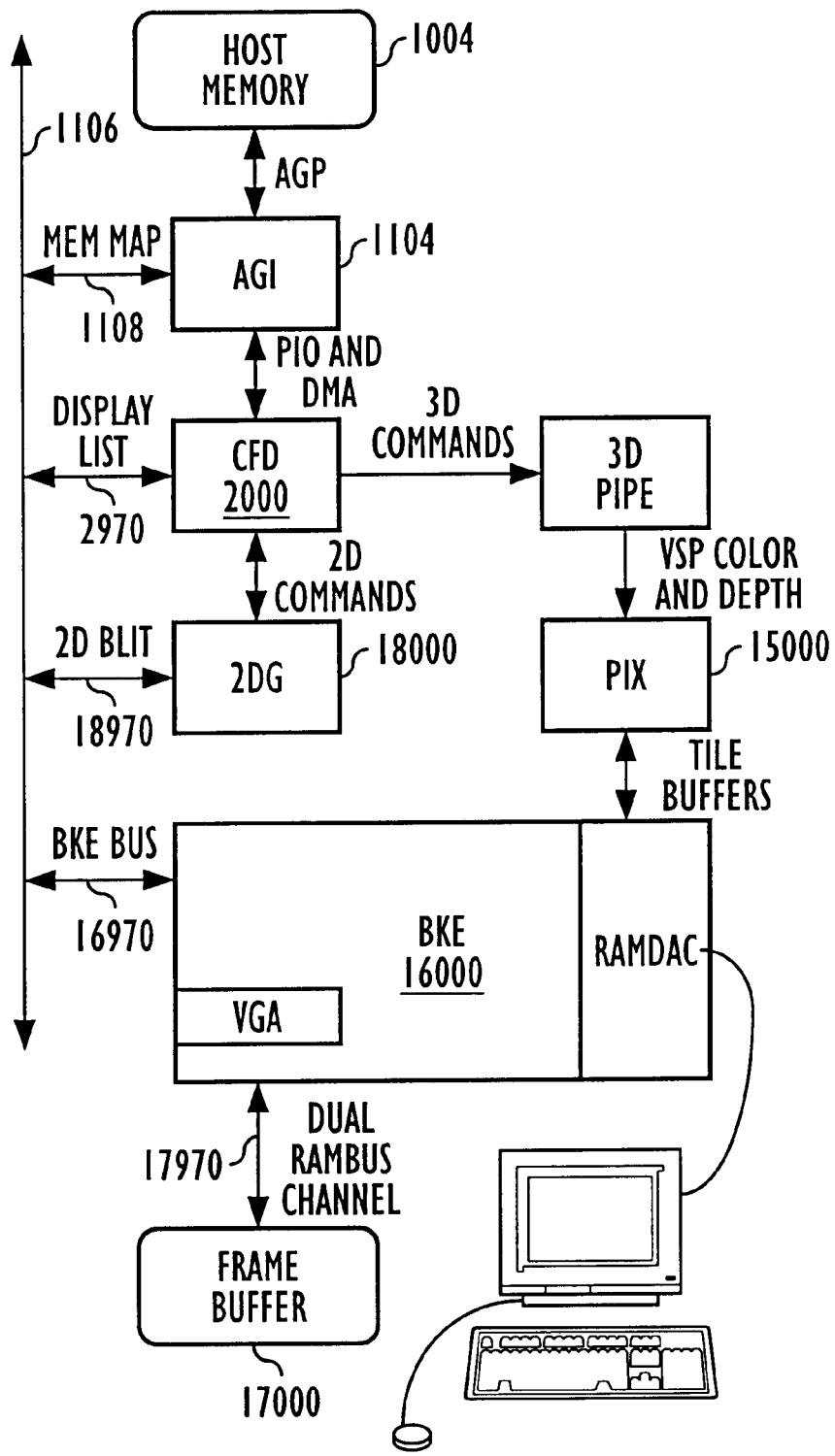
FIG. 66 is a diagrammatic illustration showing the Back-End Block (BKE) and units interfacing to it.

FIG. 66 shows the BackEnd with the units interfacing to it. As it is seen in the diagram, BKE mostly interacts with the Pixel Unit to read and write 3D tiles, and the 2D graphics engine 18000 (illustrated in FIG. 15) to perform Blit operations. The CFD unit uses the BKE bus to read display lists from the Frame Buffer. The AGI Unit 1104 reads and write BKE registers and the Memory Mapped Frame Buffer data.

The main BackEnd functions are:
3D Tile read
3D Tile write using Pixel Ownership
Pixel Ownership for write enables and overlay detection
Scanout using Pixel Ownership
Fixed ratio zooms
3D Accumulation Buffer
Frame Buffer read and writes
Color key to winid map
VGA
RAMDAC

3D Tile Read

BKE receives prefetched Tile Begin commands from PIX. These packets originate at SRT and bypass all 3D units to provide the latency needed to read the content of a tile buffer. The 3D window characteristics are initialized by the Begin Frame commands received earlier similarly from PIX. These characteristics include addresses for the color and depth surfaces, the enable bits for the planes (alpha, stencil, A and B buffers), the window width, height and stride, the color format, etc.

The pixel addresses are calculated using the window parameters. Taking advantage of tile geometry, 16 pixels are fetched with a single memory read request.

The Pixel Ownership is not consulted for 3D tile reads. If the window is in the main screen, the ownership (which window is on top) is determined during the write process.

Pixels are not extended to 24 bit colors for reduced precision colors, but unpacked into 32 bit pixel words. Depth values are read if needed into separate buffers.

Frequently Begin Tile command may indicate that no tile reading is required because a clear operation will be applied. The tile buffer is still allocated and pixel ownership for tile write will start.

3D Tile Write

3D Tile Write process starts as soon as a 3D tile read is finished. This latency is used to determine the pixel ownership write enables. The tile start memory address is already calculated during the 3D Tile Read process. The write enables are used as write masks for the Rambus Memory based Frame Buffer. The colors are packed as specified by the color depth parameter before written into the Frame Buffer.

Pixel Ownership

Pixel ownership is used to determine write enables to the shared screen and identify overlay windows for scanout reads.

The pixel ownership block include 16 bounding boxes as well as a per pixel window id map with 8 bit window ids. These window ids point to a table describing 64 windows. Separate enable bits for the bounding box and winid map mechanisms allow simultaneous use. Control bits are used to determine which mechanism is applied first.

Pixel ownership uses screen x and y pixel coordinates. Each bounding box specifies the maximum and minimum pixel coordinates that are included in that window. The bounding boxes are ordered such that the top window is specified by the last enabled bounding box. The bounding boxes are easy to set up for rectangular shaped windows. They are mostly intended for 3D windows but when a small number of 2D windows are used this mechanism can also be used to clip 2D windows.

For arbitrary shaped and larger number windows, a more memory intensive mechanism is used. An 8-bit window id map per pixel is optionally maintained to identify the window that a given screen pixel belongs.

For writes, if the window id of the tile matches the pixel id obtained by pixel ownership, the pixel write is enabled. For scanout, transition from screen to overlays and back are detected by comparing the pixel ownership window id with the current scanout window id.

To accelerate the pixel ownership process, the per pixel check is frequently avoided by performing a 16 pixels check. In case an aligned horizontal 16-pixel strip all share the same window id, this can be determined in one operation.

Scanout

Scanout reads the frame buffer color and sends the data to the RAMDAC for display. Scanout is the highest priority operation on the Frame Buffer. Pixels to be scanned out are passed through the read Pixel ownership block to do virtual blits, overlays, etc. A relatively large queue is used at the input to the RAMDAC to smooth out the irregular latencies involved with handling overlays and taking advantage of horizontal blanking periods.

Palette and Gamma corrections are performed by the RAMDAC. A fixed ratio zoom out function is performed by the backend during scanout.

Scanout has to be able to achieve 120 Hz refresh rates for a 1600 by 1200 screen with a reduced 3D performance. At full 3D performance, a minimum of 75 Hz refresh rate is required.

Scanout supports four different pixel color formats per window. All windows on the main screen share the same pixel color format. The supported color formats are:

32-bit RGBA (8-8-8)
24-bit RGB (8-8-8)
16-bit RGB (5-6-5)
8-bit color index

Scanout writes always 24 bits into the Scanout Queue (SOQ). No color conversion or unpacking is performed. The lower bits are cleared for 8 and 16-bit colors. Additional two bits are used to indicate the per-pixel color format.

Interlaced scanout is also supported for certain stereo devices.

Real time 3D applications need to speed up rendering by drawing to a small window and zooming the small image to a large window. This zooming with bilinear interpolation is done as the pixels are scanned out.

BKE supports certain fixed ratios for scaling: 16/n, n=1..15 in each direction. Sample points and interpolation coefficients are downloaded by software prior to the zoom operation.

Up to four window can be zoomed out using the same fixed ratio (same coefficients). Zoom bounding boxes are compared for scanned out pixels to determine if the pixels need to be taken from the zoom function output. The zoom logic is operational continuously to be able to sequence the coefficient table indices. Therefore the zoom output is ignored if the window id of the scanout does not match with the window id of the zoom boxes.

No overlap is allowed for the window zoom boxes.

3D Accumulation Buffers

BKE supports a 64-bit (16 bits per color) accumulation buffer. Accumulation commands are received as tween packets between frames. They perform multiplication and addition functions with the 3D tile colors, accumulation buffer colors and immediate values. The results are written into either the accumulation buffer or the 3D tiles.

When the scissor test is enabled, then only those pixels within the current scissor box are updated by any Accum operation; otherwise all pixels in the window are updated.

When pixels are written back into the 3D tiles, dithering and Color masking is also applied in addition to the scissor test. Accumulation buffers are not used for color index mode.

Frame Buffer Read and Writes

The BKE provides read and write interfaces for all internal sub-units and external units. AGI, CFD and TDG make Frame Buffer read and write requests using the BKE Bus. BKE arbitrates bus requests from these units.

The internal sub-units use the Mem Bus to access the Frame Buffer. 3D tile reads, 3D tile writes, Accumulation buffer read and writes, pixel ownership winid map reads, scanout screen and overlay reads, zoom window reads, and color key winid map writes, all use the Mem Bus to access the Frame Buffer.

Two Rambus Memory Channels with a total 3.2 Gbyte/sec bandwidth capability are used to sustain the performance requirements for the Frame Buffer. The scanout and zoom reads have the highest priority.

Color Key Window ID Map Writes

Window's color key functionality is provided by BKE via the window id map. The pixels that have a special color key will have their corresponding window id map set to point to the window the appropriate window (key id on). When writes with window id key id on happens only the pixels that are color keyed will be replaced.

BKE includes a special feature that software can use to create window id maps for color keys. The winid for a pixel may be written when a color buffer write occurs in a special window and the colors are in a certain range.

RAMDAC

The RAMDAC is used to convert digital color values into analog signals. A software programmable color palette converts 8 bit color indexes to 24 bit RGB values. The same RAM is also used to perform look-up based gamma correction. The look-up RAM is organized as three 256×10 bit SRAMs, one for each component of the color.

The RAMDAC can operate up to 300 MHz and generates the pixel clocks. It accepts pixels from the VGA core or from the Scanout Queue. The RAMDA777C is acquired as a core from SEI. This document will only specify the interface with the core and basic requirements for its functionality.

VGA

The VGA core is used only during boot time and by full screen compatibility applications running under Windows NT. VGA core interfaces with BKE bus for register read and writes, with the Mem Bus for Frame Buffer read and writes and with RAMDAC for scanout in VGA mode. When the VGA unit is disabled its scanout is ignored.

The VGA core is acquired from Alpin Systems. This document will only specify the interface with the core and basic requirements for its functionality.

The BKE Bus

As described in the CFD description, there is a Backend Input Bus and Backend Output Bus, which together are called the BKE Bus.

Figure 67:
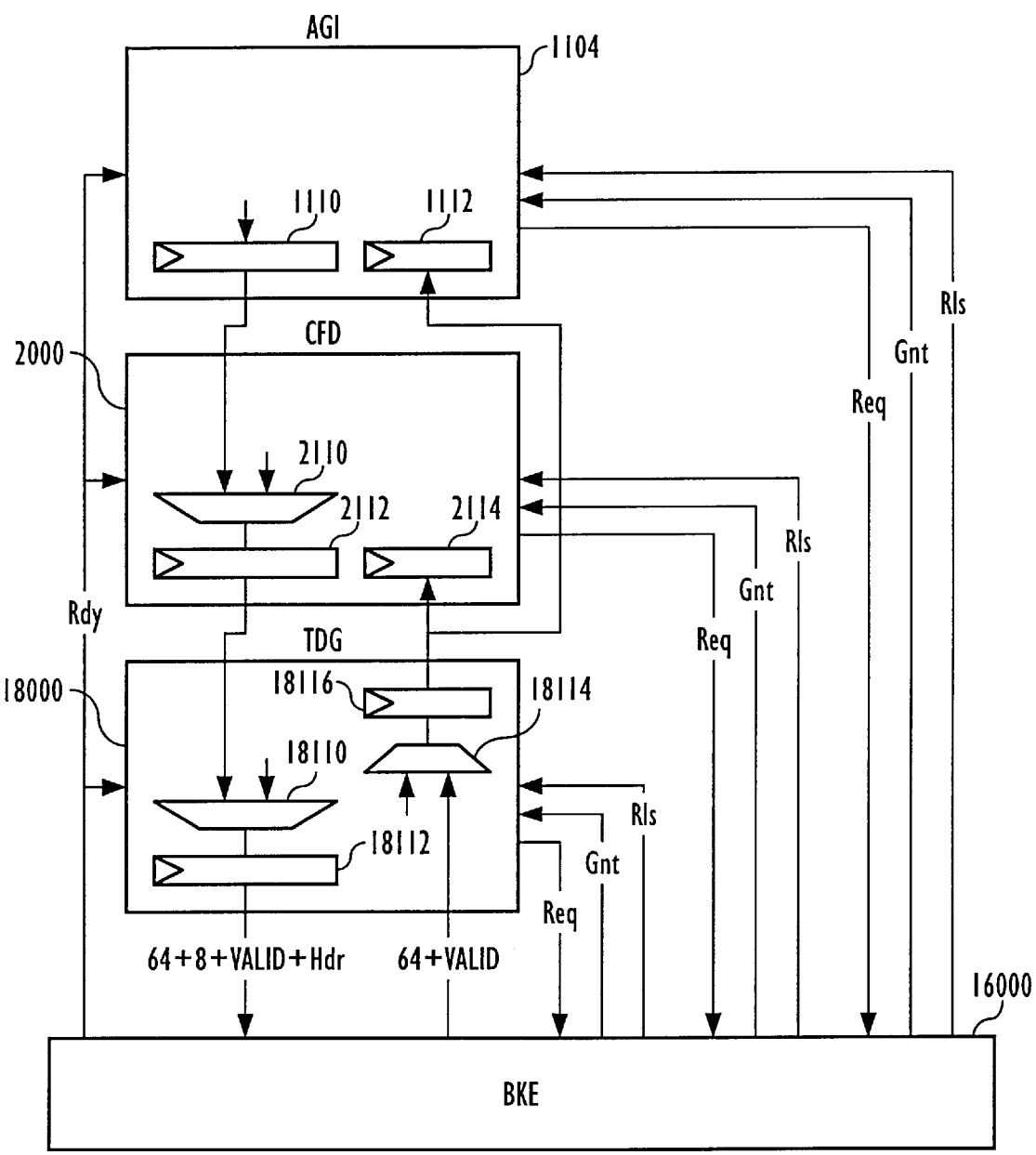
FIG. 67 is a diagrammatic illustration showing external client units that perform memory read and write through the BKE.

The external client units that perform memory read and write through the BKE are AGI, CFD and TDG, see FIG. 67.

These units follow a request/grant protocol to obtain the ownership of the BKE bus. Once a client is granted the bus, it can post read or write packet to the BKE and sample the read data from the BKE.

A client asks for BKE bus ownership by asserting its Req signal. BKE will arbitrate this request versus other conditions. BKE will assert Gnt signal when the requesting client is granted ownership. After finishing its memory access, the current owner can voluntarily release ownership by removing Req, or keep its ownership (park) until receives Rls (Release) signal from BKE. Client usually should relinquish ownership within limited time after receives Rls signal. For example, the client should no longer post new read/write request to BKE. If there is a pending read, the client should release ownership as soon as the last read data is returned.

Additional Description

The invention provides numerous innovative structures, methods, and procedures. The structures take many forms including individual circuits, including digital and circuits, computer architectures and systems, pipeline architectures and processor connectivity. Methodologically, the invention provides a procedure for deferred shading and numerous other innovative procedures for use with a deferred shader as well as having applicability to non-deferred shaders and data processors generally. Those workers having ordinary skill in the art will appreciate that although the numerous inventive structures and procedures are described relative to a three-dimensional graphical processor, that many of the innovations have clear applicability to two-dimensional processing, and to data processing and manipulation are involved generally. For example, many of the innovations may be implemented in the context of general purpose computing devices, systems, and architectures. It should also be understood that while some embodiments may require or benefit from hardware implementation, at least some of the innovations are applicable to either hardware or software/firmware implementations and combinations thereof.

A brief list of some of the innovative features provided by the above described inventive structure and method is provided immediately below. This list is exemplary, and should not be interpreted as a limitation. It is particularly noted that the individual structures and procedures described herein may be combined in various ways, and that these combinations have not been individually listed. Furthermore, while this list focuses on the application of the innovations to a three-dimensional graphics processor, the innovations may readily be applied to a general purpose computing machine having the structures and/or operation described in this specification and illustrated in the figures.

The invention described herein provides numerous inventive structures and methods, included, but not limited to structure and procedure for: Three-Dimensional Graphics Deferred Shader Architecture; Conservative Hidden Surface Removal; Tile Prefetch; Context Switching; Multipass by SRT for Better Antialiasing; Selection of Sample Locations; Sort Before Setup; Tween Packets; Packetized Data Transfer; Alpha Test, Blending, Stippled Lines, and the like; Chip Partitioning; Object Tags (especially in Deferred Shading Architecture); Logarithmic Normalization in Color Space (Floating Point Colors); Backend Microarchitecture; Pixel Zooming During Scanout; Virtual Block Transfer (BLT) on Scanout; Pixel Ownership; Window ID; Blocking and Non-blocking Interrupt Mechanism; Queuing Mechanisms; Token Insertion for Vertex Lists; Hidden Surface Removal; Tiled Content Addressable Z-buffer; three-stage Z-buffer Process; dealing with Alpha Test and Stencil in a Deferred Shader; Sending Stamps Downstream with Z Ref and Dz/dx and Dx/dy; Stamp Portion Memory Separate from the Z-buffer Memory; Sorted Transparency Algorithm; Finite State Machine per Sample; a SAM Implementation; Fragment Microarchitecture ; GEO Microarchitecture; Pipestage Interleaving; Polygon Clipping Algorithm; 2-Dimensional Block Microarchitecture; Zero-to-one Inclusive Multiplier (Mul-18p); Integer-floating-integer (lfi) Match Unit; Taylor Series Implementation; Math Block Construction Method; Multi-chip Communication Ring Graphics; How to Deal with Modes in a Deferred Shader; Mode Catching; MLM Pointer Storage; Clipped Polygons in Sort Whole in Polygon Memory; Phong/bump Microarchitecture; Material-tag-based Resource Allocation of Fragment Engines; Dynamic Microcode Generation for Texture Environment and Lighting; How to Do Tangent Space Lighting in a Deferred Shading Architecture; Variable Scale Bump Maps; Automatic Basis Generation; Automatic Gradient-field GenerationNormal Interpolation by Doing Angle and Magnitude Separately; Post-tile-sorting Setup Operations in Deferred Shader; Unified Primitive Description; Tile-relative Y-values and Screen Relative X-values; Hardware Tile Sorting; Enough Space Lookahead Mechanism; Touched Tile Implementation; Texture Re-use Matching Registers (Incl Deferred Shader); Samples Expanded to Pixels (Texture Miss Handling); Tile Buffers and Pixel Buffers (Texture Microarchitecture); and packetized data transfer in a processor.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A graphics rendering system for forming a rendered image from graphics primitives, the rendered image stored in a frame buffer, the graphics rendering device comprising:
   (A) a host processor;
   (B) a system memory;
   (C) a frame buffer storing pixels;
   (D) a device for receiving commands comprising:
      (1) a 2D command queue memory receiving and storing first direct memory access commands and first commands to perform two-dimensional graphics operations;
      (2) a 3D command queue memory receiving and storing second direct memory access commands and second commands to perform three-dimensional graphics operations, the second commands comprising: some of the graphics primitives; and part of a pipeline state;
      (3) a 2D response queue memory receiving and storing third commands to perform two-dimensional graphics operations;
      (4) a 3D response queue memory receiving and storing fourth commands to perform three-dimensional graphics operations, the fourth commands comprising: some of the graphics primitives; and part of the pipeline state; and
      (5) a direct memory access controller coupled to the 2D command queue memory and the 3D command queue memory, the direct memory access controller comprising:
         (a) logic receiving the stored first direct memory access commands and performing the first direct memory access commands by reading the third commands from the system memory and writing the read third commands into the 2D response queue; and
         (b) logic receiving the stored second direct memory access commands and performing the second direct memory access commands by reading the fourth commands from the system memory and writing the read fourth commands into the 3D response queue.
   (E) a geometry unit comprising:
      (1) logic transforming the graphics primitives;
      (2) logic clip testing the graphics primitives to determine if the graphics primitives are at least partially contained in a view volume;
      (3) logic performing face determination to discard any of the graphics primitives that are facing away from a viewing point;
   (F) a sort memory storing:
      (1) the part of the pipeline state needed for hidden surface removal; and
      (2) the part of the graphics primitives needed for hidden surface removal, comprising vertex locations;
   (G) a state memory storing:
      (1) the graphics primitives for a frame with attributes of the graphics primitives; and
      (2) the part of the graphics primitives not needed for hidden surface removal, comprising vertex colors and texture coordinates;
   (H) a sort unit comprising:
      (1) logic sorting the graphics primitives according to tile areas within the image;
      (2) logic reading the sorted graphics primitives from the sort memory according to tile;
   (I) a setup unit computing derivatives for the sorted graphics primitives;
   (J) a cull unit performing hidden surface removal to determine which portions of the graphics primitives stored in the scene memory affect the final color of the pixels in the frame buffer;
   (K) one or more computational units generating fragment color for each sample or group of samples within each of the pixels, the generation of color values for each of the pixels being done only for the portions of the graphics primitives that are determined to affect the pixels, the computational units comprising:
      (1) a device for interpolating data associated with the graphics primitives, the device comprising:
         (a) a memory storing cache fill polygon color data, the color data comprising vertex coordinates, w coordinates, and texture coordinates;

(b) logic computing barycentric coefficients for each of the graphics primitives from the vertex coordinates and the w coordinates;

(c) a cache memory storing a plurality of data cache entries corresponding to a plurality of the graphics primitives, the cached data comprising barycentric coefficients and texture coordinates;

(d) a register receiving a fragment of one of the graphics primitives, the fragment comprising fragment coordinates and a sample mask, the sample mask indicating sample locations within the pixel covered by the fragment;

(e) a lookup table determining lower bits of an interpolation location, an input of the lookup table comprising the sample mask, the interpolation location having sub-pixel accuracy;

(f) logic selecting and reading one of the stored data cache entries corresponding to the received fragment;

(g) logic computing interpolation coefficients from the barycentric coefficients and the interpolation location; and (h) logic interpolating the texture coordinates using the computed interpolation coefficients, generating texture coordinates at the interpolation location;

(2) a device for interpolating vertex surface normals comprising:

(a) logic decomposing each of the vertex surface normals into a vertex magnitude vector and a vertex direction vector;

(b) logic computing an interpolated magnitude vector from a plurality of the vertex magnitude vectors and the computed interpolation coefficients;

(c) logic computing an interpolated direction vector from a plurality of the vertex direction vectors and the computed interpolation coefficients; and (d) logic combining the interpolated magnitude vector and the interpolated direction vector to generate an interpolated surface normal.

(L) a pixel unit comprising:

(1) logic blending the fragment colors together to generate per-pixel color values; and (2) logic storing the generated per-pixel color values into the frame buffer;

(M) a status monitoring device comprising:

(1) logic associating object tags with the three-dimensional objects as the three-dimensional objects are processed by the graphics rendering system;

(2) logic testing the three-dimensional objects with one or more visibility criteria as the three-dimensional objects are processed in the graphics rendering system;

(3) a status register comprising a plurality of bits;

(4) logic selecting one of the bits in the status register according to one of the object tags;

(5) logic setting the value of the selected bit in the status register according to response of the corresponding one of the three-dimensional objects to the testing with the visibility criteria; and (6) logic reading and transmitting the status register contents to the host processor, the host processor determining which of the three-dimensional objects are at least partially visible;

(N) a device for storing a digital image into the frame buffer comprising:

(1) a first memory storing a window identifier map, the window identifier map comprising a window identifier for each of the pixels in the frame buffer;

(2) a second memory storing a plurality of bounding box descriptions, each of the bounding box descriptions comprising maximum and minimum pixel coordinates of the corresponding bounding box and a bounding box window identifier;

(3) a register storing a programmatically assigned image identifier associated with the digital image;

(4) logic selecting an image pixel from the digital image;

(5) pixel ownership logic operating on the selected image pixel, the pixel ownership logic comprising:

(a) window identifier map test logic enabled by a programmatically set control bit, the window identifier map test logic comprising:

(i) logic reading the window identifier from the first memory that corresponds to the selected image pixel;

(ii) a comparator circuit comparing the assigned image identifier to the read window identifier; and (iii) logic discarding the selected image pixel if the assigned image identifier does not match the read window identifier; and (b) bounding box test logic enabled by a programmatically set control bit, the bounding box test logic comprising:

(i) logic selecting a first one of the bounding box descriptions such that the selected pixel is within the maximum and minimum pixel coordinates of the selected first bounding box description;

(ii) a comparator circuit comparing the assigned image identifier to the bounding box window identifier of the first bounding box description; and (iii) logic discarding the selected image pixel if the assigned image identifier does not match the bounding box window identifier of the first bounding box; and (c) logic writing the selected image pixel to the frame buffer if the selected image pixel was not discarded.

(O) a scanout device comprising:

(1) logic generating a histogram of the pixel values in the rendered image as the pixel values are stored into the frame buffer;

(2) logic computing a transformation function, based on the histogram, to adjust the scale and dynamic range of the pixel values so as to match the digital-to-analog converter;

(3) logic reading the pixel values from the frame buffer in a raster line order;

(4) logic transforming the read pixel values according to the computed transformation function; and (5) logic inputting the transformed pixel values to the digital-to-analog converter.

(P) a scanout device comprising:

(1) a memory storing programmatically downloaded interpolation coefficients;

(2) a register storing a programmatically selected one of a plurality of fixed zoom ratios;

(3) a register storing a programmatically selected location of a zoom bounding box within the computer display;

(4) a register storing a programmatically assigned a window identifier associated with the zoom bounding box;

(5) logic reading a first pixel color from the frame buffer;

(6) logic reading a plurality of second pixel colors from the frame buffer;

(7) logic computing a zoomed pixel color from the plurality of second pixel colors and the downloaded interpolation coefficients;

(8) logic reading a pixel window identifier from the frame buffer;

(9) logic sending the computed zoomed pixel color to the digital-to-analog converter if the display pixel is within the zoom bounding box and the pixel window identifier equals the window identifier assigned to the zoom bounding box; and

(10) logic sending the read first pixel color to the digital-to-analog converter if the display pixel is not within the zoom bounding box or the pixel window identifier does not equal the window identifier assigned to the zoom bounding box.

2. A graphics rendering method for forming a rendered image in a frame buffer from graphics objects, the graphics objects comprising a plurality of graphics primitives, the method comprising the steps:

assigning tags to the objects;

testing the objects with one or more visibility criteria as the objects are processed in the graphics rendering pipeline, the testing of each of the objects comprising the testing of the primitives within the object;

setting bits in a status word indicating the response of the tagged objects to the testing with the visibility criteria; and reading the status word to determine which of the objects are at least partially visible.

3. The graphics rendering method of claim 2, the method further comprising the steps:

the step of inputting graphics objects comprising the inputting of the graphics primitives so as to approximate bounding volumes of the objects;

reading the status word to determine the visibility of the bounding volumes;

discarding the objects when the corresponding bounding volume is determined to be not visible receiving the graphics objects;

accumulating a plurality of the objects by storing the graphics primitives in a memory;

processing the accumulated objects to divide the primitives into stamp portions, remove portions of the primitives that are guaranteed to not affect the final results in the frame buffer, and identify other potions of the primitives as visible stamp portions; and performing the step of processing the accumulated objects on a plurality of the objects before performing the step of reading the status word, the status word then being used to determine the visibility of each of the plurality of the accumulated objects.

4. A graphics rendering method for forming a rendered image stored in a frame buffer, the graphics rendering method comprising the steps:

receiving graphics primitives;

transforming the graphics primitives;

clip testing the graphics primitives to determine if the graphics primitives are at least partially contained in a view volume;

face determination to discard any of the graphics primitives that are facing away from a viewing point;

performing setup for incremental render for the graphics primitives, comprising the computing of derivatives;

storing, in a spatial memory: (1) the part of the pipeline state needed for hidden surface removal; and (2) the part of the graphics primitives needed for hidden surface removal, comprising vertex locations and spatial derivatives;

storing, in a polygon memory: (1) the part of the pipeline state not needed for hidden surface removal; and (2) the part of the graphics primitives not needed for hidden surface removal, comprising vertex colors, texture coordinates, and color derivatives;

hidden surface removal to determine which portions of the graphics primitives stored in the spatial memory affect the final color of pixels in the frame buffer;

fragment coloring to generate color values for each fragment, each fragment comprising a sample or a group of samples within one of the pixels, the generation of color values for each of the fragments being done only for the portions of the graphics primitives that are determined to affect the final color of pixels in the frame buffer;

blending the fragment colors together to generate a single color value per pixel; and storing the generated per-pixel color values into the frame buffer.

5. A graphics rendering method for forming a rendered image stored in a frame buffer, the graphics rendering method comprising the steps:

receiving graphics primitives;

transforming the graphics primitives;

clip testing the graphics primitives to determine if the graphics primitives are at least partially contained in a view volume;

face determination to discard any of the graphics primitives that are facing away from a viewing point;

sorting the graphics primitives according to tile areas within the image;

storing, in a sort memory: (1) the part of the pipeline state needed for hidden surface removal; and (2) the part of the graphics primitives needed for hidden surface removal, comprising vertex locations;

storing, in a state memory: (1) the part of the pipeline state not needed for hidden surface removal; and (2) the part of the graphics primitives not needed for hidden surface removal, comprising vertex colors and texture coordinates;

reading the sorted graphics primitives from the sort memory according to tile;

performing setup for incremental render on the sorted graphics primitives read from the sort memory, comprising the computing of derivatives;

hidden surface removal to determine which portions of the sorted graphics primitives affect the final color of pixels in the frame buffer;

fragment coloring to generate color values for each fragment, each fragment comprising a sample or a group of samples within one of the pixels, the generation of color values for each of the fragments being done only for the portions of the graphics primitives that are determined to affect the final color of pixels in the frame buffer;

blending the fragment colors together to generate a single color value per pixel; and storing the generated per-pixel color values into the frame buffer.

6. A method for displaying a graphics image within a window on a computer display, the method comprising the steps:
   storing an image in a frame buffer;
   downloading interpolation coefficients;
   selecting one of a plurality of fixed zoom ratios;
   locating a zoom bounding box within the computer display;
   assigning a window identifier to the zoom bounding box;
   for a display pixel within the computer display, sending pixel data to a digital-to-analog converter, further comprising the steps:
      reading a first pixel color from the frame buffer;
      reading a plurality of second pixel colors from the frame buffer;
      computing a zoomed pixel color from the plurality of second pixel colors and the downloaded interpolation coefficients;
      reading a pixel window identifier from the frame buffer;
      if the display pixel is within the zoom bounding box and the pixel window identifier equals the window identifier assigned to the zoom bounding box, sending the computed zoomed pixel color to the digital-to-analog converter; and
      if the display pixel is not within the zoom bounding box or the pixel window identifier does not equal the window identifier assigned to the zoom bounding box, sending the read first pixel color to the digital-to-analog converter.

7. A method for storing a digital image into a frame buffer, the frame buffer comprising an array of pixels, the method comprising the steps:
   storing a window identifier map, the window identifier map comprising a window identifier for each of the pixels in the frame buffer;
   storing a plurality of bounding box descriptions, each of the bounding box descriptions comprising maximum and minimum pixel coordinates of the corresponding bounding box and a bounding box window identifier;
   assigning an image identifier to the digital image;
   selecting an image pixel from the digital image;
   ownership testing the selected image pixel, the ownership test comprising the steps:
      if a window identifier map test is enabled, the window identifier map test is performed, comprising the steps:
         reading the window identifier from the window identifier map that corresponds to the selected image pixel;
         comparing the assigned image identifier to the read window identifier; and
         if the assigned image identifier does not match the read window identifier, the selected pixel is discarded and not written to the frame buffer; and
      if a bounding box test is enabled, the bounding box test is performed, comprising the steps:
         selecting a first one of the bounding box descriptions such that the selected pixel is within the maximum and minimum pixel coordinates of the first bounding box description;
         comparing the assigned image identifier to the bounding box window identifier of the first bounding box description; and
         if the assigned image identifier does not match the bounding box window identifier of the first bounding box description, the selected pixel is discarded and not written to the frame buffer; and
      writing the selected image pixel to the frame buffer if the selected image pixel was not discarded.

8. The method for storing a digital image into a frame buffer of claim 7, further comprising the step:
   storing the window identifier map in the frame buffer.

9. The method for storing a digital image into a frame buffer of claim 7, wherein the step of ownership testing is performed on a plurality of pixels in parallel.

10. A device for receiving commands in a computer graphics processor, the device comprising:
    a 2D command queue memory receiving and storing first direct memory access commands and first commands to perform two-dimensional graphics operations;
    a 3D command queue memory receiving and storing second direct memory access commands and second commands to perform three-dimensional graphics operations;
    a 2D response queue memory receiving and storing third commands to perform two-dimensional graphics operations;
    a 3D response queue memory receiving and storing fourth commands to perform three-dimensional graphics operations; and
    a direct memory access controller coupled to the 2D command queue memory and the 3D command queue memory, the direct memory access controller comprising:
       (1) first logic receiving the stored first direct memory access commands and performing the first direct memory access commands by reading the third commands from a memory external to the computer graphics pipeline and writing the read third commands into the 2D response queue; and
       (2) second logic receiving the stored second direct memory access commands and performing the second direct memory access commands by reading the fourth commands from the memory external to the computer graphics pipeline and writing the read fourth commands into the 3D response queue.

11. The device for receiving commands in a computer graphics processor of claim 10, the device further comprising:
    a programmable 2D high water mark register storing the number of entries allowed in the 2D command queue memory;
    logic generating an interrupt when the number of entries in the 2D command queue memory is greater than the number stored in the 2D high water mark register;
    a programmable 2D low water mark register storing the maximum number of entries in the 2D command queue memory before writing to the 2D command queue is allowed; and
    logic generating an interrupt when the number of entries in the 2D command queue memory is less than the number stored in the 2D high water mark register;
    a programmable 3D high water mark register storing the number of entries allowed in the 3D command queue memory;
    logic generating an interrupt when the number of entries in the 3D command queue memory is greater than the number stored in the 3D high water mark register; and a programmable 3D low water mark register storing the maximum number of entries in the 3D command queue memory before writing to the 3D command queue is allowed; and logic generating an interrupt when the number of entries in the 3D command queue memory is less than the number stored in the 3D high water mark register.

12. A method of interpolating data associated with graphics primitives in a computer graphics pipeline, comprising the steps:

receiving color data, the color data comprising vertex coordinates, w coordinates, and texture coordinates;

computing barycentric coefficients for each of the graphics primitives;

storing a plurality of data cache entries corresponding to a plurality of the graphics primitives, the cached data comprising barycentric coefficients and texture coordinates;

receiving a graphics primitives fragment comprising fragment coordinates;

selecting and reading one of the stored data cache entries corresponding to the received graphics primitives fragment;

computing interpolation coefficients from the barycentric coefficients and the fragment coordinates; and interpolating the texture coordinates using the computed interpolation coefficients.

13. A method of interpolating texture coordinates in a computer graphics pipeline, comprising the steps:

receiving a graphics primitive comprising vertex coordinates, w coordinates, and texture coordinates;

receiving a fragment of the graphics primitive, the fragment comprising a sample mask, the sample mask indicating sample locations within a pixel covered by the fragment;

determining interpolation coordinates within the pixel by inputting the sample mask into a programmable lookup table, the interpolation coordinates having sub-pixel accuracy;

computing interpolation coefficients using the interpolation coordinates, the vertex coordinates, and the w coordinates; and interpolating the texture coordinates using the computed interpolation coefficients, generating texture coordinates at the interpolation coordinates.

14. A method of interpolating surface normals in a computer graphics pipeline, comprising the steps:

receiving a graphics primitive comprising vertex coordinates, w coordinates, and vertex surface normals;

receiving a fragment of the graphics primitive, the fragment being a part of the graphics primitive within a single pixel;

determining interpolation coordinates within the pixel;

computing interpolation coefficients using the interpolation coordinates, the vertex coordinates, and the w coordinates;

decomposing each of the vertex surface normals into a vertex magnitude vector and a vertex direction vector;

computing an interpolated magnitude vector from a plurality of the vertex magnitude vectors and the computed interpolation coefficients;

computing an interpolated direction vector from a plurality of the vertex direction vectors and the computed interpolation coefficients; and combining the interpolated magnitude vector and the interpolated direction vector to generate an interpolated surface normal.

15. A status monitoring device for a computer graphics pipeline, the computer graphics pipeline forming a rendered image in a frame buffer by processing a plurality of three-dimensional objects, the three-dimensional objects each comprised of graphics primitives, the status monitoring device comprising:

logic associating object tags with the three-dimensional objects as the three-dimensional objects are processed by the computer graphics pipeline;

logic testing the three-dimensional objects with one or more visibility criteria as the three-dimensional objects are processed in the graphics rendering pipeline;

a status register comprising a plurality of bits;

logic selecting one of the bits in the status register according to one of the object tags;

logic setting the value of the selected bit in the status register according to response of the corresponding one of the three-dimensional objects to the testing with the visibility criteria; and logic reading and transmitting the status register contents to a host CPU, the CPU determining which of the three-dimensional objects are at least partially visible.

16. The status monitoring device of claim 15, further comprising:

logic generating graphics primitives representing bounding volumes of the three-dimensional objects;

logic reading and transmitting the status register contents to a host CPU, the host CPU determining which of the bounding volumes are at least partially visible and discarding the objects from further processing that are not determined to be at least partially visible.

17. The status monitoring device of claim 15, further comprising:

a memory accumulating a plurality of the three-dimensional objects;

logic dividing primitives into stamp portions, removing portions of the graphics primitives from the computer graphics pipeline that are guaranteed to not affect the rendered image in the frame buffer, and identifying other portions of the primitives as visible stamp portions; and logic simultaneously associating a plurality of the object tags on a one-to-one basis with a plurality of the three-dimensional objects as the three-dimensional objects are processed by the computer graphics pipeline, the status register then being used to determine the visibility of each of the accumulated objects.

18. A graphics rendering device for forming a rendered image from graphics primitives, the rendered image stored in a frame buffer, the graphics rendering device comprising:

(a) a geometry unit comprising:
  (1) logic transforming the graphics primitives;
  (2) logic clip testing the graphics primitives to determine if the graphics primitives are at least partially contained in the view volume;
  (3) logic performing face determination to discard any of the graphics primitives that are facing away from the viewing point;

(b) a setup unit computing derivatives;

(c) a scene memory storing:
  (1) the graphics primitives for a frame with attributes of the graphics primitives; and
  (2) the various settings of pipeline state throughout the frame;

(d) a cull unit performing hidden surface removal to determine which portions of the graphics primitives stored in the scene memory affect the final color of pixels in the frame buffer;
(e) one or more computational units generating fragment color values for each sample or group of samples within each of the pixels, the generation of color values for each of the pixels being done only for the portions of the graphics primitives that are determined to affect the pixels;
(f) a pixel unit comprising:
  (1) logic blending the fragment colors together to generate per-pixel color values; and
  (2) logic storing the generated per-pixel color values into the frame buffer.

19. A graphics rendering device for forming a rendered image from graphics primitives, the rendered image stored in a frame buffer, the graphics rendering device comprising:
(a) a geometry unit comprising:
  (1) logic transforming the graphics primitives;
  (2) logic clip testing the graphics primitives to determine if the graphics primitives are at least partially contained in the view volume;
  (3) logic performing face determination to discard any of the graphics primitives that are facing away from the viewing point;
(b) a setup unit computing derivatives, the derivatives comprising spatial derivatives and color derivatives;
(c) a spatial memory storing:
  (1) the part of a pipeline state needed for hidden surface removal; and
  (2) the part of the graphics primitives needed for hidden surface removal, comprising vertex locations and the spatial derivatives;
(d) a polygon memory storing:
  (1) the part of a pipeline state not needed for hidden surface removal; and
  (2) the part of the graphics primitives not needed for hidden surface removal, comprising vertex colors, texture coordinates, and the color derivatives;
(e) a cull unit performing hidden surface removal to determine which portions of the graphics primitives stored in the scene memory affect the final color of pixels in the frame buffer;
(f) one or more computational units generating fragment color values for each sample or group of samples within each of the pixels, the generation of color values for each of the pixels being done only for the portions of the graphics primitives that are determined to affect the pixels;
(g) a pixel unit comprising:
  (1) logic blending the fragment colors together to generate per-pixel color values; and
  (2) logic storing the generated per-pixel color values into the frame buffer.

20. A graphics rendering device for forming a rendered image from graphics primitives, the rendered image stored in a frame buffer, the graphics rendering device comprising:
(a) a geometry unit comprising:
  (1) logic transforming the graphics primitives;
  (2) logic clip testing the graphics primitives to determine if the graphics primitives are at least partially contained in the view volume;
  (3) logic performing face determination to discard any of the graphics primitives that are facing away from the viewing point;
(b) a sort memory storing:
  (1) the part of the pipeline state needed for hidden surface removal; and
  (2) the part of the graphics primitives needed for hidden surface removal, comprising vertex locations;
(c) a state memory storing:
  (1) the graphics primitives for a frame with attributes of the graphics primitives; and
  (2) the part of the graphics primitives not needed for hidden surface removal, comprising vertex colors and texture coordinates;
(d) a sort unit comprising:
  (1) logic sorting the graphics primitives according to tile areas within the image;
  (2) logic reading the sorted graphics primitives from the sort memory according to tile;
(e) a setup unit computing derivatives for the sorted graphics primitives;
(f) a cull unit performing hidden surface removal to determine which portions of the graphics primitives stored in the scene memory affect the final color of pixels in the frame buffer;
(g) one or more computational units generating fragment color values for each sample or group of samples within each of the pixels, the generation of color values for each of the pixels being done only for the portions of the graphics primitives that are determined to affect the pixels;
(h) a pixel unit comprising:
  (1) logic blending the fragment colors together to generate per-pixel color values; and
  (2) logic storing the generated per-pixel color values into the frame buffer.

21. A scanout device for a computer graphics pipeline, the pipeline storing a rendered image of pixel values into a frame buffer, the computer graphics pipeline comprising a computer display, the scanout device comprising:
  a memory storing programmatically downloaded interpolation coefficients;
  a register storing a programmatically selected one of a plurality of zoom ratios;
  a register storing a programmatically selected location of a zoom bounding box within the computer display;
  a register storing a programmatically assigned a window identifier associated with the zoom bounding box;
  logic reading a first pixel color from the frame buffer;
  logic reading a plurality of second pixel colors from the frame buffer;
  logic computing a zoomed pixel color from the plurality of second pixel colors and the downloaded interpolation coefficients;
  logic reading a pixel window identifier from the frame buffer;
  logic sending the computed zoomed pixel color to the digital-to-analog converter if the display pixel is within the zoom bounding box and the pixel window identifier equals the window identifier assigned to the zoom bounding box; and
  logic sending the read first pixel color to the digital-to-analog converter if the display pixel is not within the zoom bounding box or the pixel window identifier does not equal the window identifier assigned to the zoom bounding box.

22. A device for storing a digital image into a frame buffer, the frame buffer comprising an array of pixels, the device comprising:

a first memory storing a window identifier map, the window identifier map comprising a window identifier for each of the pixels in the frame buffer;

a second memory storing a plurality of bounding box descriptions, each of the bounding box descriptions comprising maximum and minimum pixel coordinates of the corresponding bounding box and a bounding box window identifier;

a register storing a programmatically assigned image identifier associated with the digital image;

logic selecting an image pixel from the digital image;

pixel ownership logic operating on the selected image pixel, the pixel ownership logic comprising:

(1) window identifier map test logic enabled by a programmatically set control bit, the window identifier map test logic comprising:

(a) logic reading the window identifier from the first memory that corresponds to the selected image pixel;

(b) a comparator circuit comparing the assigned image identifier to the read window identifier; and (c) logic discarding the selected image pixel if the assigned image identifier does not match the read window identifier; and (2) bounding box test logic enabled by a programmatically set control bit, the bounding box test logic comprising:

(a) logic selecting a first one of the bounding box descriptions such that the selected pixel is within the maximum and minimum pixel coordinates of the selected first bounding box description;

(b) a comparator circuit comparing the assigned image identifier to the bounding box window identifier of the first bounding box description; and (c) logic discarding the selected image pixel if the assigned image identifier does not match the bounding box window identifier of the first bounding box ; and (3) logic writing the selected image pixel to the frame buffer if the selected image pixel was not discarded.

23. A computing system for 3D graphics rendering, the system comprising:

a host processor;

a system memory; and a computer graphics pipeline coupled to host processor; the computer graphics pipeline comprising:

(1) a 2D command queue memory receiving and storing first direct memory access commands and first commands to perform two-dimensional graphics operations;

(2) a 3D command queue memory receiving and storing second direct memory access commands and second commands to perform three-dimensional graphics operations;

(3) a 2D response queue memory receiving and storing third commands to perform two-dimensional graphics operations;

(4) a 3D response queue memory receiving and storing fourth commands to perform three-dimensional graphics operations; and (5) a direct memory access controller coupled to the 2D command queue memory and the 3D command queue memory, the direct memory access controller comprising:

(a) first logic receiving the stored first direct memory access commands and performing the first direct memory access commands by reading the third commands from the system memory and writing the read third commands into the 2D response queue; and (b) second logic receiving the stored second direct memory access commands and performing the second direct memory access commands by reading the fourth commands from the system memory and writing the read fourth commands into the 3D response queue.

24. A device for interpolating data associated with graphics primitives in a computer graphics pipeline, the device comprising:

a memory storing color data, the color data comprising vertex coordinates, w coordinates, and texture coordinates;

logic computing barycentric coefficients for each of the graphics primitives from the vertex coordinates and the w coordinates;

a cache memory storing a plurality of data cache entries corresponding to a plurality of the graphics primitives, the cached data comprising barycentric coefficients and texture coordinates;

logic selecting and reading one of the stored data cache entries corresponding to a received graphics primitive fragment, the graphics primitive fragment comprising fragment coordinates;

logic computing interpolation coefficients from the barycentric coefficients and the fragment coordinates; and logic interpolating the texture coordinates using the computed interpolation coefficients.

25. A device for interpolating texture coordinates in a computer graphics pipeline, the device comprising:

a memory storing data associated with graphics primitives, the stored data comprising vertex coordinates, w coordinates, and texture coordinates;

a register receiving a fragment of the graphics primitive, the fragment comprising a sample mask, the sample mask indicating sample locations within a pixel covered by the fragment;

a lookup table determining lower bits of an interpolation location, the lookup table input comprising the sample mask, the interpolation location having sub-pixel accuracy;

logic computing interpolation coefficients using the interpolation location, the vertex coordinates, and the w coordinates; and logic interpolating the texture coordinates using the computed interpolation coefficients, generating texture coordinates at the interpolation location.

26. A device for interpolating vertex surface normals in a computer graphics pipeline, the device comprising:

a memory storing a graphics primitive, the graphics primitive comprising vertex coordinates, w coordinates, and vertex surface normals;

a register storing a fragment of the graphics primitive, the fragment being a part of the graphics primitive within a single pixel;

logic determining interpolation coordinates within the pixel;

logic computing interpolation coefficients using the interpolation coordinates, the vertex coordinates, and the w coordinates;

logic decomposing each of the vertex surface normals into a vertex magnitude vector and a vertex direction vector;

logic computing an interpolated magnitude vector from a plurality of the vertex magnitude vectors and the computed interpolation coefficients;

logic computing an interpolated direction vector from a plurality of the vertex direction vectors and the computed interpolation coefficients; and logic combining the interpolated magnitude vector and the interpolated direction vector to generate an interpolated surface normal.

27. A computing system for three-dimensional (3D) graphics rendering, generating an image stored in a frame buffer, the system comprising:

a host processor;

a system memory coupled to the host processor; and a computer graphics pipeline coupled to host processor; the computer graphics pipeline comprising:

logic associating object tags with three-dimensional objects as the three-dimensional objects are processed by the computer graphics pipeline;

logic testing the three-dimensional objects with one or more visibility criteria as the three-dimensional objects are processed in the graphics rendering pipeline;

a status register comprising a plurality of bits, the status register able to be read by the host processor;

logic selecting one of the bits in the status register according to one of the object tags; and logic setting the value of the selected bit in the status register according to response of the corresponding one of the three-dimensional objects to the testing with the visibility criteria.

28. A computing system for three-dimensional (3D) graphics rendering, generating an image stored in a frame buffer, the system comprising:

a host processor;

a system memory coupled to the host processor;

a computer graphics pipeline coupled to host processor; the computer graphics pipeline comprising:

logic associating object tags with three-dimensional objects as the three-dimensional objects are processed by the computer graphics pipeline;

logic testing the three-dimensional objects with one or more visibility criteria as the three-dimensional objects are processed in the graphics rendering pipeline;

a status register comprising a plurality of bits, the status register able to be read by the host processor;

logic selecting one of the bits in the status register according to one of the object tags; and logic setting the value of the selected bit in the status register according to response of the corresponding one of the three-dimensional objects to the testing with the visibility criteria;

the host processor executing a program module that directs the rendering of the image, to function in a specified manner, the program module including instructions for:

receiving one of the three-dimensional objects represented by non-renderable graphics primitives, the non-renderable graphics primitives defining a bounding volumes of the one of the three-dimensional objects;

inputting the one of the three-dimensional objects into the computer graphics pipeline by inputting the non-renderable graphics primitives; and reading the status register contents to determine if the object corresponding to the non-renderable graphics primitives is hidden.

29. The system of claim 31, wherein:

the computer graphics pipeline further comprising:

a memory accumulating a plurality of the three-dimensional objects, each represented by a corresponding set of the non-rendered primitives; and logic performing hidden surface removal to cull out parts of the primitives that definitely do not contribute to the final rendered image, the hidden surface removal being done for an area of the image before color data is generated for the graphics primitives in the area of the image, thereby reducing the amount of the color data needed to be generated; and the program module further including instructions for:

inputting a plurality of the three-dimensional objects before reading the status register;

reading the status register and inputting, to the computer graphics pipeline, renderable primitives corresponding to the three-dimensional objects whose non-renderable primitives are not hidden, thereby avoiding inputting the renderable primitives corresponding to the three-dimensional objects whose non-renderable primitives are hidden.

* * * * *